US009120214B2

(12) United States Patent
Vandenberg

(10) Patent No.: US 9,120,214 B2
(45) Date of Patent: Sep. 1, 2015

(54) FASTENER, INSTALLATION TOOL AND RELATED METHOD OF USE

(71) Applicant: National Nail Corp., Grand Rapids, MI (US)

(72) Inventor: Roger A. Vandenberg, Hudsonville, MI (US)

(73) Assignee: National Nail Corp., Grand Rapids, MI (US)

( * ) Notice: Subject to any disclaimer, the term of this patent is extended or adjusted under 35 U.S.C. 154(b) by 233 days.

(21) Appl. No.: 13/921,464

(22) Filed: Jun. 19, 2013

(65) Prior Publication Data

US 2013/0276589 A1    Oct. 24, 2013

Related U.S. Application Data

(63) Continuation-in-part of application No. 12/908,549, filed on Oct. 20, 2010, now Pat. No. 8,480,343, and a continuation-in-part of application No. 12/908,531, filed on Oct. 20, 2010, now Pat. No. 8,672,204, and a (Continued)

(51) Int. Cl.
*B25B 23/00* (2006.01)
*F16B 25/00* (2006.01)
*F16B 25/10* (2006.01)

(52) U.S. Cl.
CPC ............... *B25B 23/005* (2013.01); *B25B 23/00* (2013.01); *F16B 25/00* (2013.01);

(Continued)

(58) Field of Classification Search
CPC .... B25B 23/005; B25B 23/06; B25B 21/002; E04B 1/38; E04B 1/40; E04F 21/20; E04F 21/22; B23Q 7/08; B23Q 7/10
See application file for complete search history.

(56) References Cited

U.S. PATENT DOCUMENTS

| 126,366 A | 4/1872 | Wills |
|---|---|---|
| 137,414 A | 4/1873 | Burdick |

(Continued)

FOREIGN PATENT DOCUMENTS

| CA | 1242601 | 10/1988 |
|---|---|---|
| CH | 695482 | 6/2006 |

(Continued)

OTHER PUBLICATIONS

Fiberon DeckPilot Mar. 2009.

(Continued)

*Primary Examiner* — David B Thomas
(74) *Attorney, Agent, or Firm* — Warner Norcross & Judd LLP

(57) ABSTRACT

A fastener installation tool and related method are provided for installing fasteners in boards. The tool can include a feed mechanism that automatically and sequentially feeds collated fasteners to a nose assembly. The nose assembly can include a guide having an alignment projection extending downwardly from the guide, and configured to engage a board corner and/or side surface, so as to align an angled bore through which fasteners are guided with the board corner and or side surface. The nose assembly can include a magnetic element located adjacent a path on which the collated fasteners are advanced. The magnetic element can exert a magnetic force on an individual fastener, aligning it for precise entry into the angled bore. The nose assembly can include a guide pocket to positively constrain a fastener as it rotates to ensure a desired advancement trajectory. A related method of installation is provided.

20 Claims, 72 Drawing Sheets

Related U.S. Application Data continuation-in-part of application No. 13/452,581, filed on Apr. 20, 2012, now Pat. No. 8,955,210, which is a continuation-in-part of application No. 12/908,549, and a continuation-in-part of application No. 12/908,531.

(60) Provisional application No. 61/663,864, filed on Jun. 25, 2012, provisional application No. 61/712,650, filed on Oct. 11, 2012, provisional application No. 61/770,618, filed on Feb. 28, 2013, provisional application No. 61/294,681, filed on Jan. 13, 2010, provisional application No. 61/320,128, filed on Apr. 1, 2010, provisional application No. 61/480,399, filed on Apr. 29, 2011, provisional application No. 61/546,882, filed on Oct. 13, 2011.

(52) U.S. Cl.
CPC ........ *F16B 25/0015* (2013.01); *F16B 25/0063* (2013.01); *F16B 25/0073* (2013.01); *F16B 25/0084* (2013.01); *F16B 25/103* (2013.01)

(56) References Cited

U.S. PATENT DOCUMENTS

| | | |
|---|---|---|
| 138,784 A | 5/1873 | Bourn |
| 198,935 A | 1/1878 | Gilchrist |
| 411,202 A | 9/1889 | Rose |
| 877,831 A | 1/1908 | Creedon |
| 984,323 A | 2/1911 | Vauclain |
| 1,074,800 A | 10/1913 | King |
| 1,695,564 A | 12/1928 | Thomas |
| 2,083,092 A | 6/1937 | Richer |
| 2,229,565 A | 1/1941 | Hallowell, Jr. |
| 2,430,044 A | 11/1947 | Campsmith |
| 2,569,069 A | 9/1951 | Motel |
| 2,774,969 A | 12/1956 | Samples |
| 2,811,877 A | 11/1957 | Groff |
| 2,994,878 A | 8/1961 | Abrahamsen |
| 3,010,496 A | 11/1961 | Bruce |
| 3,012,247 A | 12/1961 | Sillars et al. |
| 3,080,185 A | 3/1963 | Walker |
| 3,115,168 A | 12/1963 | Acres |
| 3,147,484 A | 9/1964 | Nelson |
| 3,177,755 A | 4/1965 | Kahn |
| 3,207,023 A | 9/1965 | Knohl |
| 3,316,949 A | 5/1967 | Canfield |
| 3,357,295 A | 12/1967 | Smith |
| 3,360,176 A | 12/1967 | Gehl et al. |
| 3,489,041 A | 1/1970 | Hauenstein et al. |
| 3,633,640 A | 1/1972 | Moore |
| 3,707,043 A | 12/1972 | Jones |
| 3,738,218 A | 6/1973 | Gutshall |
| 3,942,405 A | 3/1976 | Wagner |
| 4,018,254 A | 4/1977 | DeCaro |
| 4,050,842 A | 9/1977 | Janin |
| 4,068,554 A | 1/1978 | Hirabayashi |
| 4,092,753 A | 6/1978 | Fuhrmann |
| 4,123,186 A | 10/1978 | Hoadley |
| 4,146,071 A | 3/1979 | Mueller et al. |
| 4,197,886 A | 4/1980 | MacDonald |
| 4,209,275 A | 6/1980 | Kim |
| 4,241,638 A | 12/1980 | Shimizu et al. |
| 4,287,923 A | 9/1981 | Hornung |
| 4,323,326 A | 4/1982 | Okada et al. |
| 4,329,095 A | 5/1982 | Schmuck |
| 4,329,099 A | 5/1982 | Shimizu et al. |
| 4,439,077 A | 3/1984 | Godsted |
| 4,572,038 A | 2/1986 | Graham |
| 4,572,720 A | 2/1986 | Rockenfeller et al. |
| 4,586,862 A | 5/1986 | Yamasaki |
| 4,611,515 A | 9/1986 | Marbourg, Jr. |
| 4,625,597 A | 12/1986 | Cast |
| 4,653,244 A | 3/1987 | Farrell |
| 4,834,602 A | 5/1989 | Takasaki |
| 4,995,768 A | 2/1991 | Craft |
| 5,015,134 A | 5/1991 | Gotoh |
| 5,019,080 A | 5/1991 | Hemer |
| 5,056,386 A | 10/1991 | Chaconas |
| 5,064,324 A | 11/1991 | Ragaller |
| 5,083,483 A | 1/1992 | Takagi |
| 5,123,311 A | 6/1992 | Dymek |
| 5,182,973 A | 2/1993 | Martindell |
| 5,188,496 A | 2/1993 | Giannuzzi |
| 5,282,708 A | 2/1994 | Giannuzzi |
| 5,322,396 A | 6/1994 | Blacker |
| 5,337,635 A | 8/1994 | Habermehl |
| 5,341,706 A | 8/1994 | Takagi |
| 5,351,586 A | 10/1994 | Habermehl et al. |
| 5,452,630 A | 9/1995 | Haas et al. |
| 5,465,492 A | 11/1995 | Bond |
| 5,469,767 A | 11/1995 | Habermehl |
| 5,509,330 A | 4/1996 | Nick |
| 5,531,142 A | 7/1996 | Adamo |
| 5,531,143 A | 7/1996 | Habermehl et al. |
| 5,568,753 A | 10/1996 | Habermehl et al. |
| 5,570,618 A | 11/1996 | Habermehl et al. |
| 5,687,624 A | 11/1997 | Tsuge et al. |
| D391,135 S | 2/1998 | Habermehl et al. |
| 5,740,705 A * | 4/1998 | Graham .................. 81/430 |
| 5,839,332 A | 11/1998 | Fujiyama et al. |
| 5,871,486 A | 2/1999 | Huebner et al. |
| 5,884,541 A | 3/1999 | Habermehl et al. |
| 5,904,079 A | 5/1999 | Tsuge et al. |
| 5,918,512 A | 7/1999 | Habermehl et al. |
| 5,927,163 A | 7/1999 | Habermehl et al. |
| 5,934,162 A | 8/1999 | Habermehl |
| 5,988,025 A | 11/1999 | Sasaki et al. |
| 5,996,452 A | 12/1999 | Chiang |
| 6,027,004 A | 2/2000 | Ramella et al. |
| 6,089,132 A | 7/2000 | Habermehl |
| 6,098,442 A | 8/2000 | Walldorf et al. |
| 6,109,144 A | 8/2000 | Muro |
| 6,109,146 A | 8/2000 | Muro |
| 6,148,699 A | 11/2000 | Han |
| 6,158,939 A | 12/2000 | Grossberndt et al. |
| 6,244,140 B1 | 6/2001 | Habermehl |
| 6,296,433 B1 | 10/2001 | Forsell et al. |
| 6,322,307 B1 | 11/2001 | Glover |
| 6,328,516 B1 | 12/2001 | Hettich |
| 6,332,741 B1 | 12/2001 | Janusz |
| 6,334,748 B1 | 1/2002 | Gudjonsson |
| 6,345,940 B2 | 2/2002 | Anjanappa et al. |
| 6,349,948 B1 | 2/2002 | Wu |
| 6,394,712 B1 | 5/2002 | Weinstein et al. |
| 6,419,489 B1 | 7/2002 | Jorneus et al. |
| 6,425,306 B1 | 7/2002 | Habermehl |
| 6,439,085 B1 | 8/2002 | Habermehl et al. |
| 6,453,780 B2 | 9/2002 | Habermehl |
| 6,481,937 B1 | 11/2002 | Sommerfeld et al. |
| 6,499,221 B1 | 12/2002 | Kuhn et al. |
| D469,007 S | 1/2003 | Chen et al. |
| 6,514,026 B1 | 2/2003 | Gerhard |
| 6,592,015 B1 | 7/2003 | Gostylla et al. |
| 6,601,480 B1 | 8/2003 | Habermehl |
| 6,604,901 B1 | 8/2003 | Grossberndt et al. |
| 6,623,228 B1 | 9/2003 | Hettich et al. |
| 6,632,057 B1 | 10/2003 | Fauchet |
| 6,666,638 B2 | 12/2003 | Craven |
| 6,711,974 B1 | 3/2004 | Lin |
| 6,769,332 B2 | 8/2004 | Muro |
| 6,843,402 B2 | 1/2005 | Sims et al. |
| 6,887,023 B1 | 5/2005 | Lu et al. |
| 6,915,724 B2 | 7/2005 | Kigel et al. |
| 6,941,635 B2 | 9/2005 | Craven |
| 6,941,847 B2 | 9/2005 | Habermehl et al. |
| 7,037,059 B2 | 5/2006 | Dicke |
| 7,044,460 B2 | 5/2006 | Bolton |
| 7,090,453 B2 | 8/2006 | Lin |
| 7,096,768 B1 | 8/2006 | Chen |
| 7,124,665 B1 | 10/2006 | Chen |
| 7,156,600 B2 | 1/2007 | Panasik et al. |
| 7,165,481 B2 | 1/2007 | Kikuchi |

(56) References Cited

U.S. PATENT DOCUMENTS

| | | |
|---|---|---|
| 7,210,382 B2 | 5/2007 | McCracken |
| 7,231,854 B2 | 6/2007 | Kikuchi |
| D557,130 S | 12/2007 | Kashikura et al. |
| D557,131 S | 12/2007 | Liu |
| 7,306,396 B1 | 12/2007 | Chen |
| 7,344,057 B2 | 3/2008 | Dion et al. |
| D567,644 S | 4/2008 | Liu |
| 7,374,377 B2 | 5/2008 | Bauman |
| 7,383,756 B1 | 6/2008 | Liu |
| 7,387,054 B2 | 6/2008 | Rajotte |
| 7,424,840 B1 | 9/2008 | Huang |
| 7,454,996 B2 | 11/2008 | Hsu |
| D581,776 S | 12/2008 | Yin-Feng |
| 7,487,699 B2 | 2/2009 | Xu |
| D604,153 S | 11/2009 | Wantz |
| 7,682,118 B2 | 3/2010 | Gong et al. |
| 7,682,119 B2 | 3/2010 | Chen |
| 7,695,228 B2 | 4/2010 | Craven |
| D614,942 S | 5/2010 | Gaudron |
| 7,735,400 B2 | 6/2010 | Chen |
| 7,866,236 B2 | 1/2011 | Hsu |
| 7,891,275 B2 | 2/2011 | Huang |
| RE42,207 E | 3/2011 | Janusz |
| D634,186 S | 3/2011 | Kemper |
| D637,071 S | 5/2011 | Gaudron et al. |
| D637,896 S | 5/2011 | Dotsey |
| 7,950,312 B2 | 5/2011 | Matthiesen et al. |
| 7,992,469 B2 | 8/2011 | Chang et al. |
| D647,393 S | 10/2011 | Carrillo et al. |
| 8,123,524 B2 | 2/2012 | Anitua Aldecoa |
| 8,162,196 B2 | 4/2012 | Gasser et al. |
| 8,192,124 B2 | 6/2012 | Wolpert et al. |
| D662,808 S | 7/2012 | Vandenberg |
| 8,376,203 B2* | 2/2013 | Martel et al. .......... 227/15 |
| D677,147 S | 3/2013 | Vandenberg |
| 2003/0024962 A1* | 2/2003 | Sims et al. .......... 227/148 |
| 2003/0235483 A1 | 12/2003 | Chen |
| 2004/0093997 A1 | 5/2004 | Huang |
| 2004/0141827 A1 | 7/2004 | Dicke |
| 2004/0175674 A1 | 9/2004 | Hurson |
| 2005/0265806 A1 | 12/2005 | Craven |
| 2005/0278934 A1 | 12/2005 | Orchard |
| 2007/0128001 A1 | 6/2007 | Su |
| 2007/0217887 A1 | 9/2007 | Lin |
| 2008/0025816 A1 | 1/2008 | Chen et al. |
| 2008/0080951 A1 | 4/2008 | Lin |
| 2008/0264218 A1 | 10/2008 | Wang et al. |
| 2008/0276761 A1 | 11/2008 | Hale et al. |
| 2008/0296341 A1 | 12/2008 | Francescon |
| 2009/0142159 A1 | 6/2009 | Wolpert et al. |
| 2009/0255386 A1 | 10/2009 | Liao |
| 2009/0314143 A1 | 12/2009 | Chen |
| 2010/0083610 A1 | 4/2010 | King |
| 2011/0167757 A1 | 7/2011 | Vandenberg |
| 2011/0170984 A1 | 7/2011 | Vandenberg |
| 2011/0232430 A1 | 9/2011 | Hale |
| 2012/0000327 A1 | 1/2012 | Park |
| 2012/0048909 A1 | 3/2012 | Gensmann et al. |
| 2012/0073410 A1 | 3/2012 | Hoffman et al. |
| 2012/0204409 A1* | 8/2012 | Vandenberg .......... 29/468 |
| 2013/0051955 A1 | 2/2013 | Su et al. |

FOREIGN PATENT DOCUMENTS

| | | |
|---|---|---|
| DE | 1077442 | 11/1955 |
| DE | 4228727 | 3/1994 |
| DE | 4331689 | 3/1994 |
| DE | 202008003131 | 10/2008 |
| DE | 202008011435 | 2/2009 |
| DE | 202009014890 | 5/2010 |
| DE | 202010006438 | 11/2010 |
| EP | 1260319 A2 | 11/2002 |
| EP | 1260319 A3 | 11/2002 |
| EP | 1260319 B1 | 11/2002 |
| EP | 1595627 | 11/2005 |
| EP | 1671752 A1 | 6/2006 |
| EP | 1671752 B1 | 6/2006 |
| EP | 1920890 | 5/2008 |
| EP | 1932623 | 6/2008 |
| EP | 1938928 | 7/2008 |
| EP | 2062690 | 5/2009 |
| EP | 2258518 | 12/2010 |
| EP | 2283977 | 2/2011 |
| EP | 2397706 | 12/2011 |
| EP | 2076362 | 3/2012 |
| FR | 2653046 | 4/1991 |
| GB | 191001226 | 12/1910 |
| GB | 167620 | 8/1921 |
| GB | 1009630 | 11/1965 |
| GB | 2127927 | 4/1984 |
| JP | 7217625 | 8/1995 |
| JP | 10329049 | 12/1998 |
| JP | 2000257616 | 9/2000 |
| JP | 2004308732 | 11/2004 |
| WO | 0037220 | 6/2000 |
| WO | 2006021026 | 3/2006 |
| WO | 2007091487 | 8/2007 |
| WO | 2011054328 | 5/2011 |

OTHER PUBLICATIONS

Fiberon DeckPilot Dec. 2009.
Kreg Jig downloaded from http://dregtool.com/products/pht/product.php?PRODUCT_ID=109.
Kreg Jig Jr. downloaded from http://kregtool.com/products/pht/product.php?PRODUCT_ID=32.
Kreg Micro Pocket Drill Guide downloaded from http://kregtool.com/products/pht/product.php?PRODUCT_ID=113.
Bostitch Miiifn—Hardwood Flooring Cleat Nailer downloaded from http://www.bostitch.com/default.asp?CATEGORY=FLOORING+NAILERS&TYPE=PRO . . . .
Fastening Deck Boards by Kim Katwijk and Linda Katwijk; Sep. 1, 2009; Professional Deck Builder; Sep.-Oct. 2009; pp. 1-6.

* cited by examiner

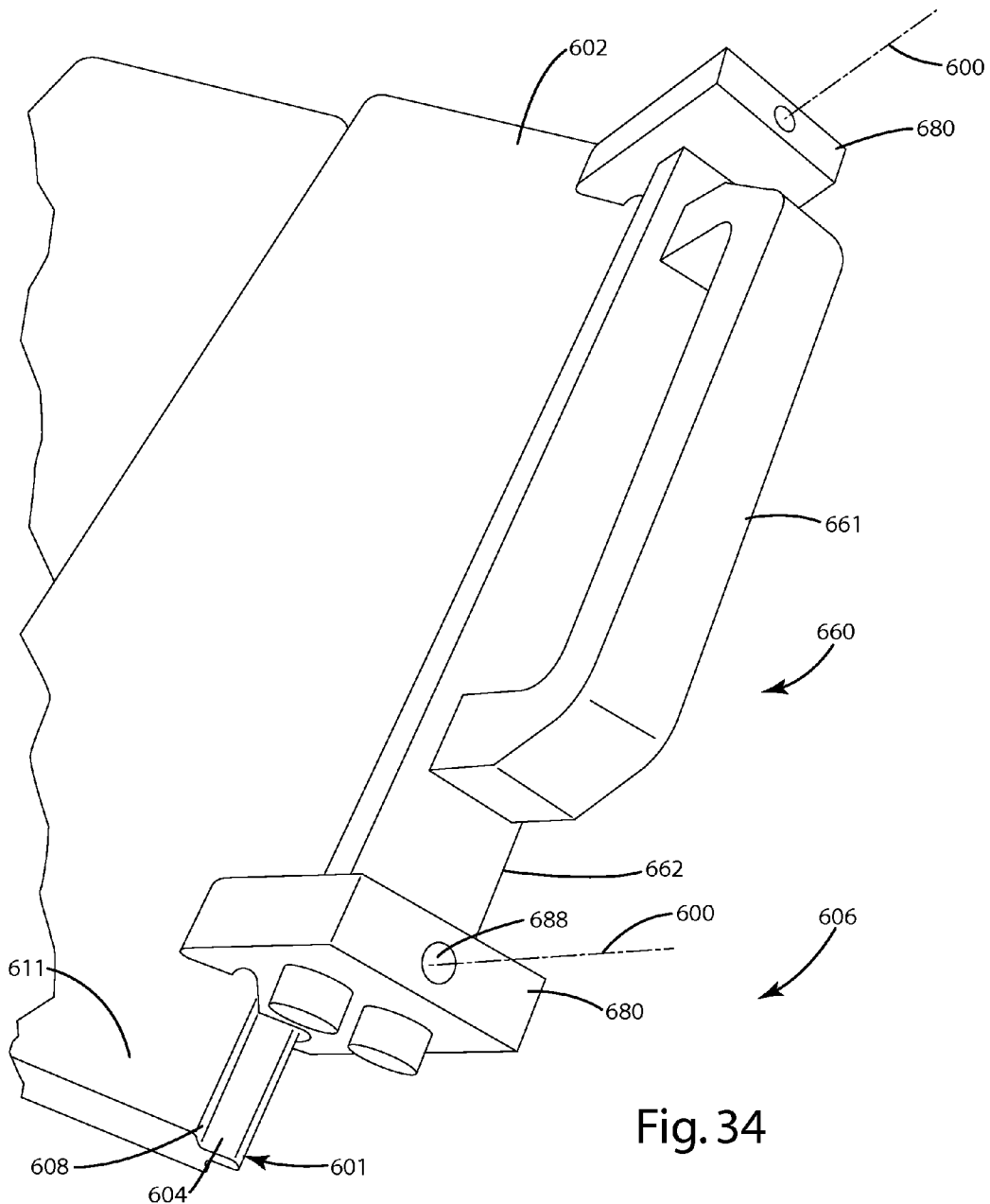

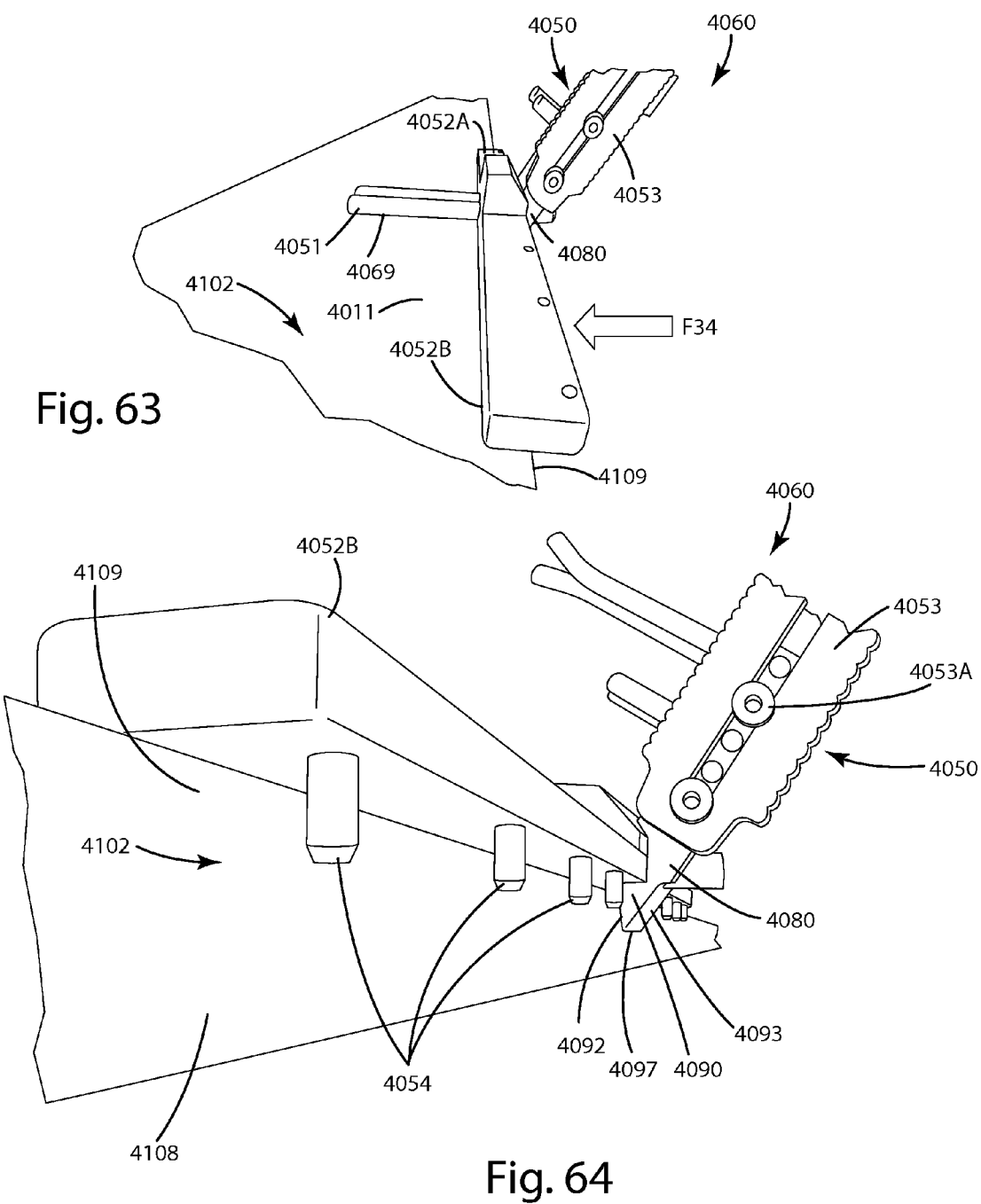

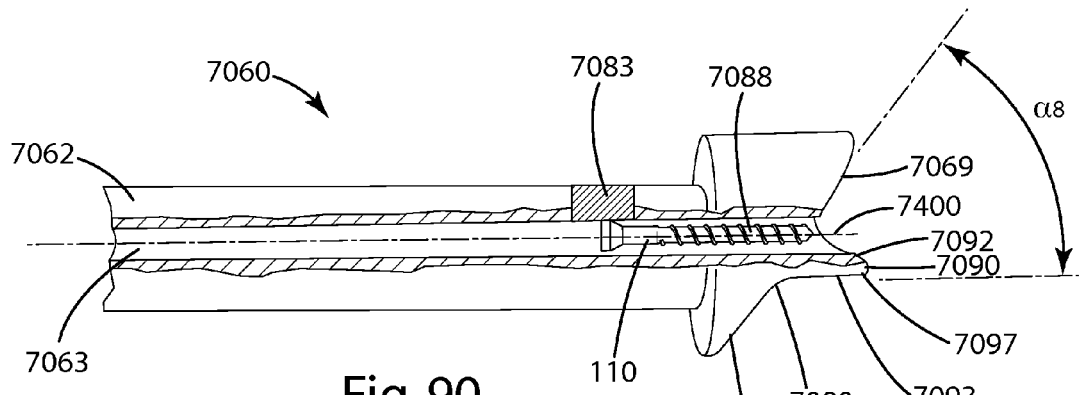
Fig. 90
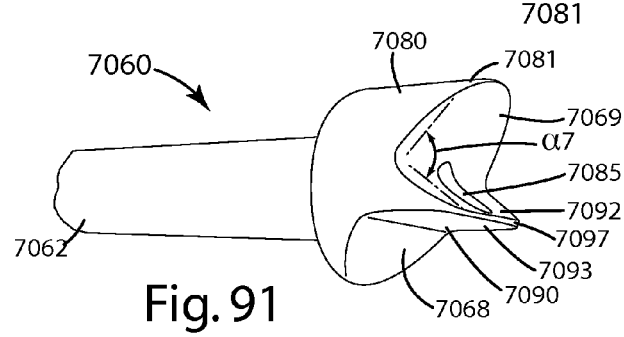
Fig. 91
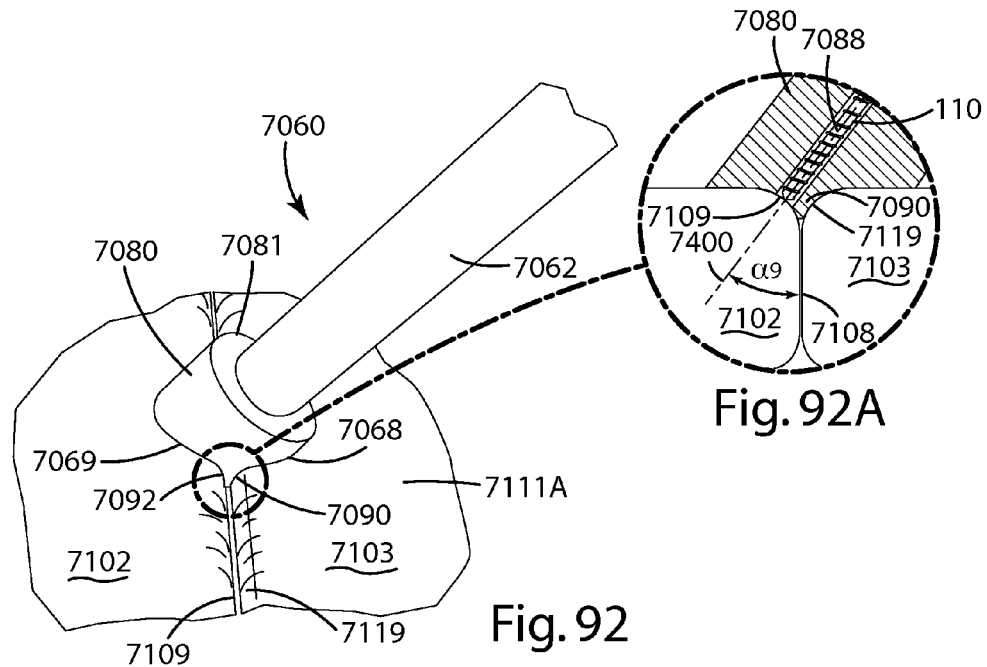
Fig. 92
Fig. 92A

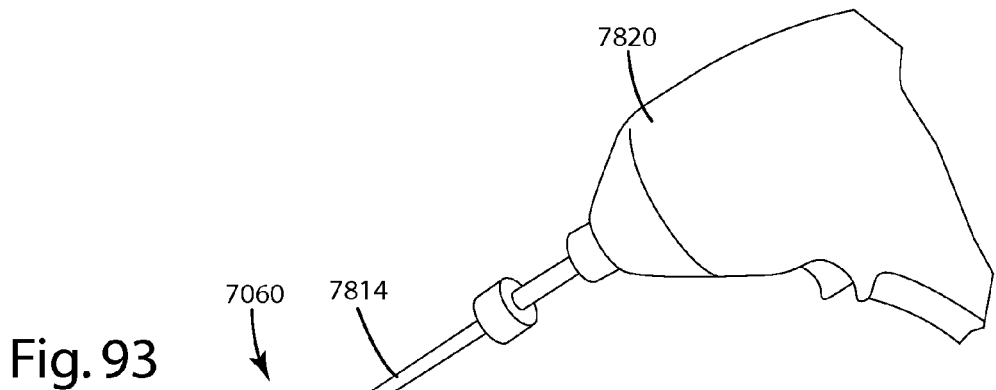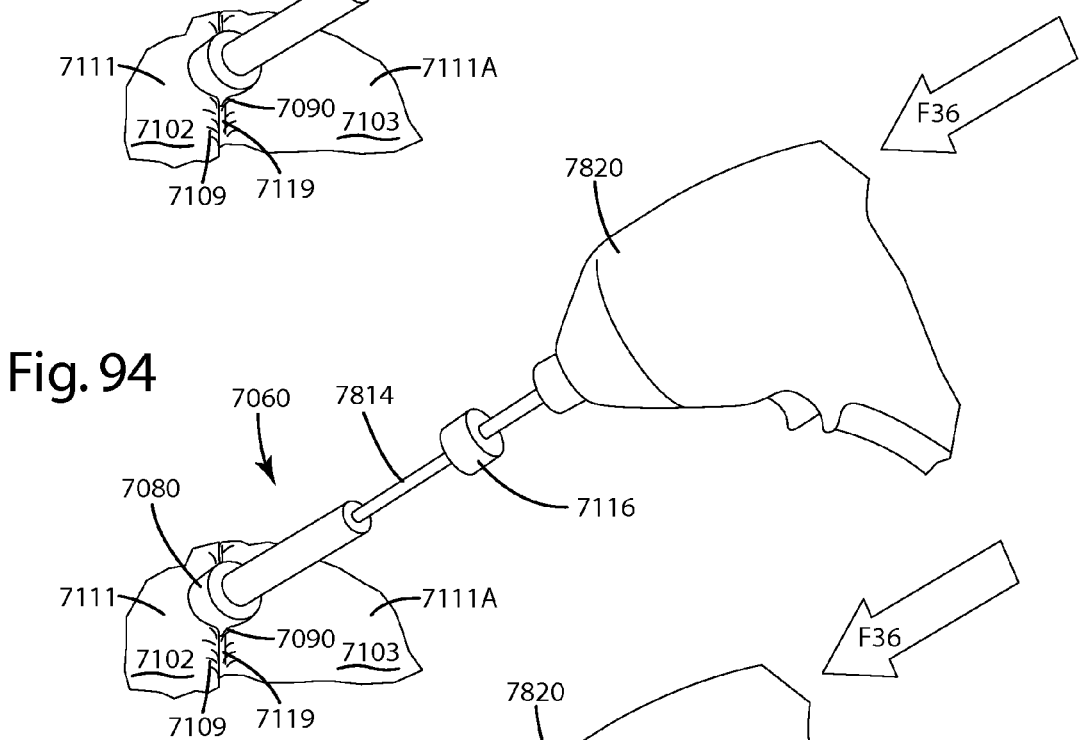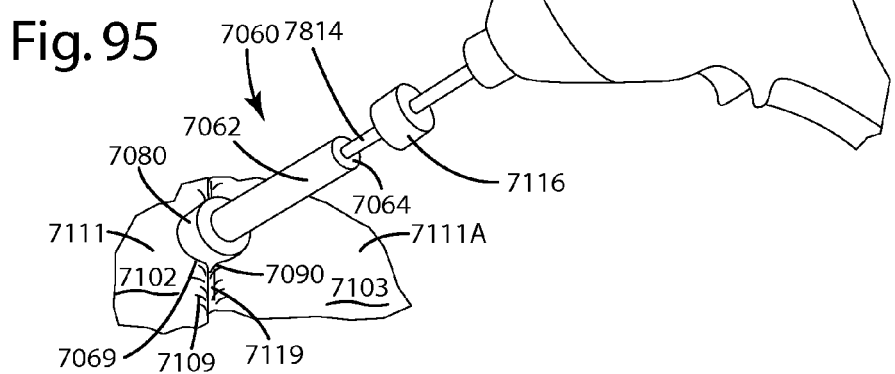

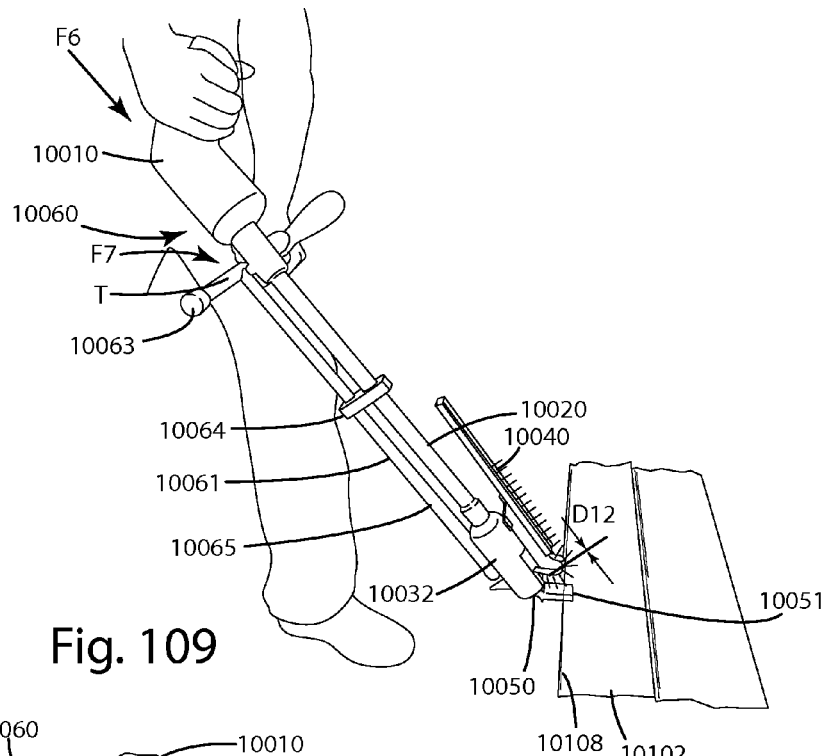
Fig. 109
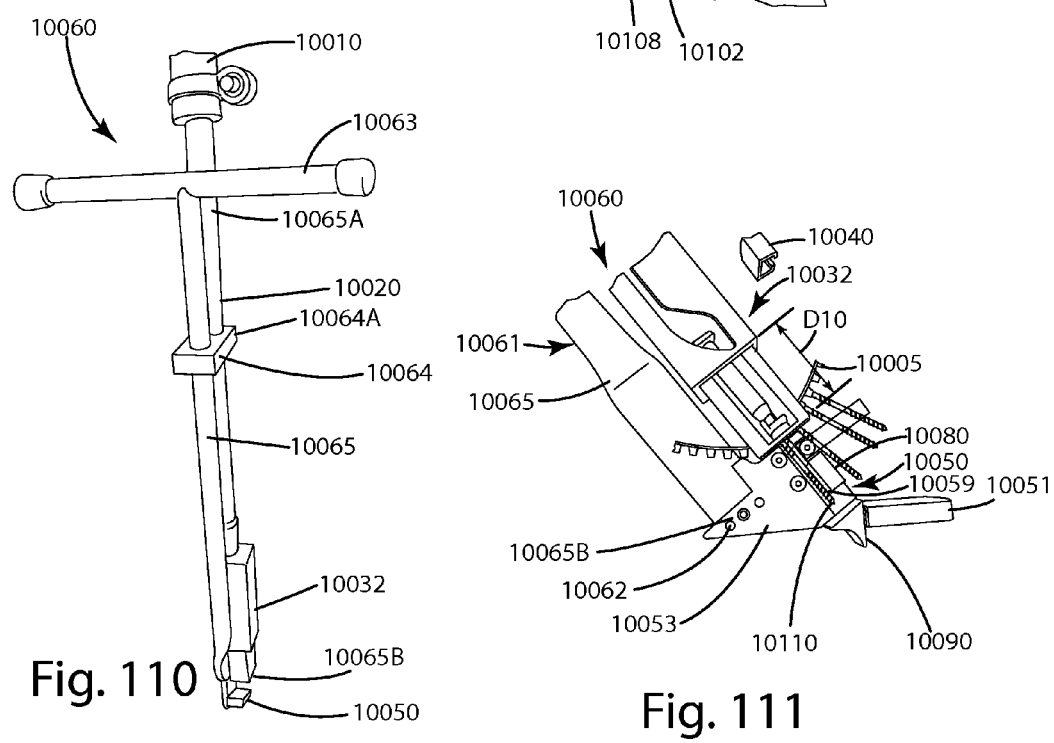
Fig. 110
Fig. 111

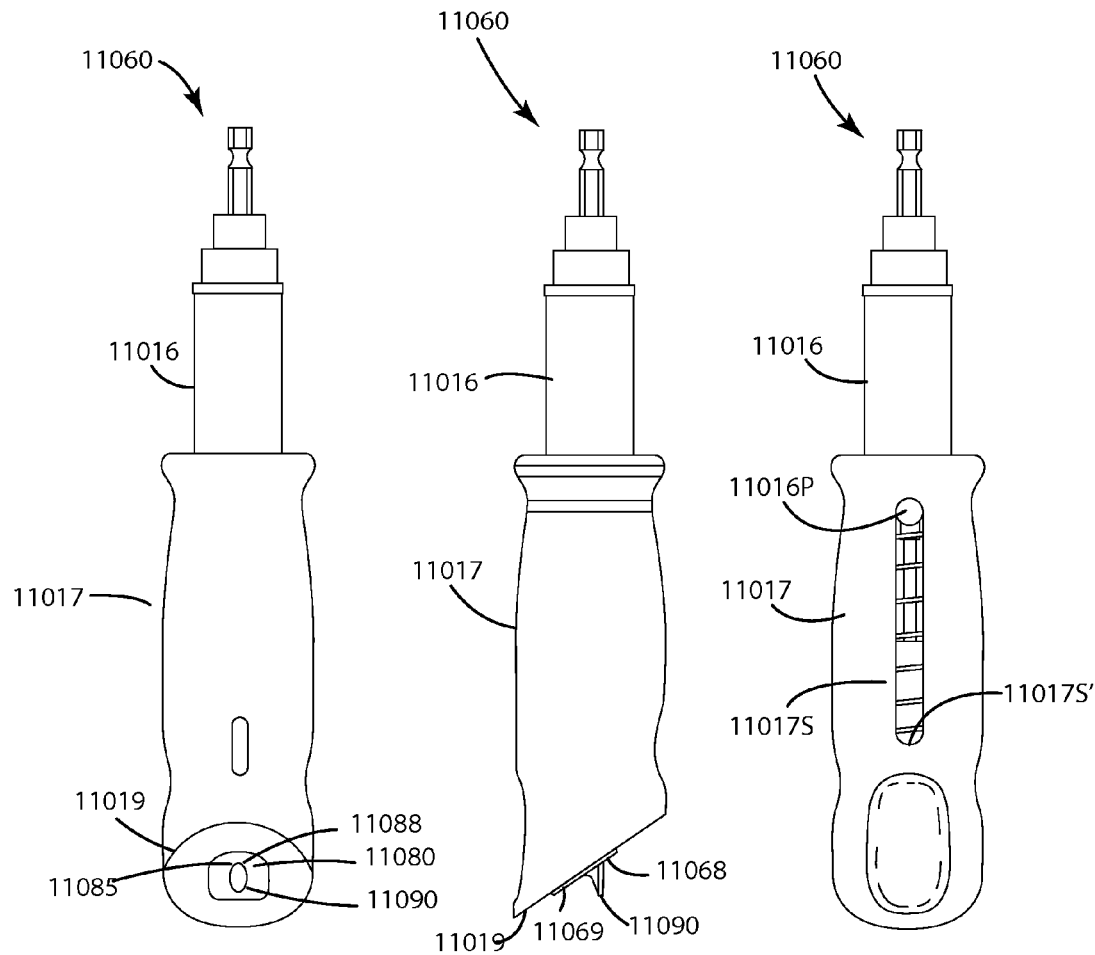
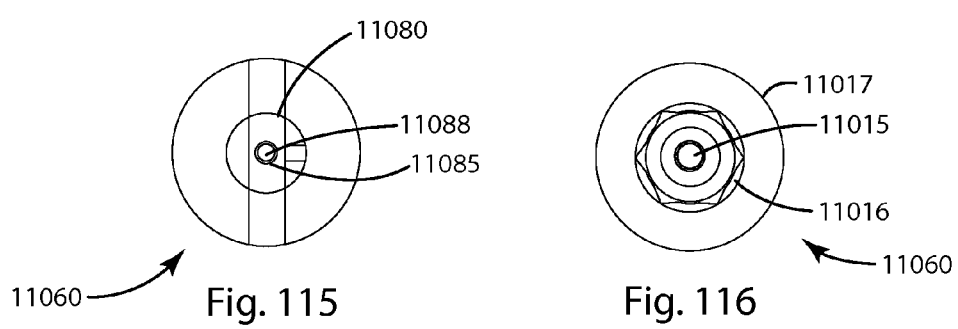
Fig. 112    Fig. 113    Fig. 114
Fig. 115    Fig. 116

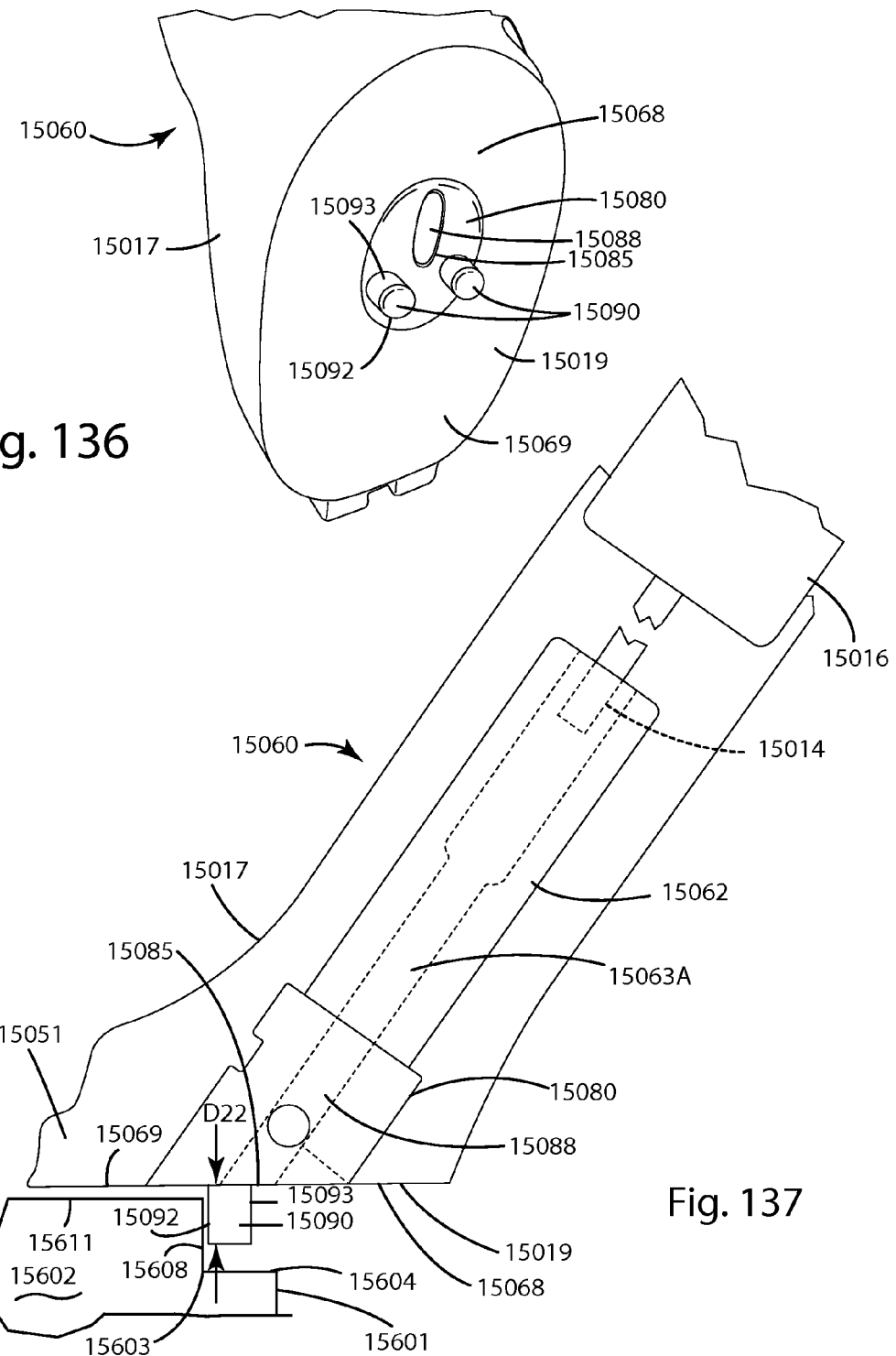

FASTENER, INSTALLATION TOOL AND RELATED METHOD OF USE

BACKGROUND OF THE INVENTION

The present invention relates to fasteners, and more particularly to a fastener, an installation tool and a related method of use.

There are a variety of commercially available fasteners that are designed to fasten a work piece, such as a wooden board or a composite element, to a substrate, such as a subfloor, joist or other underlying support structure. In many cases, these fasteners are in the form of threaded screws including: a large, bugle-shaped head to which an installation drive attaches (for example, a Phillips or star drive screw head); a shaft that projects from the head; threads on the shaft, and a conical, sharpened point, which centers the screw on a location, and initially pierces the board so that the screw can advance into it. These types of screws are typically drilled downward, in an orthogonal manner, into the top of a board to fasten the board to an underlying support, such as a joist. Most of the holding power of such screws come from the bugle-shaped head engaging the board.

Another type of screw includes the above features, that is, a large, bugle-shaped head that provides holding force, and a threaded shaft. However, instead of a sharpened conical point, these screws include a point having surfaces that meet at an acute angle between 15° and 35° to form a point. The acute angle of the surfaces enables the screw point to drill into a wood structure. While the acutely angled surfaces of such a screw can pre-drill a hole for the screw, the acutely angled surfaces also rapidly cut or drill into the wood. Accordingly, as soon as the first full threads engage the wood, they begin to quickly advance or feed the screw into the wood. This rapid advancement, caused by the threads twisting and subsequently thrusting the screw forward, sometimes leads to inadvertent splitting of the wood via a wedging action of the shaft and threads in the wood.

Recently, there have been developments in construction techniques and fastener technology that attach boards to a subfloor or underlying joist with screws, but that attempt to conceal the heads of those screws. This is achieved by advancing the screws at an angle through the sides of the boards, rather than the exposed upper surface or tops of the boards, and subsequently into an underlying support structure. When boards are placed side-by-side one another, these "side angled screws" are relatively unnoticeable by an observer looking straight down at the boards. Of course, at an angled view of the board, where portions of the sides of the boards may be visible, the screw heads may be somewhat visible, but usually not overly conspicuous.

An issue with conventional side angled screws concerns their configuration and the manner in which they advance into a work piece. Side angled screws typically include a conical, pointed tip. As soon as this pointed tip penetrates the board, the screw threads bite into the board, and rapidly draw the screw into the side of the board. As this occurs, the screw shaft is drawn between the grains or fibers or pieces of the board (depending on whether the board is constructed from wood or a composite). The drawing of the shaft between the grains or fibers frequently causes the lower corner of the board to splinter from the remainder of the board (if wooden) or to bulge out the lower corner of the board (if composite) due to the wedging action of the shaft and threads in the corner. Thus, conventional side angled screws can tend to damage the corner of the board into which they are advanced, particularly if they are imprecisely positioned or angled, or advanced too quickly into the board, or if the board is weak or dense. Typically, this will reduce the holding strength of the screw, which of course, is undesirable. Accordingly, there remains room for improving such fasteners.

To compliment side angled screws which include conical, pointed tips, certain tools have been developed to facilitate their installation. Generally, these tools include a jig, with a plate that sets atop a board to be fastened down, and a bore guide that generally aims the screw toward the side of the board into which the fastener is advanced. One specific tool includes a jig body that rests atop a board, a handle, and pins that extend downward from a flat bottom of the jig body, and that are configured to be positioned adjacent opposite sides of the board. The pins also position the fastened board a distance from the next adjacent board so that there is a notable gap between the boards. The jig body bore guide is disposed at an angle, and generally aimed at a location that is intended to correspond to the side of a board. The bore, however, is located a distance away from the side of the board, generally above the pins, and terminates at the bottom of the jig body. Because the bore terminates at the jig body, its end is located above the upper or top surface of the board, which is a good distance from the location where the tip first engages the side of the board.

While this tool can be used to install pointed end screws, it suffers some shortcomings. For example, because the bore guide is distanced from the side of the board, screws advanced through the bore sometimes are placed improperly relative to the lower corner of the board. Accordingly, when the screw is advanced, it can split off the lower corner of the board. Further, if the tool is not perfectly aligned, the pointed tip of the screw sometimes can grab and pull the screw into the board at an undesirable angle, which can cause the screw to bind against the bore of the jig body and slow its advancement, or cause additional wear and tear on the guide.

In addition, while the pins of the aforementioned tool can help locate the bore guide, those pins can also be a detriment. For example, the boards usually used in projects are of varying widths. The pins of the tool are joined with the jig body in fixed positions. Sometimes, the spacing between the pins is such that it does not match the varying widths of the board. Accordingly, the tool might not fit properly over some overly wide, "outlier" boards in a particular project. Alternatively, where certain boards are overly narrow, the tool may improperly align the bore guide too far from the side of the board, so that the screw misses the board or splinters off its lower corner.

Further, the tools mentioned above typically are used for applications where the boards are spaced a distance from one another so that upon installation, there is a noticeable gap or space between immediately adjacent, installed boards. Where the boards are prone to shrinkage, for example, by the boards drying over time, use of the above tool to install such boards can create unsightly or excessively wide gaps in the structure.

While conventional side angled screws, other screws and related installation tools exist, there remains room for improvements to both the screws and the tools to better fasten down boards and other items with fasteners driven through the sides of the boards in a manner that generally conceals those fasteners.

SUMMARY OF THE INVENTION

In one embodiment, a fastener including an end that pre-bores a hole for the remainder of the screw is provided. This fastener can be in the form of a screw that can be easily and consistently used in screwing operations where the fastener penetrates a surface of a work piece, such as a board or other building material, and optionally fastens the work piece or material to another work piece, article or underlying support structure.

In another embodiment, the fastener can be a screw, for example, a side angled screw, including a head attached to a body. The side angled screw can be adapted to be advanced into the side of a board at an angle. The head can include a drive feature that mates with a corresponding drive tool. The body can include a shaft, threads and an end.

In another embodiment, the screw can include an end that is generally "V" shaped. The end can include a chisel edge or point that is adapted to engage and scrape a surface of a work piece. Inclined surfaces can be opposed to one another across the chisel edge.

In yet another embodiment, the inclined surfaces can be disposed at an angle relative to one another, the chisel edge and/or a work piece into which the screw is advanced. Optionally, the inclined surfaces can be inclined at a negative rake angle when the end is engaged against a work piece. Further optionally, the inclined surfaces can be disposed at an obtuse angle relative to one another, for example, greater than 90° but less than about 180°, or about 135° to about 170°. Even further optionally, the inclined surfaces can be inclined at about 90°±10° relative to one another.

In still another embodiment, the screw end can be configured to scrape material from a work piece to pre-bore a hole for the remainder of the screw. Where included, the threads can auger the scraped material out from the hole to ensure there is sufficient room for the remainder of the screw to enter the hole without splitting or otherwise damaging the work piece adjacent the hole.

In even yet another embodiment, the screw end can include a thread that merges with at least one of the inclined surfaces associated with the chisel edge. The thread can include a leading portion that is located at or near the inclined surface, and that extends outwardly from an axis of the screw. The leading portion can engage and move chips or other material generated by the scraping action of the screw end, and subsequently auger that material up, along the thread. The leading portion optionally can form an extension of the chisel edge, with the thread beginning immediately adjacent the chisel edge.

In still yet another embodiment, the screw end can include a chisel brake point having at least two inclined surfaces disposed at an angle relative to one another. The screw end can act as a brake to retard the feed or advancement of the screw into a work piece for a preselected distance. Optionally, the braking action of the chisel brake point can be partially or fully overcome by threads on the screw engaging surrounding material of the work piece, where the threads eventually impart a forward advancing or feed force on the screw. When this occurs, the screw feeds or advances into the work piece at a faster feed rate.

In a further embodiment, the screw end including the chisel brake point can be configured for use with a screw that fastens a first work piece to a second work piece. The chisel brake point can retard advancement or feeding of the screw at least partially through the first work piece. When the screw has advanced into the first work piece a preselected distance, and optionally through the first work piece, the threads of the screw can engage the first work piece and increase the feed rate of the screw. Accordingly, the rate of advancement of the screw can change, due to the configuration of the screw (rather than a change in speed of a tool rotating the screw), with the braking action of the chisel brake point being reduced, and the rate of screw feed increasing in the first and/or second work piece.

In yet a further embodiment, a method is provided for using the screw including: providing a screw including a threaded shaft and an end, the end including a chisel edge and opposing inclined surfaces; constraining all but rotational and axial movement of the screw; engaging the screw against a work piece; rotating the screw so that the end scrapes material from the work piece surface; continuing to rotate the screw so that the end pre-bores a hole in the work piece into which the remainder of the screw enters; and continuing to advance the screw into the work piece, with the end continuing to scrape material from within the hole and the threads of the shaft augering the scraped material to eject material from the hole.

In still a further embodiment, a method is provided for installing a fastener, for example, a screw having a shaft, threads disposed on the shaft, and a chisel brake point located at an end of the fastener, into at least two work pieces. The method can include engaging the first work piece with the chisel brake point; advancing the fastener into and at least partially through the first work piece; retarding the advancement or feed rate of the fastener into and at least partially through the first work piece with the chisel brake point for a preselected distance; sufficiently engaging the threads of the fastener with the first work piece after the fastener is advanced the preselected distance, where the engagement of the threads increases the feed rate into and through at least one of the first work piece and the second work piece. Optionally, the engagement of the threads with the first work piece generates an advancement or feed force that is greater than a braking force of the chisel brake point, which braking force retards the feed of the fastener.

In still yet a further embodiment, an installation tool is provided. The tool can include a handle, a frame, and a tool screw guide or pilot element defining a screw bore that aligns a screw with a desired location on a work piece. The screw guide can prevent the screw from excessively wobbling as it rotates in the screw bore, relative to the work piece, so that the screw can be started in the surface of the work piece and advanced satisfactorily.

In another, further embodiment, the tool screw guide can include a spacer that extends downwardly from a body of the guide, and that sets a gap between adjacent boards or other construction materials joined with an installed screw. The screw bore can be defined at least partially within the spacer, so that the end of a screw is positioned and contained immediately adjacent the surface into which it is to be advanced.

In yet another, further embodiment, the tool guide can include a clamping mechanism that clamps the tool in place relative to a board or other construction element into which a screw is to be installed with the tool. The spacer can be a part of the clamping mechanism, and can move relative to the frame of the tool. The tool can include another spacer element distanced from the screw guide spacer. The distance can generally correspond to a width of a board or other construction element. The distance can be changed by moving the spacer relative to the spacer element sufficiently to clamp the board between these components. Accordingly, a screw installed with the tool can be precisely advanced into a surface of the board or other construction element.

In still another, further embodiment, the screw guide can include a material ejection port in communication with the screw bore. With this port, material scraped, extracted and/or removed from the hole produced by the screw can eject from the port, thereby preventing or impairing the material from hindering screw rotation within the tool.

In still yet another further embodiment, the installation tool can be configured to guide fasteners into a work piece having a tongue-and-groove configuration. The tool can include a fastener guide having a bore that aligns the fastener as it is advanced at a pre-determined portion on or near a side surface of the board adjacent a tongue of the board. Optionally, the guide can guide the fastener without splitting, bulging or otherwise damaging the tongue of the board. Further optionally, such an embodiment can be used to fasten porch-type boards to underlying substrates or flooring.

In still yet even another further embodiment, the installation tool can be in an automated format including a magazine for storing multiple fasteners and an extension that is joined with the tool guide. The extension can be further joined with a driving tool that can rotate the fasteners and advance them into a work piece as noted with the embodiments herein. Optionally, this tool can include a fastener feeding system that sequentially feeds fasteners one at a time into the guide and/or extension so that those fasteners can be advanced sequentially into the work piece at different locations.

In a different embodiment, the installation tool can be configured to install fasteners described herein or other conventional fasteners in boards that are installed adjacent one another with no gap therebetween. For example, where wet, treated wood, synthetic boards, or other materials are used to construct a structure, the boards can be placed immediately adjacent one another so that their side surfaces engage and contact one another, substantially along the lengths of the boards. Due to this engagement, there effectively is no or only a tiny gap between the adjacent boards, in which case, the boards effectively are not spaced from one another a preselected distance. The installation tool in this embodiment can be positioned atop one or both of the boards in the location where they abut one another, and can guide a fastener so that it advances into an upper corner, or edge, or exposed side surface of a board, through that board and optionally into an underlying substructure to secure the board in place.

In even a different embodiment, the installation tool can include a frame having a handle and a bottom surface. A guide for guiding the advancement of a fastener installed with the tool can extend through a portion of the frame and can define a longitudinal bore within which the fastener can be controllably rotated during advancement thereof.

In yet a different embodiment, the tool can include an alignment projection extending downwardly therefrom, optionally extending downwardly from the bottom surface a preselected distance. The preselected distance can be such that the alignment projection extends downwardly from the bottom surface a sufficient distance to align the guide, and more generally the fastener, with a corner or side surface of a board along a line of advancement, but without the alignment projection establishing a gap between the side surface of one board and the side surface of another, immediately adjacent board.

In still a different embodiment, the tool alignment projection can be configured to wedge or position between opposing corners of immediately adjacent boards. The alignment projection can engage a corner of an already-installed first board at a position that orients the trajectory of a fastener guided by the guide of the tool. Depending on the engagement of the alignment projection with the corner of the first board, the trajectory of the fastener can be established.

In still yet a different embodiment, the installation tool can be used to install fasteners in wet, treated wood, or boards of different materials prone to shrinkage over time, with no gap between adjacent boards. In the method, a first board can be installed. A second board can be installed adjacent the first board and moved so that adjacent side surfaces of each of the boards engage and contact one another substantially along the lengths of the boards. The installation tool can be positioned atop the second board and a force can be applied to an opposite, exposed side surface of the second board, distal from the first board, toward the first board with the installation tool. For example, with the alignment projection pushing against the opposite exposed side surface of the second board, or an adjacent upper corner of the second board near the exposed side surface, the tool pushes that second board so that the opposite side surface of the second board is pressed or pushed directly against the side surface of the adjacent first board. The tool can guide a fastener into the opposing side surface of the second board and/or an adjacent upper corner of the second board to secure that portion of the second board to an underlying substructure.

In this method, the installation tool optionally can be reversed end for end, and used so that the guide is alternatively positioned adjacent another side surface of the second board, generally in the region or plane where the first board abuts the second board. The alignment projection can be positioned so that an outer wedge engagement surface of the alignment projection engages a first upper corner of the first board. This engagement can dictate the orientation of the guide relative to the upper corner and/or side surface of the first board. In turn, this can effectively establish the trajectory of the fastener in the guide bore either higher or lower on the corner and/or side surface of the second board. In some cases, depending on the configuration of the upper corners of the respective boards, the trajectory can be placed either higher or lower on the corners and/or side surfaces.

In the method, the installation tool optionally can guide a second fastener into the second board adjacent the first board, thereby securing the second board in place with there being little or no gap between the respective first and second boards. Optionally, this can enable boards to be placed immediately adjacent one another to allow for shrinkage. This can be helpful where the boards are constructed from wet treated wood or some other type of material that shrinks over time or with exposure to the environment. With the installation of these types of shrinking materials, the absence of a gap between the boards, when installed with the above noted tool, can reduce the size of the resulting gap between the boards after the boards shrink over time.

In another embodiment, the installation tool can include an automatic feed mechanism that automatically and sequentially feeds collated fasteners to a nose assembly. The nose assembly can include a guide having an alignment projection extending downwardly from the guide a preselected distance. The alignment projection can include an inner engagement surface and an opposite outer engagement surface that merge together to form a wedge. The inner engagement surface can be configured to engage a board corner, to align the angled bore with the corner so that a fastener can be advanced through the angled bore and into the corner at a non-orthogonal angle relative to a top and a side surface of the board.

In yet another embodiment, the nose assembly can include a magnetic element located adjacent a collated fastener path along which collated fasteners are advanced. The magnetic element can exert a magnetic force on an individual fastener from the collated fasteners, so as to align that individual fastener with an opening of the guide. This can enable the fastener to enter the opening and subsequently the angled bore of the guide for advancement into the board. Where the fasteners are generally small and/or the bore is small, this can provide reliable alignment for consistent advancement of the fasteners, and can minimize unintentional jamming of the fasteners in the nose assembly.

In still another embodiment, the nose assembly can include a collector guide extending adjacent the nose assembly. The collector guide can be configured to generally constrain and funnel the collated fasteners toward an opening or slot in the nose assembly from which the fastener is advanced into the angled bore.

In still another embodiment, a method of installing a fastener with the installation tool is provided. The method generally includes providing an installation tool including a nose assembly having a guide. The guide defines an angled bore and includes an alignment projection or wedge. The tool includes a holder that holds a supply of collated fasteners, a feed mechanism that sequentially feeds the collated fasteners toward the guide, and a drive element that rotates individual fasteners of the collated fasteners. The alignment projection is placed adjacent at least one of a corner and a side surface of a board so that the angled bore is aligned with a corner and/or a side surface of a board to advance the fastener into the same at an angle. A first fastener is fed from the collated fasteners into the nose assembly with the feed mechanism. The first fastener is aligned with an opening of the angled bore, optionally with a magnetic force. The first fastener is engaged and rotated to advance the first fastener through the opening and into the corner and/or a side surface of a board.

In still even another embodiment, a fastener installation tool is provided including an elongated shaft defining a shaft bore. The shaft bore is configured to receive a drive element rotated by a drive tool. A guide is joined with the elongated shaft. The guide includes an alignment projection including opposing inner and outer engagement surfaces that merge together at a terminal end to form a wedge. The inner and/or outer engagement surface engages a board corner and/or a board side surface to align an angled bore with the same. The angled bore is aligned with the shaft bore, and optionally, the two can be the same bore, so that the drive feature can be reciprocally extended through the shaft bore and through the angled bore while rotating a fastener. This installation tool can be readily joined with a driving tool, such as a power drill, to assist in manually advancing screws into the corner or side surface of a board.

In another embodiment, the shaft bore and/or angled bore include one or more magnetic elements. The magnetic elements can be positioned to align the head of a fastener and the head of a drive element so that the drive element can adequately and consistently engage a drive feature of the head and rotate the fastener. The magnetic element can include a first magnet and a second magnet that exert magnetic forces on the head of the drive element and the head of the fastener. The magnetic forces can pull these elements against a wall, and optionally align them in a common plane. When the drive element is advanced toward the guide, even when rotating, it can engage a drive feature, such as a star or other drive described herein to begin rotating the fastener.

In even a further embodiment, the installation tool can include an automatic feed mechanism that automatically and sequentially feeds collated fasteners to a nose assembly. The nose assembly can include a guide having an alignment projection extending downwardly from the guide a preselected distance. The nose assembly can further include a guide pocket aligned with an angled bore defined by the guide. The guide pocket can capture and/or guide a portion of a fastener, for example, the head of a screw, and can assist in aligning the fastener with an opening of the angled bore so that the fastener consistently feeds into the angled bore. Moreover, the guide pocket and its interaction with a fastener can prevent the fastener, as it is advanced into a board, from "diving," deflecting, or otherwise becoming misaligned with the bore or tool, which could cause a jam or misfeed in the angled bore or nose assembly.

In yet a further embodiment, the nose assembly of the tool can define a guide pocket having a magnetic element associated with the pocket. The magnetic element can exert a magnetic force on a fastener to move or pull the fastener into the guide pocket so that the fastener positively and consistently registers in the pocket and aligns with an opening of the angled bore in the nose assembly.

In still a further embodiment, the nose assembly can include a diverter element that engages a portion of the fastener. The diverter element, optionally in conjunction with a collector guide element, can tilt, swing or otherwise move the fastener so that a tip of the fastener departs from the general path of the collated fasteners. For example, the diverter element can engage a portion of a shaft or threads of a fastener and move the tip of the respective collated fastener outward, away from the collated fastener path and/or longitudinal axis of an angled bore. The diverter element can terminate near or adjacent the guide pocket so it no longer restricts the tip from following the collated fastener path. Further optionally, the tip of the fastener can be drawn into the guide pocket by virtue of flexible material of the collated fasteners, thereby urging the tip and remainder of the fastener into the guide pocket.

In a different embodiment, the nose assembly can include a pocket element. The pocket element can include a side wall and a back wall joined with one another. The back wall can be transverse to the collated fastener path and can selectively obstruct it. An exterior surface of the nose assembly, the side wall and the back wall can collectively form a guide pocket that receives the individual fastener and aligns the individual fastener with the guide of the nose assembly, and optionally, an opening of the angled bore.

In yet a different embodiment, the pocket element is movably joined with the nose assembly. The pocket element is operable in a pocket mode and a service mode. In the pocket mode, the pocket element is positioned so that the back wall obstructs the collated fastener path. In the service mode, the pocket element is positioned so that the back wall does not obstruct the collated fastener path. In the service mode, a user can service the nose assembly, clearing any jams or obstructions in the guide pocket, or cleaning the guide pocket and/or nose assembly.

In still a different embodiment, the pocket element includes the magnetic element. The magnetic element can be joined with the back wall, and can obstruct the collated fastener path as well. The magnetic element and back wall can be moveably joined with the nose assembly so that the magnetic element and the back wall can be moved out of the collated fastener path so that the back wall and magnetic element no longer obstruct the collated fastener path. The magnetic element can exert a magnetic force on an individual fastener to align it with the guide, and in particular, an opening to the angled bore.

In a different embodiment, the installation tool is operable in two modes. In a first mode, the drive element and feeding mechanism are fixedly joined with one another so that as the feeding mechanism compresses or moves toward a board, the drive element moves with it, engages a fastener and advances the fastener into a board. In the second mode, the drive element and the feeding mechanism move separately and independently. The feeding mechanism first compresses or moves toward the board until it bottoms out. The drive element does not move relative to the feeding mechanism. With the feeding mechanism bottomed out, a user can apply as much force as desired through the feeding mechanism and to the alignment projection to maintain the guide in a desired location relative to a board, and forcefully pushed against the board. Next, the drive element is moved relative to the feeding mechanism and toward the fastener until it engages the fastener. Optionally, the drive element breaks the fastener free from the collated strip, pushing it into the angled bore, through the guide and into the board. As the drive element rotates, it also rotates the fastener and advances it into the board. Because the feeding mechanism movement and the driving tool/drive element movement and advancement are separate and independent, a user can apply any desired amount force to the drive element and thus the fastener, customizing the applied force relative to the material from which the board is constructed and/or the type of fastener used.

In another different embodiment, the installation tool can be operable in either the first mode or the second mode immediately above. The tool can include a locking element to lock the tool in the first mode noted above. Optionally, the locking element can be a clamping device that immovably secures the drive element and/or drive tool in a fixed position relative to the feeding mechanism. Further optionally, the locking element can be a threaded element, cam, collet, or other structure.

In still another different embodiment, the feeding mechanism can be joined with a feed extension. The feed extension and feeding mechanism can move together toward and away from the nose assembly, guide and/or the board. The feed extension can be joined with a handle. A user can actuate the feeding mechanism and move the feeding mechanism by applying force to the handle.

In yet another different embodiment, the feed extension can be tubular or include a structure that allows the driving tool and driving element to move relative to it. Where it is tubular, the drive element can extend though the feed extension longitudinally to the nose assembly. The drive tool can be joined with a drive extension that is reciprocally joined with the feed extension. A user can apply a second force, different from the force applied to the handle, to the drive tool to move the drive element through the feed extension, and further to selectively and controllably engage and advance the fastener into the substrate, regardless of the material from which it is constructed.

The fastener described herein provides a simple and efficient structure that can pre-bore a hole for itself as it is advanced into a work piece. The fastener can be a screw that is easily advanced into a work piece at any angle, but optionally, the fastener is well suited to be advanced into the side of a work piece so that when installed, it is generally concealed from view from a viewer directly above the work piece. Where included, threads of the screw can auger material scraped by the screw out from the hole bored by the screw to promote efficient advancement of the screw and/or to prevent damage, such as splitting, of the work piece adjacent the hole and/or screw. Where included, the chisel edge brake point can selectively retard advancement or feed of the screw to prevent damage, such as splitting, of the work piece adjacent the hole and/or screw.

Further, the installation tool described herein can easily and consistently align a fastener with a desired surface of a work piece, and efficiently contain that fastener as it is rotated to prevent excessive wobble. The installation tool also can be securely and precisely joined with a work piece where it includes a clamping mechanism. This can promote accurate advancement of the fastener into the work piece. In addition, when a material ejection port is incorporated into the tool, it can facilitate dumping of material bored by the fastener out from a screw guide, which can prevent clogging of the guide, and impairment of fastener rotation. Where coupled with a fastener feeding system, the tool can rapidly and efficiently install fasteners in a variety of work pieces.

Additionally, where the tool includes an alignment projection and is generally void of any board gap establishing structure, the tool can be used to install and fasten down shrinkable or non-shrinkable boards immediately adjacent one another, with no gap established by the tool between the side surfaces of those boards. Thus, when the boards shrink, the resulting gaps between them are not of an overly large, unsightly dimension. Where the installation tool is coupled to an automated fastener feed mechanism, the fasteners can be fed easily and quickly to through the tool to facilitate the performance of large projects where many fasteners are installed. In addition, if the tool includes a magnetic element, that element can consistently and cleanly feed and align individual fasteners from a collated strip with a particular drive path of the installation tool. Further, where the installation tool is in the form of an elongated shaft joined with a guide having a wedge, where the tool easily couples to a driving tool to advance individual fasteners, that tool can provide an uncomplicated and easy way to consistently align and install those fasteners at a desired angle relative to a board surface.

These and other objects, advantages, and features of the invention will be more fully understood and appreciated by reference to the description of the current embodiment and the drawings.

BRIEF DESCRIPTION OF THE DRAWINGS

FIG. 34 is a perspective view of a third alternative embodiment of the fastener installation tool;

FIG. 63 is a second side view of the eighth alternative embodiment of the fastener installation tool with the front engagement foot of the nose assembly engaging the board;

FIG. 64 is a bottom view of the eighth alternative embodiment of the fastener installation tool the nose assembly with an alignment projection engaging the corner of the board;

FIG. 90 is a top view of an eleventh alternative embodiment of the fastener installation tool;

FIG. 91 is a bottom perspective view of a guide and alignment projection or wedge of the eleventh alternative embodiment of the fastener installation tool;

FIG. 92 is a perspective view of the guide and alignment projection or wedge of the eleventh alternative embodiment of the fastener installation tool engaged in the crevice between adjacent corners of boards to advance a fastener into a corner of one of the boards;

FIG. 92A is a close up view of the wedge of the eleventh alternative embodiment of the fastener installation tool engaged in the crevice between adjacent corners of boards to advance a fastener into a corner of one of the boards taken from FIG. 92;

FIG. 93 is a perspective view of the eleventh alternative embodiment of the fastener installation tool joined with a driving tool and a drive element to advance the fastener into the corner of a board;

FIG. 94 is another perspective view of the eleventh alternative embodiment of the fastener installation tool joined with the driving tool to advance the fastener into the corner of a board;

FIG. 95 is yet another perspective view of the eleventh alternative embodiment of the fastener installation tool joined with the driving tool to advance the fastener into the corner of a board;

FIG. 109 is yet another perspective view of the fourteenth alternative embodiment of the fastener installation tool including a push handle, completing advancement of the fastener;

FIG. 110 is a bottom view of the fourteenth alternative embodiment of the fastener installation tool showing the push handle;

FIG. 111 is a side view of the fourteenth alternative embodiment of the fastener installation tool illustrating the attachment of the nose assembly to the push handle;

FIG. 112 is a bottom view of a fifteenth alternative embodiment of the fastener installation tool;

FIG. 113 is a front view of the fifteenth alternative embodiment of the fastener installation tool;

FIG. 114 is a top view of the fifteenth alternative embodiment of the fastener installation tool;

FIG. 115 is a left view of the fifteenth alternative embodiment of the fastener installation tool;

FIG. 116 is a right view of the fifteenth alternative embodiment of the fastener installation tool;

FIG. 117 is a sectional view of the fifteenth alternative embodiment of the fastener installation tool in an extended mode with a biasing element of the tool in an uncompressed state;

FIG. 118 is a side view of a sixteenth alternative embodiment of the fastener installation tool with a pocket element in a pocket mode;

FIG. 119 is a perspective view of the sixteenth alternative embodiment of the fastener installation tool with the pocket element in the pocket mode;

FIG. 120 is a rear view of the sixteenth alternative embodiment of the fastener installation tool with the pocket element in the pocket mode;

FIG. 121 is a side view of the sixteenth alternative embodiment of the fastener installation tool with the pocket element in a service mode;

FIG. 122 is a top view of a seventeenth alternative embodiment of the fastener installation tool;

FIG. 123 is a front view of the seventeenth alternative embodiment of the fastener installation tool;

FIG. 124 is a sectional view of the seventeenth alternative embodiment of the fastener installation tool in an extended mode with a biasing element of the tool in a uncompressed state;

FIG. 125 is a sectional view of the seventeenth alternative embodiment of the fastener installation tool in a compressed or installation mode with the biasing element of the tool in a compressed state;

FIG. 126 is a side view of the eighteenth alternative embodiment of the fastener installation tool, and in particular, a nose assembly and feed mechanism;

FIG. 127 is a side view of the eighteenth alternative embodiment of the fastener installation tool upon initial engagement with a board;

FIG. 128 is a side view of the eighteenth alternative embodiment of the fastener installation tool operating in a second mode with the tool pushing against a board but a drive element not yet engaging a fastener;

Figure 129:
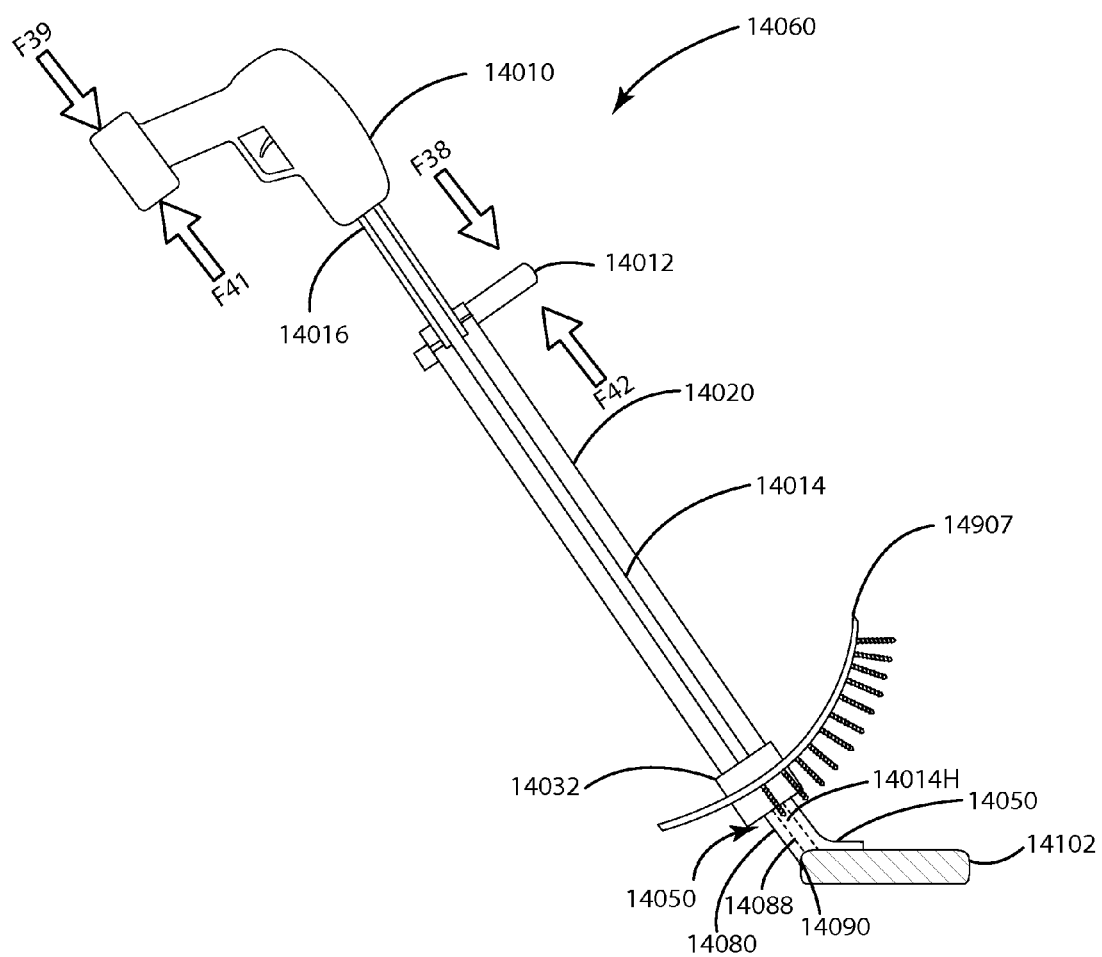
Figure 130:
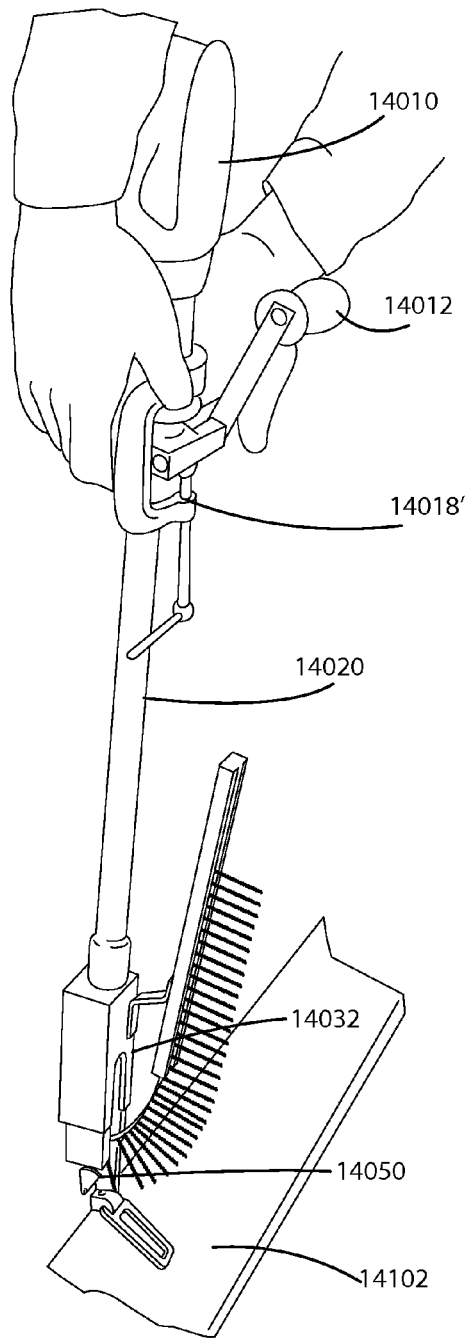
Figure 131:
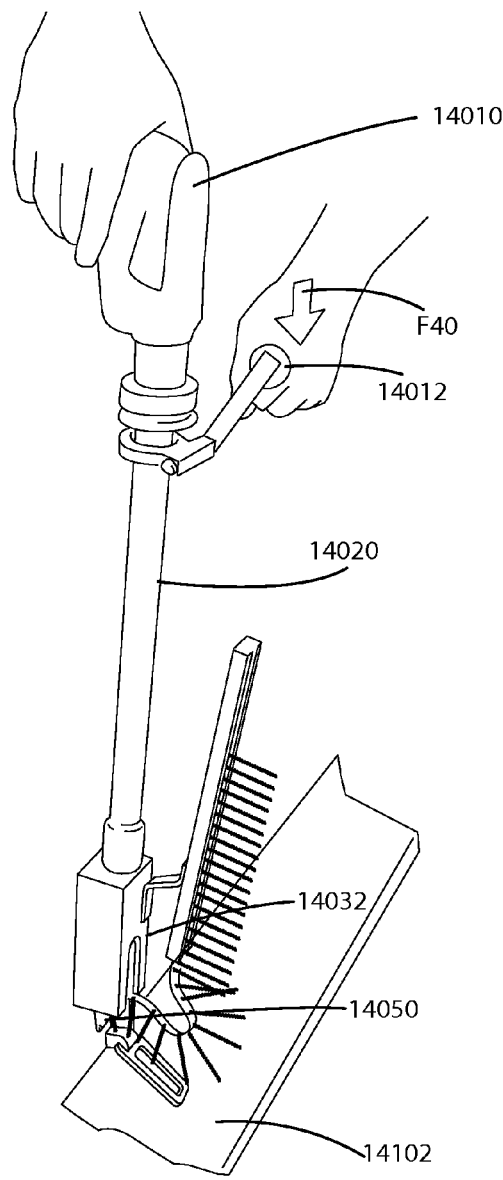
Figure 132:
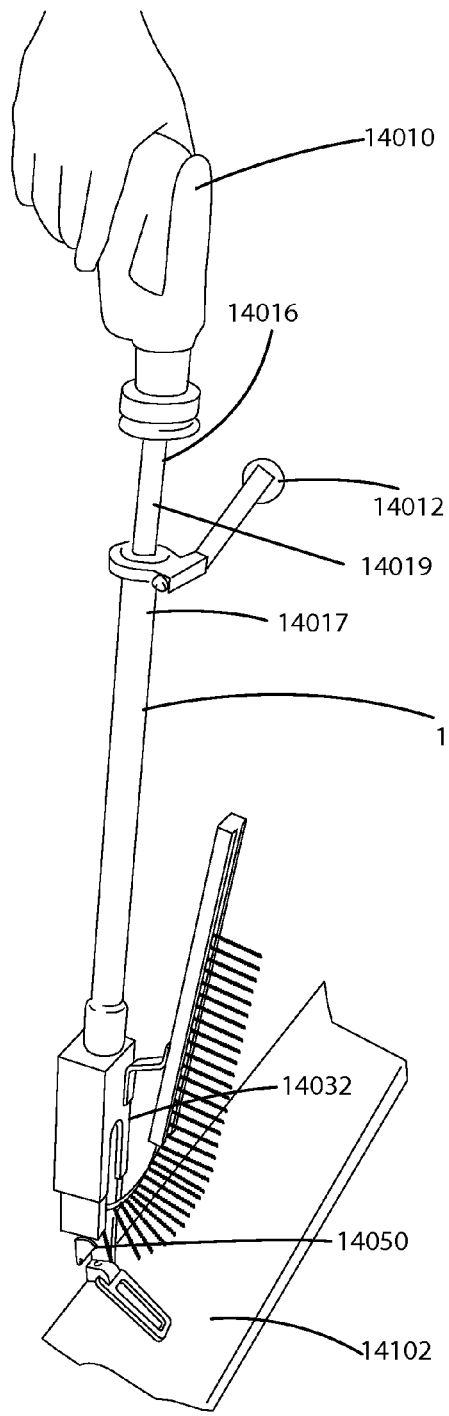
Figure 133:
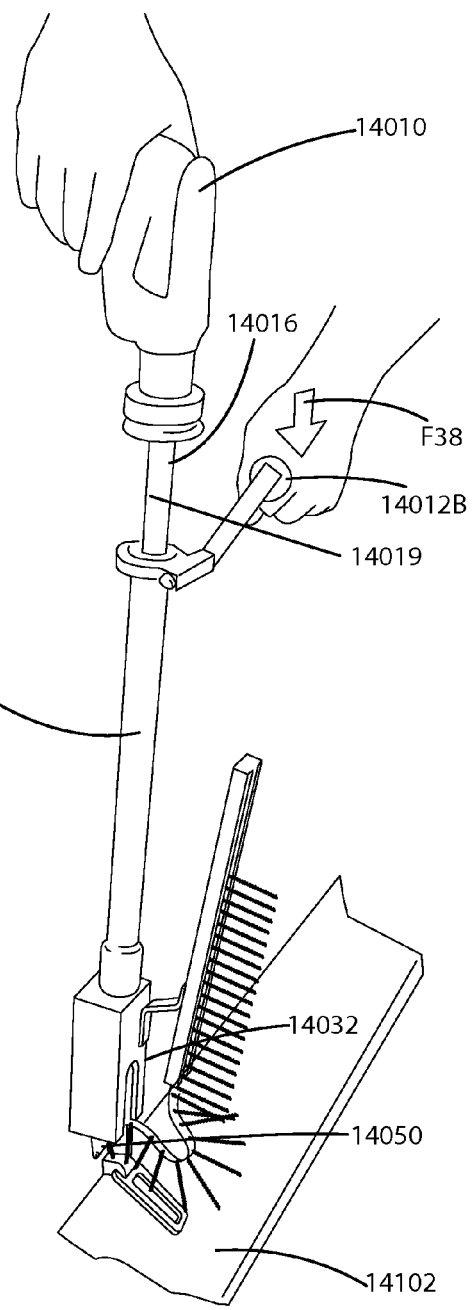
Figures 134, 135:
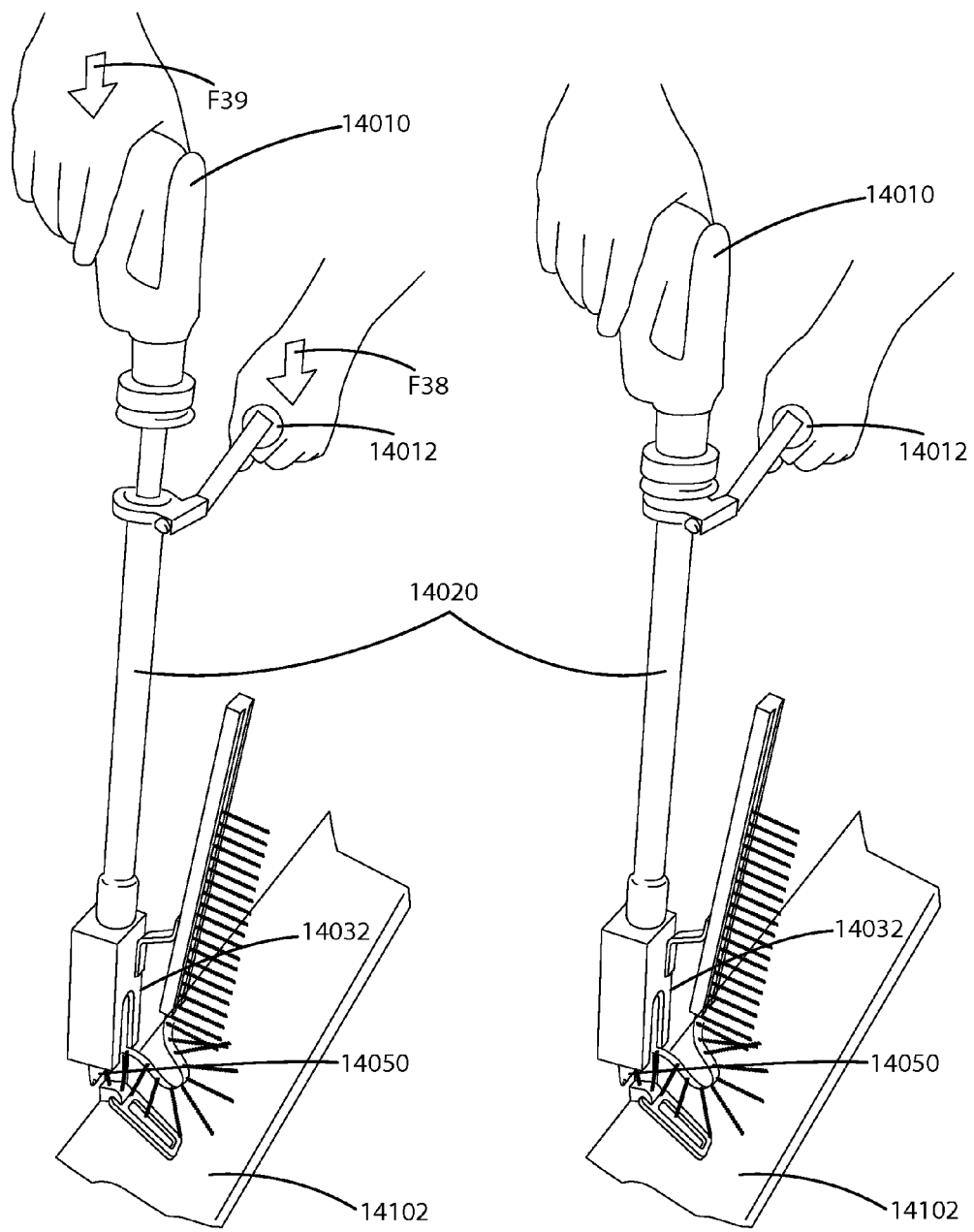

FIG. 129 is a side view of the eighteenth alternative embodiment of the fastener installation tool in a second mode with the tool pushing against a board and the drive element advancing a fastener;

FIG. 130 is a perspective view of the eighteenth alternative embodiment of the fastener installation tool in a first mode with the tool readied to advance a fastener;

FIG. 131 is a perspective view of the eighteenth alternative embodiment of the fastener installation tool in the first mode with the tool advancing the fastener;

FIG. 132 is a perspective view of the eighteenth alternative embodiment of the fastener installation tool in a second mode with the tool readied to advance a fastener;

FIG. 133 is a perspective view of the eighteenth alternative embodiment of the fastener installation tool in the second mode with the feed mechanism compressed and moved toward the board, but the drive tool not yet engaging the fastener;

FIG. 134 is a perspective view of the eighteenth alternative embodiment of the fastener installation tool in the second mode with the feed mechanism pressed and moved toward the board, and the driving tool and drive element engaging a fastener to push it through a collated strip;

FIG. 135 is a perspective view of the eighteenth alternative embodiment of the fastener installation tool in the second mode with the drive tool and driving element engaging the fastener and advancing it into the board;

FIG. 136 is a perspective bottom view of a nineteenth alternative embodiment of the fastener installation tool for use with tongue and groove boards; and FIG. 137 is a side partial view of the nineteenth alternative embodiment of the fastener installation tool illustrating the angled bore, shaft bore, guide and alignment projection of the same, aligned with a tongue and groove board for installing a fastener therein.

DETAILED DESCRIPTION OF THE CURRENT EMBODIMENTS

A current embodiment of a fastener is illustrated in FIGS. 1-6 and generally designated 10. The fastener can be in the form of a threaded fastener, and more particularly, a screw 10 including a head 20 and a shaft 30. The head can include an upper portion 22 and a lower portion 24. The upper portion 22 can be of a uniform diameter 23 (FIG. 3), which can range from about 0.197 to 0.202 inches in diameter, or can be of other dimensions if desired. The upper portion 22 of the head can be generally cylindrical and of a uniform diameter from the end of the head where the opening to the drive feature is located, to where the upper portion 22 begins to transition to the lower portion 24, where it tapers down to the shaft 30 of the screw 10. Optionally, the lower portion can be in the form of a frustoconical portion.

The upper portion 22 of the head 20 can define a screw drive feature, such as a star drive, a Phillips head drive or any other suitable drive. The screw drive feature can define a hole 26 in the head, and can be compatible with any suitable drive feature, as noted above. Optionally, the hole 26 can be generally in the shape of a six-pointed star. The generic name of this type of drive feature is a star drive, or hexalobular internal drive feature, which is standardized by the International Organization for Standardization as ISO 10644. One optional type of star drive feature is a TORX drive, which drive comes in a variety of sizes, generally designated by a "T" and some number, such as T-10, T-15, and the like. TORX is a trade name of Textron, Inc. of Providence, R.I.

The particular drive and size of the hole 26 of the head 20 can vary, but as shown, it can be a T-15 size. The dimension from point-to-point of a T-15 hole in screw head can be about 0.128". The maximum torque range for such a head can be about 6.4 to about 7.7 Nm, as applied via a corresponding tool or head coupled within the hole. The hole 26 can be configured to accommodate a T-15 size TORX drive head. The hole 26 can be quite large, and thus the material 29 between the points of the hole and the outer diameter 23 of the head around the hole can be of a relatively small dimension. In some cases, the material between the outer diameter and the outermost portion of the points on the hole 26 can range from about 0.0325 to 0.035 inches. The hole 26 can be of a depth equal to, less than or greater than the depth 25 of the upper portion 22 of the head having the uniform diameter. Generally, the depth 25 of the upper portion can range from about 0.055 to 0.065 inches. Of course, where drive features, other than the optional T-15 drive are used, the dimensions of those features can widely vary depending on the application.

The drive feature can be connected to a rotary operated tool, such as a drill, that turns the head, and thus the screw 10, to advance the screw into a work piece as described in detail below. Optionally, the screw head can be of the same diameter as the shaft or smaller, or completely absent from the screw, with a drive feature simply included on or defined by the shaft 30 opposite the end 50.

Figure 1:
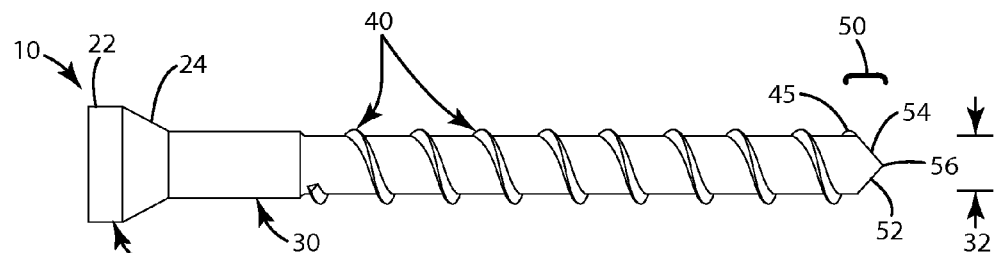
FIG. 1 is a side view of a current embodiment of a fastener.

Referring to FIG. 1, the shaft 30 of the screw 10 can be relatively cylindrical. The cylindrical portion can include threads 40 which protrude from it and wrap or coil around it. The threads can continue to the end 50 of the screw. Optionally, the threads can end or taper off a preselected distance from the end, for example 0.010" to about 0.5", or other distances as desired for the application. Further optionally, as described in the alternative embodiments below, one or more of the threads may be included in the end, possibly merging with and forming a portion of one or more inclined surfaces and/or the chisel edge. Even further optionally, the threads 40 can extend from the head 20 to the end 50 of the screw, depending on the application.

The threads can be configured at a particular pitch to theoretically provide a preselected feed rate of the screw into a work piece. For example, the threads may be pitched to provide a feed rate of about 1 to about 8 millimeters per full revolution of the screw about its longitudinal axis 200 (FIG. 5), also referred to as a screw axis. Other thread pitches can be selected to provide other desired theoretical feed rates.

Figure 2:
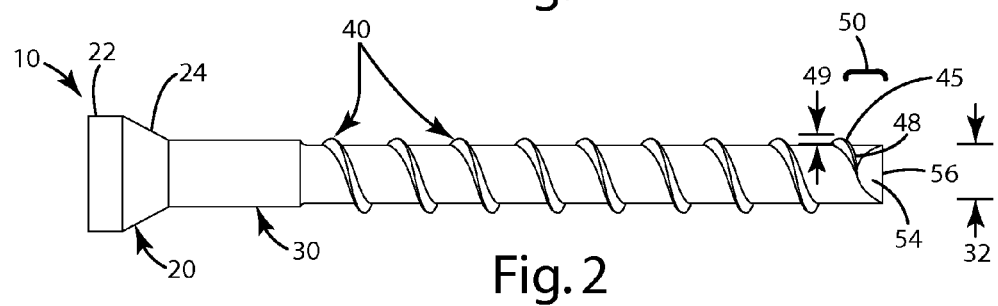
FIG. 2 is a second side view of the fastener.
Figure 3:
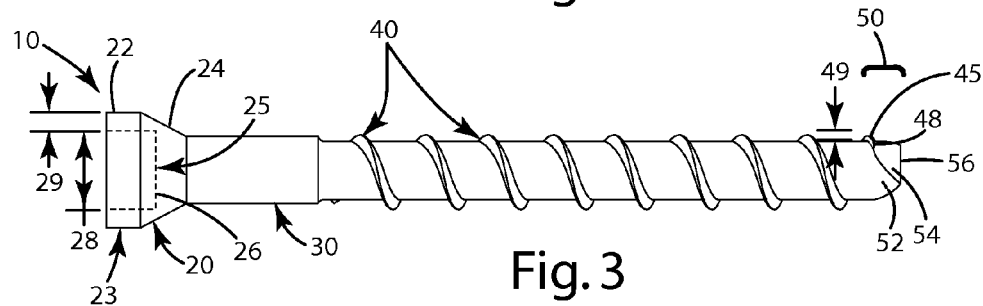
FIG. 3 is a third side view of the fastener.

The threads 40 can end at a last thread 45 as shown in FIGS. 1-5. The last thread 45 can terminate at a leading portion 48, which can have a thread height 49 (FIG. 2) that gradually decreases until it fades into the generally cylindrical portion of the shaft 30. Alternatively, although not shown, the last thread 45 can terminate abruptly, with the leading portion of the last thread having a thread height that is generally the same as the threads located above it on the shaft. With this configuration, the leading portion can terminate at a flat, beveled or sharpened forward surface as desired. Optionally, the location of the leading portion 48, and thus the end of the last thread 45 can vary relative to the chisel point 56. As shown in FIGS. 1-3, the leading portion 48 can terminate and fade or merge into the shaft 30 before the inclined surfaces 52 and 54 begin at the end 50, or at some other location relative to the inclined surfaces or chisel edge.

Figure 5:
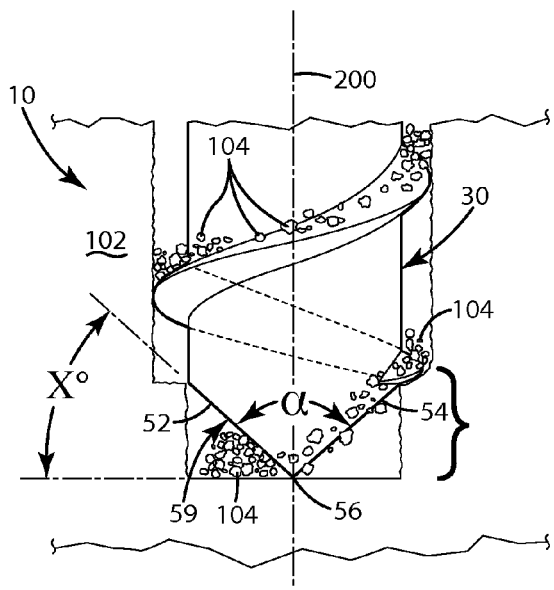
FIG. 5 is an enlarged side view of the end of the fastener engaging a work piece.

The leading portion 48 can end adjacent an apex of one of the inclined surfaces 54 as shown in FIGS. 3 and 5. If desired, however, the leading portion can terminate much farther up the shaft, away from the inclined surfaces, toward the head. Alternatively, the leading portion can terminate farther along the shaft, generally adjacent one of the inclined surfaces. Further, the leading portion can terminate the last thread somewhere between the opposing inclined surfaces 52 and 54, rather than at an apex or along some other portion of those surfaces. Other examples of the leading portion are presented in the alternative embodiments below.

Figure 4:
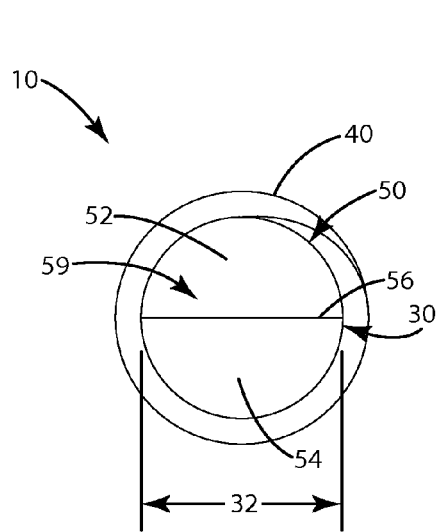
FIG. 4 is an end view of the fastener.

Returning to the end 50 of the screw in general, instead of being sharpened to a conical point (as with conventional screws), it instead can include a chisel edge 56 which includes inclined surfaces 52 and 54 diverging rearwardly from the chisel edge in a V-shaped configuration as seen in the side view of FIGS. 1, 4 and 5. The inclined surfaces 52 and 54 can be at a variety of angles relative to the longitudinal axis 200, for example 25°, 35°, 45°, 55°, 65°, 70°, 80°, or any angles therebetween that are suitable for the desired application. Optionally, the inclined surfaces 52 and 54 can be inclined at the same or different angles relative to the longitudinal axis 200.

Further optionally, the inclined surfaces 52 and 54 can be disposed at an obtuse angle α relative to one another as shown in FIG. 5. The obtuse angle can be any obtuse angle greater than 90° but less than 180°. Nonlimiting examples of ranges of suitable obtuse angles can have a lower limit of about 91°, 95°, 100°, 105°, 110°, 115°, 120°, 125°, 130°, 135°, 140°, 145°, 150°, 155°, 160°, 165°, 170°, 175°, and 179°; and a corresponding upper limit of 179°, 175°, 170°, 165°, 160°, 155°, 150°, 145°, 140°, 135°, 130°, 125°, 120°, 115°, 110°, 105°, 100°, 95°, and 91°. Several further exemplary ranges are between about 135° and about 170°, between about 145° and 160°, and about 130°.

Although shown as generally planar elements, the inclined surfaces 52 and 54 can include surfaces that are slightly curvilinear. For example, the inclined surfaces can be slightly concave or convex, or even wavy or serrated depending on the application. As a result, the chisel edge located where the inclined surfaces meet can likewise be curvilinear, for example, concave or convex. Where the inclined surfaces are generally planar, the chisel edge can be substantially linear.

As shown in FIGS. 2 and 4, the chisel edge 56 and corresponding inclined surfaces 52 and 54 can extend outwardly to an outer diameter 32 of the shaft 30. The inclined surfaces 52 and 54 can be diametrically and symmetrically opposed to one another about the chisel edge 56, and/or the axis 200. In such a configuration, the chisel edge 56 can lie along a line that bisects the outer circumference of the shaft, and can be of the same length as the diameter of the shaft. As illustrated in FIGS. 1 and 2, the chisel edge 56 can extend substantially linearly from one side of the outer diameter 32 of the shaft 30 to the other side of the diameter 32 of the shaft 30, and/or in a transverse manner across a majority of the diameter of the shaft 30 in any desired location.

Optionally, the chisel edge 56 can be offset a preselected distance from the diameter of the shaft. In which case, the inclined surfaces 52 and 54, while being opposed to one another across the chisel edge 56, might not be symmetric. For example, one of the inclined surfaces might be of a larger surface area than the other. The chisel edge and the respective inclined surfaces, or generally the end 30, can be void of any cutting edges that effectively cut into a surface of a work piece against which the end is engaged. Instead, as shown, the end can be configured to scrape the surface against which it is engaged when being advanced by a tool, and to act as a brake to retard advancement or feed of the screw into a work piece, as further explained below. Of course, depending on the application, one or more true cutting surfaces might be incorporated into the end 50.

Generally, the screw end 50 can include a chisel brake point 59, which as used herein, means that the end includes at least two inclined surfaces 52 and 54 disposed at an angle α relative to one another, where the end 50 functions as a brake to selectively retard advancement or feed of the screw 10 into and/or at least partially through a work piece. In some embodiments, the angle α can be about 85° to about 95°, optionally about 90°, further optionally an obtuse angle, and even further optionally, any of the angles noted in connection with the other embodiments herein. Further, although referred to as a "point," the actual structure of the chisel brake point can include an edge, rather than a true point, that is formed at the intersection of the two or more inclined surfaces. Optionally, the edge extends along a diameter, a chord or other transverse dimension of the shaft 30 and or end 50 of the fastener 10.

One mode of operation of a specific embodiment of the screw 10 and its end 50 will now be described with reference to FIGS. 5 and 6. When advanced into a work piece 102, the screw 10 rotates in the direction of the arrow 101. With such rotation, the inclined surface 52 can form a rake angle, specifically a negative rake angle X°, which indicates that X° is less than or equal to 90°, which corresponds to the angle α being 90° or an obtuse angle. Thus, when the screw 10 is rotated as illustrated by the arrow 101, the inclined surface 52 (having the negative rake angle) and/or the chisel edge 56 forcibly scrapes the surface of the work piece 102 due to drag and friction. As a result, the chisel edge 56 and respective inclined surfaces remove material 104 from the surface of the work piece 102 (or the bottom of the hole) via a scraping action. The amount of scraping can be increased or decreased based on the amount of force which is applied along the longitudinal axis 200 by a tool or user.

On the opposite side of the chisel edge 56, the inclined surface 54 also forms a negative rake angle, which can be the same as or different from the rake angle X of the inclined surface 52. This inclined surface 54 and/or the chisel edge 56 can scrape and remove material 104 from the work piece as described in connection with the other inclined surface.

Generally, without a tool to hold the screw 10 on the fixed axis 200, rotation of the screw 10 and the chisel edge 56 may cause the screw 10 to wobble uncontrollably against the work piece, making it difficult to advance the screw 10 into and/or through a desired location on the work piece. This can occur particularly in instances where the screw 10 is installed as a side angled screw, generally in a non-orthogonal manner into a surface of a work piece. Accordingly, an installation tool 70 as described herein is suitable for installing the screw 10 in a variety of work pieces.

Figure 6:
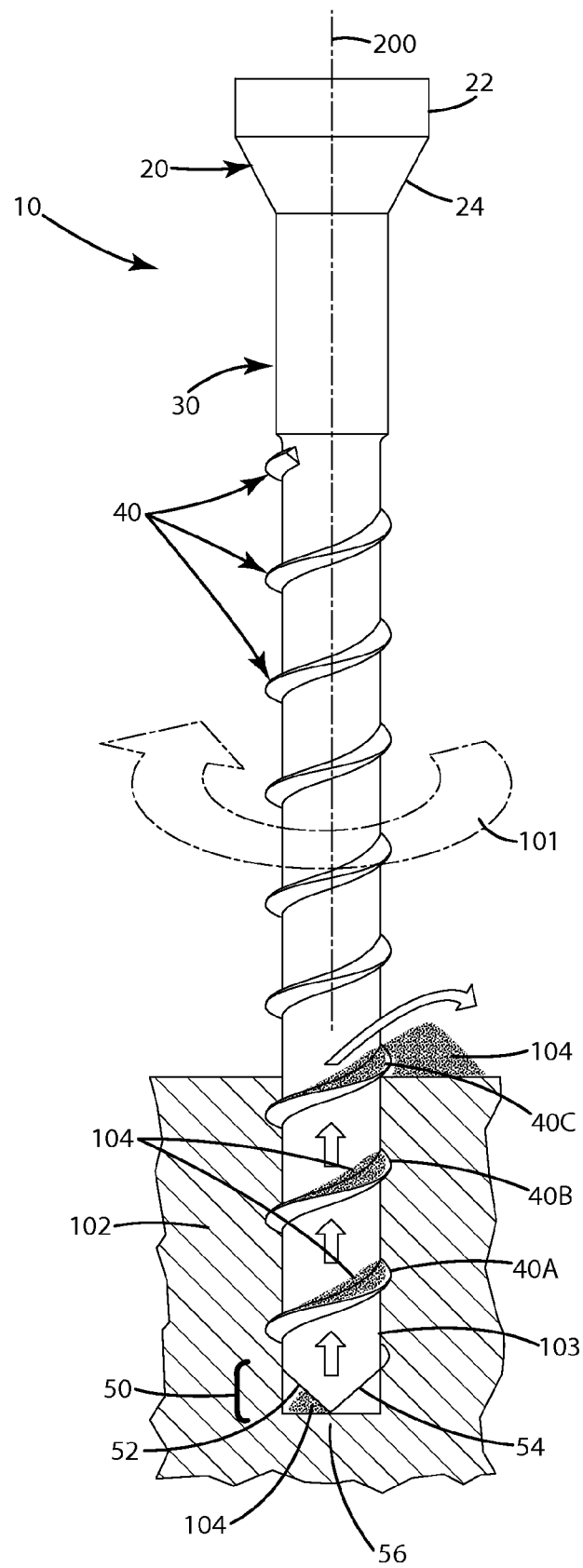
FIG. 6 is a side view of the fastener engaging a work piece.

Advancement or feed of the screw 10 into a work piece 102 can be further understood with reference to FIG. 6. As shown there, with the configuration of the screw end 50, and in particular, the chisel edge 56, the end 50 of the screw scrapes material 104 from the hole 103 which can be created by the scraping action of the end 50 within the work piece 102. The material 104 subsequently scraped from the bottom of the hole 103 can be augered upward, or otherwise away from the end 50, by the threads 40a, 40b, 40c (which can be part of the continuous thread 40) of the fastener 10 until the material is ejected from the hole, beyond the surface of the work piece 102.

Thus, in the embodiment of FIG. 6, the screw not only scrapes a hole in the work piece 102, but also removes the material from the hole so that the screw in effect can be threaded into a pre-bored hole (pre-bored by the screw end 50 and chisel edge 56) defined by the work piece. The scraping action of the end 50 can prevent the shaft 30 and threads 40 of the fastener from advancing or feeding too quickly into the work piece or otherwise advancing in a manner that will split the work piece into which it is drawn.

Figure 8:
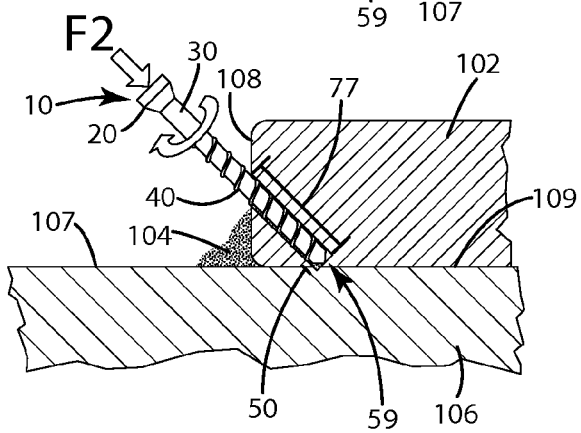
FIG. 8 is a second side view of the fastener advancing into the first work piece.
Figure 9:
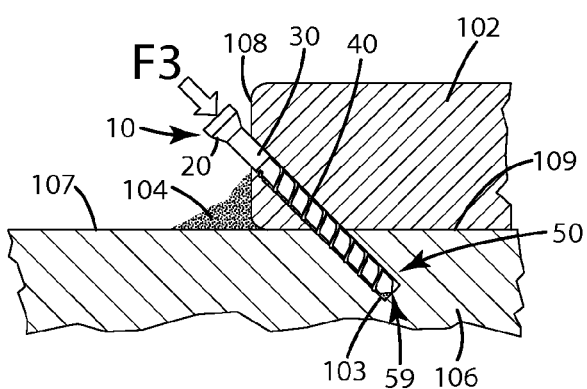
FIG. 9 is a third side view of the fastener as it further advances into the first and second work pieces.
Figure 10:
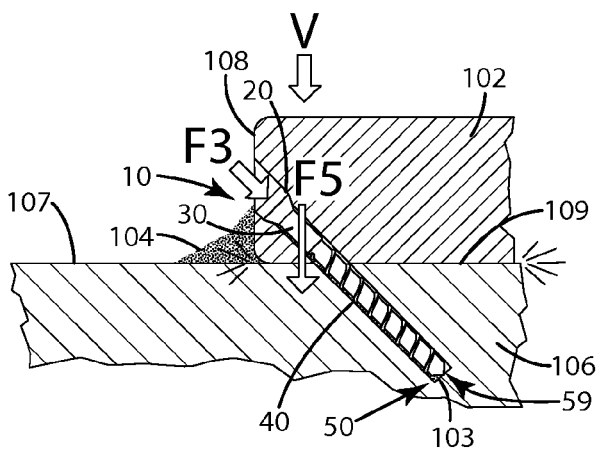
FIG. 10 is a fourth side view of the fastener as it is fully advanced into the first and second work pieces.

FIGS. 7-10 illustrate an example of a screw 10 of the current embodiment being installed in a first work piece 102 and a second work piece 106 to join those work pieces. Generally, the screw 10 joins the first work piece 102, which can, for example, be a board, to a second work piece 106, which can be a subfloor, joist or some other support structure. Also illustrated is the material 104 previously augered out from the hole 103 which the screw self-bored for itself. As shown in FIG. 10, the screw 10 can be advanced into the board 102 a desired distance so that the head is not too conspicuous when viewed from above. The screw 10 can be screwed into the side surface of the board at an angle β which optionally can be about 15° to about 65°; further optionally about 45° or any other desired angle. If desired, the screw can be advanced at a non-orthogonal angle to the surface of the board, or optionally an angle other than 90° relative to the surface of the board. Again, although shown connecting a board to an underlying joist, the screw 10 described herein can be used in any application where it is desirable to use a screw with a feature that pre-bores a screw hole with the screw itself. For example, it can be used to join corners of boards, used in cabinetry or as trim, particularly where the wood or other materials require a pilot hole to be pre-bored before installation of a screw to prevent splitting, or simply to facilitate advancement of the screw into the work piece.

Figure 7:
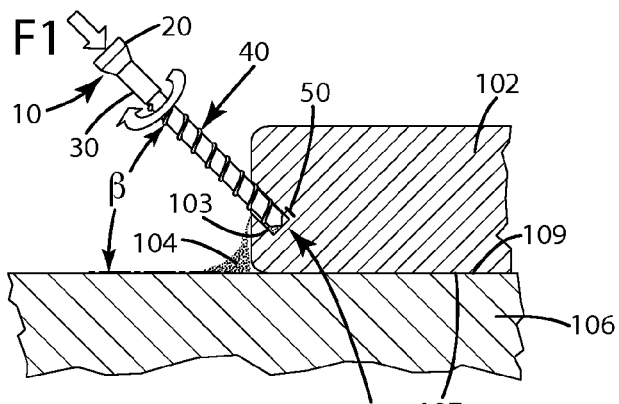
FIG. 7 is a first side view of the fastener being initially installed in a first work piece.

Further referring to FIGS. 7-10, a method of installing a current embodiment of the screw will now be described in more detail. As illustrated, the screw 10 includes a shaft 30, threads 40, a screw end 50 and the chisel brake point 59. The screw 10 can be advanced through a first work piece 102 and into a second work piece 106. As shown in FIG. 7, the first work piece 102 is engaged by the chisel brake point 59 and rotated in the direction of the arrow with a tool (not shown) joined with the screw head. A force F1 can be applied by a user to initiate the screw in boring into the side of the work piece 102 at some preselected angle β, which can be established by a user via an installation tool as described below or some other type of guide or tool. The screw 10 can be advanced into the work piece 102, and in so doing, the chisel brake point 59 can begin to scrape away material 104 from the hole 103 that the point creates in the work piece 102. The force F1, which is transferred to the screw 10 to bore the screw into the work piece 102, can be between about 1 and about 35 pounds, or more or less depending on the application, the type of wood or composite, and the type of installation tool.

Referring further to FIG. 7, the screw is advanced or fed at least partially into the work piece 102. During this advancement, the chisel brake point 59 bores away material 104 to create the hole 103 into which the screw 10 advances or feeds. The chisel brake point 59, retards the feed or advancement of the screw into the work piece 102, and generally provides a braking force to prevent the screw from being rapidly advanced into the work piece 102. In turn, this can impair and/or prevent damage to the material surrounding the screw 10, and can specifically prevent and/or impair splitting of materials, for example, wood in the area in which the screw is advanced. As a more specific example, the braking force can impair rapid advancement of the screw into the work piece 102, which advancement would otherwise typically be generated by the threads 40 engaging the work piece and thrusting it into the work piece, to prevent a lower corner of the work piece 102 from splitting off the remainder of the work piece. As shown in FIG. 8, the screw 10 can continue to be rotated, and fed into the work piece 102, with material 104 continuing to be augured by the threads 40 out from the hole bored by the chisel brake point 59.

As the screw 10 advances into the work piece 102, the chisel brake point 59 can act as a brake to retard or reduce the feed rate of the screw 10 into the work piece 102 for a preselected distance 77. This preselected distance can be anywhere from ⅛, ¼, ½, ¾, 1, 1¼, 1½, 1¾, 2, 2½, or more, or less, inches. As shown, the preselected distance 77 is about ½ to ¾ of an inch. Optionally, this distance can correspond to the distance between one surface 108 of the work piece 102 and a second surface 109 of the work piece 102, so that the feed rate of the screw generally is slowed through a portion or all of the first work piece, which may be more prone to splitting or damage.

Further, as shown in FIGS. 7 and 8, as the screw 10 advances, and the chisel brake point 59 acts to retard advancement of the screw into the work piece, the threads 40 also can engage the material of the work piece surrounding the bore 103 bored by the chisel brake point 59. During such engagement, the threads 40 can rotate or move relative to the sides of the bore 103 without substantially advancing the screw into the work piece upon such engagement, or generally without the threads thrusting the screw into the work piece at the theoretical feed rate for which the threads are designed. Optionally, this can contrast operation of conventional screws, where the engagement of the threads of those screws with the material surrounding the screw would typically lead to those threads thrusting the screw into the work piece at the theoretical rate of feed for which the threads were designed.

As the screw is advanced the preselected distance 77, shown in FIG. 8, the force F2 applied can be equal to or greater than the initial force F1 applied to initiate advancement of the screw. Further, the screw can rotate about the axis anywhere from optionally about 10 to about 100 rotations; further optionally about 15 to about 70 rotations; even further optionally about 20 to about 50 rotations, yet further optionally at least about 25 rotations, as it is advanced into the work piece 102, until the head of the screw engages the work piece. This can contrast a conventional sharp pointed screw, which typically might only be rotated about five to twelve times, depending on the number and characteristics of threads on the conventional sharp pointed screw. This also can contrast the design of the threads of the screw 10. For example, the threads may be designed to advance the fastener into the work piece so the head engages the work piece optionally within about 10 to about 20 rotations, further optionally in less than about 15 rotations of the fastener about the axis. The additional rotations of the embodiments to advance the fastener to a desired depth herein, for example, where the head engages the work pieces, can be attributed to the braking action or force generated by the chisel brake point 59 at the end of the screw, which slows or impairs advancement of the screw into the material of the first work piece 102.

When the screw has been advanced into the work piece 102 the preselected distance 77, a number of the threads 40 sufficiently engage the hole 103 which was pre-bored by the chisel brake point 59, and the material surrounding the hole of the work piece 102. Further rotation of the screw 10 in the direction of the arrow causes the threads to overcome the braking force created by the chisel brake point 59. Optionally, this overcoming of the braking force can occur when the preselected distance generally corresponds to the dimension of the work piece in the area where the screw 10 penetrates or is otherwise bored through the work piece 102. The engagement of the threads 40 with the hole 103 and subsequent overcoming of at least a portion of the braking force generated by the chisel brake point can increase the rate of advancement of the screw through the work piece 102, as well as the rate of advancement of the screw into and through a portion of the second work piece 106. Accordingly, the braking force and subsequent retarding forces and action of the chisel brake point 59 is overcome a desired amount so that the threads 40 advance the screw through the first work piece and into the second work piece at an increased rate of feed.

Optionally, the screw then can begin to advance into the second work piece 106. The rate of advancement or feed, when with the threads overcome at least a portion of the braking force, can result in the screw 10 being advanced or fed about 1, 2, 5, 7, 10, 12, 15, 20, 25, 30, 35, 40 and/or 50 (or any range between or above any of the aforementioned values) times faster than when the braking force of the chisel brake point was retarding advancement of the screw. With the threads 40 sufficiently engaging and advancing the screw into the work pieces, the force F3 in FIG. 9, and F4 in FIG. 10, applied to the screw can be less than the forces F1 and F2 applied before with the braking force of the chisel brake point 59 was overcome by the forward thrust caused by the threads 40.

As shown in FIG. 9, the screw 10 can be advanced into the first work piece 102 and further into the second work piece 106. During this advancement, the chisel brake point 59 can provide a braking force, but most, if not all, of it is overcome by the feeding force generated by the threads 40 engaging the material surrounding the hole 103. The chisel brake point 59 also can pre-bore a hole 103 in the second work piece 106. Material 104 also can be augured out from the respective hole created by the screw in the second work piece 109. Where the installation tools described herein are used to install the screw, that material can be ejected from a material ejection port as described below.

With reference to FIG. 10, the screw 10 can continue to advance until the screw head 20 is sufficiently indented in or buried in the side surface 108 of the work piece 102. In some cases, the head of the screw is completely positioned in the hole 103, so that no portion of the head extends beyond the first surface 108 of the work piece 102. Optionally, the screw 10 can be advanced sufficiently so that it is at least partially hidden from a viewer "V" viewing the work piece generally from above. With the screw 10 installed as shown, optionally about 20% to 100%, further optionally about 50% to 90% of the holding force F5 of the screw 10 is provided via the screw shaft 30 and/or threads 40, rather than via the head 20 of the screw 10. Further, where screws 10 are similarly installed on opposite side surfaces of the work piece 102, with the screws generally pointing toward one another and embedded in the underlying work piece 106, those opposing screws can cooperatively provide sufficient force to hold down the work piece 102, with a substantial portion of the holding force being supplied via the shaft of the screws, rather than the heads of the screws.

Another feature of the screw of the embodiment herein concerns the chisel brake point 59 and its effect on feed of the screw. Optionally, the point 59 can include inclined surfaces that are at an angle relative to one another so that they provide a sufficient braking force such that the screw does not feed or advance into the first work piece 102 at a rate corresponding to the pitch of the threads 40 until after the chisel brake point at least partially penetrates through the work piece 102, for example, a preselected distance 77, or through the second surface 109 of the work piece. In such a manner, the screw can prevent or impair excessive wedging of the threads 40 and/or shaft 30 through the material of the work piece 102 surrounding the screw 10, thereby preventing or impairing damage such as splitting to that material and the corresponding corner edge of the work piece 102. With the screw substantially or fully penetrated through the first work piece 102, its rate of advancement can change, and generally increase, so that it advances at a faster rate into the second work piece 106. Of course, in so doing, the remaining portion of the screw in the first work piece 102, including the shaft 40 and head 20, can be advanced in and/or through the first work 102 piece at a greater rate than the rate before the screw penetrated the second surface 109 of the work piece 102.

In the above described mode of operation, the feed rate of the screw 10 into and/or through the work pieces also can change as the screw is advanced or fed into the first and/or second work pieces 102, 106. For example, as the screw 10 is turned in the direction of the arrow in FIG. 7, the feed rate of the screw 10 into the work piece 102 can be a percentage slower or less than the theoretical feed rate provided by the pitch and configuration of the threads 40. As a more specific example, the threads 40 can be configured to provide a theoretical feed rate of one millimeter per one revolution of the screw 10. Due to the braking forces provided by the chisel brake point 59, however, the actual feed rate of the screw 10 can be only 0.25 millimeters per one revolution of the screw 10. This braking force or action can retard advancement of the screw, or otherwise reduce the feed rate of the screw for the preselected distance 77 (FIG. 8). As more threads 40 of the screw engage the material surrounding the hole 103 bored by the chisel brake point 59, the braking force provided by the chisel brake point 59 can be overcome by the threads 40. The feed rate of the screw 10 can increase dynamically as more threads engage the material of the work piece 102, overcoming the braking force.

Thus, by example only, the feed rate of the screw into the work piece 102, after the chisel brake point 59 has advanced a preselected distance 77 into the work piece 102, can increase from 0.25 millimeters per one revolution (which is caused by the braking force of the chisel brake point) up to 1.0 millimeter per one revolution, which again can be the theoretical feed rate of the screw based on the pitch of the threads 40. When the screw 10 penetrates through the other surface 109 of the work piece 102, it can be advanced at a feed rate of about one millimeter per revolution. Accordingly, when it enters the second work piece 106 it can be advanced at the full theoretical feed rate, or at some percentage, for example, about 70%, 80% or 90%, of the full feed rate.

In general, the feed rate of the screw 10 into the work piece 102 can dynamically change from a first feed rate to a greater, second feed rate as the screw enters the work piece, nearing the preselected distance 77. This can occur because additional threads 40 of the screw 10 begin to engage the material around the hole pre-bored by the chisel brake point 59. As more threads engage the work piece 102, the forward force/thrust provided by those threads begins to overcome the braking force provided by the chisel brake point 59.

The aforementioned mode of operating the fastener 10 of the current embodiment and screw features also yields a suitable method for installing a fastener to join a first work piece with a second work piece. In this method, a fastener 10 is provided. The fastener can be the screw of any of the embodiments herein, having a chiseled brake point 59 and threads 40, where the threads are configured to advance the fastener 10 at a first feed rate, which for the sake of this example, can be a theoretical feed rate. The fastener 10, and in particular, the chiseled brake point 59 can be rotated and brought into engagement with the first work piece 102 as it is rotated. Initially, the chiseled break point can penetrate the side surface of the work piece, as generally shown in FIG. 7.

Optionally, the screw 10 can be held with an installation tool at a preselected angle, and generally aimed at the angle β at the side surface 108 of the work piece 102. The installation tool can also engage the head or other portions of the screw to rotationally restrain the fastener as it is advanced, and generally to prevent or impair excessive wobble of the screw in so doing. In general, the installation tool or some other driver, such as a drill, can rotate the fastener.

The fastener 10 can be advanced into the first work piece 102 at a second feed rate, less than the first feed rate, due to the chisel brake point 59 retarding advancement of the fastener 10 into the work piece 102 and providing a braking force that reduces the first feed rate of the fastener into the work piece to the second feed rate, or more generally impairing the fastener from increasing its feed rate to the theoretical feed rate of the screw 10.

Returning to the method, the chisel break point 59 can pre-bore a hole in the first work piece 102 and the second work piece 106. When the fastener is advanced so that it extends through the first work piece and engages the second work piece, the hole 103 generally is completely bored through the first work piece. The diameter of that hole 103 can be about the size of the widest diameter of dimension of the chisel brake point 59, but smaller than the outer diameter of the threads 40 of the fastener so that those threads can still bite into the material surrounding the hole and alter the feed rate of the fastener as described herein.

When the fastener 10 begins to advance and continues to advance into the second work piece as shown in FIG. 9, the threads 40 of the fastener generally pull the remaining shaft 30 (if any) above the threads, and the head 20 of the fastener into and/or through the pre-bored hole until rotation ends and the fastener achieves a desired depth of installation in the work pieces. As shown in FIG. 10, the fastener can be advanced so that the threads 40 are substantially located in the second work piece 106, but not the first work piece 102. The shaft 30 and head 20 of the fastener 10, however, can remain in the first work piece as the fastener 10 also continues to advance into the second work piece 106. As a result, the head 20 and optionally the shaft 30 can pull down the first work piece 102 into further securing engagement with the second work piece, and can further pull the second work surface 109 toward and into engagement with the first work surface 107.

Generally, the aforementioned depth of installation corresponds to the fastener head 20 being at least partially located, if not fully located within the pre-bored hole 103. The head 20 also can be generally concealed from view for a viewer V from above. For example, the head can be sufficiently buried in or located within the interior of the pre-bored holed in the first work piece so that it is not readily visible to a viewer V from above without close inspection. Sometimes, where the work piece is constructed from wood or composites, the material around the pre-bored hole may swell or at least partially fill the pre-bored hole above the head back in to even further conceal the head of the fastener 10.

The depth of the fastener 10 in the work pieces after installation also can correspond to a sufficient portion of the threads 40, and shaft 30 if desired, being located within the second work piece, and a sufficient portion of the shaft, as well as the head 20, being located in the first work piece, where the fastener joins the first and second work pieces to one another.

Figure 11:
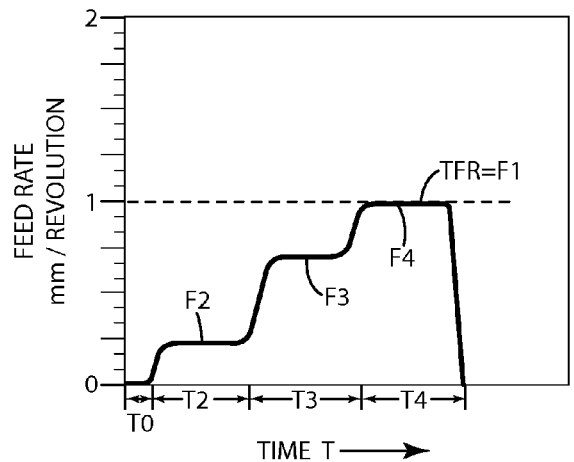
FIG. 11 is a chart illustrating the feed rate of the fastener into work pieces over time.

A chart illustrating the feed rates as the screw 10 is advanced is presented in FIG. 11. There, the y-axis represents the feed rate in millimeters of advancement into the work piece per revolution. The x-axis represents the passage of time as the fastener is installed, starting from when the fastener first engages the first work piece at T0, where time is equal to zero, to when the fastener is fully installed at TE. The theoretical feed rate TFR, also referred to as a first feed rate herein, is a function of the geometry of the thread, and more particularly, the pitch and/or angle of the threads as explained above. As shown in FIG. 11, during time T0, as the fastener is initially rotated, it begins to engage the work piece, so it does not feed into the work piece.

As the fastener 10 continues to rotate and penetrate into the work piece, the threads 40 engage the work piece. Generally, however, the threads during time T2 do not substantially advance the fastener 10 into the work piece. Much of the advancement, or the feed rate F2 in general, is due to the force being applied to the fastener through the head. Some or a small part of the advancement can be provided by the threads during T2. During T2, the chisel brake point 59 can pre-bore the hole for the remainder of the fastener.

The fastener 10 can continue to be rotated and advanced at feed rate F2 a preselected distance 77 (FIG. 8) into the work piece 102, with progressively more of the threads 40 of the fastener 10 engaging the work piece until that engagement of the threads with the work piece at least partially, if not substantially, overcomes the braking force. At about that point, the advancement of the fastener 10 can generally increase from the second feed rate F2 to a greater third feed rate F3, that is optionally between the second feed rate F2 and the first feed rate TFR. This increase in the feed rate is generally represented in FIG. 11 between the transition between F2 and F3. While the transition between the feed rates is shown as abrupt, it can occur gradually if desired.

The fastener 10 can continue to advance until it extends through the first work piece and engages the second work piece. Shortly after it engages the second work piece, the rate of advancement of the fastener can further increase, transitioning from the third feed rate F3 to the fourth feed rate F4. This increase can be due to many, if not all of the threads 40 engaging the work piece(s) to advance the fastener into the work piece(s). The fastener 10 can continue to be advanced at the fourth feed rate F4 that is optionally between the third feed rate and the first feed rate TFR, and optionally at or near the first feed rate or TFR.

In operating at the fourth feed rate F4, the fastener 10 can be advanced into the first surface 107 of the second work piece 106 as shown in FIG. 8. Generally, the fastener can be advanced into the second work piece, which can be an underlying work piece, such as a floor joist at a faster feed rate, such as the TFR because there is not much concern of splitting or damaging that structure as a result of the screw shaft being wedged or quickly advanced into the material of that work piece. Optionally, the fastener 10 can be advanced into the second work piece parallel to the longitudinal length of the second work piece. When the fastener is fully installed in the work pieces, the advancement stops, which is represented at TE in FIG. 11.

Generally, the changes from one feed rate to another as mentioned above can occur due to the geometry and interaction of the chisel brake point, threads and head of the fastener with one another and/or the work piece(s), rather than due to changes in the external forces F1, F2, F3, F4 or other forces applied to the fastener as it is advanced. Indeed, the forces F1, F2, F3 and F4 can be substantially the same throughout the advancement of the fastener into the work pieces. Likewise, the rate of revolutions per minute (RPMs) of the fastener can remain generally the same throughout the advancement of the fastener in to the work pieces. What can change however, is how fast the fastener advances under those RPMs, again, due to the geometry of the fastener and the interaction of its components.

Although the different feed rates F2, F3 and F4 are shown as transitioning from one to the other rather abruptly, those feed rates can transition from one to the other gradually, so that the transitions are less stepped. This can be achieved by varying the geometry of the threads, the chisel brake point, and or other features as desired.

I. First Alternative Fastener Embodiment

A first alternative embodiment of the fastener is illustrated in FIGS. 12-17 and generally designated 110. This embodiment is similar to the above embodiment above in construction and operation with a few exceptions.

Figure 15:
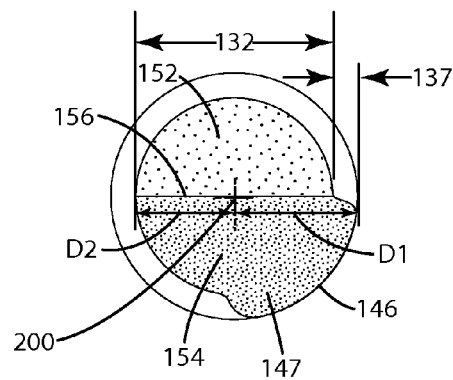
FIG. 15 is an end view of the first alternative embodiment of the fastener.
Figures 16, 17:
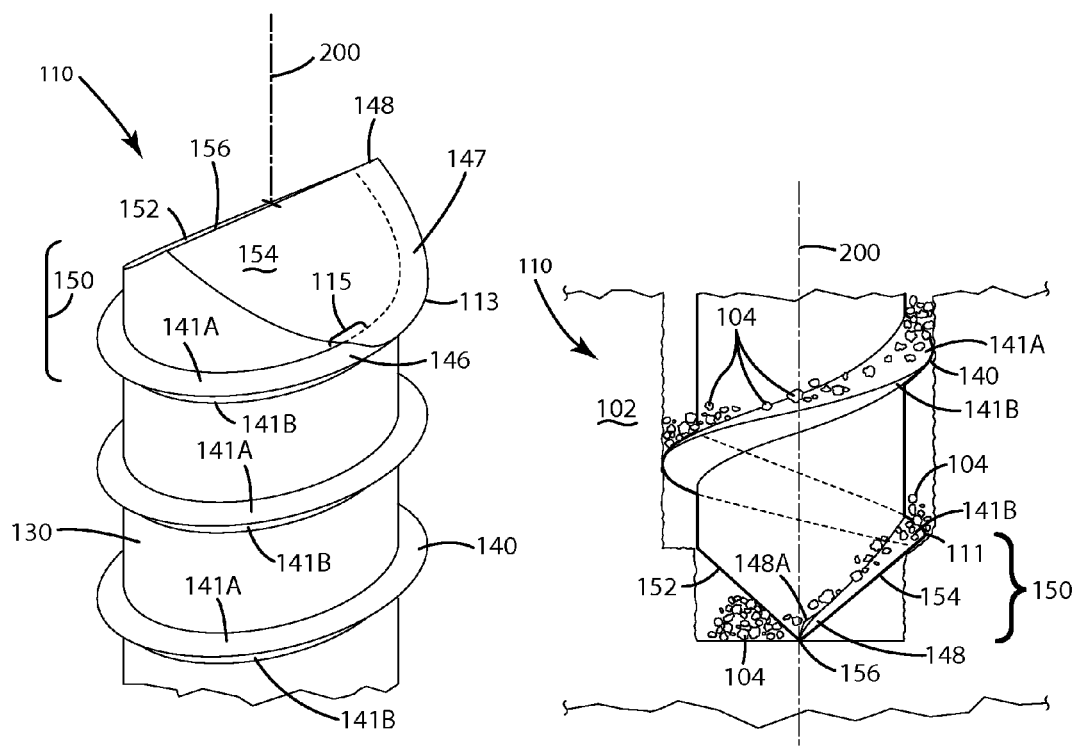
FIG. 16 is an enlarged perspective view of the first alternative embodiment of the fastener.
FIG. 17 is an enlarged side view of the end of the first alternative embodiment of the fastener engaging a work piece.

To begin, the end 150 of the fastener can include a different thread geometry and inclined surface configuration. For example, the end 150 can include a chisel edge 156 that extends across the diameter 132 (or some other chord or dimension) of the shaft 130. The chisel edge 156 can be in the form of and function like the chisel brake point explained above if desired. However, the chisel edge 156 also can extend slightly beyond the outer diameter 132 of the shaft 130 as shown in FIGS. 15 and 16 by a distance 137. In so doing, at least a portion of the last thread 146, for example, the leading portion 148, can form part of the chisel edge 156, or more generally the chisel brake point. With the last thread 146 forming this extension, the chisel edge 156 can be configured asymmetrically about the longitudinal axis 200. For example, a first portion of the chisel edge 156 can extend a first distance D1 from the longitudinal axis on one side of the axis, and a second portion located on the opposite side of the longitudinal axis can extend a second distance D2 on the other side of the longitudinal axis 200. The distance D1 generally can be greater than distance D2. This difference in the distances can be equal to the depth of the last thread, or some other dimension as desired.

The chisel edge 156 extends rearward from the very end of the fastener 150 generally in a V-shape with the inclined surfaces 152 and 154 inclined relative to one another at an angle: which can be in the range of about 90° to about 105°, or optionally about 90° to about 135°, or further optionally about 90° to about 150°, or even further optionally 90°±10°. It has been discovered that with these ranges of angles incorporated into the chisel edge, the fastener 110 can pre-bore holes well into composite work pieces, as well as fiber or natural wood work pieces. For example, this range of angles is blunt enough so that it can slow or retard advancement of the screw into a wood board, and allow a hole to be pre-bored therein. Substantially more acute angles, where: is less than 45°, on the other hand, can be too pointed, and can cause the fastener to rapidly drill into the wood board, almost at, if not at, the theoretical feed rate of the fastener and related threads. In turn, this rapid advancement of the fastener can split or damage the work piece.

The above range of angles is also sharp enough so that the end of the fastener can pre-bore a hole, rather than melt a hole in a work piece, such as a board, that is constructed from composites, such as a polymer or plastic or wood/plastic hybrid. Substantially more obtuse angles, where: is greater than 170°, on the other hand, can be too blunt, and can cause the fastener end to simply melt a hole into the wood work piece, at a feed rate that is unsatisfactory for practical use. In addition, the melting of the work piece material can rapidly gum up the threads of the fastener, and prevent the melted material from ever making it to the surface of the work piece. In turn, this can cause the surrounding material to bulge and present aesthetic issues.

Returning to FIGS. 15-17, the inclined surfaces 152 and 154 can intersect at the chisel edge 156 and form at least portion of it. One or more of the inclined surfaces can transition to or merge with the last thread 146. More particularly, the last thread 146 can form at least a part of, and lie in the same plane or curvilinear surface as, one or more of the inclined surfaces 154. Depending on the angle of the inclined surface 154 relative to the longitudinal axis 200 or the other surface, more or less of the last thread 146 can form a part of that surface.

Figure 12:
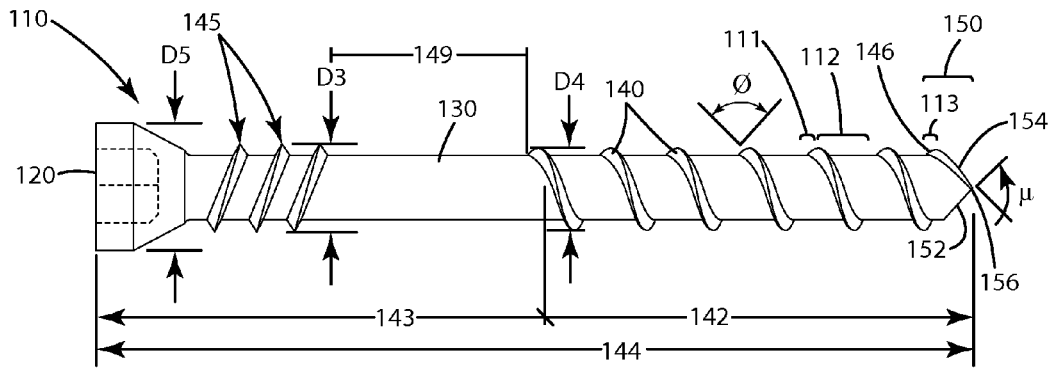
FIG. 12 is a side view of a first alternative embodiment of the fastener.
Figure 13:
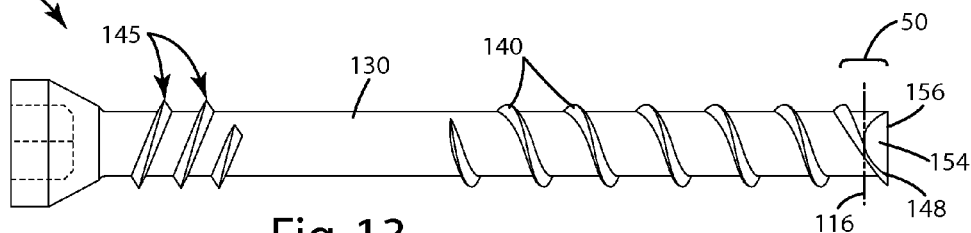
FIG. 13 is a second side view of the first alternative embodiment of the fastener.
Figure 14:
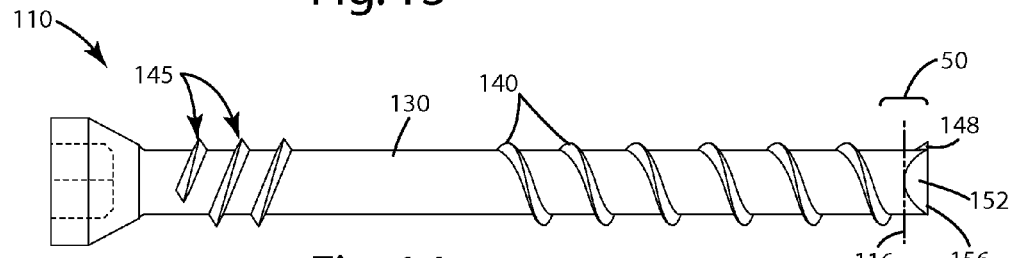
FIG. 14 is a third side view of the first alternative embodiment of the fastener.

Optionally, the inclined surfaces 152 and 154 can be located between a boundary 116 on the shaft 130 and the chisel edge 156 as illustrated in FIGS. 12-14. The boundary 116 can mark the location at which one or both of the inclined surfaces begin on the shaft 130 or within the end 150 of the fastener 110. Where included, the thread 140 and/or last thread 146 also can be formed beyond the boundary 116, in the end, between the boundary and the chisel edge or chisel brake point. Optionally, these threads can also extend rearward from that location toward the head in a continuous, generally uninterrupted manner as well.

As shown in FIGS. 15 and 16, the last thread 146 merges or transitions into the inclined surface 154 at the intersecting portion 147 of these elements. This intersecting portion 147 can lie within the same plane or curvilinear surface as the inclined surface 154, and can form a continuous surface with the inclined surface 154 as illustrated. The intersecting portion 147 can extend the inclined surface 154 beyond the shaft 130 a distance equal to the depth of the last thread 146, the leading portion 148, or some other distance. Thus, with this intersecting portion acting as extension of the inclined surface, the inclined surface 154 can have a greater surface area than the opposing inclined surface 152. Optionally, although not shown, a part of the last thread can extend beyond the chisel edge 156, in which case, that part can form a portion, and optionally another surface extension of the other inclined surface 152 as well.

Returning to FIGS. 15-17, the last thread 146 can include a leading portion 148 at which the last thread terminates. The leading portion 148 can be the part of the last thread that actually merges or transitions directly into the inclined surface(s), and can include at least a portion of or overlap the intersecting portion 147. The leading portion 148 can extend all the way to the chisel edge 156, or it can extend somewhat beyond the chisel edge and form part of the other inclined surface 152, or it can terminate somewhere adjacent the inclined surface 154, and/or the inclined surface 52.

The leading portion 148 can extend outward from the shaft 130 the full depth of the other threads 140, or some other preselected greater or lesser depth. The leading portion can transition rearward from the chisel edge 156 to the remainder of the last thread 146, which in turn furls or coils around the shaft 130 at or near the end 150, depending on the thread configuration, and transitions to the other threads 140 extending outward from the shaft. The leading portion 148, the last thread 146 and the other threads 140 can form a unitary thread that extends from the chisel edge 156 continuously up the shaft 130 optionally without any interruptions or voids in the thread, until it terminates somewhere in a middle region of the shaft 130.

Optionally, the threads 140, 146 and fastener 110 in general can be void of any self-tapping grooves or discontinuities that assist the fastener initially penetrating a very dense material, such as a metal. The upper and lower thread surfaces 141A and 141B of the last thread 146 and the remaining threads 140 likewise can be continuous from the chisel point to the end of the threads 140 in the middle region of the fastener 110. Of course, if voids or interruptions are desired in the threads for certain applications, they can be included.

Further optionally, the last thread 146 can merge with the inclined surface at the leading portion 148, with the last thread and all threads terminating at that location. As an example, there may be no additional thread or threads or portions of threads located between the chisel edge and the leading portion.

As shown in FIG. 17, the leading portion 148 optionally also can include a forward surface 148A which generally is located adjacent and forms a part of the lower thread surface 141B. The forward surface 148A can generally be inclined or effect relative to the axis optionally by about 0° to about 45°, further optionally about 2° to 10°. The forward surface 148A optionally can extend all the way to and generally intersect the chisel edge 156. Opposite the inclined surface 154, in some applications, the forward surface 148A can also form a partial extension of the chisel edge 156. If desired, the forward surface 148A can form a ramp from a location at or adjacent the chisel edge 156. This ramp can operate to scrape material from the bottom of the hole 103. This ramp also can operate to scoop or route material 104 adjacent the shaft 130, can be onto the lower thread surface 141B. As the fastener turns, the scooped material augered farther up the lower thread surface 141B.

The fastener of this first alternative embodiment as shown in FIG. 12 can be of a length 144, and generally divided into a first portion 142 and second portion 143. Optionally, the length 144 can be about 1.5 to about 2.0 inches, optionally about 1.8 inches, with the first portion 142 being about half the length 144 and the second portion 143 being about half the length as well. Of course, the screw may be of various other lengths, for example, it can be 2 inches, 3 inches, 4 inches or other increments therebetween depending on the application. Further, the first and second portions 142 and 143 can be subdivided in different ratios depending on the application.

The first portion 142 can include primary threads 140 and the chisel edge 156 described above. The first portion 142 can be about half the length 144 of the fastener, or about a or ¼ the length of the screw, or other portions as desired. The second portion 143 can be threadless and can include an optional head 120 of the fastener 110. The outside primary threads near the end 150 can be less sharp than the threads closer to the head 120 of the screw if desired to prevent the or impair those threads from biting into and advancing the fastener into the work piece at an undesired rate. Of course, the threads can be uniformly sharp from end to end. The pitch of the threads 140 optionally can be about 2 mm to about 4 mm, and further optionally about 3 mm. Generally, as used herein, the pitch refers to distance from one point on the thread to the corresponding point on an adjacent thread measured parallel to the axis 200.

The threads 140 and the last thread 146 can be of a thread design having a "V" profile or a buttress profile depending on the application. Further, as shown in FIG. 12, the threads and last thread can each include a thread angle Ø, which is generally the included angle formed between the upper and lower thread surfaces 141A and 141B. This angle can be optionally between 10° and 90°, further optionally between 30° and 70°, and still further optionally between 55° and 60°, and even further optionally about 60°.

The threads 40 each can also include crests 111 and roots 112 between each crest of the threads. As shown in FIGS. 12 and 16, the last thread can include a crest 113. This crest 113 can continue to the leading portion 148, or can terminate short of it as desired. The crest 113, and more generally the last thread 146 also can thin substantially in the intersecting portion 147 where the last thread 146 merges or transitions into the inclined plane 156. Indeed, the inclined surface 154 and intersecting portion 147 can extend outward to the crest 113, such that the planar, curved or other surface of the inclined surface and/or intersecting portion terminates at the crest 113 for at least a portion, if not all of the last thread 146 and/or the leading portion 148.

As illustrated in FIG. 16, the inclined surface 154, and more particularly the intersecting portion 147, can form a part of the last thread where the last thread merges into these elements. For example, the last thread in this region can generally include the lower thread surface 141B on one side of the crest 113 of the last thread, and can include the intersecting portion 147 that merges with the inclined surface 154 on the opposite side of the crest 113 of the last thread 146. As the last thread 146 furls or coils away from the leading portion 148 or the chisel edge 156, the inclined surface 154 and/or intersecting portion 147 themselves can merge or transition to the upper thread surface 141A in the transition region 115. This transition can be abrupt, with a perceivable drop off from the inclined surface 154 and/or intersecting portion 147 to the upper thread surface 141A, or it can be gradual, with inclined surface 154 and/or intersecting portion 147 angling or curving away from the upper thread surface 141A at a small angle or curvature.

While the second portion 143 can be unthreaded, it optionally can include secondary threads 145 as shown. These secondary threads 145 can be included on the shaft 130 at or near the head and can extend a predetermined distance within the second portion 143 of the length of the screw 110. The primary threads 140 and secondary threads 145 can be separated by a void located along the shaft 130. the void can be of a preselected length 149.

The secondary threads 145 can be of the same threading as the primary threads 140, or alternatively can include a reverse thread, generally running in the opposite direction of the threads 140 in the first portion 142. The pitch on the secondary threads 145 optionally can be about 2 mm to about 4 mm, and further optionally about 3 mm. The pitch on the secondary threads 145 can be about 1.5 to 2 times greater than the pitch on the primary threads 340, in addition to being reverse threaded along the shaft 130. Further, the outer diameter D3 of the reverse threads 145 can include an outer diameter that is smaller than the outer diameter D4 of the primary threads 140. As an example, the outer diameter of the reverse threads can be about 1.4 inches, and the outer diameter of the primary threads can be about 1.6 inches. Optionally, the outer diameter of reverse threads 145 can be about 0.1 to about 0.4 inches less than the outer diameter of the primary threads 140.

The head 120 of the fastener shown in FIG. 12 optionally can be of a diameter D5 that is greater than the other diameters D3 and D4. This larger size of the head can enable a drive tool to be attached to the head and driven. The larger size of the head can also enable the head to engage the material surrounding the pre-bored hole 103 and provide some holding force, in addition to the shaft, to hold the work pieces in a desired orientation.

In operation, the screw 110 can function and can be installed in a manner similar to the embodiments described above. Where the leading portion 148 and last thread 146 terminate adjacent or near one or more of the inclined surfaces, however, these features can provide enhanced augering. For example, as shown in FIG. 17, as the material 104 is scraped from the work piece within the pre-bored hole 103, the small pieces of material, which can be in the form of chips, fragments, fibers, or parts of the work piece are scraped from the bottom of the hole by the leading portion 148. In effect, these parts can be scooped or picked up by the leading portion 148 and the last thread 146, and where included, the forward surface 148A, and augered up the last thread to the other threads 140. The material 104 can travel on the lower thread surface 141B as illustrated, generally continuously up the threads until it is ejected out from the hole to the environment or into a tool as described below.

In applications where the work piece into which the fastener 110 is advanced is a composite board, the scooping and scraping action of the leading portion and end 150 can almost immediately auger out the material 104 from the pre-bored hole. This can prevent melting of that composite material due to excessive churning in the bottom of the hole, which in turn can prevent the screw from becoming gummed up with the melted material as it is augered up the threads, thereby impairing advancement of the screw into the composite.

Figure 18:
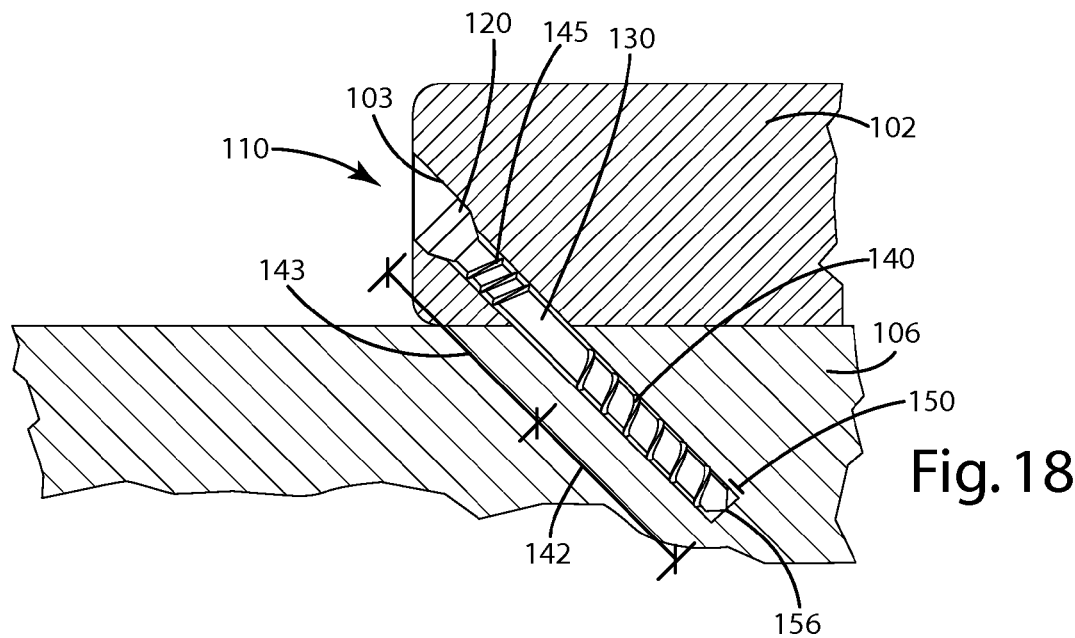
FIG. 18 is a side sectional view of the first alternative embodiment of the fastener installed in first and second work pieces.

FIG. 18 illustrates the fastener 110 installed in work pieces 102 and 106 at a predetermined angle, much like the embodiment described above. Leading up to that installation, the fastener 110 can undergo the operations, can be installed at the angles, and can feed at the feed rates as described in any of the embodiments herein to connect the work pieces 102 and 106.

As shown in FIG. 18, however, the optional additional secondary threads 145 can provide a slightly different holding effect than that of the embodiments described above. For example, where the secondary threads 145, which again may be reverse threads, are included, those reverse threads can assist in drawing the work piece 102 more toward the second work piece 106. Further because there is a void between the primary threads and the secondary threads, that void can allow the first work piece 102 to draw down against the second work piece 106. The optional reverse threads also can rotate within the pre-bored hole 103, thereby scraping the loose ends of material from that hole, which can provide a clean finished hole above the location where the head 120 comes to rest after being fully installed.

After the fastener 110 is fully installed, the optional reverse threads can provide additional holding power to prevent the work piece 102 from being removed from the second work piece 106 under force. For example, the added contact between the reverse threads and the material surrounding the pre-bored hole 103 can provide more friction between the fastener and the hole, which in turn can make much more force required to pull the work piece 102 away from work piece 106.

Optionally, a first fastener 110 is installed on one side of a work piece 102, such as a board, and a second fastener is installed directly across from the first fastener on an opposite side of the board, and in some cases in the same plane as the first fastener. Where these opposing fasteners optionally include the secondary threads, these threads can provide even more holding force to keep the work pieces fastened together.

II. Second Alternative Fastener Embodiment

Figure 19:
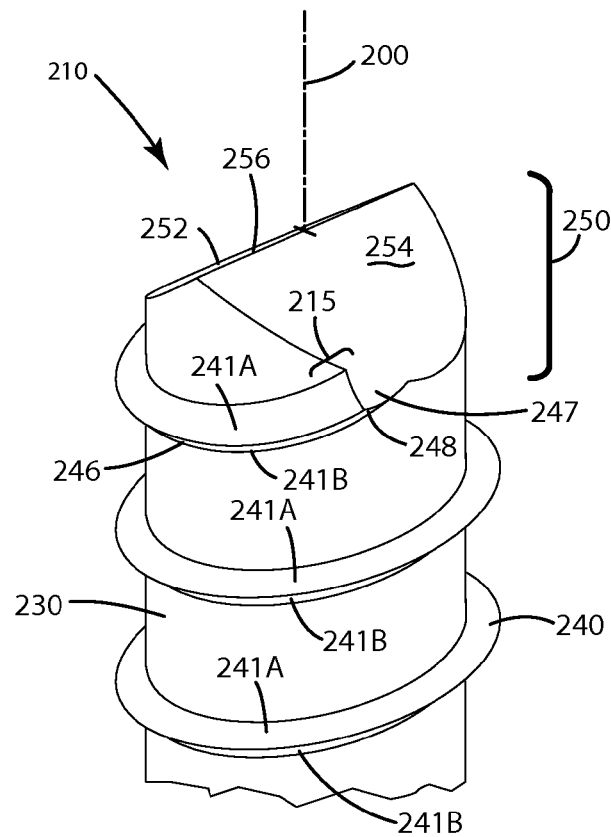
FIG. 19 is an enlarged perspective view of a second alternative embodiment of the fastener.

A second alternative embodiment of the fastener is illustrated in FIG. 19 and generally designated 210. This embodiment is similar to the above embodiments in construction and operation with a few exceptions. For example, the end 250 of the screw 210 can generally include a last thread 246 that is included within the primary threads 240. This last thread 246 can also include upper 241A and lower 241B thread surfaces, as can the remainder of the primary thread 240 as illustrated in FIG. 19. The last thread 246 can end at a leading portion 248. This leading portion 248, and more generally the last thread 246, can transition or merge with the inclined surface 254. This merging or transition can occur at the intersecting portion 247. This intersecting portion can form a continuation or extension of the surface of the inclined surface 254. The last thread 246 can also transition at the transition region 215 into the inclined surface 254. As can be seen in FIG. 19, the leading portion 248 is adjacent the chisel edge 256, but does not form a direct extension of that chisel edge 256. The surface area of the inclined surface 256 thereby can be increased by the area corresponding to the intersecting portion 247.

The operation of the second alternative embodiment in FIG. 19 is similar to that of the embodiment in FIGS. 12-18. For example, the leading edge 248 and/or last thread 246 acts to scoop up material and transfer it to the surfaces of the threads so that that material can be augured up and out of a pre-bored hole created by the chisel edge 256. Moreover, the chisel edge 256 and respective components can operate like a chisel break point as described in the embodiments herein. In some circumstances, however, the scooping action by the leading portion 248 can be slightly less than that of the embodiments described above due to the leading portion 248 not being disposed at the point of contact with the bottom of the pre-bored hole or the material, that is, directly adjacent the end forming an extension of the chisel edge 256. Optionally, if desired, the leading portion 248 can be moved to the lower most extremity of either of the inclined surfaces 252, 254. The chisel edge of this fastener surface can also include a chisel brake point as described above.

III. Third Alternative Fastener Embodiment

Figure 20:
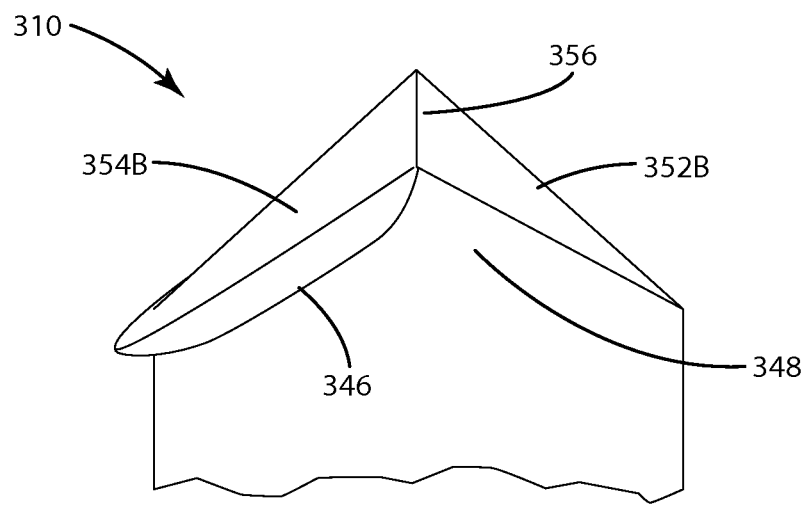
FIG. 20 is an enlarged side view of an end of a third alternative embodiment of the fastener.
Figure 21:
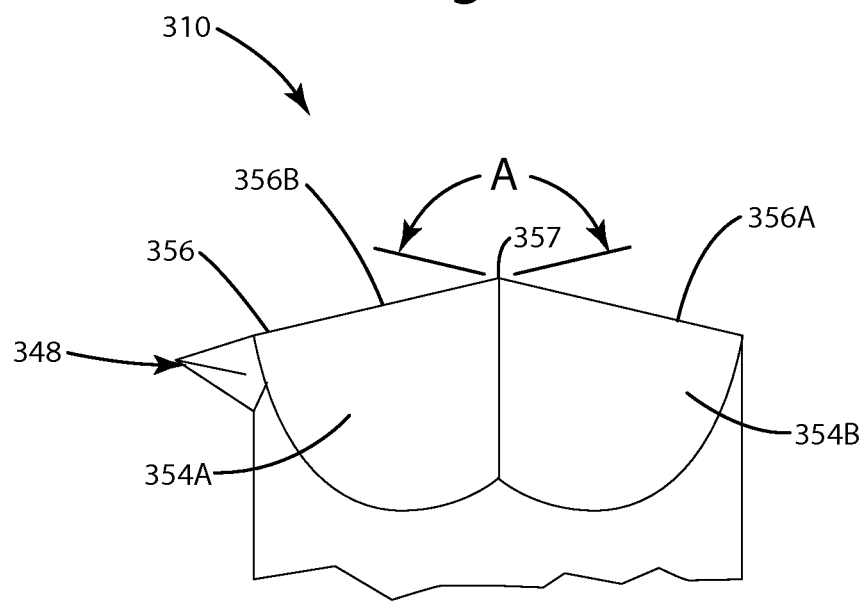
FIG. 21 is another enlarged side view of the end of the third alternative embodiment of the fastener.

A third alternative embodiment of the screw is illustrated in FIGS. 20 and 21 and generally designated 310. This embodiment is similar to the above embodiments in construction and operation with a few exceptions. For example, the chisel edge 356 includes a small apex or point 357 at which the chisel edge sub portions 356A and 356B intersect. In this chisel edge construction, the chisel edge sub portions can be at an angle A relative to one another. This angle can generally be an obtuse angle, that is, greater than 90° and optionally less than 180°. In this embodiment, the inclined surfaces can be divided into sub portions 352a and 352b, and 354a and 352b, or additional sub portions if desired. These sub portions can include the negative rake angles or other angles of the inclined surfaces of the embodiments described above. The screw of this embodiment also can include a last thread 346 with a leading portion 348 that merges or transitions into one or more of the inclined surfaces, generally forming an extension of those surfaces, the chisel edge, or other components of the end of the screw. Further, the chisel edge of this fastener can include a chisel brake point and can operate like the embodiments described above.

IV. Installation Tools

As mentioned above, a tool can be used to start and advance the above mentioned fasteners, or other fasteners, into one or more work pieces to join those work pieces in the manners explained above. For example, a tool can be used to start a screw and subsequently advance the screw through the side of a board and subsequently into an underlying or adjacent joist or other structure.

Figure 22:
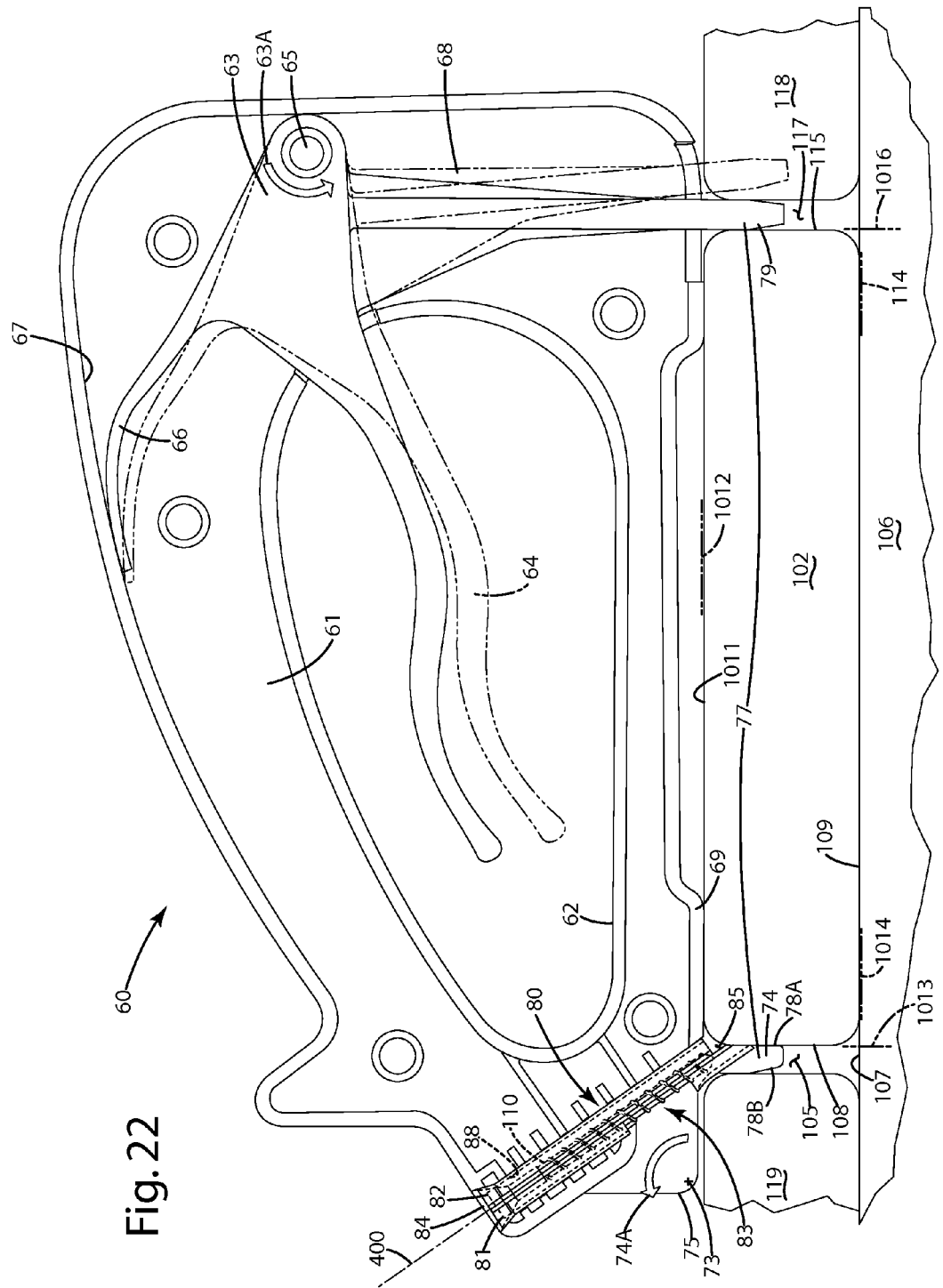
FIG. 22 is a side view of a current embodiment of a fastener installation tool.
Figure 23:
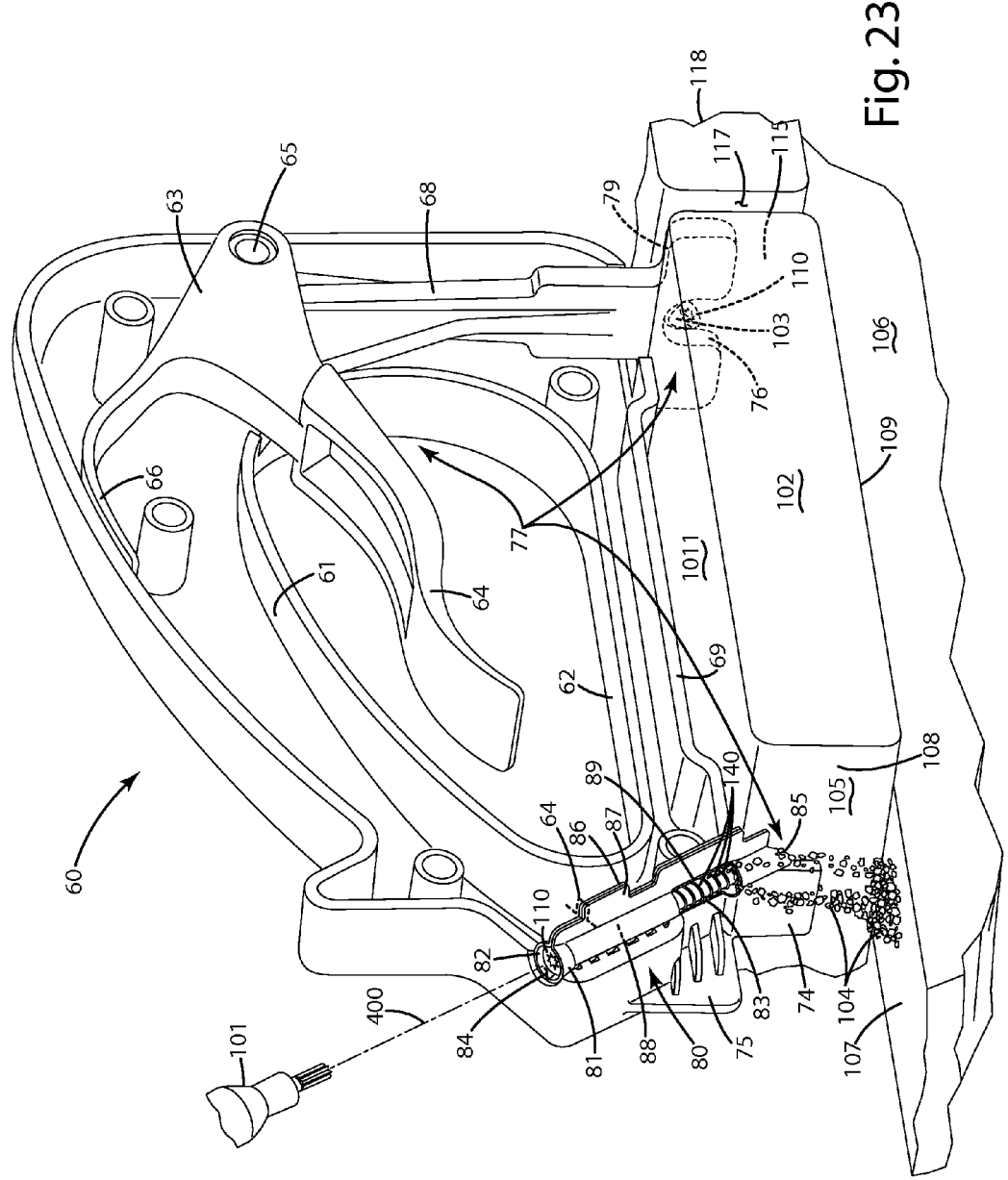
FIG. 23 is an end perspective view of the fastener installation tool.
Figure 24:
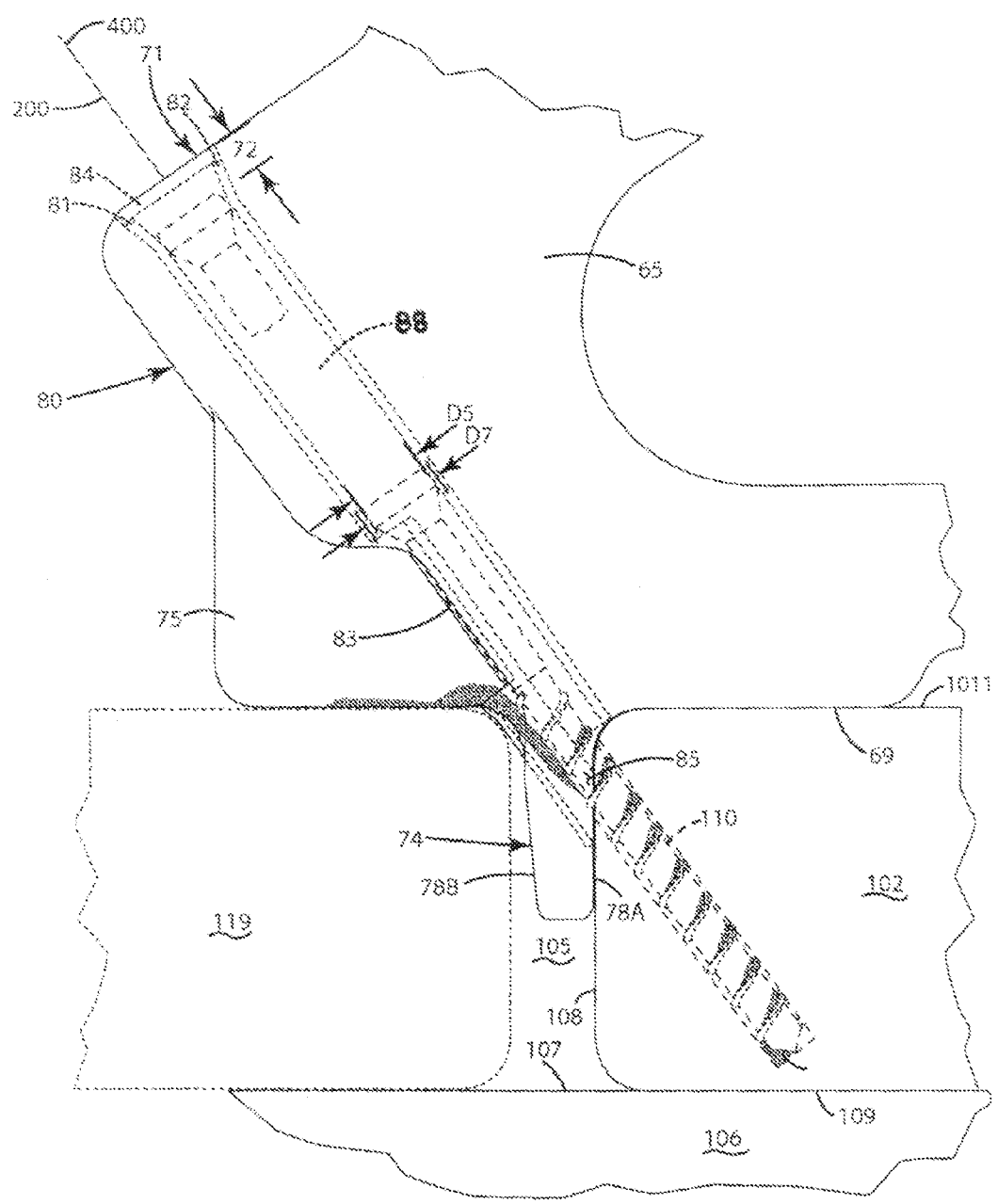
FIG. 24 is a close up view of the fastener installation tool in use installing a fastener.

A current embodiment of a tool suitable for such a fastener installation is illustrated in FIGS. 22-24, and generally designated 60. As shown there, the tool 60 can include a frame 62 including a handle 61, a guide 80 and an optional clamping assembly 77. The frame 62 can include a bottom surface 69 that is adapted to engage a top surface 1011 of a work piece 102. This work piece can be a board or any other type of structure described herein. The tool can be used to install a fastener 110 as described above through the first work piece 102 and into the second work piece 106.

Generally in the embodiments shown, the work piece 102 can include a first surface, also referred to as a side surface 108 that lays in a first plane 1013. Opposite the first surface or side surface 108, on the opposite side of the work piece, can be an opposing side surface 115, or fourth surface, that lays generally in a fourth plane 1016. The work piece 102 also can include a third surface or top surface 1011 that generally lies at least partially within a third plane 1012, and a second surface or bottom surface 109 that generally lies in a second plane 1014 that is parallel to and on the opposite side of the work piece from the top surface 1012. The first surface 108 and fourth surface 115 can be generally perpendicular to the top 1011 and bottom 109 surfaces of the work piece 102.

The guide 80 of the tool 60 can generally define an angled bore 88 that is positioned in a non-orthogonal angle, or generally angularly offset from 90°, relative to the side surface 108 of the first work piece 102 when the tool 60 readied for advancing the fastener. The angled bore can extend from a first opening 84 to a second opening 85. The first opening can be configured to receive a fastener and generally operate as an entrance into which a fastener can be inserted into the tool 60. The second opening 85 can serve as an exit through which the fastener exits the tool 60 as it advances into the work piece 102.

The angled bore 88 in this embodiment, and in particular the guide 80, can include first and second guide plates 81 and 82. These guide plates 81 and 82 can be constructed from stamped parts forming opposing halves of the angled bore. The stamped parts can be metal, such as steel, stainless steel or other metals, or optionally composites or polymers. The stamped metal halves cooperate to form the angled bore 88.

As shown in FIG. 23, the guide plates 81 and 82 can include opposing tabs 86 and 87 (FIG. 23) that extend radially outwardly generally from the angled bore and/or the axis 400 of the angled bore. These tabs 86 and 87 can be positioned in the frame 62 so that they engage and contact one another. To join the tabs 86 and 87, the tabs can be inserted in slots 64 defined by certain portions of the frame 62. When placed in the slots, the guide plate tabs 86 and 87 can be held in close proximity to one another to generally secure the opposing halves 81 and 82 of the guide 80 together. Of course, where other constructions are desired, the guide plates 81 and 82 can be of a unitary construction such that the tabs 86 and 87 are eliminated. For example, in the embodiments described below, the angled bore 84 can simply be defined by a unitary structure screw guide. Alternatively, the plates 81 and 82 can be joined with fasteners projecting through or otherwise fastening the tabs 86 and 87.

Optionally, a protective plate 92 can be included with the tool 60. This protective plate 92 can be placed adjacent the first opening 84 to generally protect the uppermost edges of the guide plates 81, 81 from damage when the fastener 110 or a portion of a tool 101 is inserted in the angled bore 88. For example, the protective plate 92 can define a plate bore 94, which can be generally aligned with and/or centered on the axis 400 of the bore 88. The inner edge of the protective plate 92 adjacent the plate bore 94 can extend over and at least partially or fully cover the edges 98 of the respective guide plates 81 and 82. With the inner edge of the protective plate covering the edges of the guide plates, a fastener 110 or portion of the tool 101 can be guided or generally deflected so it does not engage those edges 98. In turn, this can prevent chipping, marring, breaking or other damage to those edges 98 and more generally to the guide plates with the fastener or tool. Of course, if desired, the guide plates themselves can include integral protective plates extending therefrom, or the protective plate 92 and similar devices can be absent from the construction altogether.

The frame 62 and the other various components of the tool 60 can be constructed from stainless steel, steel, other metals, composites and/or polymers. For example, as mentioned above, the guide plates 81 and 82, as well as the optional protective plate 92 can be constructed from steel, while the like components of the frame 62, such as the handle 61, the secondary handle 64 and the spacers 74 and 79 can be constructed from a polymeric material such as a high impact resistant plastic.

Referring to FIGS. 22 and 23, the guide 80 and/or frame 62 can include a spacer 74 that extends downwardly from the bottom 69 of the frame 62. The spacer 74 includes opposing side surfaces 78A and 78B. The side surface 78A can be configured to engage and rest immediately adjacent or up against the side surface 108 of the work piece 102. The opposing side surface 78B of the spacer 74 can be configured to be positioned adjacent another work piece 119 positioned near the first work piece 102, as described below.

The spacer 74 can project downwardly or generally protrude into a space 105 that is immediately adjacent the side surface 108 of the work piece 102. This space 105 can be defined by the dimension or width of the spacer 74 between the side surface 78A and the second side surface 78B. Of course, if other types of spacers or indexing elements are desired, they can be included and extend outwardly from the bottom surface 69 of the frame 62. For example, the spacer 74 can be configured to fit in the space 105 that is immediately adjacent the side surface 108 of the work piece 102 as shown. The spacer can be of a dimension or width, for example about ⅛ to ½, 1/16 to 3/16, or about ¼ of an inch, to effectively set the preselected spacing or distance between a first work piece 102 and a third work piece 119 as shown in FIG. 22. Alternatively, the spacer can be dimensioned to precisely fit between already preinstalled work pieces or boards to further fasten those boards to underlying substructures or improve the fastening of the boards to other structures.

The side surface 78A of the spacer 74 also defines the second opening 85 of the angled bore 84 through which a fastener is adapted to exit. Further, the guide plates 81 and 82 can extend downwardly to the opening 85 and terminate at or adjacent the side surface 78A. The second opening 85 can be positioned a preselected distance away from the bottom surface of the frame 62 in certain applications. Although as shown the second opening 85 opens out the side surface 78A of the spacer 74, the angled bore alternatively can be constructed so that it opens out the bottom surface 69 of the frame 62 (not shown).

With the illustrated configuration of the guide 80 and the spacer 74, the angled bore 84 extends through these elements and generally through the space 105 immediately adjacent the side surface 108 of the work piece 102. The angled bore 88 can substantially encase or otherwise contain a fastener 110 all the way up to the side surface 108 of the work piece 102. Optionally, the opening 85 can be placed within about 1/16 to about ⅛, further optionally about 1/16 to about ¼ of an inch from the side surface of the work piece 102. Further optionally, the opening 85 can be configured so that at least a portion of it lays within a plane that is generally parallel to the plane 1013 in which the side surface 108 of the board lays.

Accordingly, when the fastener 110 is rotated, even when its end includes a chisel break point or other construction, that end is restrained and generally contained in the bore 88, so that it does not wobble excessively, even when beginning to penetrate the side surface 108 at the angle as illustrated or described in the embodiments of the fastener above. This can provide a precise alignment of the fastener 110 into the side surface of the work piece 102 and into or through other surfaces of that work piece 102 and underlying work pieces 106.

The fastener guide 80 can also be configured to include a material ejection port 83 that is in communication with the angled bore 88. As shown in FIG. 24, the guide plate 81 can define a material ejection port 83. The material ejection port 83 can be a hole that is located between the first opening 84 and the second opening 85. The precise location of the material ejection port 83 and its dimension can be selected based on the material to be augured or otherwise ejected or evacuated out from the angled bore 88. As illustrated, the material ejection port is positioned generally above the bottom surface 69 of the frame 62, and can be about ½" long. Of course, it can be of other dimensions, for example about ⅛ to about ¼ of an inch in length. Generally, it can be of a dimension that is sufficient to allow material augured by a fastener 110 to eject from the port 83.

The material ejection port 83 can be dimensioned and located so that it is defined on the underside of the angled bore 88 so that the material drops out from the bore via gravity through the port. The material ejection port 83 can be large enough to drop out fibers or other material augured from the work pieces, yet small or short enough so that a screw inserted into the angled bore 88 from the first opening 84 will not have its end drop out from, or otherwise protrude, or get hung up in the ejection port 83 while the screw moves toward the second opening 85.

The material ejection port 83 can include a lowermost rim 95 as shown in FIGS. 23 and 24. This lowermost rim can be positioned so that it is located above the top surface 1011 of the work piece 102, and/or so that it is also located above the top surface 1111 of an adjacent work piece 119. With such a positioning of the lowermost rim of the material ejection port, material augured up through the angled bore can be ejected out from the bore generally above the top surface 1011, as well as the top surface 1111 if the work piece 119 is in place adjacent the work piece 102. In turn, the ejected material can freely flow out from the port over or adjacent the lowermost rim 95. It is noted that the lowermost rim may be considered to be above the top surface 1011 of a particular work piece merely because it is above the plane in which the surface is located. For example, the lowermost rim 95 in FIG. 24 can be considered above the top surface 1011 even though it is not directly over that top surface 1011. Optionally, in certain applications, the material ejection port can be eliminated from the tool.

The material ejection port also can be housed between opposing frame flanges 75 which extend from the rearward portion of the frame 62. These flanges 75 can extend outward a sufficient distance to generally conceal the material ejection port 83. If desired, the flanges can form and include a pivot axis 73. The frame itself 62 can pivot about this pivot axis 73 in the direction of the arrow 75A after a fastener has been sufficiently advanced and installed in a work piece 102 to fasten or join it with another work piece 106. By pivoting the frame about the pivot axis 73 and in general having the frame rotate on the rearward portion of the flanges 75, undue stress and forces on the spacer 74 can be reduced or eliminated. This can add to the longevity of the spacer, particularly where it is constructed from a polymer material. Of course, the flanges 75 can be eliminated altogether if desired.

With further reference to FIG. 23, the material ejection port can include edges 89 constructed to function as wipers to wipe or pull material 104 entrapped within the threads 140 of the fastener 110 out therefrom. The edges can be configured to extend generally along or parallel to the axis 400 of the angled bore. Of course, the edges alternatively can be offset at a predetermined angle relative to that axis 400 as desired. The edges can be somewhat sharpened or otherwise disposed at a right angle relative to the rotation of the fastener 110. In this manner, any excessive material that protrudes from beyond the crests of the fastener threads can catch or otherwise engage the edges 89. In so doing, the edges can dislodge the material 104 from the threads and cause it to further drop out with the assistance of gravity from the port 83. Where the material 104 is taken from a work piece constructed from a composite or polymer or an extremely fibrous material, the wiper edges can act to wipe these materials from the fastener as it rotates the angled bore 88 to prevent or impair binding of the fastener 110.

Generally, the wiper edges can be generally linear, but of course can be tapered or curved as desired. Further, the edges can be positioned somewhere around the circumference of the fastener 110 so that as the fastener rotates at least a portion of it passes by and is capable of engaging augered material associated with the fastener against the edges. In some circumstances, where the material is known not to be of a type that would excessively bind the rotation of the fastener 110, the edges can be absent. For example, the material ejection port can extend all the way around the circumference of the angled bore 88.

The material ejection port can serve to remove or eject bored material from the angled bore to reduce some or all of the amount of material pulled back into the pre-bored hole by the fastener, which in some cases can cause damage, such as splitting or bulging of the work piece in the area surrounding the fastener. For example, the material ejection port can enable material augered up from the work piece to be ejected away from the threads and shaft of the fastener. In cases where the material ejection port is absent, or otherwise does not facilitate ejection of the material from the bore, and the head of the fastener is dimensioned so that it is almost the same dimension as the angled bore, the head might capture and drag all the pre-bored material back into the hole as the head advances toward the hole. That material would be captured in the space between the shaft and threads, and the walls of the angled bore, with the head acting like a cap or piston to pull the augered material between it and the work piece back into the pre-bored hole. With the material ejection port, the material augered or removed from the hole is ejected from the bore so that there is minimal, if any, augered or removed material for the head to pull into the hole. In turn, this can reduce the likelihood of damage to the work piece around the area of the hole caused by the material entering the hole, possibly along with the components of the fastener. Of course, in certain applications where material might not readily be pulled into the hole by the fastener, the material ejection port can be eliminated.

As shown in FIG. 24, the guide 80 optionally can include a beveled portion 83A adjacent the lower extremity of the port 83. This beveled portion can generally increase the internal area of the bore adjacent the port 83. The bore also can serve as a ramp to assist the material 104 being ejected out from the bore 88 through the port 83. The angled bore 88 can have an internal dimension D7, which can be in the form of a diameter about 0.1 to about 0.4 inches, optionally about 0.15 to about 0.75 inches, or other dimensions greater or less as desired. In general, the diameter D7 can be slightly larger than the dimension than the head D5 of the fastener 110. For example, the dimension of the diameter D5 can be about 0.001 to about 0.05 inches less than the diameter D7 of the angled bore 88. Other tolerances can be suitable as well, depending on the application. The diameters D5 and D7 can be matched so that the head of the fastener does not excessively wobble or move other than rotationally and/or along the axis 400 of the angled bore 88. This in turn can reduce, impair or otherwise prevent wobble of the fastener 110 as it is advanced into the work pieces. It also can prevent or impair the axis of rotation 200 of the fastener 110 from becoming misaligned or substantially non-parallel with the axis 400 of the angled bore 88, which also can be considered the advancement axis of the fastener 110. In certain circumstances where the axis 200 of the fastener 110 becomes significantly deviates or is at a substantial angle relative to the axis of advancement 400 of the angled bore 88, it is possible that the portions of the fastener can bind against the material surrounding the second opening. In limited circumstances, this can impair advancement and/or rotation of the fastener and/or otherwise impair the functioning of the tool and its removal from the respective work piece.

The angled bore 88 as shown in FIGS. 22 and 24 can be configured so that it is of a length that closely corresponds to the length of the fastener 110. For example, the length of the angled bore 88 can be about 1.9 to about 2 inches in length, while the length of the screw is about 1.5 to about 1.9 inches in length. Of course, other lengths of the bore and fastener could be selected and still function suitably for other applications. With this particular embodiment, where the fastener is slightly shorter than the length of the angled bore 88, the fastener 110 can be substantially encased within the angled bore 88 immediately before it is advanced into the work piece. In this manner, the features of the fastener can be restrained or otherwise contained within the bore to prevent excessive wobble. For example, the end of the fastener can be closely constrained as it begins to penetrate the side surface 108 of the work piece 102.

Optionally, the angled bore can be about 0.01 to about 1.0 inches, further optionally about 0.25 inches longer than the fastener 110. Accordingly as shown in FIG. 24, when the fastener is positioned in the angled bore 88 before it is advanced into the work piece, as shown in broken lines in FIG. 24, the head of the fastener 110 can be a preselected distance 72 inward from the portion of the frame 71 surrounding the angled bore 88 and in particular the opening 84. Optionally, the angled bore 88 itself, in particular the guide plates 81 and 82 can include a slight frustoconical taper at or adjacent the first opening 84 extending outwardly to the surrounding portion 71 of the frame 62. With the head of the fastener 110 slightly disposed inwardly slightly from the surrounding surface, a user can quickly center a drive, such as a Philips or star drive feature associated with a drill, in the head of the fastener. The region of the angled bore 88 above the head of the fastener 110 can act to capture and guide the drive feature into the head more easily. Alternatively, if desired, the fastener 110 and angled bore 88 can be more grossly mismatched in length. For example, the fastener 110 can be longer than the angled bore 88 so that it protrudes outward beyond the surrounding portion 71 of the frame 62 a preselected distance in certain applications.

With reference to FIGS. 22-23, the tool 60 can also include a clamp assembly 77. This clamp assembly can include the first spacer 74 and a second spacer 79 spaced distal from the first spacer. The distance between the first and second spacers can be about the width or slightly larger than the width of the work piece into which the tool is designed to install fasteners. Further, this distance can be varied by operating the clamping assembly 77. For example, the second spacer 79 can be spaced about 5"-6" from the first spacer 74 and can be actuated to move closer to the first spacer 74 to close the distance between those elements to the precise dimension or width of the work piece 111 into which the fastener is to be driven. This can provide a clamping action to clamp the side surfaces 108 and 115 of the work piece 102 between these features of the tool. In turn, this can temporarily rigidly hold the guide 80 and/or spacer 74 in a fixed orientation relative to the board 102 and more particularly hold the axis 400 of the bore 88 in a desired alignment with the side surface 108 of the work piece 102. In turn, the fastener can be rotated and advanced precisely into a desired location through the side surface 108 and into and through the first work piece and/or second work piece. More generally, the clamp assembly 77 can hold the tool 60 in a desired orientation and aim the fastener 110 precisely into and/or through the work pieces.

Optionally, the clamp assembly 77, or more generally the tool when no clamp assembly is included, positions the first spacer side surface 87A immediately adjacent the side surface 108 of the work piece. The second opening 85 can also be placed immediately adjacent the side surface 108 of the work piece. In such a configuration, there may be little or no gap or void between the side surface and these elements. Accordingly, when a screw, for example, an embodiments of the fasteners described herein, is rotated in the angled bore, it is rotationally constrained right up to the side surface into which it is to advance. Where the end of the screw is configured to pre-bore a hole, this rotational constraint can offset the tendency of the screw end to wander or wobble when it is rotated against the work piece, and in turn assist in starting the screw in the work piece.

The clamp assembly further includes an arm 68, a secondary handle 64 and a biasing element 66, as shown in FIGS. 22 and 23. These elements can all be joined with a common element 63. The common element 63 can be rotatably mounted on a pivot axle 65. The arm 68 can extend downwardly through a portion of the frame 62 and be connected with the spacer 79. The secondary handle 64 can extend at another location outward from the common element 63 and can be disposed generally adjacent the handle 61. The secondary handle 64 can be moveable relative to the handle 61 and generally relative to the frame 62. The secondary handle 64 can be considered movably joined with a frame 62 and adapted to actuate the clamp assembly and move the second spacer 79 to effectuate a clamping action on the work piece 102.

Optionally, the secondary handle 64 can be spaced a preselected distance from the handle 61 so that a user can manually grasp simultaneously both the handle and the secondary handle and squeeze those elements so that they move closer to one another. In so doing, the secondary handle 64 rotates the common element 63 about the pivot axis, which in turn rotates the arm 68 and correspondingly the second spacer 79 toward the first spacer 74 to provide a clamping action on the work piece 102.

The secondary handle 64, as well as the arm 68 and spacer 79 can be biased toward the configuration shown in broken lines in FIG. 22 by the biasing element 66. This biasing element can be in the form of a biasing arm 66 that, when installed in the frame, can engage the interior surface 67 of the frame 62 and accordingly urge the common element 63 in the direction of the arrow 63A shown in FIG. 22. In turn, this can urge the secondary handle 64 and the arm 68 to the configuration shown in broken lines in FIG. 22 as well.

To overcome this biasing action, a user can manually grasp a secondary handle 64 and pull it toward the handle 61, which will cause a clamping action on the side surfaces 108 and 115 of the work piece 102, thereby holding the angled bore 88 and generally the axis 400 of the bore in a desired orientation relative to the side surface 108 of the work piece 102.

Other biasing elements can be used to provide the clamping action of the tool 60 on the work piece 102. For example, instead of the biasing element 66 being preformed and engaged against the interior of the frame, a coil spring or leaf spring could be positioned adjacent the common element 63 to urge the arm 68 and second spacer 79 in a desired direction about the pivot 65. Optionally, the pivot could have a coil spring built between it and the common element to provide a biasing force. Further optionally, the biasing element 66 could urge the arm and the spacer in a direction about the pivot axis 65 in the direction opposite that shown by the arrow 63A in FIG. 22. In such a construction, the user would then move the secondary handle 64 away from the handle 61 to open up the distance between the first spacer 74 and the second spacer 79. With such an alternative configuration, upon installing the respective spacer on the opposing side surfaces of the work piece 102, the user could release the handle so that the biasing element urges the respective spacers to move relative to one another and provide a clamping action on the work piece 102.

With reference to FIG. 23, the second spacer 79 can define a recess or hole 76 therein. This recess can extend all the way through, or only partially through, the second spacer 79. This recess 76 can be configured to straddle or otherwise extend around a hole in which another fastener 110 is positioned. This can be helpful in cases where the area surrounding the hole 103 is slightly raised due to the boring of the hole 103 by the fastener, or where the fastener is not of the type that pre-bores a hole, or where the fastener excessively bulges out material in the area surrounding the fastener 110. The recess 76 generally surrounds the area so that the bulge in the material does not affect the dimension of the space 117 between the adjacent side surfaces of the respective work pieces 102 and 118. Accordingly, the spacer 79, even when overlapping bulged out material surrounding previously installed fasteners can be consistently spaced to provide a clean, even appearance in the spacing between the adjacent work pieces. Although shown in a generally U-shape, the recess or hole 76 can be of square, rectangular, triangular, or some other geometric shape sufficient to surround a fastener hole or fastener head on an adjacent work piece. Further, the recess 76 can extend farther up the arm 68 depending on the application.

Referring to FIGS. 22-24, a method for installing a fastener with the tool 60 to join work pieces will be briefly described. To begin, a first work piece 102 is provided where the first work piece includes a top surface 111 and opposing bottom surface 109, a first side surface 108 and an opposing side surface 115. The bottom surface 109 of the work piece is placed adjacent the upper surface 107 of the second work piece 106. As illustrated, the second work piece 106 can be, for example, a underlying joist or subfloor. The first work piece 102 can be a deck board or other board constructed from any suitable board material as described above.

If a previous work piece 118 is already fastened to the underlying work piece 106, the spacer tool 60 can be placed atop the work piece 102 with the bottom surface 69 resting adjacent that the upper surface 1011 of that work piece 102. The spacer 79 can establish a preselected spacing that is the equivalent of the dimension or width of the second spacer 79 between the work piece 118 and work piece 102 and in particular the side surfaces of those work pieces that are adjacent one another.

The tool can be positioned so that the first spacer 74, and in particular the first side surface 78A of the first spacer 74 is positioned adjacent the side surface 108 of the work piece 102. In so doing, the second opening 85 also is positioned adjacent that side surface 108, with the angled bore 88 and related advancement axis 400 aligned at a predetermined non-orthogonal angle relative to the side surface 108 and the plane in which the side surface 108 lays. The second opening 85 is located so that it is immediately adjacent the first side surface 108 of the work piece 102. To further secure and hold the angled bore 88 and opening 85 in these respective locations, a user can manually grasp the secondary handle 64. In so doing, the handle actuates the common element 63 rotating it about the pivot axis 65. This rotates the arm 68 and accordingly moves the second spacer 79 toward the first spacer 74. In turn, this can provide a clamping action to clamp the first work piece 102 between the first spacer 74 and the second spacer 79. As an example, the first spacer 74 can engage the first side surface 108, and the second spacer 79 can engage the other side surface 115.

A fastener 110 can be installed in the angled bore 88. Assuming the fastener is an equal or lesser length than the angled bore, the fastener can bottom out and engage the side surface 108 of the work piece 102. A small distance 72 as shown in FIG. 24 will be left above the head of the screw. A user can then advance a driving tool 101 toward the frame. Due to the recessed configuration of the fastener head in the angled bore 88, the tool can center within the angled bore 88 and come to rest in the drive feature of the fastener 110.

While holding the tool 60 in a clamped configuration, with the axis 400 along a desired line of advancement into the work piece 102, a user can actuate the drive tool 101 to rotate the fastener 110 as described with the fastener embodiments described above, or some other fastener as desired. The fastener 40 can be advanced along the axis 400 within the angle bore 88 so the fastener enters the first side surface 108 of the work piece 102 immediately after exiting the second opening 85 of the angled bore. The fastener then travels partially out the bottom surface 109 of the work piece 102. Thereafter the fastener continues to rotate and penetrates the upper surface 107 of the second work piece 106 and continues to advance until the head of the fastener is at a desired location, which can be within a pre-bored hole created by the fastener, or generally so that the head of the fastener is at least partially concealed from view from above and generally does not obstruct the positioning of another work piece adjacent the first work piece 102.

Where the fastener of the embodiments described above is used, as the fastener is advanced into the work piece 102, it pre-bores a hole, and the material 104 from that hole is augured or otherwise fed up the threads. The material is ejected or evacuated generally from the angled bore 88 through the material ejection port 83. This action is shown in FIGS. 23 and 24. Where the material ejection port 83 includes an edge 85 adjacent the material ejection port 83, that edge can scrape augured material off from the threads or the remainder of the fastener 110, and assist in evacuating that scraped material from the angled bore 88.

After the first work piece 102 is installed and joined with the second work piece 106 with the fastener 110, a third work piece 119 (FIG. 22) can be installed adjacent the first work piece 102, atop the second work piece 106. The tool can be moved to a position atop the third work piece 119 in a manner such as that used in connection with the first work piece 102. The first 74 or second 79 spacer, depending on the orientation of the tool 60, can establish the desired spacing between the first work piece 102 and the third work piece 119. A new fastener can be inserted in the angled bore as with the previous fastener described above. That new fastener can be advanced along the advancement axis 400 in a manner described above to install the new fastener in the third work piece 119 and second work piece 106 to join those work pieces together. The above process can be repeated at worksite to install multiple work pieces and join them with other work pieces.

The tool above and any of the other alternative embodiments of the tool herein, can be used to install multiple deck boards on underlying substructure subfloor or joists. The work pieces can be boards, which as used herein can include deck boards, porch boards or other boards constructed from wood, particle board, composites, polymers, plastics, metal or other materials as desired. In installing the fasteners and work pieces to join them together, the tool can provide a way to quickly and precisely align the fasteners with the respective side surfaces of the work pieces or boards and install them in a manner such that they are generally concealed from view when viewed from a viewer directly above. Further, the angled bore of the tool, and in particular the guide surrounding the angled bore extending upwardly above the upper surface of an adjacent work piece, can effectively prevent the threads of an advancing fastener from gouging, damaging or marring an immediately adjacent work piece as that advancing fastener is advanced into an adjacent work piece.

V. First Alternative Tool and Method Embodiment

Figure 25:
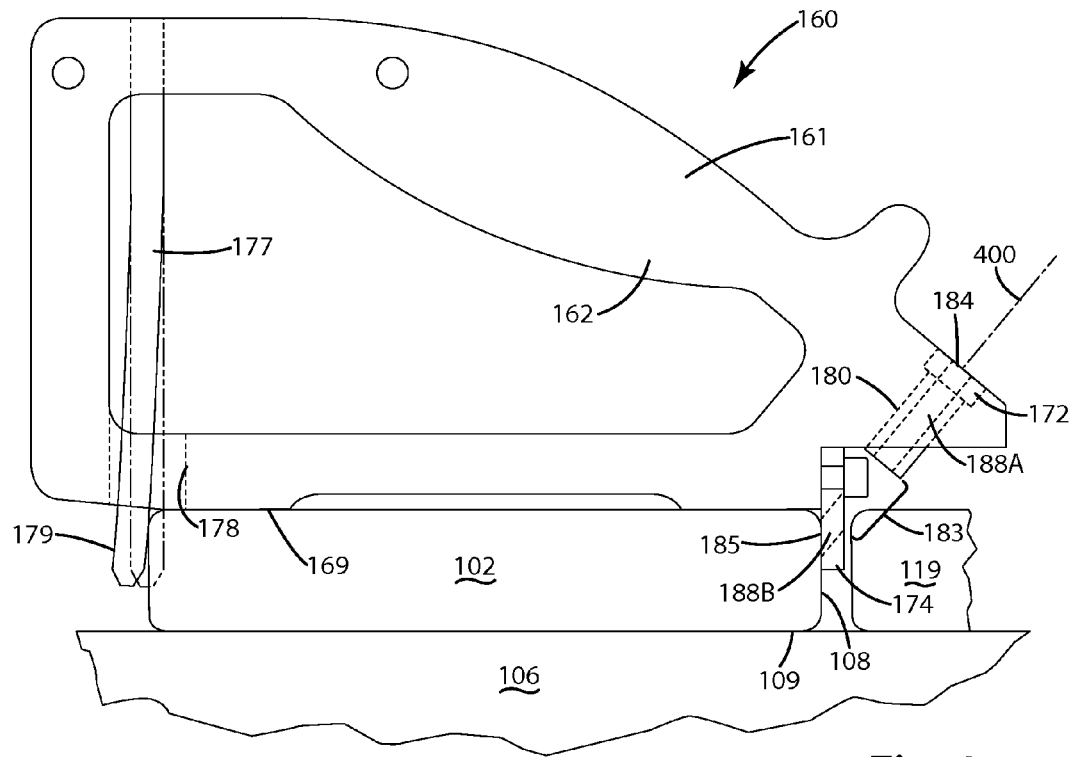
FIG. 25 is a side view of a first alternative embodiment of a fastener installation tool.
Figure 26:
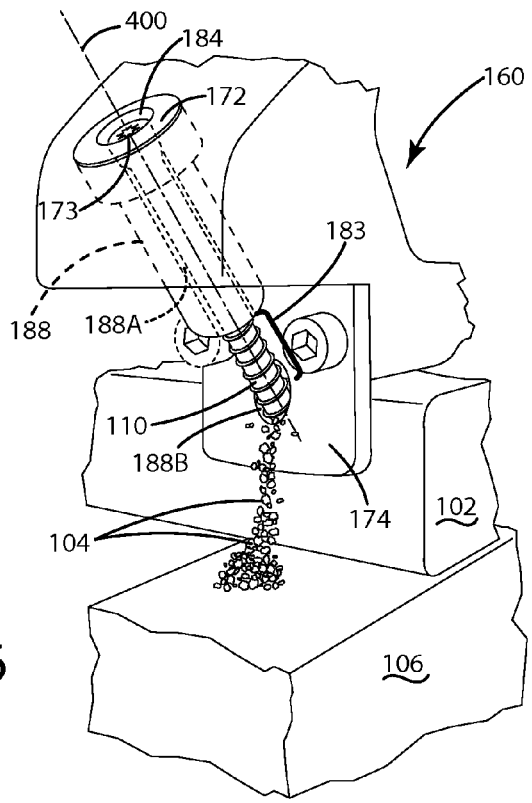
FIG. 26 is a close up view of the first alternative embodiment of the fastener installation tool in use installing a fastener.

A first alternative embodiment of the installation tool is shown in FIGS. 25 and 26 and generally designated 160. This embodiment of the tool is similar to the first tool embodiment described above with several exceptions. For example, the tool 160 generally includes a handle 161, a fastener guide 180, also referred to as a pilot element, and a spacer plate 174. The screw guide 80 can be installed in a frame 162 constructed from a polymeric or other material, which can generally be of a solid or hollow construction like that described in the embodiment above. The guide 180 can include an angled bore which includes first and second angled bore portions 188A and 188B. The first portion 188A can be defined by the primary guide element 172 and the second portion 1888 can be defined by the spacer plate 174, which also can be referred to as a spacer. The primary guide element 172 can be configured at an angle relative to the spacer 174, however, the angled bore portions 188A and 188B can be aligned with and parallel to one another along the axis 400 of the angled bore. As with the embodiment above, this axis 400 can be configured and oriented at a fixed predetermined angle relative the side of the work piece 102 into which it advances a fastener 110. As with the above embodiment, a fastener 110 can be disposed within and generally circumferentiated by the primary 188A and secondary 188B portions of the angled bore 188. The primary and secondary portions can be dimensioned to be the same, and slightly larger than the outermost dimensions of the head and/or threads of the screw 110, so that as with the embodiment above, the screw can be constrained yet still rotate and advance along the axis 400 when driven and rotated by a powered or manual tool.

The primary and secondary portions 188A and 188B of the angled bore can be separated from one another by a gap 183 formed therebetween. This gap can also be referred to as a material ejection port and can operate similar to the material ejection port described in the embodiments herein. For example, material 104 that is scraped or pre-bored from a work piece 102 and augered up the angled bore can be ejected or extracted out the port 183 to prevent or impair binding of the fastener as it advances or rotates.

Although the material ejection port 183 is shown as being formed by separate elements, for example being formed between the spacer 174 and the primary guide portion 172, the gap can be replaced with an alternative structure. For example, the guide 180 and in particular the angled bore can extend all the way to the location adjacent the surface of the side surface 108 of the work piece 102. In this alternative construction, the guide 180 can include a transversely drilled hole or a milled gap at least partially therethrough to allow the removed material 104 to escape from the angled bore 188 as shown in FIG. 26. Optionally, the end of the guide 180 adjacent the work piece 102 can be at an angle that corresponds to the surface of the work piece. Alternatively, the end of the guide element can terminate at a plane that is orthogonal to the axis 400.

As shown in FIGS. 25 and 26, the spacer 174 can be in the form of a plate that is rigidly attached to the frame 162 with screws or other fasteners so that it does not move laterally or vertically relative to the remainder of the guide element 180 and/or the work piece as the fastener 110 is advanced through the tool 160. Accordingly, the features of the tool steadily aims the fastener toward a desired location on the side of the work piece 102, and constrains it, regardless of wobbling forces that are generated by the fastener engaging the work piece 102, as with the embodiments herein.

As illustrated in FIG. 25, the tool 160 also can include a second spacer 179. This spacer 179 can be mounted to an arm 177 that is further joined with a frame 162. The spacer can establish a gap between adjacent work pieces, much like that of the spacer in the first tool embodiment described above. The arm 177 and spacer 179 can project through a slot 178 that is defined in a portion of a frame 162. The spacer 179 can extend beyond the bottom surface 169 of the tool into a corresponding space between adjacent work pieces. The spacer 179 optionally can be adjustable, moving within the slot 178 to accommodate work pieces of different widths. For example, the spacer 179 can move toward or away from the first spacer 174 on the opposite end of the tool 160. With this construction, the spacer 179 can set a gap between the first work piece 102 being fastened down by the tool and a second work piece immediately adjacent that work piece. Optionally, the arm can be tensioned or under force so that it is urged against the opposing side surface of the work piece 102. In such a manner, it can act like a clamp to generally clamp the work piece between the first spacer 174 and the second spacer 179. The clamping action, however, can be somewhat less than that of the other tool embodiments described herein.

VI. Second Alternative Tool and Method Embodiment

A second alternative embodiment of the fastener installation tool and related method is illustrated in FIGS. 27-30 and generally designated 460. The installation tool shown there is similar in construction and operation to the embodiments described above with several exceptions.

Figure 27:
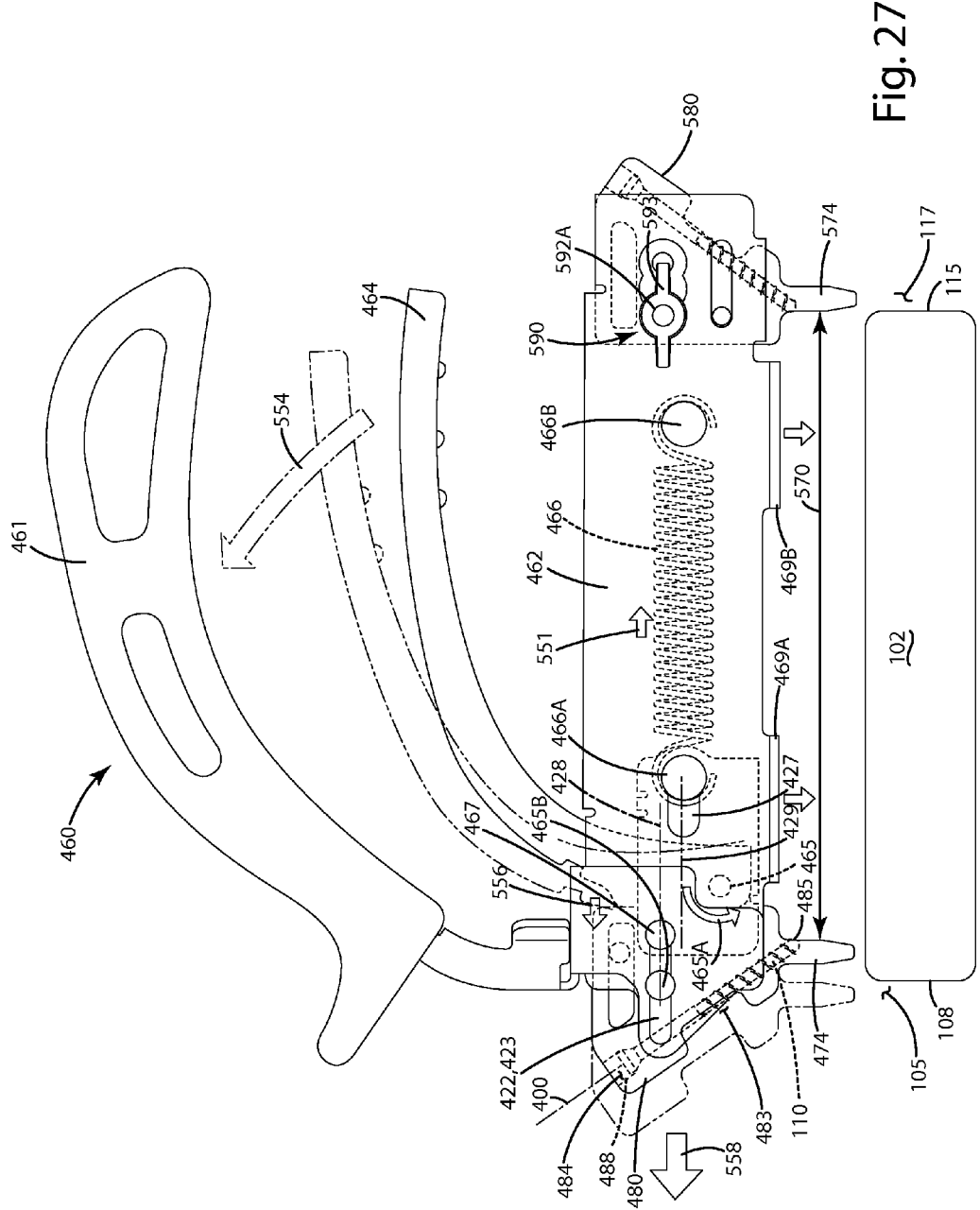
FIG. 27 is a side view of the second alternative embodiment of the fastener installation tool before being placed adjacent a work piece.

As shown in FIG. 27, the fastener installation tool 460 includes a handle 461 joined with a frame 462. The frame is joined with a first fastener guide 480 and a second fastener guide 580. A secondary handle 464 is operably joined to the frame 462 and a biasing element 466, as well as the first fastener guide 480. The secondary handle and biasing element 466 are adapted to move the first fastener guide 480 as described below.

Figure 31:
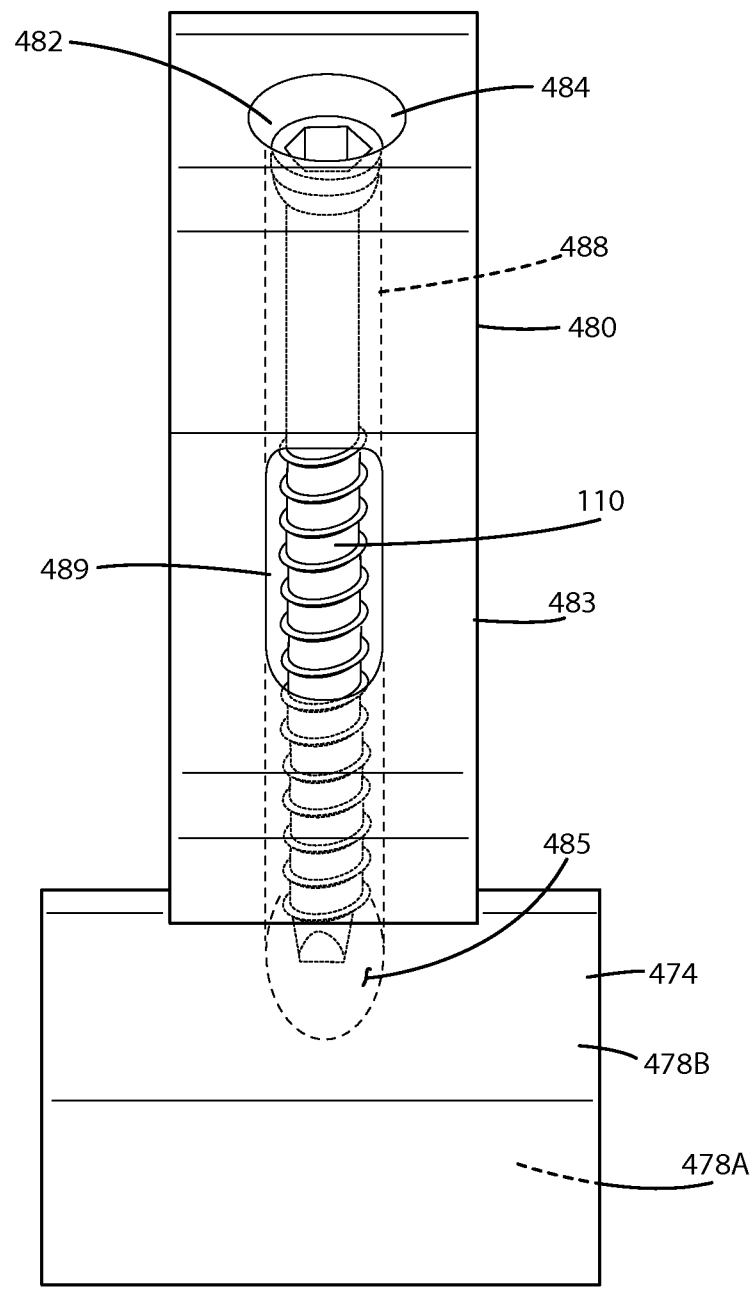
FIG. 31 is an enlarged end view of the fastener guide of the second alternative embodiment of the fastener installation tool.

Turning to FIGS. 27 and 31, the guides 480 and 580 are generally identical except reversed at opposite ends of the frame 462. Because the first and second guides are identical but simply reversed at opposite ends of the frame, only the first guide will be described here. The guide 480 is a monolithic structure that defines an angled bore 488 and further includes a or otherwise is joined with a spacer 474 that extends downwardly from the lower portion of the guide. The guide 480 can include a material ejection port 483 that is located between the first 484 and second 485 openings of the angled bore 488. The material ejection port can also include a lowermost rim 495 as described in the embodiments herein. Further, like the embodiments above, the angled bore can be aligned along an axis 400 along which the fastener 110 can be advanced in a manner similar to the above embodiments. The guide 480 can include a beveled region 482 (FIG. 31) adjacent the first opening 484 to guide the fastener 110 into the angled bore 488. Likewise, the angled bore 488 can be of a length that is less than the length of the fastener 110 as described above so that before being installed into a work piece, the top of the head is slightly recessed inward from the outer portion of the guide element to facilitate guiding of a drive feature of a tool into the head of the fastener 110.

Figure 30:
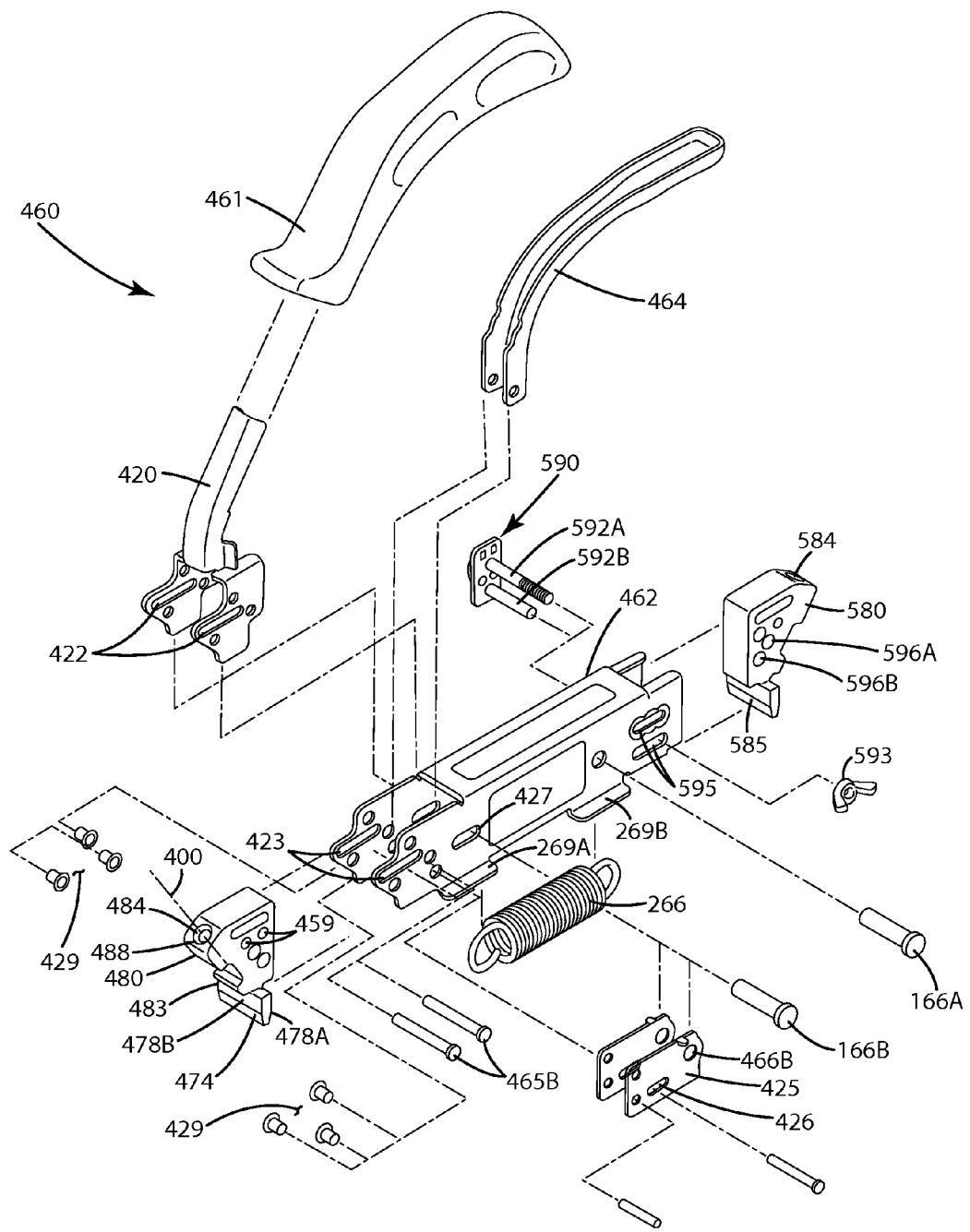
FIG. 30 is an exploded view of the second alternative embodiment of the fastener installation tool.
Figure 33:
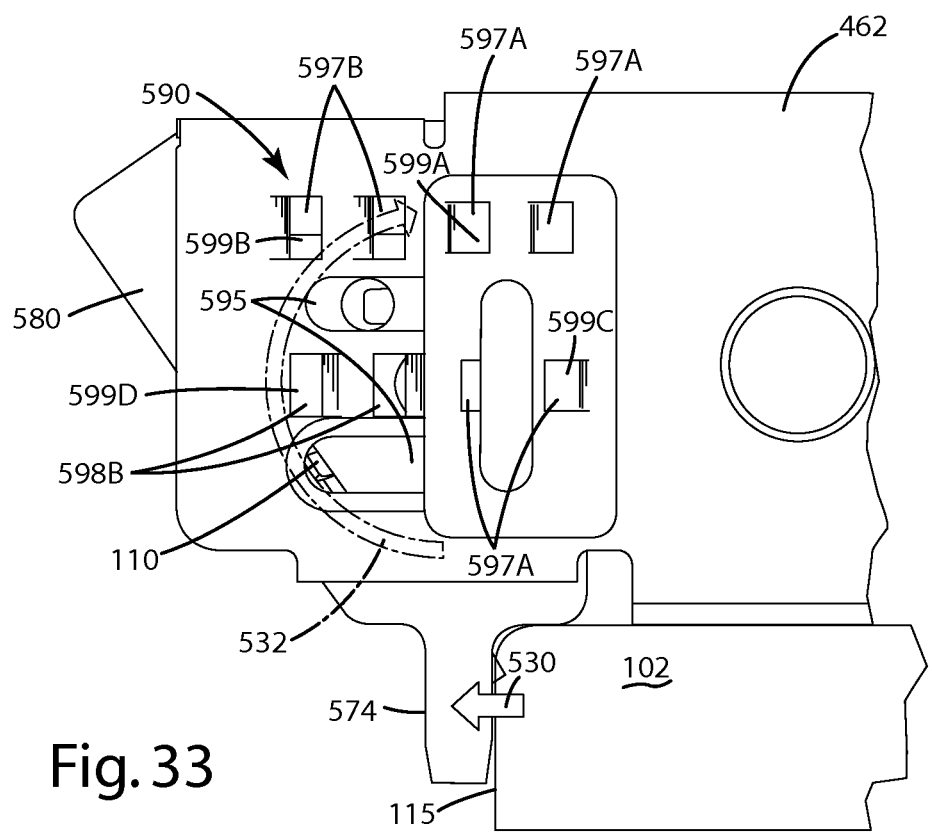
FIG. 33 is another side view of an adjustment element of the second alternative embodiment of the fastener installation tool.

The guide 480 also can include or be joined with a spacer 474 that can be monolithic with a remainder of the guide. The angled bore 488 can extend downwardly through the spacer 474 so that the spacer 474 defines at least a portion of the angled bore 488. The angled bore 488 can terminate at the second opening 485 which can be defined by the side surface 478A of the spacer 474. As with the above embodiments, when the tool is used to install a fastener, this opening and thus the fastener can be positioned immediately adjacent the side surface 108 of the respective work piece 102. Optionally, as shown in FIGS. 30 and 33, and described further below, the monolithic structure of either of the guides 480 and 580 including the spacer, bore, and material ejection port, can be removed and separated from the frame 462 as a unit for replacement or service.

The guide 480 can define additional apertures 489 (FIG. 30) through which pins 465B can fit to prevent excessive rotational movement of the guide 480 relative to the frame. These pins 465 can also be slidably disposed in a slots 422, 423 so that the pins can generally guide the guide 480 linearly in the direction of arrow 558.

Figure 28:
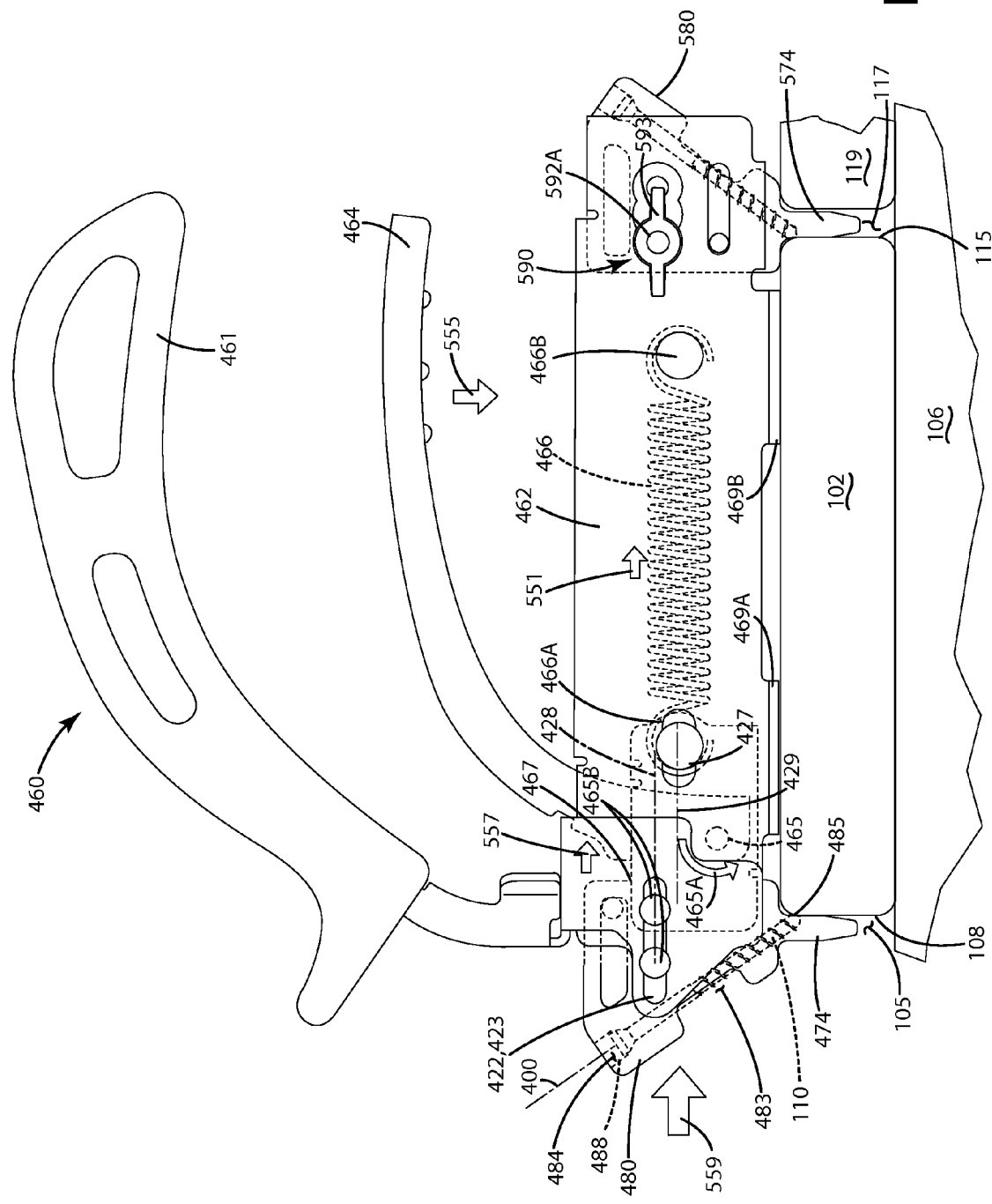
FIG. 28 is a side view of the second alternative embodiment of the fastener installation tool installed on a work piece.

The guide 480 can operatively be engaged against a portion of the secondary handle 464 at the handle portion 467. The handle 464 can be rotatable about the pivot axis 465. The movement of the handle 464, however can be constrained by the connection bracket 425, which can engage the secondary handle 464, and under the force of the biasing element 466, urge the handle in the direction 555 as shown in FIG. 28. The connection bracket 425 can be joined via a pin 466A with the biasing element 466.

The biasing element 466 can be in the form of a coil spring which is joined to the frame 462 in a relatively fixed location via a pin 466B at one end and is moveable with the pin 466A in the slot 427 at the opposite end thereof. Although shown as a coil spring, the biasing element 466 can be replaced with a variety of different biasing elements, for example leaf springs, elastomeric materials, pneumatic cylinders, hydraulic cylinders, solenoids, or other elements that can move the first guide 480 and/or second guide 580 relative to one another and/or the frame 462 to clamp or otherwise engage opposing surfaces of a work piece into which a fastener is to be installed within the tool 60.

Returning to FIGS. 27 and 30, the handle 461 can be joined with the frame 462 via a handle frame 420. This handle frame 420 can include an arm that extends upwardly into the handle 461. The handle frame 420 can also include slots 422 which can align with the slots 423 in the frame through which the pins 465B can project. The handle frame 422 can be fastened to the frame via fasteners such as rivets as illustrated. Of course other fasteners can be used, or the handle and handle frame can be monolithically formed with the remainder of the frame.

The frame 462 can include feet or tabs 269A and 269B which extend outward from the lateral sides of the frame a distance sufficient so that the width of the frame to the outer most portion of the feet on opposing sides is about 1.5 inches, which corresponds to the width of a common board used as a joist or underlying substructure. Of course, the feet can extend outward from the sides of the frame other distances, or may be alternatively folded inward depending on the particular application. Indeed, even if desired, the feet may be separate elements such as plates that are joined to the bottom of the frame and can extend outward a preselected distance from the frame depending on the desired application.

Figure 29:
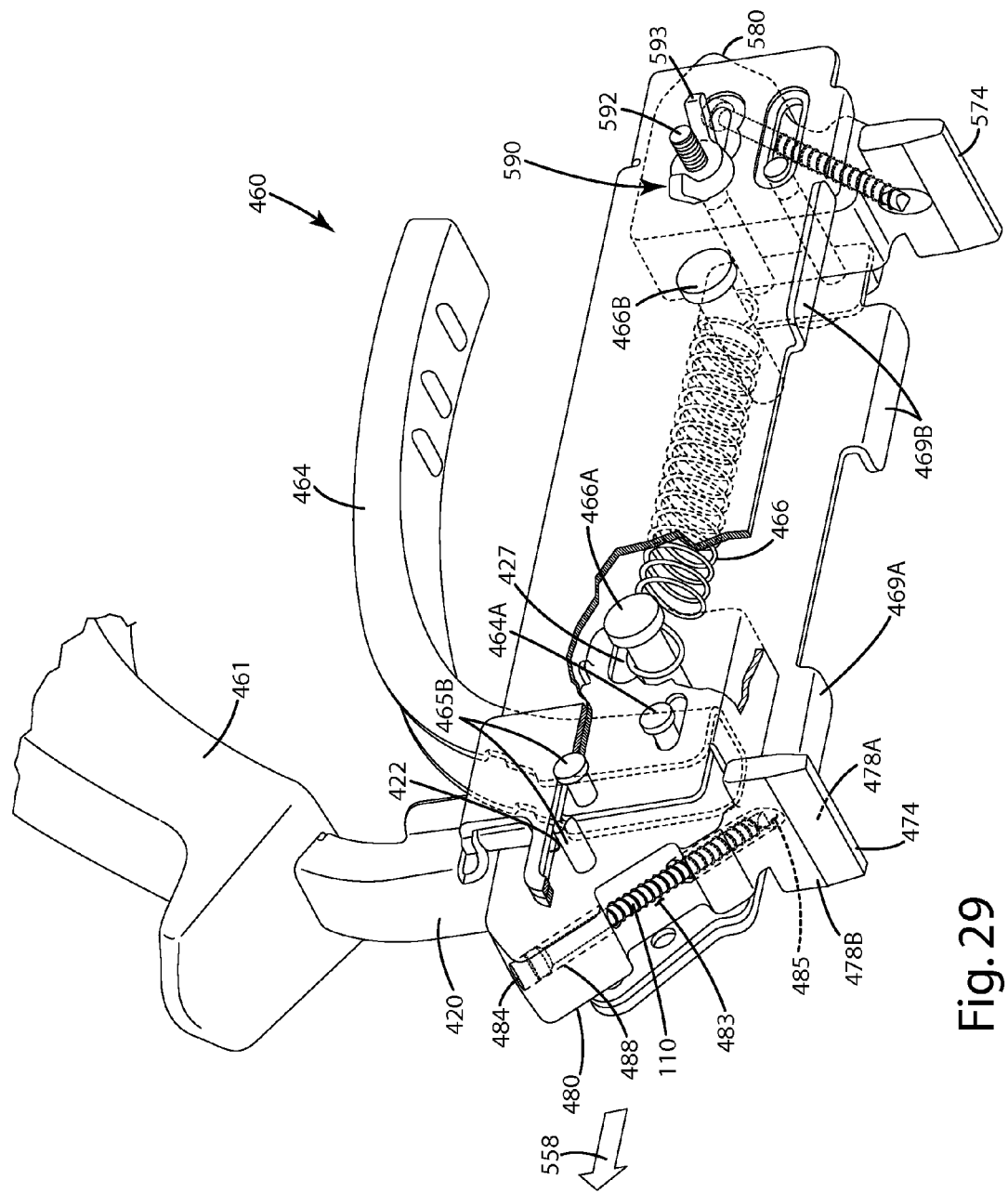
FIG. 29 is a bottom perspective view of the second alternative embodiment of the fastener installation tool.

As shown in FIGS. 27 and 29, the pins 465B are located through apertures 489 in the screw guide 480. Pins 465 are also linearly guided via their registration within the slots 422, 423 defined by the handle frame and frame. In operation, the forward portion 467 of the secondary handle 464 can engage the pins 465B or the guide 480 itself and push the pins forward in the slot 422, 423. Accordingly, the guide 480, joined with the pins 465B moves forward in direction 558. This movement of the guide 480 is generally along the linear axis 428. Optionally, to impair rotation of the guide 480 as it moves along in the direction 558, the guide can also be guided directly or indirectly along the second axis 429, by the pin 466A sliding in the slot 427, with the connection bracket 425 rigidly joined with the guide 480 so that the guide 480 does not rotate relative to the frame while moving in the direction 558. A variety of different slots and guide configurations can be substituted for those shown to ensure the guide 480 moves linearly in direction 558 rather than rotates. Of course, if a pivoting action or rotation of the guide 480 is desired for a certain application, those guides and slots could be modified to include curvilinear portions or otherwise facilitate rotation of the guide as desired.

Operation of the installation tool 460 on a work piece 102 will now be described with reference to FIGS. 27 and 28. As shown in FIG. 27, the installation tool is initially in a retracted mode shown in solid, but reconfigured to an extended mode shown in phantom, to fit the work piece 102. In the retracted mode, the biasing element 466 has urged the guide element 480 inward toward the other guide element 580 so that the dimension between the spacer 474 and spacer 574 are dimension 570. To increase that dimension so the spacers 474 and 575 can fit on opposing sides 108 and 115 of the work piece 102, a user manually grasps the secondary handle 464 and draws it in the direction 554. The user can do this simply by squeezing the secondary handle 464 and handle 461 together.

The movement of the secondary handle 464 rotates it about the pivot 465 in the direction of the arrow 465a as shown in FIG. 27. In turn, this engages a portion 467 of the secondary handle 464 against the pins 465B which causes the pins to slide in the slots 422, 423. This moves the guide 480, which is joined with the pins 465B in the direction 558 outward from the frame 462. This also moves the first spacer 474 away from the second spacer 479. When the dimension 570 is increased so that the spacers 474 and 574 can be positioned and slide downward along the sides 108 and 115 of the work piece, the user may do so. In so doing, the lower surface, and in particular the feet 469A and 469B are engaged against the upper surface of the work piece 102. After the feet are engaged against the upper surface and the spacers 474 and 574 have been disposed in the spaces 105 and 117 immediately adjacent the respective sides 108 and 115, the user can release the secondary handle 464.

As shown in FIG. 28 this release is shown generally as movement of the handle 464 in direction 555. When this occurs, the biasing element 466 exerts a force 551 on the pins 466A. This pulls the connection bracket 425 so that the pin 466A slides in the slot 427, thereby allowing the connection bracket 425 to pull the guide 480 in the direction 559. This provides a clamping effect between the spacers 474 and 574, which in turn causes the tool to clampingly engage the work piece 102. With the work piece clamped between the spacers, the angled bores 488 and 588 of the guides 480 and 580 are aligned along the respective advancement axes, and the side surfaces of the respective spacers are positioned against the respective sides of the work piece. Accordingly, the fasteners can be rotated and advanced in the respective angled bores of the respective guides and installed in a manner similar to that described in the embodiments herein. After the fasteners are sufficiently installed, the secondary handle 464 can again be engaged to move the spacer 474 away from the spacer 574 to release the clamp on the work piece. The tool 460 can then be removed from the work piece. After the tool is removed, another work piece can be installed adjacent the work piece 102 and the process can be repeated with the tool to install additional features.

The above clamping mechanism of the tool 460 utilizing the guide 480, the secondary handle 464 and related mechanisms, can provide fine adjustment of the tool to accommodate boards generally of the same nominal dimensions but which may have variations due to quality of inconsistency of those boards. For example, the adjustment with the handle 464 can generally adjust the guide 480 and spacers so that the tool accommodates certain boards, for example 5¾" wide boards that may have variation of an ⅛" to ¼". In applications where a user may want to switch to a different job and install a larger board, for example a 6" composite board, the tool optionally can include a more coarse adjustment mechanism 590, which allows the tool to be used with different width or dimensioned boards.

Figure 32:
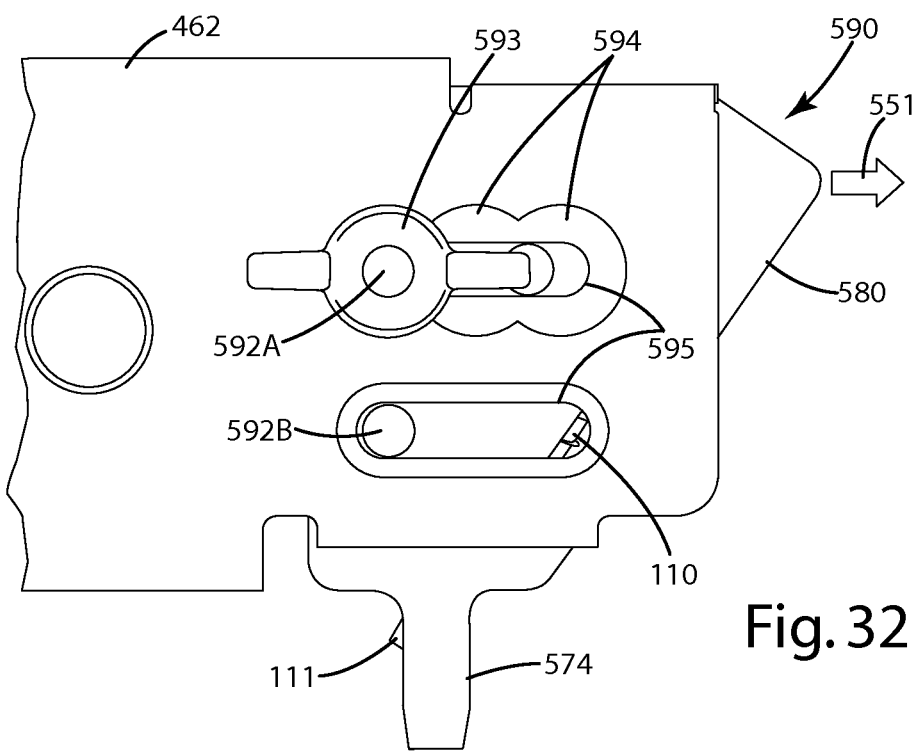
FIG. 32 is a first side view of an adjustment element of the second alternative embodiment of the fastener installation tool.

Referring to FIGS. 29-33, one suitable coarse adjustment mechanism 590 can include a stopper assembly including first and second stopper pins 592A and 592B. The stopper pins can extend through the respective slots 595 defined by the frame 462. One or both of the pins can be threaded. As shown in FIG. 32, the upper stopper pin 592A is threaded and can receive a wing nut 593 to secure the stopper assembly to the frame in a fixed position. The frame itself may define recesses 594 which can accommodate the dimensions of the wing nut 593 or whatever other fastener may be used.

The stopper assembly 590 can be prone to rotation due to forces exerted by a work piece on the tool during installation or a clamping action executed by the tool. For example, as shown in FIG. 33, the work piece 102 can exert a force 530 on the spacer 574 which can urge the spacer to rotate in the direction of the arrow 532 when the tool clamps the work piece 102. If the guide 580 is allowed to rotate significantly, it can misalign the spacer 574 with the side surface 115 of the work piece 102, which in turn can misalign the fastener 110 with the side surface 115 of the work piece. Accordingly, as the fastener 110 is advanced, it can damage the work piece 102 or otherwise bind in the angled bore of the screw guide 580. To counter this possible rotation in the direction of the arrow 532, or other rotation, the stopper assembly can include tabbed detents 597A that interfit within corresponding detents 597B. The angle of the upper detents 597A can be such that the free tabs engage the inner surfaces of the apertures 597B and prevent the stopper from rotating. Likewise, the lower tabs 598A can be angled inward and can be adapted so that the ends 599C of the tabs engage the flat surfaces of the apertures 599D to prevent rotation of the stopper assembly and subsequently to prevent rotation of the guide 580. There are a variety of other constructions that can prevent such rotation. Such constructions may be readily exchanged with the adjustment element 590 described herein.

As further illustrated with reference to FIGS. 30 and 32, the coarse adjustment mechanism 590 can be removed to remove and/or replace the guide 580. For example, a worn out guide 508 can be replaced with a new guide. Alternatively, a guide having a spacer with a first dimension, for example 3/16", can be replaced with a guide having a spacer of another dimension, for example 1/16" to provide different spacing between adjacent boards. In some cases, the smaller spacers, for example those of 1/4", 3/16" or smaller can work well to limit the size of the gap established by the tool between adjacent boards, as described in more detail below. In turn, with the small gap between the boards, even where the boards are shrinkable boards and after such boards shrink, the resulting gap is still suitable.

Referring further to FIGS. 30 and 32, to effect the removal of the guide 580 and replace or interchange it with another guide, the nut 593 can be threaded off or generally removed from the stopper pin 592A. With the nut removed, the first and second stopper pins 592A and 592B can be removed from the respective slots 595 and stopper pin holes 596A and 596B, generally pulled out in the direction as shown in FIG. 30. From there, the guide 580 can also be removed from the frame of the tool 460 as shown. The guide can be serviced or replaced with another guide as desired. The guide 580 or some other replacement guide can be inserted in the frame 462 as shown, and the stopper pins can be reinserted into the respective stopper pin holes and slots. The nut or other fastening element can be reattached to the stopper mechanism to secure the guide 580 to the frame.

Although sometimes referred to as boards, the work pieces with which the fasteners and tools herein can be utilized can vary, for example, the work pieces can be composite materials, natural wood, polymeric sheets, particle board or other suitable building materials.

VII. Third Alternative Tool and Method Embodiment

Figure 34A:
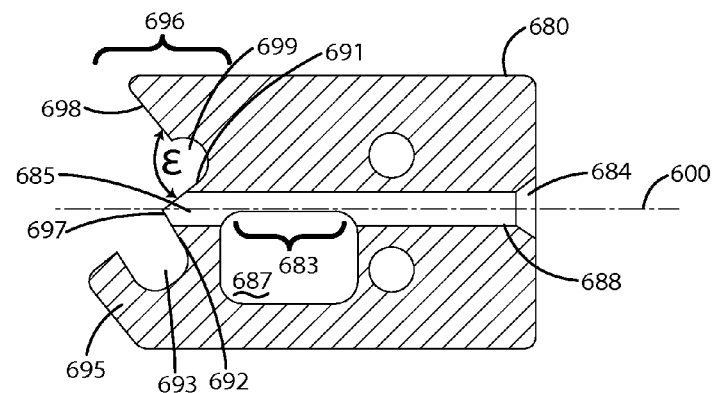
FIG. 34A is a side sectional view of a guide of the third alternative embodiment of the fastener installation tool.

A third alternative embodiment of the fastener installation tool is illustrated in FIGS. 34-41 and generally designated 660. The installation tool shown there is similar in construction and operation to the embodiments described herein with several exceptions. For example, as shown in FIGS. 34 and 34A, the fastener installation tool 660 includes a handle 661 that is joined with a frame 662. The frame 662 is further joined with fastener guides 680. These components can be joined via fasteners or welds, or the components can be of a monolithic, integral, single piece unit. The handle 661 can be of any of the constructions of the embodiments herein, or can be of a generally flattened and ergonomically acceptable shape. Further, although shown as including two fastener guides 680, the frame 462 can include multiple fastener guides or can include a single guide, depending on the application and the space within which the tool is used.

Figure 35:
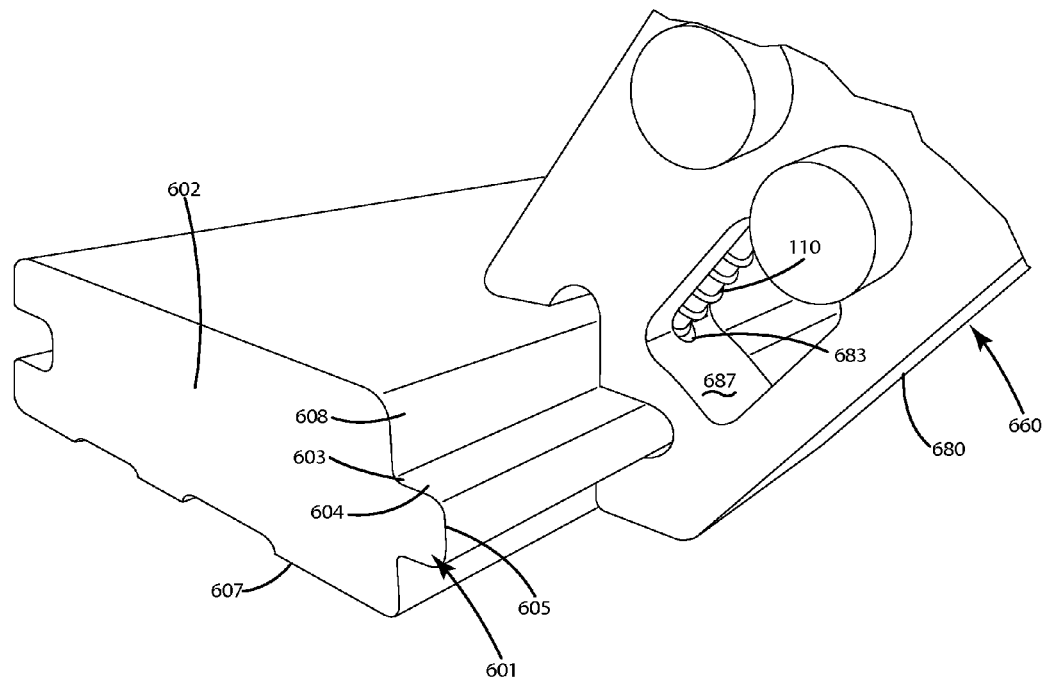
FIG. 35 is a close up perspective view of the third alternative embodiment of the fastener installation tool in use.

Referring to FIGS. 34, 34A and 35, the fastener guides 680 are substantially identical and accordingly only one side will be described here. The guide of this embodiment is suited to advance fasteners, of the types discussed in the embodiments herein, or other conventional fasteners, into work pieces that are of a particular configuration. For example, as show in FIGS. 34-37, the work pieces are formed as what is conventionally shown as "porch boards," or more generally boards that include a tongue-and-groove construction, where the tongue of one board is adapted to insert and be received by the corresponding groove defined by a side of an adjacent, similar board to enhance continuity between the boards and their connection to one another and/or an underlying substrate.

Figure 40:
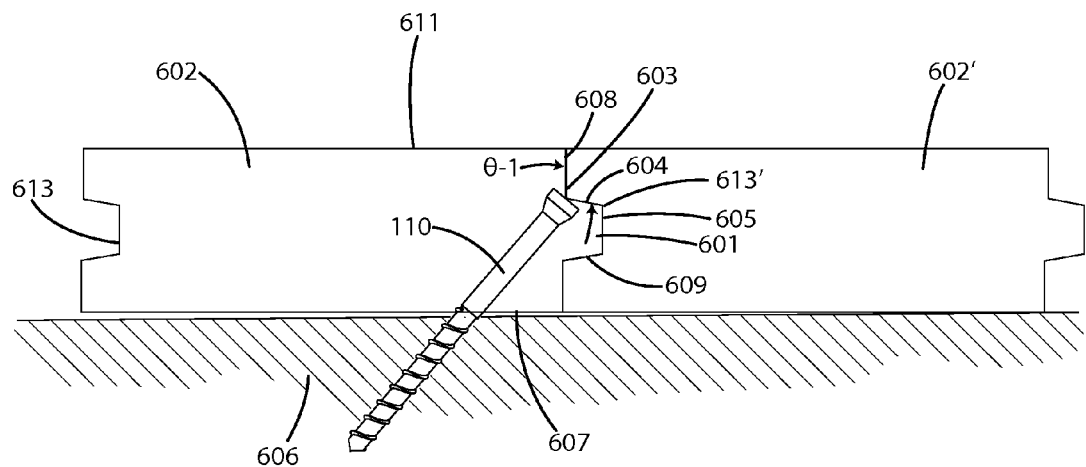
FIG. 40 is a side view of a first work piece fully installed with the third alternative embodiment of the fastener installation tool and a second work piece placed adjacent the installed work piece.

Referring to FIGS. 35 and 40, the work piece 602, also referred to here as a board, is joined with a substrate 606 using the fastener installation tool 660 and respective fasteners, for example, 10, 110, 210 and/or 310, or other fasteners as desired. The board 602 includes a side surface 608 that extends downwardly away from an upper surface 611 of the board. The side surface 608 joins the upper surface 611 at an upper corner. On the lower side of the board, the side surface 608 joins a lower surface of the board 607 at a second corner.

The side surface 608 includes a tongue 601 that projects outwardly from the side surface 608. The tongue 601 includes a tongue upper surface 604, a tongue side or end surface 605 and a tongue lower surface 609. The tongue upper surface 604 intersects the board side surface 608 at a corner 603. Although shown as generally planar and separate surfaces, the tongue upper surface 604, tongue side surface 605, and tongue lower surface 609 can alternatively form a multi-curved structure or can be of a generally continuous curved structure. For example, the multiple surfaces can be merged into a semi-circular or rounded structure, or a structure having multiple compound curvatures. As another option, the tongue 601 can be in the form of a triangle, rectangle, square, or other polygonal or curved geometric shape as desired.

With further reference to FIGS. 35 and 40, side surface 608 of the board and the upper surface of the tongue 604 meet at the corner 603, and at that corner generally form some angle the angle 1-1, which can be of a variety of ranges, again depending on the geometric structure of the side surface and/or the tongue. For example, the angle 1-1 can be optionally a 90° angle so the side surface 608 and tongue upper surface 604 are perpendicular to one another. In other cases, due to the specific formation of the board or manufacturing tolerances, the side surface 608 and the tongue upper surface 604 can be at angles 1-1 ranging optionally from about 70° to about 120°, further optionally 80° to 110°, even further optionally 85° to 95°, or other angles therebetween. The side surface 608 and the lower tongue surface 609 can form similar angles, and can be joined at a corner formed similarly to corner 603 between the side surface 608 and the tongue upper surface 604.

FIG. 40 also illustrates the interaction of the tongue 601 of one piece 602 with a groove 613' of another piece 602'. The groove 613', which can be identical to the groove 613, can be formed in a side surface of work piece 602'. The groove 613' can have a geometric shape corresponding to that of the tongue 601 which is described above. If desired, all of the surfaces of the tongue 601 can be mirrored to corresponding surfaces of the groove 613'.

Returning to FIGS. 34-39, the installation tool 660 is useful for installing fasteners in boards such as those described herein. The tool can include a guide 680, which defines a bore 688 that extends along a bore axis 600. The bore extends generally from a first bore opening 684 to a second bore opening 685 along the axis 600. The angled bore 688 can be positioned in a non-orthogonal angle, or generally angularly offset from 90°, relative to the side surface 608 of the first work piece 602 when the tool 660 is readied for advancing the fastener, which, for exemplary purposes is fastener 110 from the embodiments above, but of course could be any screw embodiment herein, or other screws as desired.

The first opening 684 can be configured to receive the fastener 110 and generally operate as an entrance into which a fastener 110 can be inserted into the tool 660. The second opening 685 can serve as an exit through which the fastener exits the tool 660 as it advances into the work piece 602. Like the other embodiments herein, the bore can include a material ejection port 683 which is positioned and functions similar to the embodiments noted herein, so those descriptions of the other embodiments apply equally here.

Figure 36:
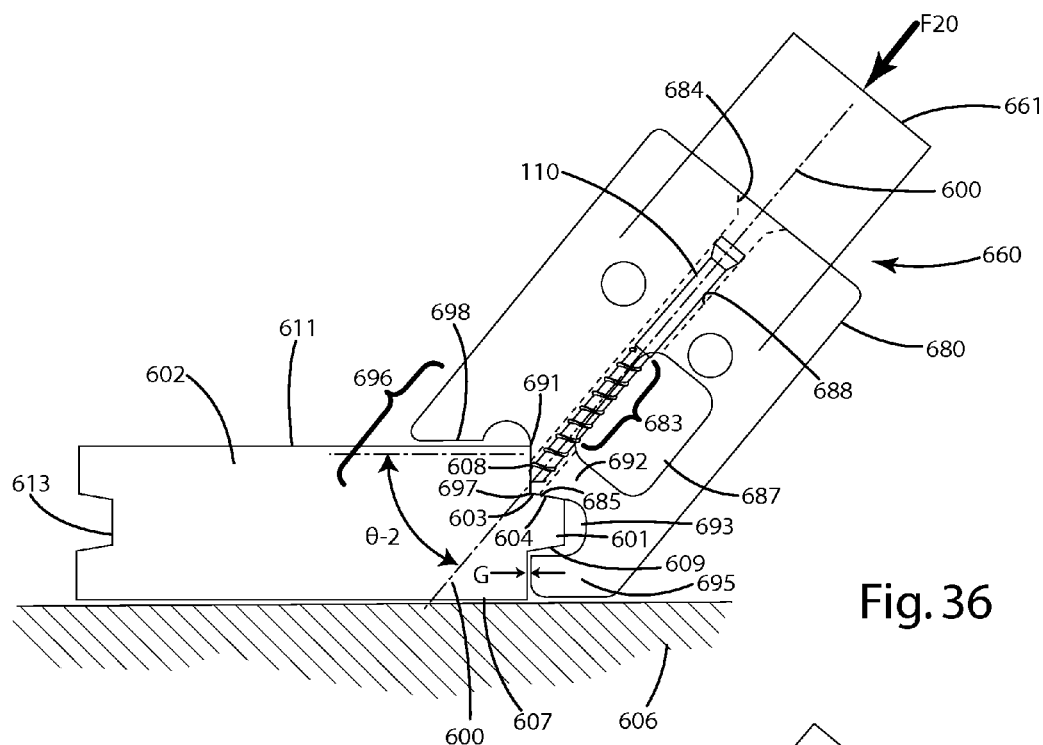
FIG. 36 is a side view of the third alternative embodiment of the fastener installation tool as a guided fastener first engages a first work piece.

The guide 680 can include an engagement head 696 which includes some features that are not described in other embodiments. For example, to accommodate the tongue-and-groove configuration of the work piece or board 602 and orient the bore 688 in a preselected configuration relative to the board, the engagement head 696 can include certain structural features. One such feature is the primary engagement surface 691, which is adapted to abut or generally engage the side surface 608 of the work piece 602 as shown in FIGS. 36 and 34A, generally above the tongue 601. Another is the second opening 685, which is defined at a corner or intersection 697 of the primary engagement surface 691 and a secondary engagement surface 692. The longitudinal axis 600 of the bore 688 can generally be centered so that it projects through the corner or intersection 697 of the primary engagement surface 691 and secondary engagement surface 692, and/or or adjacent to it, optionally offset 0.01 mm to 10 mm depending on the board structure.

Generally, the intersection 697 of the primary engagement surface 691 and secondary engagement surface 692 is configured to fit precisely adjacent or adjacent and/or in the corner 603 formed between the side surface 608 of the work piece and the tongue upper surface 604. With this type of arrangement, the engagement head 696 and therefore the guide 680 can be precisely positioned with the bore 688, and generally the longitudinal axis 600 of the bore, precisely aligned with the corner 603, or some other location on the side surface 608. In this manner, the fastener 110 can be started and advanced through the work piece in that region without splitting, cracking or bulging the tongue 601. Although shown as the intersection of two generally planar surfaces at a corner or point, the corner 697 can be rounded or chamfered at the intersection of the respective primary engagement surface 691 and secondary engagement surface 692 if desired.

Figure 41:
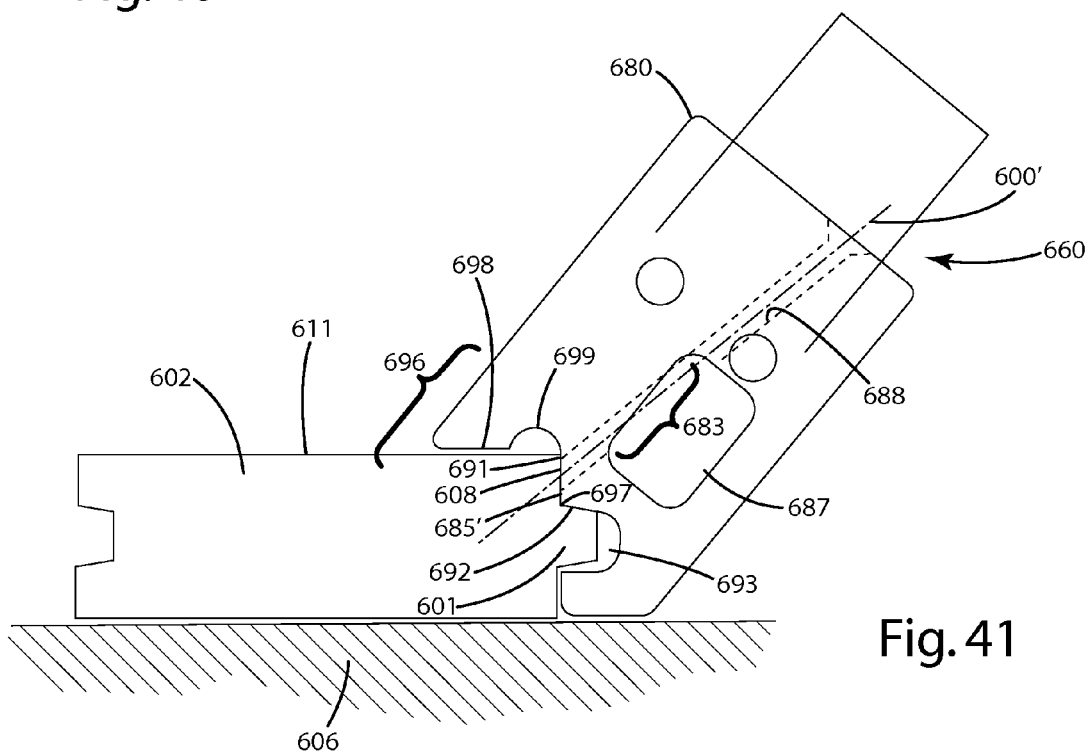
FIG. 41 is a side view of the third alternative embodiment of the fastener installation tool including an alternative guide bore configuration.

Optionally, the bore 688 can be offset from this intersection or corner 697 even farther, and defined substantially only in one of the primary engagement surface 691, as shown in FIG. 41. There, the bore 688' can be oriented so that when the guide 680, and in particular the engagement head 696 is placed adjacent the work piece 602, the bore 688' and longitudinal axis 600' are aligned with and aimed at the side surface 608 or and/or upper surface 611. In such a construction, the guide 680 is configured so that the primary engagement surface 691 defines substantially all of the first opening 685'. Optionally with this construction, the second opening 685' is defined only in the primary engagement surface 691 and is not defined in the secondary engagement surface 692. Accordingly, the bore does not intersect or overlap the corner 697 defined between the respective primary engagement surface 691 and secondary engagement surface 692. With this bore configuration, the bore is aimed at primarily only the side surface or upper surface of the board, so that the fastener, when advanced in the bore, will only penetrate these surfaces. Optionally, in such an alternative bore configuration, the fastener will not advance through the tongue 601, or any surfaces thereof.

Returning to FIGS. 36 and 34A illustrating the guide defining the bore 688, the second opening 685 is defined by the corner or intersection 697 of the primary engagement surface 691 and secondary engagement surface 692. Because it overlaps both the primary engagement surface 691 and the secondary engagement surface 692, the bore 688 at the second opening 685 is generally truncated by the intersecting planes of the respective primary and secondary engagement surfaces. Accordingly, each of the respective primary and secondary engagement surfaces 691 and 692 define at least a portion of the second opening 685. With this bore configuration, the bore is aimed generally at the side surface 608 as well as a portion of the tongue 601, for example, the tongue upper surface 604, so that when advanced in the bore 688 and into the board, the fastener 110 can engage and penetrate two or more of these multiple surfaces.

Optionally, although shown as being generally equally divided between the primary and secondary engagement surfaces 691 and 692, the second opening 685 can be defined by different proportions of those respective surfaces. And again, as noted in the optional embodiment above, the second opening 685 can be defined entirely within only one of the respective engagement surfaces 691 or 692 as desired.

Further optionally, when the installation tool 660 is used with certain types of boards, less of the second opening 685 can be defined in the respective secondary engagement surface 692, particularly where the tongue 601 of the respective board through which the fasteners is to be advanced is thin, or where the material from which the board is constructed is weak or prone to bubbling, splitting, expanding or bulging when a hole is bored through it and/or when a fastener is advanced into it.

Figure 37:
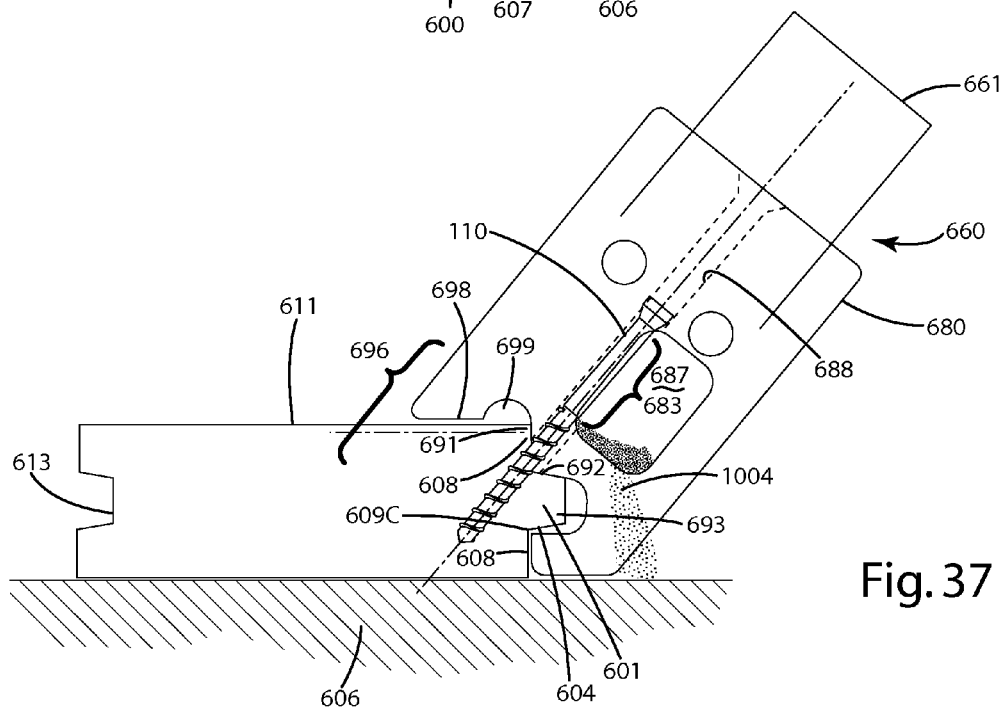
FIG. 37 is a side view of the third alternative embodiment of the fastener installation tool as the fastener is being initially installed in the first work piece.

With reference to FIG. 37, a configuration of the tool 660 is shown that advances the fastener so that it is generally a sufficient distance from certain portions of the tongue. For example, as shown, the tongue lower surface 609 intersects the side surface 608 at a corner 609C. The bore 688 is angled and configured so that when the guide 680 advances the fastener 110, it does not bore a hole or advance the fastener along a path that intersects or otherwise damages or passes through the corner 609C. If it did, then in such an embodiment, the fastener likely would protrude from the corner 609C into the space defined between the side surface 608 and the tongue lower surface 609. Accordingly, in such a case, when another board is placed with its groove 613 adjacent the tongue 601, the fastener likely would interfere with the interfitting of the tongue in the groove, and thus the boards could not be easily closely joined.

When using the installation tool 660 with certain materials, it can be desirable that the fastener 110 and its line of advancement are distanced sufficiently from the corner 609C. For example, with certain wood boards that are prone to bulge or split when a fastener advances through them, the bore 688 can be angled and distanced from the corner 609C, again as shown in FIG. 37. This can prevent unnecessary damage to or bulging of material adjacent the corner 609C. Again, that damage to or bulging of material possibly can interfere with the inter-fitment of the tongue 601 into a corresponding groove 613 of another board.

Figure 39:
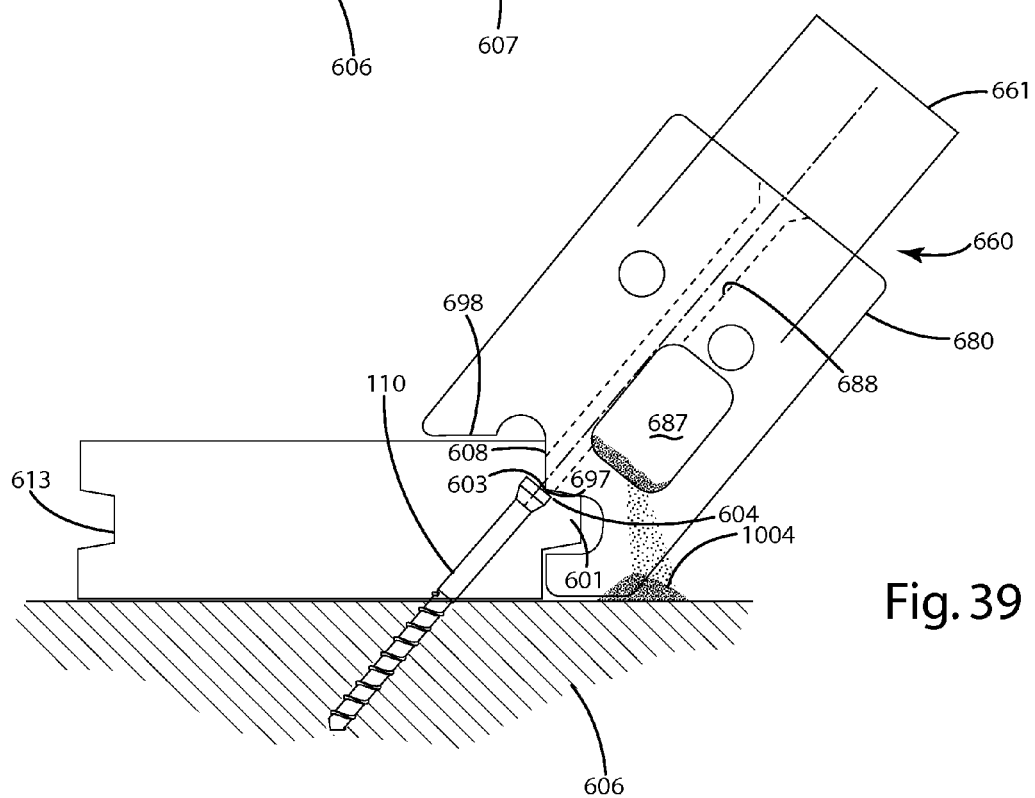
FIG. 39 is a side view of the third alternative embodiment of the fastener installation tool with the fastener fully advanced into the first work piece and an underlying structure.

As shown in FIG. 39, the installation tool 660 can be configured so the head of the fastener 110, upon full installation, is recessed inward, into the board, beyond the corner 603 where the side surface 608 and the upper tongue surface 604 meet. In this manner, the head of the fastener 110 does not interfere with the inter-fitment of the tongue 601 with a groove 613 defined by another board.

With further reference to FIGS. 36 and 34A, the guide 680 will now be further described. The guide 680 shown there, more particularly the head 696, can include a work piece upper surface engager 698 that is generally transverse to the primary engagement surface 691. This work piece upper surface engager can likewise be disposed at some angle ϵ. This angle ϵ can be 90 degrees as shown, and can generally correspond to a board having an upper surface 611 generally perpendicular to a side surface 608 distal from the intersecting corner of these surfaces, which is common to many boards, and in particular to many tongue in groove type boards. If desired, however, the angle ϵ between the work piece upper surface engager 698 and the primary engagement surface 691 can vary optionally from about 75° to about 115°, further optionally about 80° to about 110°, even further optionally about 85° to about 105°, or at other ranges depending on the particular application and the configuration of the board.

The work piece upper surface engager 698 can define a first recess 699. This recess can be curvilinear or partially rounded as shown. Alternatively, it can be of an angular or rectangular shape, depending on the application. Generally this recess enables the work piece upper surface engager 698 to engage the upper surface 611 of the work piece 602 even when the corner or intersection of the upper surface 611 of the work piece and the side surface 608 is irregular, bowed, damaged, and/or bulging.

The work piece upper surface engager 698 also can generally be planar as shown or it can be of a rounded or other curvilinear shape. Generally, it can contact the upper surface 611 of the work piece, so in many circumstances, it can be of a planar or rounded (concave or convex), non-point contact configuration. Accordingly, without a pointed contact portion, the engager 698 can be prevented from marring or gouging the upper surface 611 of the work piece if forcibly engaged against that surface.

As shown in FIGS. 34A and 36, the engagement head 696 of the guide 680 also can define a tongue recess 693 positioned adjacent the secondary engagement surface 692. Indeed, the secondary engagement surface can bound a portion of the tongue recess 693 if desired. The second recess 693 can be oversized, that is, larger in dimension than the size of the tongue 601. With such an oversized recess 693, the engagement head 696 can fit over different portions of the same tongue that are of varying dimension or misshaped, and can fit over tongues of different boards that are of varying dimension or misshaped.

Generally, the recess 693 is of a rounded internal configuration so that if it engages certain portions of the surface portions or surfaces of the tongue 601, it will not gouge or mar the tongue, which potentially could impair the fitment of a tongue in a corresponding groove. Of course, the structure of the recess can be modified so that it does include angled corners or intersecting surfaces that mate perfectly or generally accommodate the different surfaces of the tongue 601.

As shown in FIG. 36, the head 696 also can include a guide foot 695 that extends from the head, optionally beyond the bore 680. The guide foot can be configured to project under the tongue 601. For example, the guide foot 695 can extend forwardly under the lower surface 609 of the tongue 601 so that it almost abuts, and in some cases does abut, the side surface 608 of the work piece when the guide 680 is appropriately placed adjacent the work piece 602. As shown, however, there can be a gap G established between the side surface 608 and the outermost portion of the guide foot 695 even when the guide is positioned with the bore 680 precisely aligned and positioned adjacent the side surface 608 and/or tongue 601.

In operation, the guide foot 695 can act as a spacer to properly space the corner 697 of the guide 680, or more particularly the bore 688, from the substrate 606 upon which the work piece 602 is positioned. Accordingly, a user can slide the guide 680 along the substrate 606, and more particularly slide the guide foot 695 along the substrate 606, until the tongue 601 registers in the tongue recess 693. At this point, the user can slightly angle or move the guide 680 so that the intersection 697 and the respective bore 688 aligns with and registers with the respective corner 603 or surface of the work piece to facilitate proper advancement of the fastener 110 into the work piece 602.

Returning to FIGS. 34A and 36-37, the guide 680 can define a material ejection port 683 that is similar in function, structure and location to the material ejection ports discussed above in connection with the other embodiments herein. Optionally, the material ejection port 683 can be located within a guide window 687 that is defined by the guide 680. The window 687 can extend from one side surface of the guide to the other side surface of the guide if desired. The window 687 can be configured and sized large enough so that material 1004 ejected from a hole bored by a respective fastener 110 can exit the material ejection port 683 and further exit the guide 680 through the window 687 on one or both sides of the guide 680.

Operation of the third alternative embodiment of the fastener installation tool 660 will be explained with reference to FIGS. 34, 35 and 36-39. Generally, the fastener installation tool 660 can be used to install a fastener of any of the types described herein, or other conventional fasteners. To begin installation, the tool 660 is positioned adjacent the board 602. As noted above, the guide foot 695 can engage the substrate 606 and can be slid across the substrate until the guide foot 695 is inserted generally under the tongue 601. If helpful, the guide 680 can be slightly rotated to position the work piece upper surface engager 698 against the upper surface 611 of the board. The guide also can further be pressed with a force F20 (FIG. 36) so that the bore 688, the second opening 685, and more generally the corner 697 is positioned in close engagement with the corner 603 of the work piece between the tongue 601 and side surface 608.

With the work piece upper surface engager 698 generally engaging the upper surface 611 of the work piece 602, the longitudinal axis 600 of the bore can be aligned with that upper surface at angle σ-2. The angle σ-2 can vary optionally from about 25° to about 65°, further optionally about 35° to about 55°, even further optionally about 40° to about 50°, or at other ranges depending on the particular application and the configuration of the board.

Alternatively or in addition to the work piece upper surface engager 698 engaging the upper surface 611 of the work piece, the angle σ-2 can be established by engagement of the guide foot 695 with the substrate 606 or the side surface 608 of the board 602. In this manner, the engagement head 696 becomes engaged sufficiently with the board 602 for installation of the fastener.

In another step, a force F20 can be applied to the tool 660 by a user, and a fastener 110 can be inserted in the bore 680. The fastener can engage the corner 603 of the work piece when placed in the bore 680. The fastener 110 can be engaged by a driving tool (not shown), such as a drill, screwdriver, wrench or other rotating tool, which rotates the fastener.

As shown in FIG. 37, as the fastener 110 is rotated, material 1004 can be ejected from the material ejection port 683 and further out through the guide window 687. The position of the guide 680 and engagement head 696 can be maintained throughout the fastener advancing operation.

Figure 38:
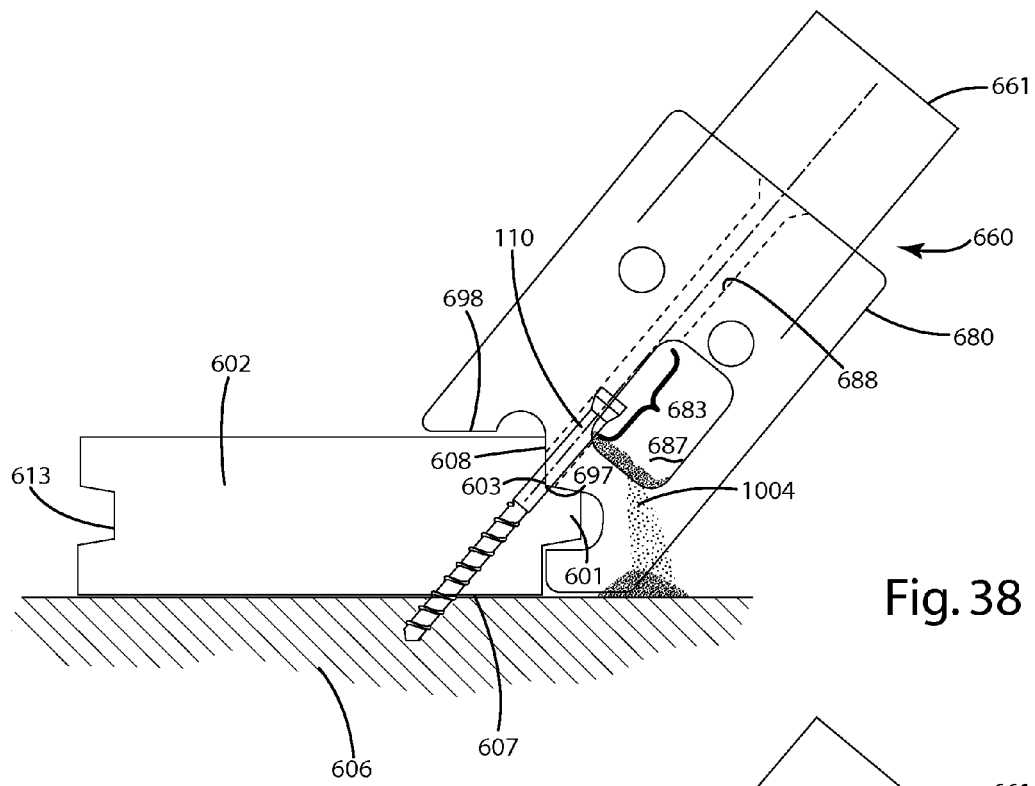
FIG. 38 is a side view of the third alternative embodiment of the fastener installation tool as the fastener is further advanced into the first work piece.

As shown in FIG. 38, the fastener 110 is further advanced so that it passes through the work piece 602 and into the underlying substrate 606, passing from side surface 608 through lower surface 607 and eventually into the substrate 606. As shown in FIG. 39, the fastener 110 continues to be advanced until it attains the fully advanced position noted in the embodiments herein, at which point the guide 660 can be moved. When the first work piece is sufficiently fastened to the substrate 606, the tool 660 can be removed.

As shown in FIG. 40, with the tool removed, a second work piece 602' can be placed on the substrate and slid so that the tongue of the first work piece 602 fits within the recess 613' of the second work piece 602', and interlocks with the first work piece 602. When so interlocked, the second work piece 602' can be fastened with one or more additional fasteners using the tool 660 as described in connection with the first work piece 602. This process can be repeated for multiple work pieces to fasten them to the substrate.

VIII. Fourth Alternative Tool and Method Embodiment

Figure 42:
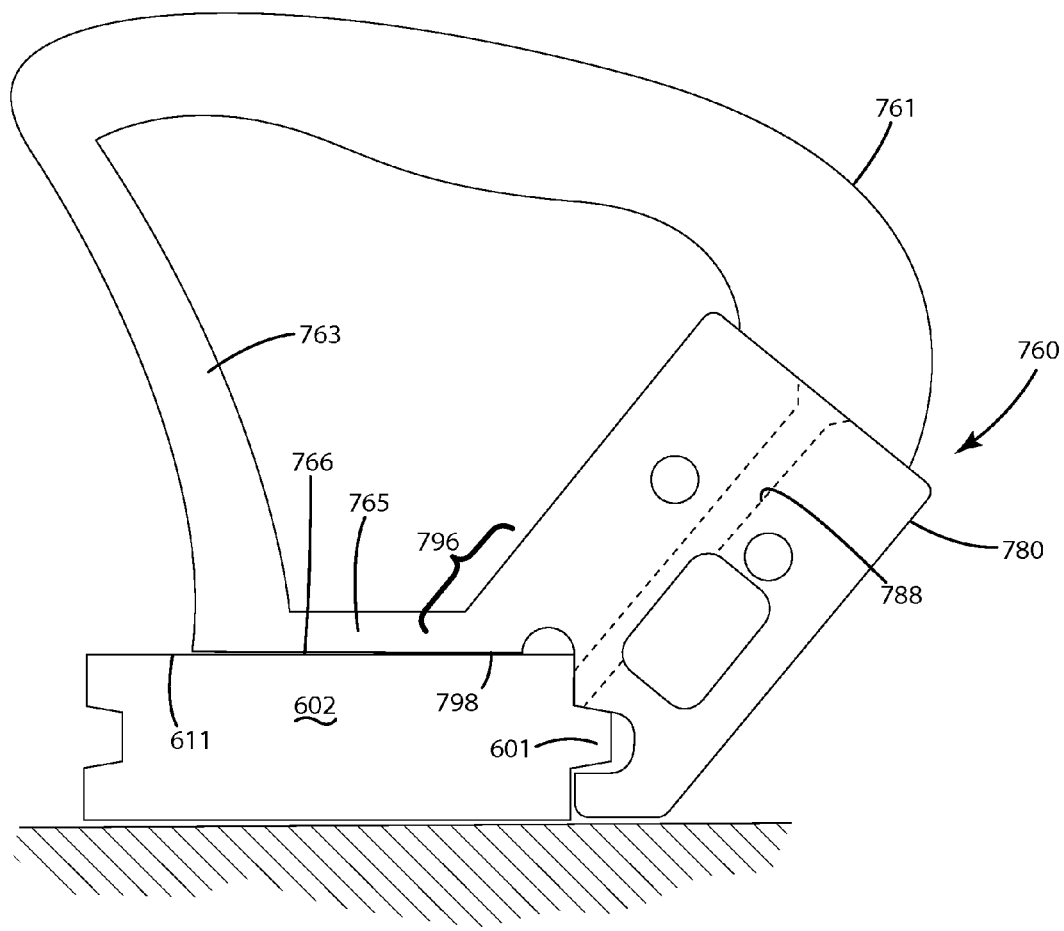
FIG. 42 is a side view of a fourth alternative embodiment of the fastener installation tool.

A fourth alternative embodiment of the fastener installation tool and related method is illustrated in FIG. 42 and generally designated 760. The installation tool shown there is similar in construction and operation to the embodiments described above with several exceptions. For example, the tool 760 can includes only a single guide 780. To the guide, a handle 761 can be attached, however, the handle 761 can extend transversely to the length of the work piece 602. For example, the handle 761 can extend rearwardly from the guide 780 upward and over the upper surface 611 of the work piece 602. The handle can be ergonomically shaped and can include a base support 763 that extends downwardly to a base 765. The base 765 can extend toward and can be connected to the head 796 of the guide 780. The base 765 can be configured to engage the upper surface 611 of the work piece 602. If desired, the base can include a lower surface 766 that is contiguous with the work piece upper surface engager 798. Indeed, the two surfaces 766 and 798 can be continuous and can form a generally planar surface. Operation of this embodiment is similar to the embodiments described above and therefore not be described again here.

IX. Fifth Alternative Tool and Method Embodiment

Figure 43:
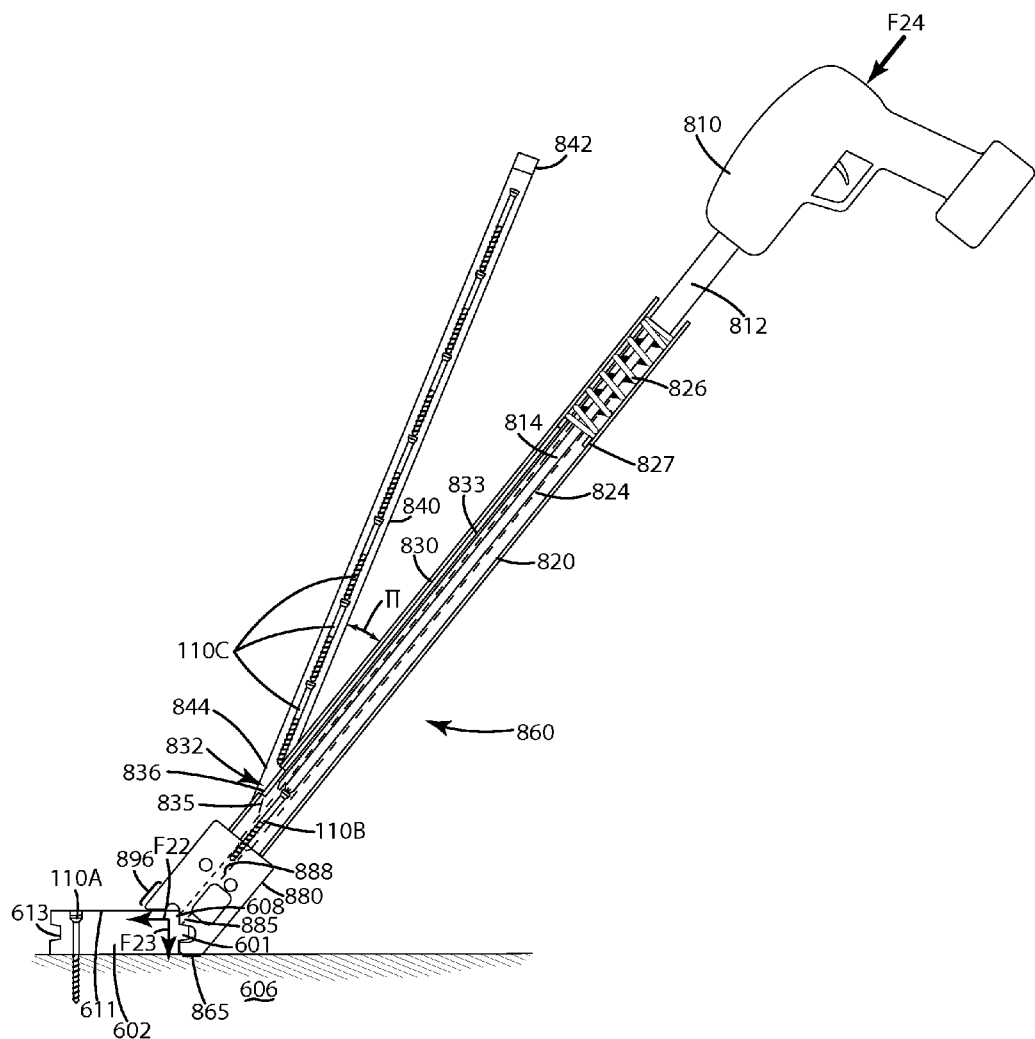
FIG. 43 is a side view of a fifth alternative embodiment of the fastener installation tool with fasteners loaded in the installation tool.
Figure 44:
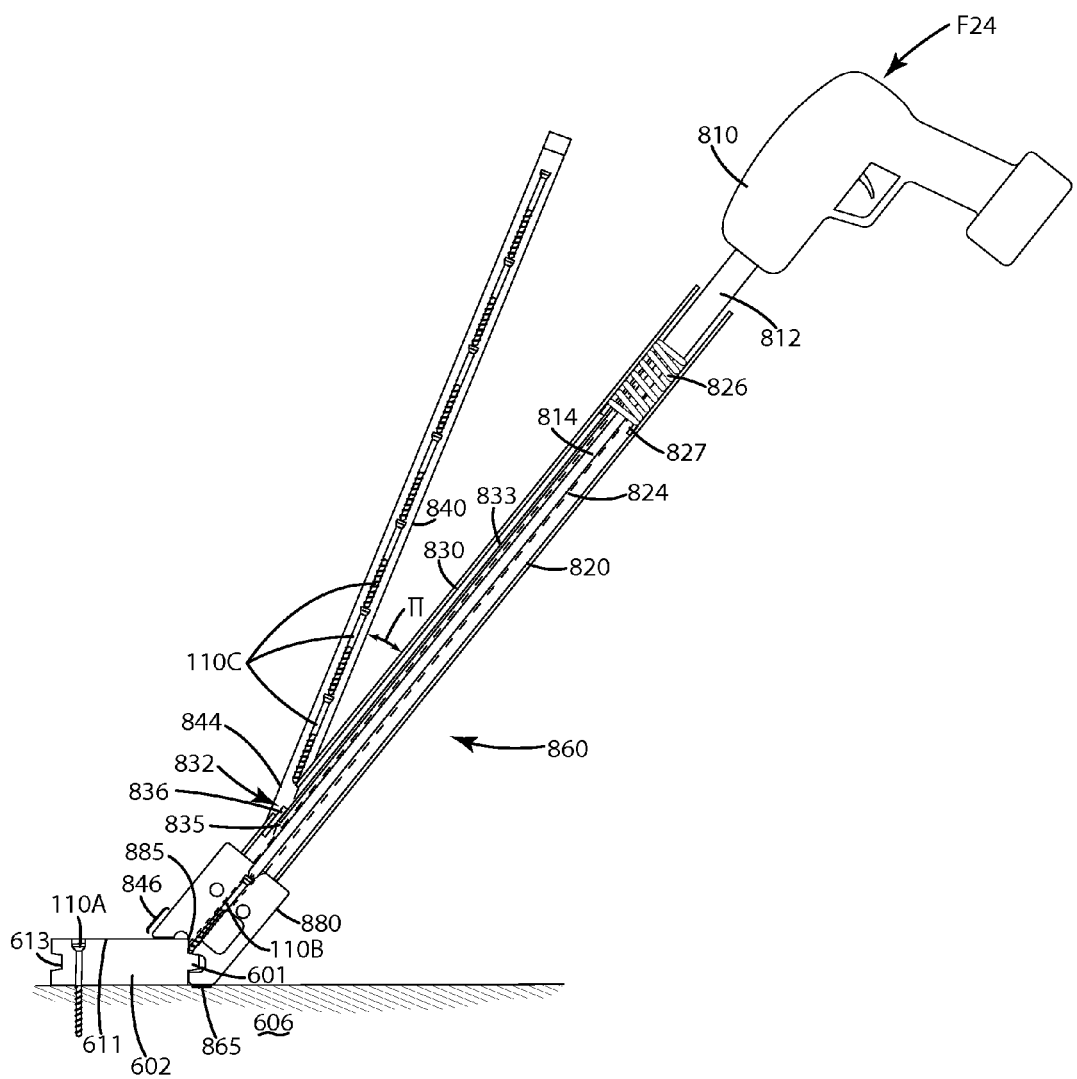
FIG. 44 is a side view of the fifth alternative embodiment of the fastener installation tool with a fastener adjacent the work piece, readied for installation in the work piece.
Figure 45:
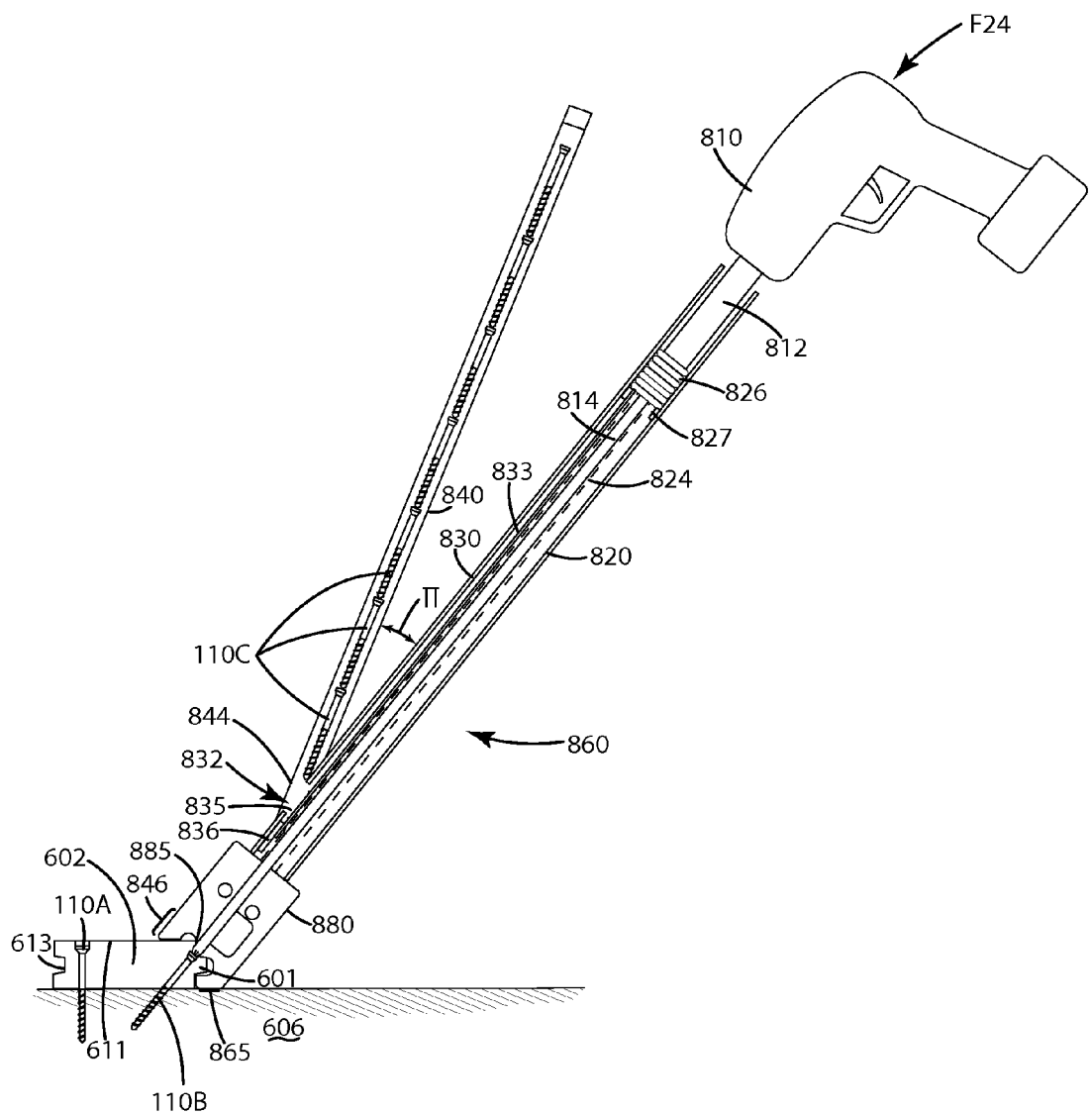
FIG. 45 is a side view of the fifth alternative embodiment of the fastener installation tool with the fastener fully installed in the work piece.

A fifth alternative embodiment of the fastener installation tool and related method is illustrated in FIGS. 43-45 and generally designated 860. The installation tool shown there is similar in construction and operation to the embodiments described above with several exceptions.

For example, the tool 860 is configured to work in conjunction with an integral or selectively attachable driving tool 810, such as a drill (cordless or electric) or other device capable of rotating the fastener for advancement into boards. The tool 860 is also configured to automatically and sequentially feed fasteners for advancement into work pieces to join those work pieces with one another or a substrate. Further, the tool 860 can be configured so that a user thereof can operate the tool and install fasteners from a standing or otherwise elevated position, which can alleviate discomfort or the difficulties associated with having to bend over and install the fasteners.

The tool 860 can include a guide 880 which defines a bore 888 and includes a head 896 to engage the board 602 so that a fastener 1108 can be advanced into and/or through the work piece 602 to connect it to the substrate 606 as described in connection with the embodiments herein. The guide 880, however, can be connected to an extension 820 which is further joined with the driving tool 810. A magazine 840 can be joined with the extension 820 so that multiple fasteners 110C stored in the magazine 840 can be sequentially fed into the extension 820 and/or the guide 880, and subsequently advanced into the board 602.

The extension 820 can define an extension bore 824, which can be sized and positioned to receive the next-to-be-advanced, or succeeding fastener 1108 therein. The extension bore 824 can be further configured to receive a chuck or tool extension 814 that is joined with and designed to be rotated by the driving tool 810. The extension 814 can extend from the head 812 of the driving tool 810 toward the guide 880 to a position adjacent the guide 880. The extension can also be reciprocally mounted in the extension bore, as described below.

The extension 820 can further include a biasing element 826, for example a spring or compressible/rebounding material, which is mounted therein. The biasing element 826 can be positioned so that it engages and seats against a stop 827. Opposite the stop 827, the biasing element engages the head 812 of the driving tool 810. Although not shown, the head 812 can include a locking element to prevent the base 812 from being completely withdrawn from the extension 820. Of course, where it is desirable that the base and driving tool 810 be quickly and easily separable, any desired decoupling element can be utilized to provide such a connection.

A fastener supply container or magazine 840 can be joined with the extension 820. As shown, the magazine 840 can be offset from the extension 820 by some predetermined angle π. This angle π can range optionally from about 1° to about 45°, further optionally about 3° to about 30°, even further optionally about 4° to about 20°, still further optionally about 5° to about 15°, or other ranges of angles as desired.

Generally, the magazine 840 can include a first end which may include a cap 842 to contain and store fasteners 110C therein. The magazine 840 can include a second end 844 that is joined with the extension 820, optionally near the guide 880. The magazine 840 can be of a length sufficient to store multiple fasteners 110C head to point or one on top of another. Although not shown, if desired, the magazine could be modified to store a coil, strip or roll of collated fasteners that are linked together with some sort of linking element, such as wire, a coil, tape, or other construction.

Figure 46:
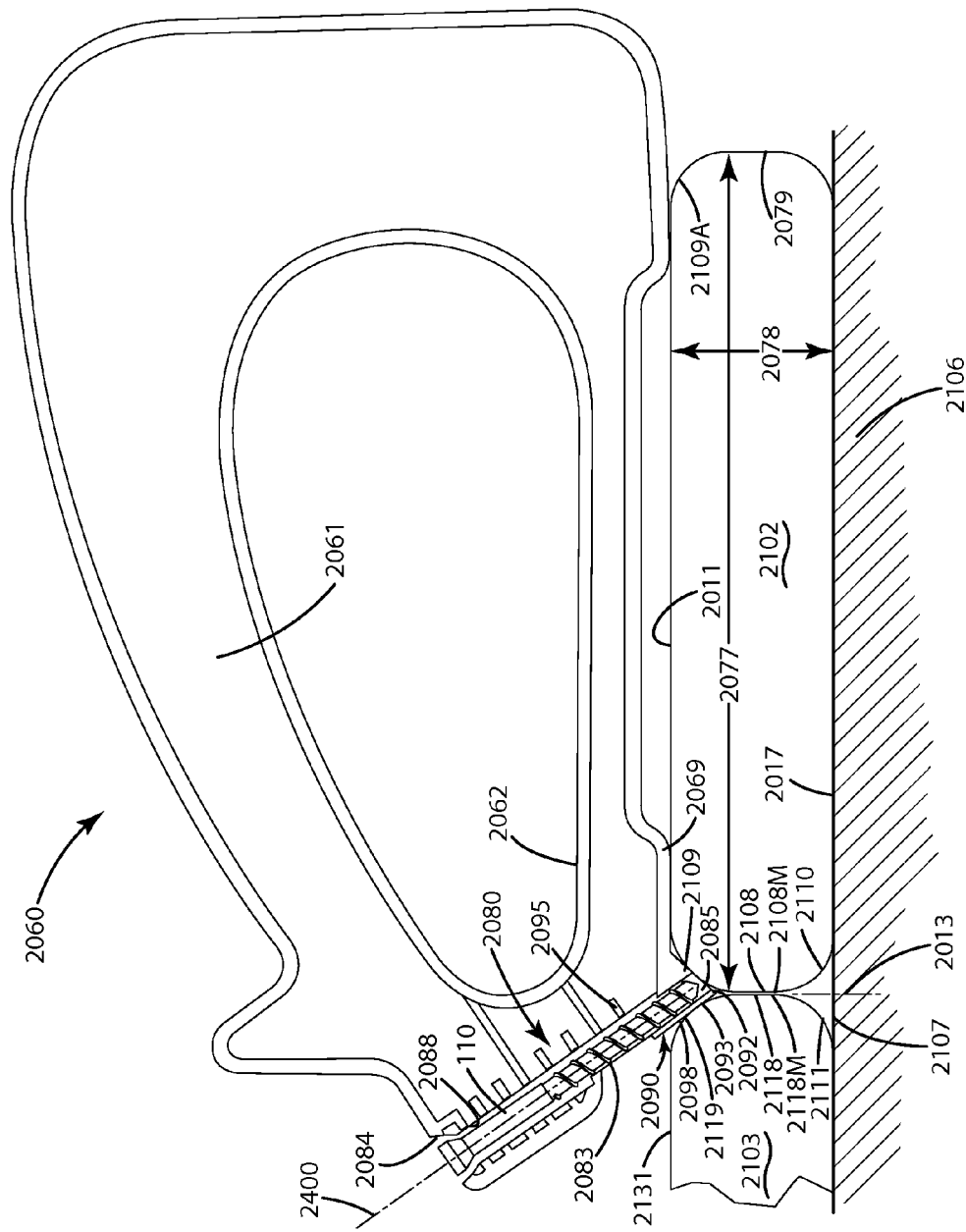
FIG. 46 is a side view of a sixth alternative embodiment of the fastener installation tool with a fastener about to be installed in a work piece that abuts another work piece, where there is no gap between the abutting work pieces.

Returning to FIG. 43, the second end 844 of the magazine 840 can be attached so that the magazine 840 generally is in feeding communication with the extension bore 824 and/or the bore 888 of the guide 880, and so the fasteners 110C can be sequentially fed into these elements. To prevent multiple fasteners 110C from dumping into the extension bore 824 and/or guide bore 880, the tool 860 can include a feed mechanism 832 that meters and precisely feeds the fasteners. The feed mechanism 832 can include an actuator bar 833 which is joined with a plate, door or hatch 836 at one end, and coupled to the biasing element 826 and/or head 812 of the driving tool 810 at the opposite end. Upon actuation of the head 812 or driving tool in general, and/or its movement into the extension 820, the operating bar 833 moves the plate 832 downward as shown in FIGS. 44 and 46, out of the way of the opening 835 in the extension 820. Accordingly, a subsequent fastener 110C can be fed through the feed aperture 835 defined by the extension 820, and into the position shown in FIG. 43 when the chuck 814 is appropriately retracted. Of course, there can be other types of feed mechanisms used with the tool 860 that can sequentially feed the fasteners 110C into the guide 880 to ready them for installation in a work piece 602.

With reference to FIGS. 43-45, the operation of the tool 860 will now be described in further detail. In operation, a user grasps the driving tool 810 and positions the guide 680 generally in the upright configuration shown in FIG. 43. The user then slides the guide foot 865 of the guide 880 along the substrate 606, which in this case can be a subfloor or other flooring or base. The user slides the foot 865 until it is positioned adjacent the tongue 601, optionally under the tongue. Conveniently, the horizontal F22 and vertical F23 forces exerted by a user to engage the engaging head 896 with the work piece 602 can correspond to the natural movements of the user simply pushing the driving tool 810 and tool 860 toward and against the board.

With the bore 888 satisfactorily positioned adjacent the work piece 602, for example, with the second opening 885 adjacent the work piece side surface 608 and/or tongue 601, the user can further push the drive tool 810 with a force F24, which in turn pushes the tool head 812 against the biasing element 826 to compress it. This enables the chuck 814 to travel and move toward the work piece 602 within the bore 824. As the driving tool 810 is pushed with a force F24, the chuck 814 can be rotated by the driving tool 810. In turn, the end of the chuck 814, which can include a drive feature mating with the fastener 1108, can engage that fastener 1108 and rotate it. As the fastener 1108 rotates, it advances into the work piece 602 and optionally the substrate 606 in a manner discussed in the embodiments herein.

As the force F24 continues to be applied, the head 810 can move farther into the extension 820, thereby enabling the chuck 814 to continue to move with and engage the fastener, optionally fully advancing the fastener into the work piece 602 until it obtains the configuration shown in FIG. 45. When the fastener 1108 is fully installed, the user can remove the force F24, in which case the biasing element 824 engages the head 812 and moves it away from the stop 827. Accordingly, the chuck 814 is retracted from the guide 880, and reciprocates away from the bore 888. Likewise, the feed mechanism 832 is activated so that the plate 836 opens the feeding aperture 835 and the next in line or subsequent fastener 110C is fed into the extension bore 824 and/or the guide bore 888 so that fastener is readied for advancement into the same work piece or into another work piece which can be laid adjacent the illustrated work piece and interlocked therewith via the respective tongue and groove features of those work pieces. The process can be continued until the substrate is adequately covered.

If desired, as shown in FIG. 43, a first work piece 602 can be fastened down with a fastener 110A. Alternatively, and/or additionally, the end including the groove 613 of the work piece 602 can be placed adjacent a wall to start the application of multiple tongue and groove work pieces. Optionally, the components of the tool of the above embodiment can be incorporated into any other embodiments herein. Likewise, the components of any tool embodiment herein can be combined in virtually any combination with any other tool embodiment as desired.

X. Sixth Alternative Tool and Method Embodiment

A sixth alternative embodiment of the fastener installation tool and a related method is illustrated in FIGS. 46-49 and generally designated 2060. The installation tool shown there is similar in construction and operation to the embodiments described above with several exceptions.

For example, as shown in FIG. 46, the installation tool 2060 includes a frame 2062 optionally including a handle 2061, and a guide 2080. The frame 2062 can include a bottom surface 2069 that is adapted to engage a top surface 2011 of work pieces 2102 and/or 2103, which can be in the form of boards.

The tool 2060 of the sixth alternative embodiment is suited for any board, or other type of work piece as described herein. Optionally, however, the boards 2102 and 2103 can be particular types of boards if desired. These boards can be constructed from a material that with time, shrinks, that is, one or more of the board dimensions, such as width, thickness and/or length, decreases. As one example, the board can be constructed from wet, treated lumber. As the lumber dries over time, the board can shrink in width, thickness and/or length. This type of board is referred to herein as a "shrinkable board." Such a shrinkable board, over time, is prone to reduce or shrink in dimension, e.g., width 2077, and/or height 2078 (FIG. 46) by 0.5%, 1%, 2%, 3%, 4%, 5%, 10%, 15%, 20%, 25%, 30%, 35%, 40%, 45%, or more of the original dimension, depending on the particular material from which the shrinkable board is constructed.

As shown in FIG. 46, the work piece 2102, also referred to as the second board 2102, can include an upper surface 2011, a lower surface 2017, and side surfaces 2108 and 2079. The side surface 2108 can transition to the upper surface at an upper corner 2109, and to the lower surface 2017 at the lower corner 2110. As shown, the upper and lower corners, 2109 and 2110, can include a gradual radius which can be anywhere from a ⅟32" radius to a 4" radius, or optionally a ¼" radius to a 2" radius, or further optionally a ½" radius. Although shown as including a radius, any of the corners, for example, corners 2109, 2109A, or 2119, can alternatively be configured to include a compound angle or compound curved configuration. Even further optionally, the corners can be straight so that the side surfaces and upper surfaces of the respective work pieces meet at about a 90° angle.

Returning to the installation tool 2060, the bottom surface 2069 of the tool 2060 can be joined with the frame 2062, and the frame joined with the handle 2061, so that a user can exert different forces on the tool. These forces can be transferred through the bottom surface 2069 to one or more boards. The tool can include a guide 2080, which can be of the constructions described above and herein, and can define a longitudinal angled bore axis 2400 which extends along a length of the guide 2080, generally through an angled bore 2088 defined by the guide. As with the other embodiments herein, the angled bore 2088 can be configured to accommodate and constrain a rotating fastener, and can extend from a first opening 2084 to a second opening 2085. The angled bore 2088 can be positioned so that it is at a non-orthogonal angle, or generally offset from a right angle, relative to the upper surfaces of the respective boards when the tool is readied for advancing the fastener. This angle can be the same as the angles described in connection with other embodiments herein. The first opening 2084 can be configured to receive a fastener, for example, fasteners 10, 110, 210 and/or 310 herein, or other fasteners as desired, and can operate as an entrance into which the fastener can be inserted in the tool 2060. The second opening 2085 can serve as an exit through which the fastener exits the tool 2060 as it advances into a work piece.

The fastener guide 2080 also can be configured to include a material ejection port 2083 that is in communication with the angled bore 2088. The material ejection port 2083 can be a hole that is located between the first opening 2084 and the second opening 2085. The precise location of the material ejection port 2083 and its dimension can be selected based on the material to be augured or otherwise ejected or evacuated out from the angled bore 2088. As illustrated, the material ejection port is positioned generally above the bottom surface 2069 of the frame 2062, and can be about ½" long. Of course, it can be of other dimensions, for example about ⅛ to about ¼ of an inch in length. Generally, it can be of a dimension that is sufficient to allow material augured by a fastener 110 to eject from the port 2083.

The material ejection port 2083 can be dimensioned and located so that it is defined on the underside of the angled bore 2088 so that the material drops out from the bore via gravity through the port. The material ejection port 2083 can be large enough to drop out fibers or other material augured from the work pieces, yet small or short enough so that a screw inserted into the angled bore 2088 from the first opening 2084 will not have its end drop out from, or otherwise protrude, or become hung up in the ejection port 2083 while the screw moves toward the second opening 2085.

Optionally, the material ejection port can serve to remove or eject bored material from the angled bore to reduce some or all of the amount of material pulled back into the pre-bored hole by the fastener, which in some cases can cause damage, such as splitting or bulging of the work piece in the area surrounding the fastener. For example, the material ejection port can enable material augured up from the work piece to be ejected away from the threads and shaft of the fastener. In cases where the material ejection port is absent, or otherwise does not facilitate ejection of the material from the bore, and the head of the fastener is dimensioned so that it is almost the same dimension as the angled bore, the head might capture and drag all the pre-bored material back into the hole as the head advances toward the hole. That material would be captured in the space between the shaft and threads, and the walls of the angled bore, with the head acting like a cap or piston to pull the augured material between it and the work piece back into the pre-bored hole. With the material ejection port, the material augured or removed from the hole is ejected from the bore so that there is minimal, if any, augured or removed material for the head to pull into the hole. In turn, this can reduce the likelihood of damage to the work piece around the area of the hole caused by the material entering the hole, possibly along with the components of the fastener. Of course, in certain applications where material might not readily be pulled into the hole by the fastener, the material ejection port can be eliminated.

As illustrated in FIG. 46, the tool 2060 also includes an alignment projection 2090 that projects about 1/32 inch to about ½ inch, further optionally about ⅛ inch to about ¼ inch from the bottom 2069 of the tool 2060. The precise distance of the projection of this alignment projection 2090 can vary depending on the particular board with which the tool 2060 is used. For example, when the tool 2060 is used in conjunction with a shrinkable board, the preselected distance from which the alignment projection 2090 extends from the lower surface 2069 of the tool is selected so that the projection can at least partially fit between opposing corners 2109 and 2119 of adjacent first and second work pieces 2103 and 2102, respectively, without extending between or promoting the formation of a gap between the first work piece 2103 and the and second work piece 2102.

Optionally, the alignment projection can generally be in the shape of a triangle having a generally rounded, downwardly projecting terminal end. If desired, the alignment projection can be in the form of an isosceles triangle, or an equilateral triangle, or other triangle depending on the application. The terminal end at the lowermost portion of the triangle can be rounded or curved so that it does not mar or gouge boards which it contacts.

The alignment projection 2090 can be configured so that the angled bore 2088 terminates generally at the alignment projection 2090, with the second opening 2085 being formed substantially entirely within an inner engagement surface 2092 of the alignment projection 2090. The inner engagement surface 2092 can transition to the bottom surface 2069 of the installation tool 2060, optionally without forming a portion of the bottom surface 2069, and further optionally along a radius or fillet.

The alignment projection 2090 also can include an outer engagement surface 2093 positioned opposite the inner engagement surface 2092. The outer engagement surface 2093 can transition to the inner engagement surface 2092 generally at a terminal end 2097 of the alignment projection. The terminal end can be rounded and/or curved when viewed from a side view as illustrated so that it does not mar or gouge boards which it contacts. Optionally, the terminal end can include a radius R10 (FIGS. 51, 52) between about 0.1 mm to about 50 mm, further optionally between about 1 mm to about 20 mm, and even further optionally between about 2 mm to about 10 mm, or other radii as desired. Further optionally, the terminal end can include multiple compound radii or angled intersecting portions to provide the rounded effect as illustrated.

Figure 51:
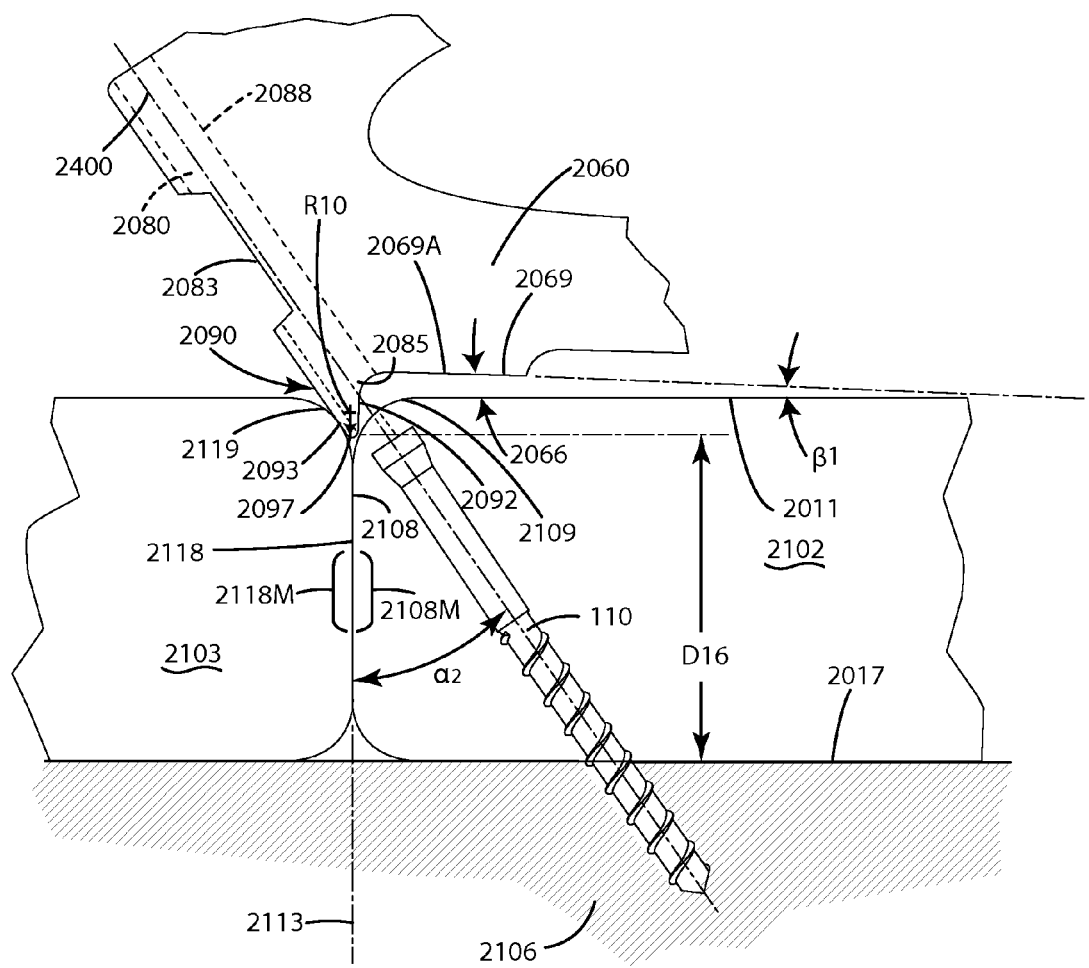
FIG. 51 is a close up view of the alignment projection of the sixth alternative embodiment of the fastener installation tool adjacent a second side of the second work piece, generally wedging between work piece corners.

With reference to FIG. 51, the precise angle between the inner and outer engagement surfaces, as well as the angle of the longitudinal axis 2400 relative to the engagement surfaces can be preselected based on the desired location at which the fastener will engage and advance into the corner and/or side surface of a board. The angle between the inner and outer engagement surfaces can vary, optionally from about 10° to about 90°, further optionally about 35° to about 65°, even further optionally about 40° to about 50°, or at other ranges depending on the particular application. Further, these surfaces can be non-parallel with one another if desired. Generally, the inner engagement surface 2092 and or the rounded or curved terminal end 2097 can be configured to engage the second board 2102 on which the bottom surface 2069 of the tool 2060 rests or is immediately adjacent or near when the tool 2060 is in position atop the board for installing a fastener.

As shown, the inner engagement surface 2092 optionally can be at about a 90° angle relative to the bottom surface 2069, but other angles from about 80° to about 100° can be selected. The inner engagement surface 2092 can be configured to directly engage the upper corner 2109 or side surface 2008 of the second board.

The outer engagement surface 2093 of the alignment projection can be at an angle relative to the bottom surface 2069 of optionally about 30° to about 70°, further optionally about 40° to about 60°, and even further optionally about 45°. The precise angle can be selected depending on the desired angle α2 (FIG. 51) at which the longitudinal axis and or corresponding trajectory of the fastener 110 is desired to be oriented relative to the side surface 2108.

The outer engagement surface 2093 of the alignment projection 2090 can be configured to directly engage the first corner 2119 and side surface 2118 of the first board 2103 as illustrated in FIG. 51. This engagement of the outer engagement surface 2093 against the corner 2119 and/or side surface 2118 effectively can set the height D16 (FIG. 51) at which the fastener 110 is advanced into the side surface 2108 or corner 2109 of the second board 2102 during a fastener installation operation with the tool. This engagement of the outer engagement surface 2093 against the corner 2119 and/or side surface 2118 can also set the angle α2 and/or orient the longitudinal axis along a desired fastener trajectory.

As shown in FIGS. 46-52, the entire bottom surface 2069 of the tool can be void of any spacer projections, that is, any projections which are configured to be positioned between the side surfaces of adjacent boards or work pieces to establish a predetermined distance therebetween, or a gap between the work pieces. With such a construction, the installation tool 2060 of this embodiment is constructed so that it is generally incapable of establishing a gap between adjacent installed boards, and in particular the side surfaces of those installed boards. In other words, the bottom surface of the tool itself can be void of any structures that extend downwardly along opposing side surfaces of the board 2102, when the tool 2060 is installed atop the board, with the bottom surface 2069 engaging the upper surface 2011 of that board. Further, the tool 2060 and/or bottom surface 2069 can be void of any projection that extends down along either the side surfaces 2108 or 2079 of the board. Of course, if desired, the alignment projection 2090 can extend downwardly adjacent one or more of the upper corners 2109, 2109A of the board 2102 to assist in aligning the guide 2080 with a desired trajectory of the fastener 110.

For example, the alignment projection 2090 can extend downwardly from the bottom surface 2069 of the tool 2060 a preselected distance so that when a user exerts a force F25 (FIG. 48) on the tool 2060, via the handle 2061, the alignment projection 2090 assists in pushing the second board 2102 adjacent the first board 2103, and more specifically, contacting the side surfaces 2108 and 2118 at least along a portion of the middle portions 2108M and 2118M of those respective boards. Optionally, during this application of force F25, the inner engagement surface 2092 transfers a substantial portion of the force F25 to the board 2102, which is further transferred to the board 2103.

The frame 2062 and the other various components of the tool 2060 can be constructed from stainless steel, steel, other metals, composites and/or polymers. For example, as mentioned above, the guide 2080 and angled bore 2088 can be constructed from steel, while the like components of the frame 2062, such as the handle 2061 and alignment projection 2090 can be constructed from a polymeric material such as a high impact resistant plastic.

Figure 47:
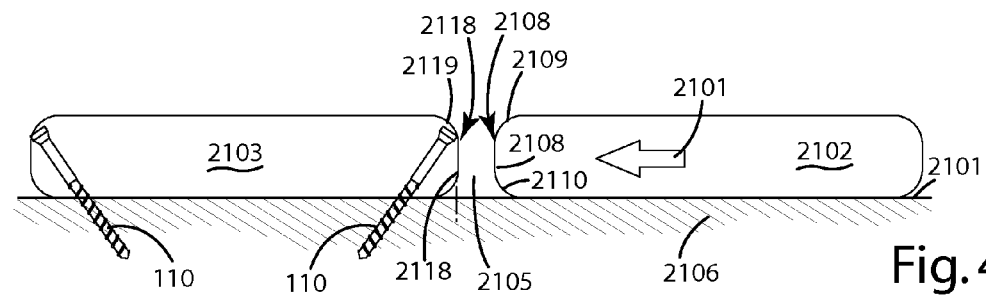
FIG. 47 is a side view of an installed first work piece and a second work piece being moved toward it so the first and second work pieces abut one another.
Figure 48:
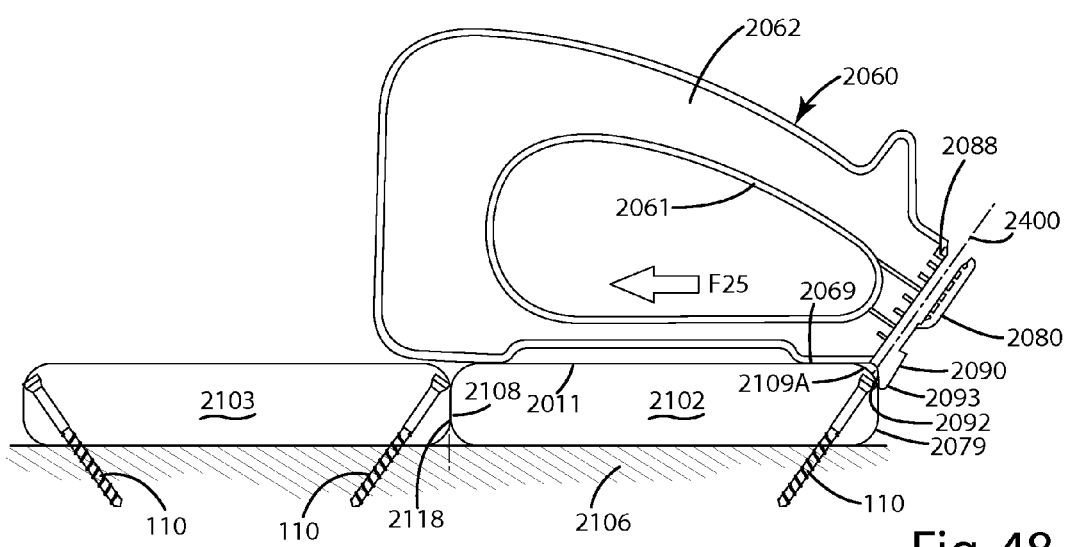
FIG. 48 is a side view of the sixth alternative embodiment of the fastener installation tool installing a fastener in the second work piece.
Figure 49:
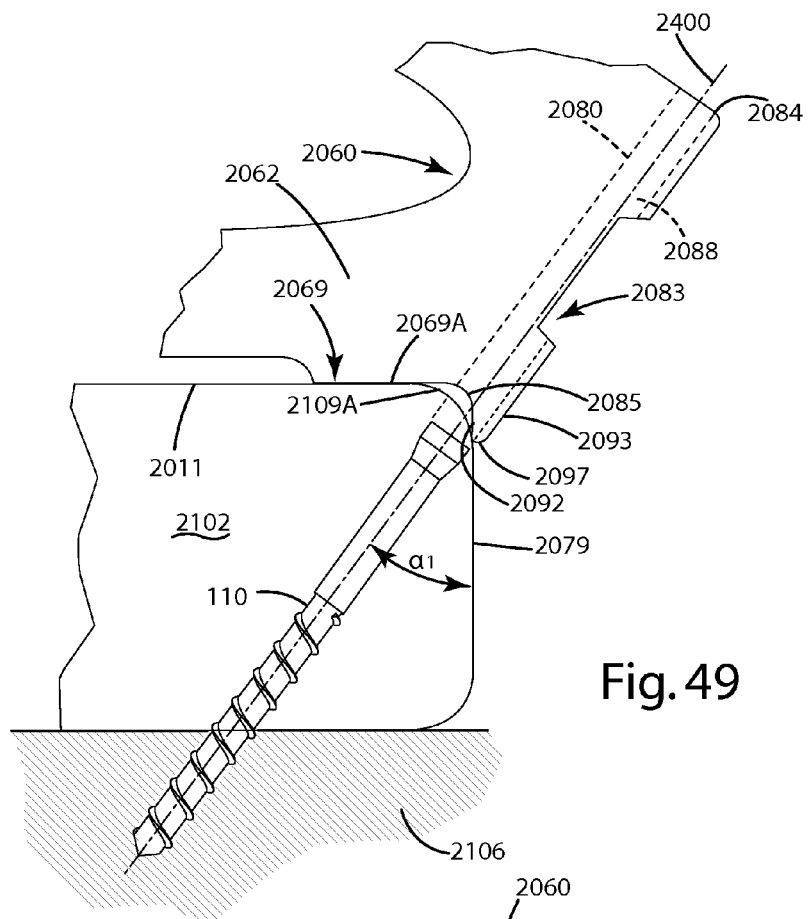
FIG. 49 is a close up view of the alignment projection of the sixth alternative embodiment of the fastener installation tool adjacent a first side of the second work piece.

With reference to FIGS. 47-49, a method for installing one or more boards, in the form of shrinkable boards, or other boards, with the installation tool 2060 will now be described. As shown in FIG. 47, a first board 2103 is first joined with a substructure 2106 with fasteners 110, or any other fasteners described herein or other conventional fasteners. These fasteners 110 can be installed at an angle, as described above, relative to the side surfaces of the board 2103 using the installation tool 2060, or at some other angle. For example, optionally, the board 2103 can be installed with the fasteners alternatively extending from the top surface of the board through the bottom surface, generally orthogonal to the board.

Figure 50:
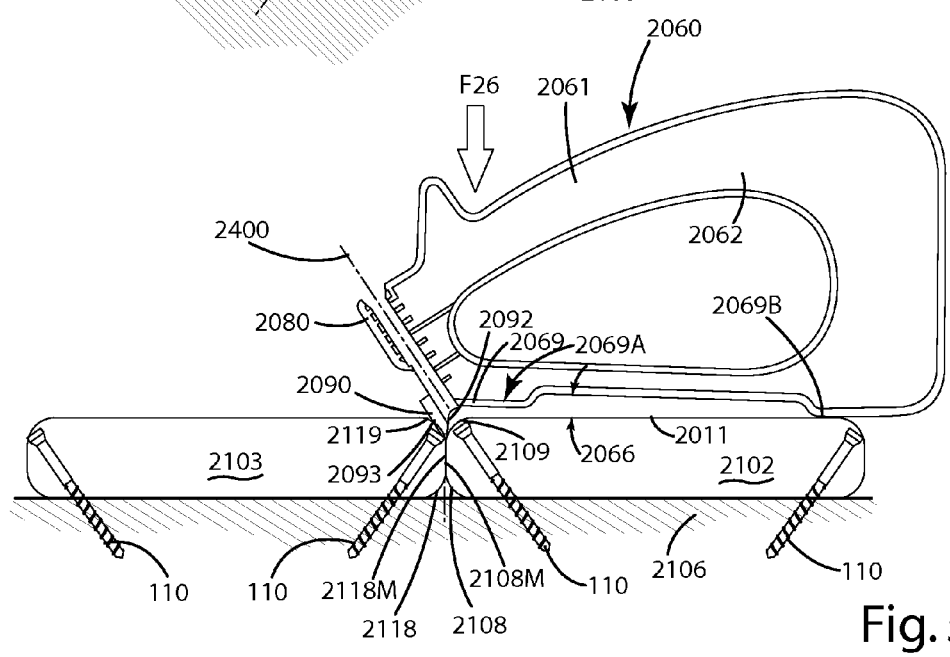
FIG. 50 is a side view of the sixth alternative embodiment of the fastener installation tool, rotated end for end relative to the configuration in FIG. 48, installing another fastener at a location where the first work piece and the second work piece abut one another.

With the first board 2103 installed, the second board 2012 is moved, generally in the direction 2101 toward the first board 2103. The second board 2102 is positioned so that the gap 2105 between the side surfaces 2118 and 2108 of the respective boards is closed along a substantial length, for example all the length, of the respective boards 2103 and/or 2102. The second board 2102 is moved adjacent the first board 2103 so that the first side surface 2118 engages and/or directly contacts the second side surface 2108 of the second board 2102. In this type of contact, there is substantially no gap between the respective first and second boards. Generally, the middle portions 2118M and 2108M of the respective first and second boards 2102 and 2103 directly engage or contact one another as shown in FIGS. 48, 50 and 51. In this engaging or contacting configuration, however, the board corners 2109 and 2119 can still be a distance from one another. Even though the board corners are distanced from one another, the boards are still considered to be positioned adjacent one another, directly engaging and/or contacting one another, so that there is no gap between the first and second boards.

Optionally, the movement of the second board 2102 can be either linear along the upper surface 2107 of the substructure 2106, as shown in FIG. 47, or alternatively the movement can include a combined pivoting and sliding motion. For example, the side surface 2108 of the second board 2102 can be placed adjacent the side surface 2118 of the first board 2103 with the second board 2102 generally at an angle of optionally about 20° to about 60° relative to the upper surface 2107 of the substructure 2106. The second board 2102 then can be moved or pivoted about its lowermost corner 2110 until it is positioned immediately adjacent the first board 2103 with the respective side surfaces 2108 and 2118 engaging or otherwise contacting one another.

In some cases, the shrinkable boards with which the installation tool 2060 is used may be warped, so that it is impossible to engage the respective first and side surfaces of adjacent boards in complete contact or in immediate adjacent engagement with one another along the entire lengths of the boards. In such cases, despite parts of the boards in warped regions not being in contact with one another, the boards and their respective side surfaces still may be considered to be in substantial engagement and/or contact with one another as those terms are used herein.

As shown in FIGS. 46 and 51, the respective outermost portions of the side surfaces 2108 and 2118, in particular, the middle portions 2118M and 2108M, can be aligned in parallel and can contact one another within the contact plane 2013. This contact plane can correspond with the region of contact between the immediately adjacent side surfaces of the first and second shrinkable boards 2102 and 2103.

A method of installing shrinkable or other boards using the tool 2060 is further shown in FIGS. 48-51. Referring to FIG. 48, the installation tool 2060 is positioned with its bottom surface 2069 engaging the upper surface 2011 of the second board 2102. The alignment projection 2090 is positioned so that its engagement surface 2092 generally engages and squarely faces the corner 2109A and/or the opposing side surface 2079, also referred to sometimes herein as the third side surface. In this configuration, the longitudinal axis 2400 of the bore 2088 is generally aligned with the corner 2109A and/or at least a portion of the side surface 2079. The user can exert a force F25 against the side surface 2079 through the handle 2061 and frame, ultimately through the alignment projection 2090.

Optionally, the inner engagement surface 2092 engages the corner 2109A and/or the side surface 2079, with that force being applied through that engagement surface to those respective features of the board 2102. This force F25 can move the second board 2102 into close contact or improved contact or engagement with first boards 2103, and optionally can provide improved engagement between the side surfaces 2108 and 2119 of these respective boards. The bottom surface 2069 of the tool 2060 can engage the upper surface 2011 of the second board 2102, and via friction between the bottom surface 2069 and the upper surface 2011, the force F25 on the installation tool 2060 can exert a further improved engagement or contact between the side surfaces of the respective boards.

With the second board 2102 forcibly pushed against the first board 2103 as shown in FIG. 48, and the respective side surfaces 2118 and 2108 sufficiently engaged and/or contacting one another, for example along their middle portions 2108M and 2118M, a fastener 110 can be advanced along the longitudinal axis 2400, through the second board 2102 and into the substructure 2106 in a manner as described in any of the embodiments described herein. With the board so installed, there effectively is no gap between the side surfaces of the first and second boards upon such installation.

With reference to FIG. 49, which is a close up of the fastener 110 being installed in the board 2102, the tool 2060 is configured so that the inner engagement surface 2092 is mounted against the upper most corner 2109A of the board 2102, and optionally engages at least a portion of the side surface 2079. In this configuration the bottom surface 2069, and more particularly the secondary bottom surface portion 2069A engages the upper surface 2011 of the work piece 2102. The longitudinal axis 2400 of the bore 2088 is aligned so that the fastener 110 advances along a trajectory that is generally at an angle α1 relative to the side surface 2079 of the work piece 2102. This angle α1 can be optionally about 30° to about 80°, further optionally about 40° to about 70°, and further optionally about 45° to 50° or other angles depending upon the precise configuration of the corner 2109 and the side surface 2079. Generally, in the configuration shown in FIG. 49, the outer engagement surface 2093 is outwardly disposed relative to the side surface 2079. Optionally, the engagement surface 2093 does not engage any other work pieces or boards during the advancing operation shown in FIG. 49 adjacent the side surface 2079 of the board opposite the first board 2103.

With the fastener 110 positioned and tacking down the second board 2102 near the second side surface 2079, the tool 2060 can be lifted so that the bottom surface 2069 disengages the upper surface 2011 of the board 2102. The installation tool 2060 can be rotated 180°, generally rotated end for end, and the bottom surface 2069 can again be placed atop the upper surface 2011 of the second work piece 2102. Upon such placement, the tool 2060 faces an opposite direction (FIGS. 50-51) relative to the previous installation procedure (FIG. 48). Depending on the profile of the alignment projection 2090, the bottom surface 2069 can mount flush with top surface 2011 of the work piece 2102 (FIGS. 46 and 52), or a portion of the bottom surface 2069A can remain a preselected distance 2066 above the top surface 2011, while a remaining portion 2069B engages another portion of the upper surface 2011 of the work piece 2102 (FIGS. 50 and 51).

As shown in FIGS. 46, 50, 51 and 52, the alignment projection 2090 does not establish a gap between the respective side surfaces 2118 and 2108, or the middle portions 2118M and 2108M, of the respective first and second boards 2013 and 2012. When a user applies a force F26, the alignment projection 2090 seats or wedges between the respective corners 2109 and 2119 of the work pieces, to align the longitudinal axis 2400 of the bore 2088 with a desired trajectory of the fastener 110. If a significant amount of force is exerted, the distance 2066 between the bottom surface 2069a of the tool and the side surface 2008 of the board 2102, atop which the tool 2060 is positioned, can be reduced to alter the angle of the longitudinal axis 2400 relative to the plane in which the upper surface 2011 of the work piece 2102 lays.

Optionally, where the alignment projection 2090 is wedged and between the corners 2109 and 2119, the alignment projection can be said to be generally positioned substantially within the region or crevice formed between the corners 2109 and 2119, but without extending below the crevice into a location adjacent or between the respective side surfaces of the first and second boards. Further optionally, the alignment projection can occupy the crevice between the upper board corners, but not a gap between the adjacent side surfaces of the boards.

With the alignment projection 2090 adequately wedged and between the corners 2109 and 2119, the fastener 110 can be advanced along the longitudinal axis 2400 through the corner 2109 and/or side surface 2108, further through the work piece 2102 and into the underlying substructure 2106 to secure the side of the board adjacent the side surface 2108 to the underlying substructure 2106. This process can be repeated multiple times along a particular side surface of a work piece, over and over, to securely fasten the work piece to the underlying substructure 2106.

A close-up view of the fastener advancement is shown in FIG. 51. There, as illustrated, the alignment projection 2090 is wedged between the corners 2109 and 2119 of the second work piece 2102 and the first piece 2103, respectively. The outer engagement surface 2093 and or terminal end 2097 specifically engages the corner 2119 of the first board 2103, while the inner engagement surface 2092 and or an opposing side of the terminal end engages the corner 2109 of the second board 2102. In this particular embodiment, due to the configuration of the corners and the alignment projection 2090 from the bottom surface 2069, the wedging action of the alignment projection 2090 does not enable the bottom surface 2069, and more particularly the bottom surface portion 2069A to directly engage the upper surface 2011 of the second work piece 2102.

For example, as shown in FIG. 51, the bottom surface portion 2069A is a distance 2066 from upper surface 2011 of the work piece 2102. Accordingly, the bottom surface 2069 is generally disposed at an angle β1 relative to the upper surface 2011 of the work piece 2102. This angle can vary, but generally can be between 0.1° and about 30°, further optionally about 1° and about 15°. This contrasts the orientation of the bottom surface 2069A/2069 shown in FIG. 49, where that bottom surface is generally coplanar with the upper surface 2011 of the board 2102. As shown in FIG. 51, the bottom surface 2069 is disposed at a different angle relative to the upper surface 2011 than the angle shown in FIG. 49 when the fastener is installed in the first corner 2109A and/or side surface 2079 of the work piece 2102, with the tool 2060 in a reverse orientation.

Optionally, the fastener shown in FIG. 49 can be installed with the bottom surface 2069 disposed at a first angle relative to the upper surface 2011 of the work piece 2102, generally coplanar with that surface, for example at a zero degree angle, while the second fastener shown in FIG. 51 can be installed on an opposite side of the board with the bottom surface 2069 disposed at a second, greater angle β1 relative to the upper surface 2011 of the board 2102.

FIG. 51 also illustrates the angle α2 along which the longitudinal axis 2400 is disposed relative to the side surface 2108 of the board 2102 into which the fastener 110 is advanced. The longitudinal axis 2400, and thus the trajectory of the fastener 110, is disposed at an angle α2 relative to the side surface 2108. That angle of advancement, relative to the side surface 2108 and/or the longitudinal axis 2400 relative to the side surface, is generally less than the corresponding angle α1 shown in FIG. 49. Again, this is because the tool 2060 has been shifted upward by engagement of the alignment projection 2090 wedging between the corners 2119 and 2109. The angle α2 can be less than angle α1 by about 1° to about 20°, further optionally about 2° to about 8°. Depending on the particular application, the relative difference between angle α1 and angle α2 on the opposite sides of the board 2102 can vary as desired.

As further shown in FIG. 51, the outer engagement surface 2093 and or terminal end 2097 engages the uppermost corner 2119 of the installed first work piece 2103. It is this engagement that generally sets or establishes the trajectory, or line of advancement of the fastener, or generally orients the longitudinal axis 2400 of the bore relative to the corner 2109 and/or side surface 2108 of the second board.

Figure 52:
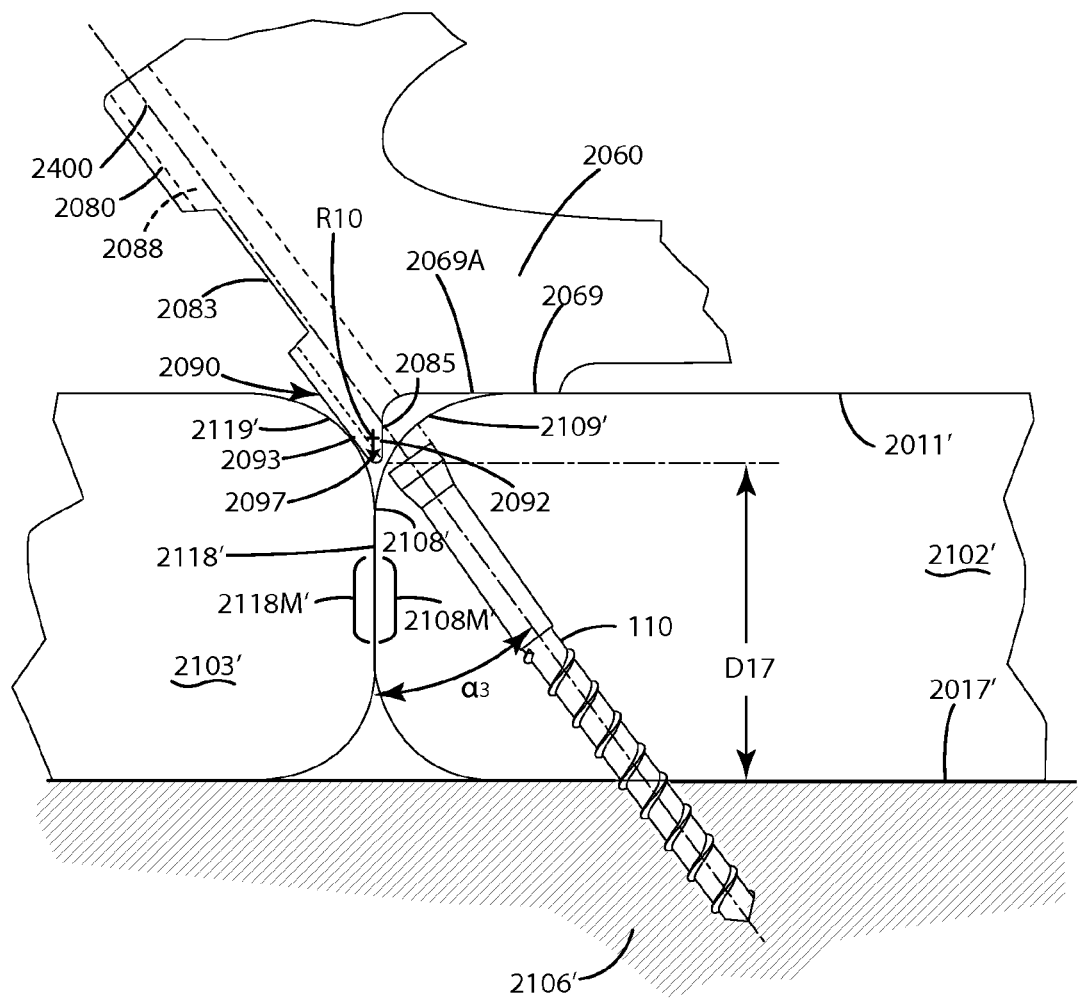
FIG. 52 is a close up view of the alignment projection of the sixth alternative embodiment of the fastener installation tool wedging between alternative work pieces having large radius corners.

The engagement of the outer engagement surface 2093, and/or terminal end 2097 of the alignment projection 2090, with the boards can vary depending on the particular profile of the corners 2119 and/or 2109. For example, as shown in FIG. 52, the corners 2119' and 2109' of the first work piece 2103' and second work piece 2102' are of a greater/larger radius than the corners 2119 and 2109 of the work pieces in FIG. 51. In turn, the distance between these corners 2109' and 2119' is generally greater, however, no gap is formed between the respective side surfaces 2108' and 2118' or more particularly the middle portions 2108M' and 2118M'. The alignment projection 2090 extends downwardly into the area established between the respective corners 2119' and 2109'. The bottom surface 2069, and more particularly the bottom surface portion 2069A adjacent the alignment projection 2090, engages the upper surface 2011' of the board 2102'. In turn, this ensures that the fastener 110 is advanced into the board at a lower location on the side of the board 2102'.

For example, as shown in FIG. 52, the fastener 110 is advanced and enters the board 2102' generally at a distance D17 from the bottom surface 2017' of the second board 2102'. This is due to the larger radius of the corner 2119' and the alignment projection 2090 being able to be disposed further into the crevice or region between the respective corners 2119' and 2109'. This contrasts the greater distance between the point of entry of the fastener 110 shown in FIG. 51. There, the fastener 110 enters the second board 2102 at a distance D16, which is greater than the distance D17 in FIG. 52, because the alignment projection 2090 cannot extend sufficiently downward into the area between the respective corners 2119 and 2109. The alignment projection 2090 interferes and wedges against those corners, preventing the bottom portion 2069A from engaging the upper surface 2011 of the second board 2102. Thus, the profile of the alignment projection 2090 of the installation tool 2090, and more particularly the configuration of the outer engagement surface 2093, can influence the height at which the fastener is advanced into the corner and/or side surface of the board relative to the bottom surface of the board.

The profile of the board and/or the profile of the alignment projection 2090 also can influence the angle at which the fastener 110 is advanced relative to the side surface 2108 of the board 2102. For example, again referring to FIG. 52, with the larger radiused corners 2119' and 2109' of the boards 2103' and 2102', the angle α3 between the respective longitudinal axis 2400 of the angled bore (which also corresponds to the trajectory or line of advancement of the fastener 110) is offset relative to the side surface 2108' of the second board 2102'. Generally, that angle α3 can correspond to or can be equal to the angle α1 (FIG. 49) such that the angles of the advanced fasteners relative to the respective side surfaces are about the same or equal.

This contrasts the geometries shown in FIG. 51, where the alignment projection 2090 wedged between the corners results in the bottom surface 2069 being raised a distance 2066 and at an angle β1 relative to the top surface 2011. There, the angle of advancement and the longitudinal axis 2400 is offset from the side surface at angle α2, which is different from angle α1 in FIG. 49. In comparing FIGS. 49 and 51, when the tool 2060 is used to advance a first fastener into the second board 2102 having a relatively small radius inside corner, that first fastener in a first side of the second board 2102 is advanced at a first angle α1. However, a second fastener advanced in a second, opposite side of the second board 2102, is advanced at a second, different, and generally smaller angle α2. Where, however, the radii of the corners of the boards are larger, like that shown in FIG. 52, the advancement of the first fastener in one side surface of the board 2079 (FIG. 49) is at an angle α1, and that angle α1 is generally the same or equal to an angle α3 at which another fastener 110 is advanced adjacent the opposite side surface 2108', as shown in FIG. 52.

Optionally, the distance from the lower surface of the board, where the fastener 110 enters the respective corners and/or side surfaces of the board, can vary depending on the size of the radii of the respective corners of the board, and/or can vary depending on the distance that the alignment projection 2090 extends from the bottom surface 2069 of the tool 2060. Depending on the particular application, desired angle of advancement of the fastener, and the board to be fastened, the alignment projection and tool can be specifically configured to provide the desired fastening capabilities and advancement of the fasteners. Further optionally, the engagement of the outer engagement surface 3093 and/or terminal end 3097 with the corner 3119 of the first work piece, which may already be secured to the substrate with a fastener, can affect the depth or distance downward from the upper surface 2011 at which the fastener is advanced. This engagement can also affect the angle α3 at which the fastener is advanced into the board.

After the fastener 110 fastens down the work piece adjacent the side surface 2108, regardless of the configuration of the tool or board, that side surface 2108 is in substantial engagement and/or contact with the side surface 2118 of the first board 2103. In other words, there is no gap established between these respective side surfaces 2108 and 2118, other than the distance between the corner 2109 and 2119 and/or 2110 and 2111 (FIGS. 46, 50, 51). Of course, with shrinkable boards, after time, those boards can dry and reduce in dimension as noted above. As they dry over a period of one week to three months, a gap can start to form between the work pieces 2103 and 2102, and in particular the side surfaces and/or middle portions of the work pieces.

The above process of installing a second board adjacent a first board, engaging the side surface of the first board with the second board so that they remain substantially engaged and/ or be in contact along the length of the board, while fastening an opposing side of the second board so that no gap is established between the opposing first side of a board, and then adjusting the tool to guide another fastener 110 into the side of the second board adjacent the first board can be repeated multiple times with multiple boards to produce a deck or flooring structure.

XI. Seventh Alternative Tool and Method Embodiment

A seventh alternative embodiment of the fastener installation tool and related method is illustrated in FIGS. 53-56 and generally designated 3060. This embodiment, like that of the sixth alternative embodiment above can be well suited for use with shrinkable or other types of boards as described herein. The installation tool shown there is similar in construction and operation to the embodiments described above with several exceptions.

Figure 53:
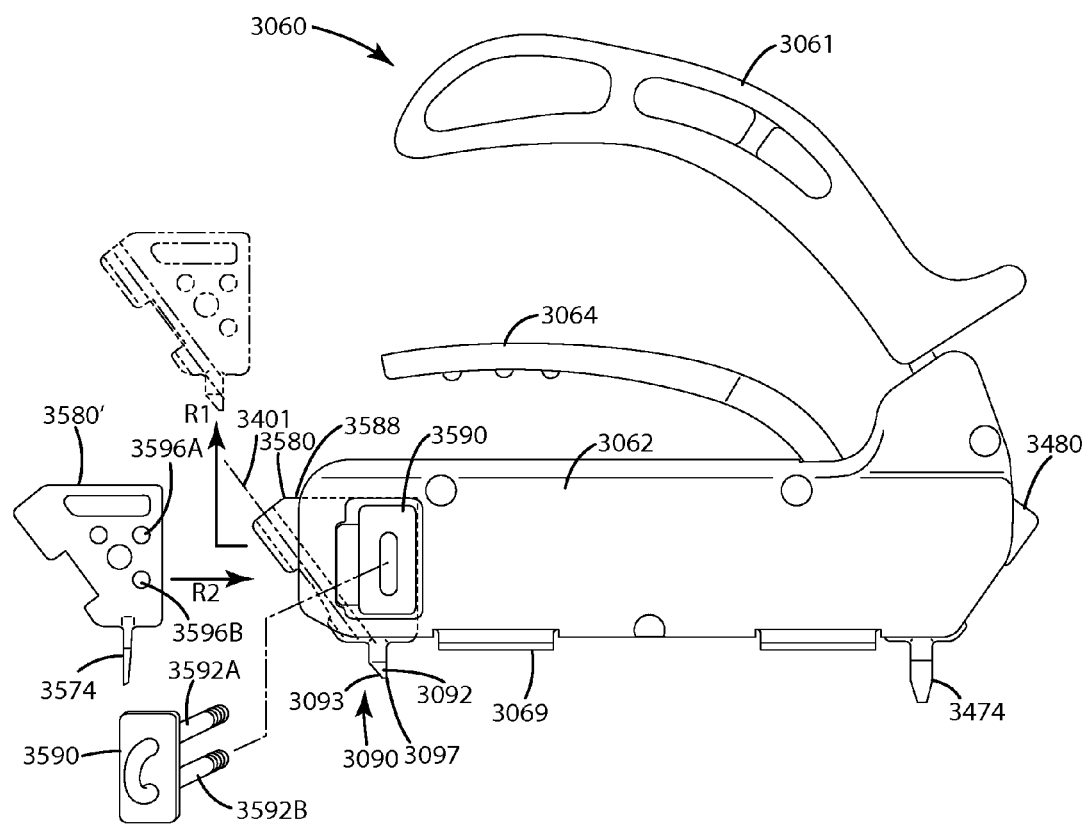
FIG. 53 is a side view of a seventh alternative embodiment of the fastener installation tool, illustrating replaceable alignment guides and an adjustment mechanism.

For example, as shown in FIG. 53, the installation tool 3060 includes a frame 3062 including a handle 3061 and first and second guides 3480 and 3580 at opposite ends of the frame. The installation tool can include a secondary handle 3064 that can move the guide 3580 similar to that in the second alternative embodiment above, shown in FIGS. 27-30, to provide a clamping effect on a board located adjacent the tool, for example, to clamp the board between a spacer and an alignment projection as described below.

The guide 3480 and respective spacer 3474 can be similar to the guide 480 and spacer 474 shown in figures of the second alternative embodiment. The opposing guide 3580 can generally be similar to the guide 580 in that embodiment as well with several distinctions. For example, instead of including a spacer 3574, the guide 3580 can include an alignment projection 3090. This alignment projection can include an inner engagement surface 3092 and an opposing outer engagement surface 3093 that are structured and function generally the same as that of the sixth alternative embodiment above. Indeed, the geometric configurations and angles between these respective surfaces can be identical to that of the sixth alternative embodiment described above if desired. For example, the inner engagement surface 3092 can define an opening through which a fastener exits to enter a board. That surface 3092 can be substantially planar and can be on the opposite side of the alignment projection 3090 from the other substantially planar outer engagement surface 3093. The two engagement surfaces can be joined and transition to one another via the terminal end 3097. As shown, this terminal end 3097 can also have the same function and configurations as those of the terminal end of the sixth alternative embodiment.

Optionally, all of the descriptions and features of the alignment projection in this embodiment, and its orientation, as well as its engagement with different features of shrinkable boards and/or work pieces are the same as those of the alignment projection of the sixth alternative embodiment of the installation tool 3060.

The installation tool 3060 as shown in FIG. 53 can also include an adjustment mechanism 3590 similar to that described in connection with the second alternative tool embodiment above. For example, the first adjustment mechanism 3590 can include stopper pins 3592A and 3592B. These respective stopper pins can be inserted through respective stopper pin holes 3596A and 35968 of a guide to hold the guide in place. As with the embodiments above, the guide 3580 can be removed and/or replaced for service or change out of the alignment projection 3090 for a spacer 3574. The spacer, unlike the alignment projection, can be configured to extend between the sides of boards and establish a gap therebetween as a fastener is installed using the installation tool 3060.

Optionally, the guides of the tool can be interchangeable so a first guide having a first alignment projection can be exchanged for a another guide having a differently shaped alignment projection or spacer that extends a different distance from the frame bottom surface than the first alignment projection. This can enable the same tool to be used with different types of boards, or to work in a particular manner to set particularly sized gaps or no gap between shrinkable boards upon installation.

Returning to FIG. 53, to remove or replace the guides, the adjustment mechanism 3590 can be removed from the guide 3580 by removing the stopper pins 3592A and 3592B from corresponding stopper pin holes of the guide. The guide is then removed in direction R1. The replacement guide 3580' can be replaced in the same position in the frame 3062 in direction R2. With the second guide 3580' in position, the respective stopper pins 3592A and 3592B can be installed so that they project through the stopper pin holes 3596A and 3596B. The adjustment mechanism 3590 can be resecured to the frame to hold the replaced second guide 3580' block in position relative to the frame 3062.

Figure 54:
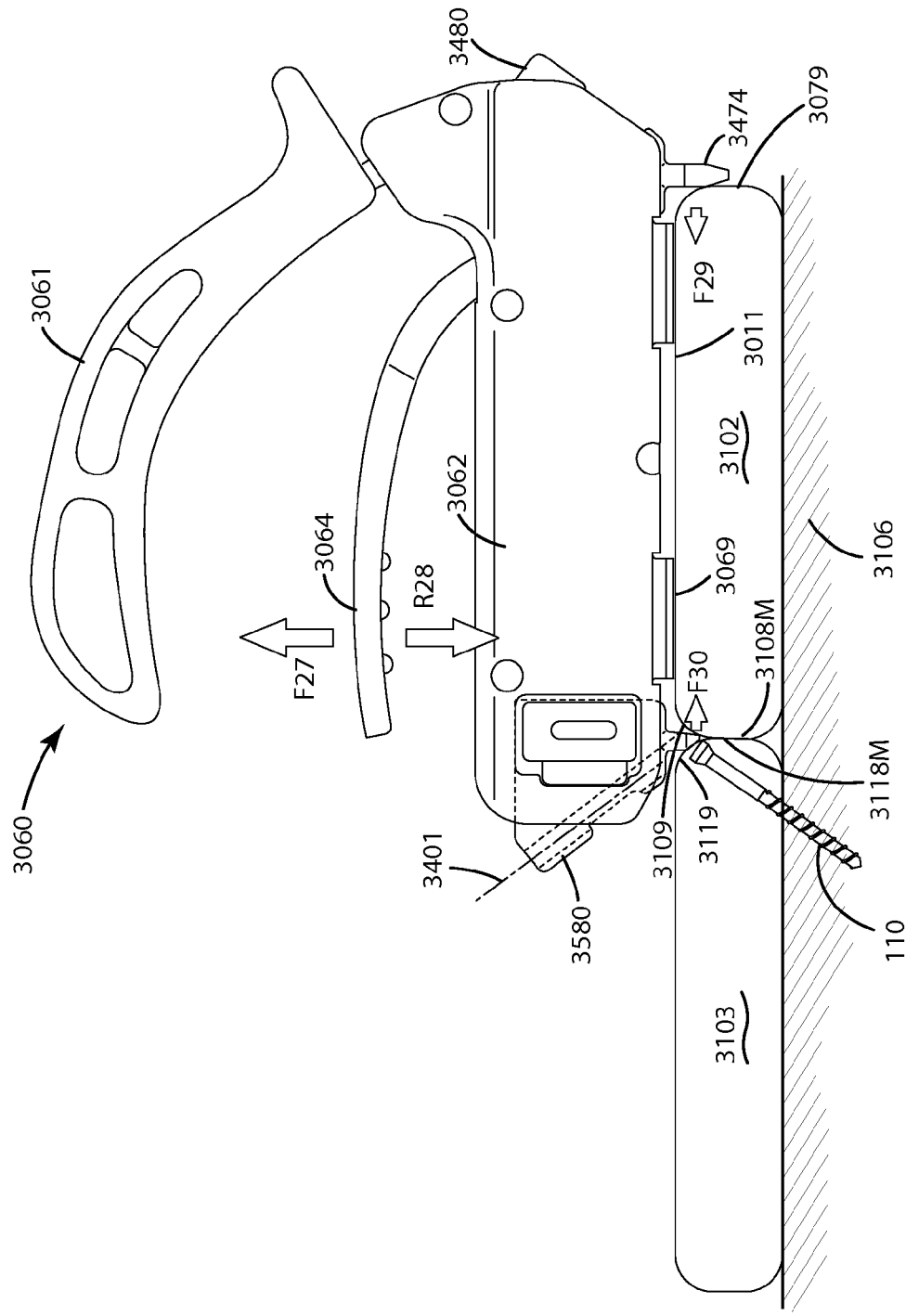
FIG. 54 is a side view of the seventh alternative embodiment of the fastener installation tool adjacent work pieces.

Operation of the installation tool 3060 in the seventh alternative embodiment will be described in more detail with reference to FIGS. 54-56. Generally, the installation and engagement of the alignment projection 3090 with the respective components of the boards is similar to that of the sixth alternative embodiment described above with a few exceptions. For example, as shown in FIG. 54, the installation tool 3060 is positioned over a second shrinkable board 3102 that is placed adjacent the first shrinkable board 3103, generally with no gap being located between the first and second shrinkable boards. The respective side surfaces 3118 and 3108 engage and abut one another and specifically, the middle portions 3108M and 3118M engage and abut one another so that substantially no gap is established between the side surfaces of the first and second shrinkable boards 3103 and 3102. Of course, where other types of boards are used, the same procedure for operating the installation tool can be implemented if appropriate.

As noted above, the tool 3060 is similar to that of the second alternative embodiment tool, so the alignment projection 3090 and spacer 3074 can be separated a distance by exerting a force counter to an internal bias member. This can be effected by pulling the second handle 3064 in direction F27. The alignment projection 3090 can be placed between the first corner 3119 of the first board 3103 and the second corner 3109 of the second board 3102, with the spacer 3474 positioned adjacent a third side 3079 of the second shrinkable board 3102. The bottom surface 3069 of the tool 3060 can rest on, or at least be adjacent, the upper surface 3011 of the second work piece 3102 as described in the sixth alternative embodiment above. The tool can be operated to release the handle in direction R28, which in turn enables the bias member to effect a clamping force via forces F29 exerted by spacer 3474 on the third side 3079 and F30 exerted by the alignment projection 3090 on the corner 3109 and/or side 3108.

Figure 55:
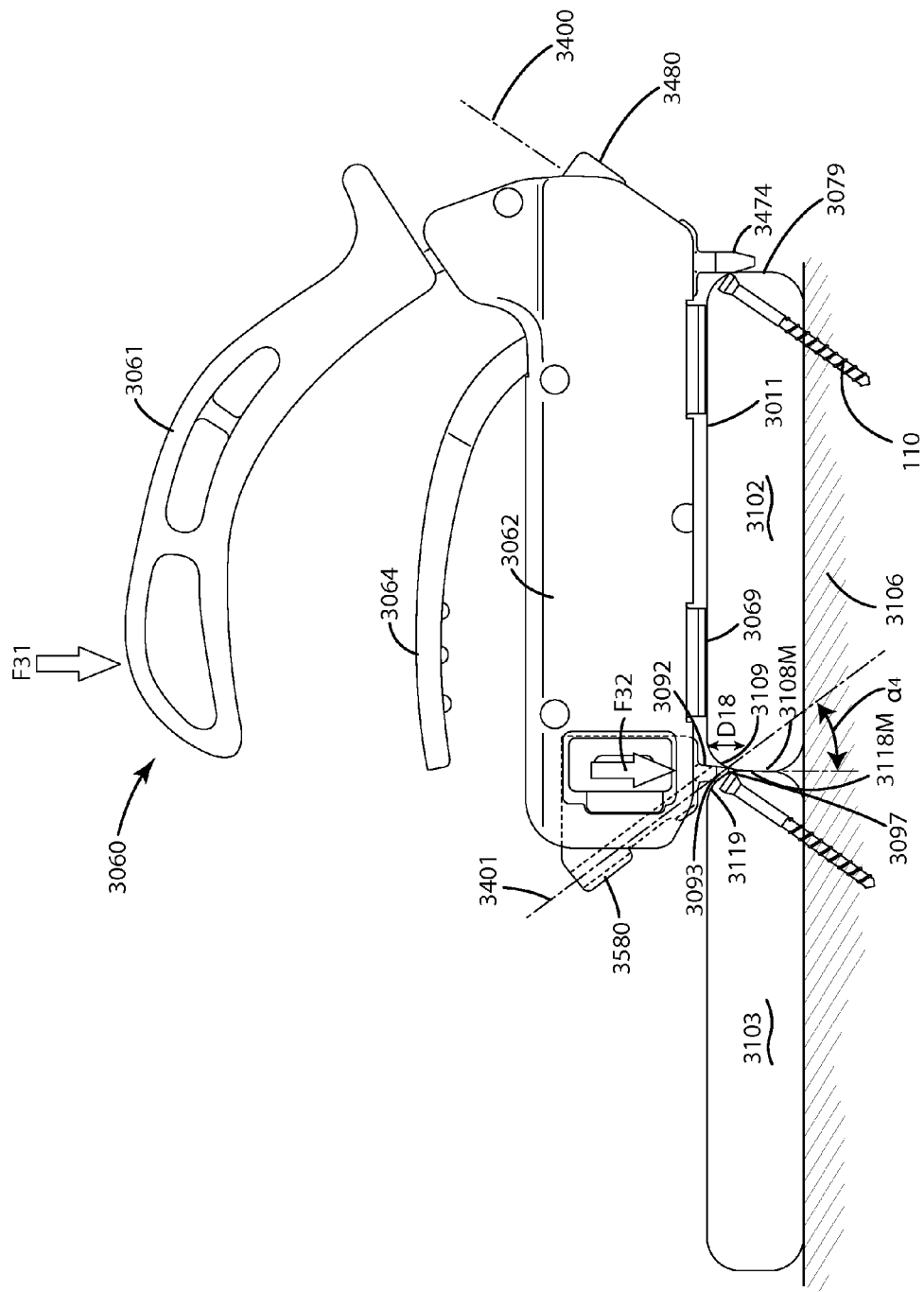
FIG. 55 is another side view of the seventh alternative embodiment of the fastener installation tool including a fastener installed through a corner or side surface of a work piece.
Figure 56:
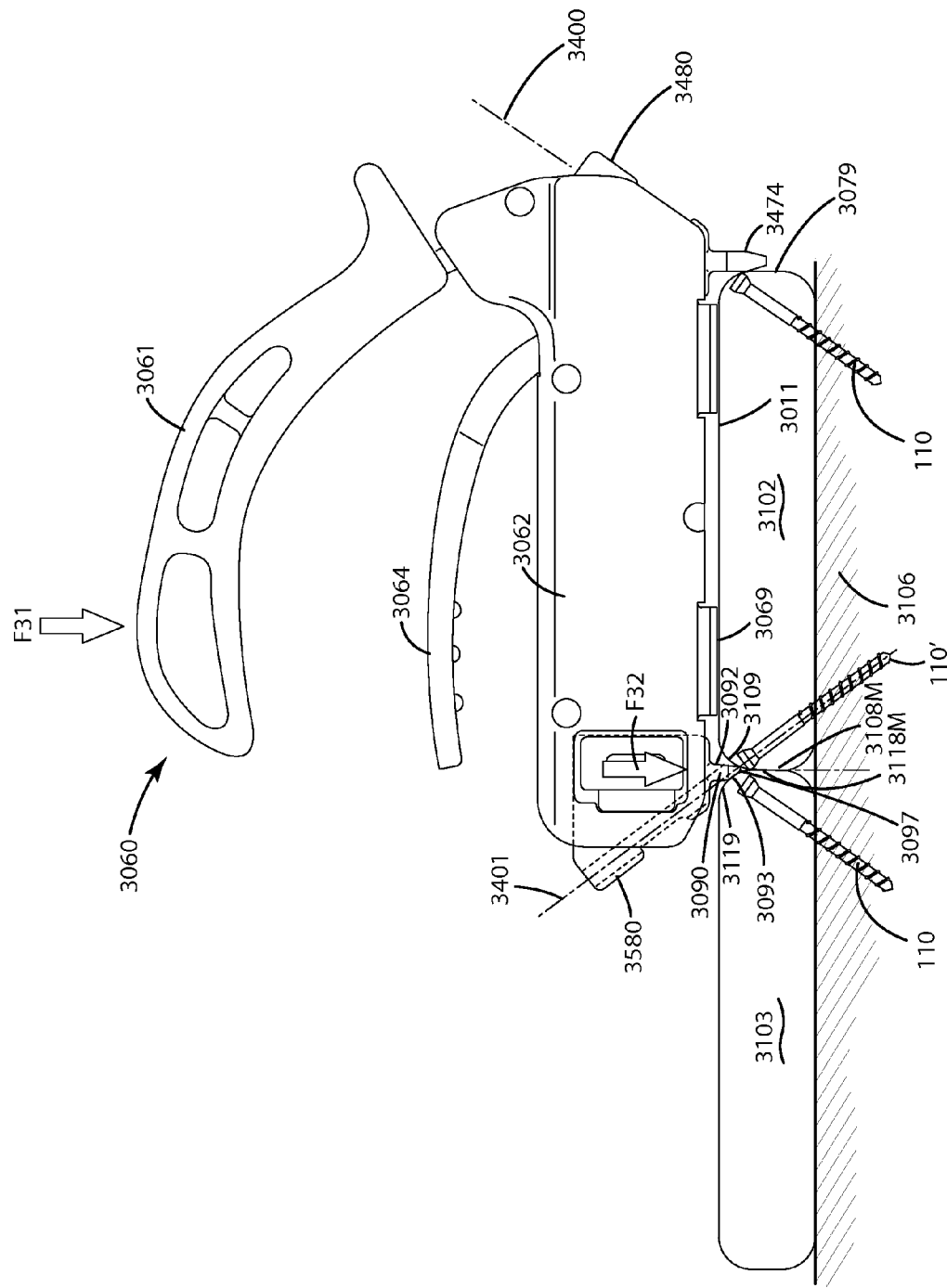
FIG. 56 is a yet another side view of the seventh alternative embodiment of the fastener installation tool with another fastener installed in another corner or side surface of the work piece.

With the tool clamped in place, as shown in FIG. 55, the fastener 110 can be installed in the guide 3480 and advanced along a bore axis 3400 into the side surface 3079 of the third opposing side of the second board 3102. The advancement can continue until the board 3102 is satisfactorily secured to the substrate 3106.

Optionally, the installation tool 3060 can then be adjusted by pulling again on the handle 3064 with force F27 to reduce the clamping forces on the board 3102, then pushing downward with force F31 as shown in FIG. 55 to further drive the alignment projection 3090 into the crevice or region between the first 3119 and second 3109 corner. This force can be translated to a more localized force F32 through the alignment projection, again to drive the projection into the crevice or region between the respective upper corners of the respective boards. This can be done to overcome any shifting in the tool while the fastener was driven into the third opposing side 3079. It also can be done to precisely engage the outer engagement surface 3093 against the first corner 3119, which in turn can set the appropriate depth D18 down the corner and/or sidewall at which the fastener will be advanced into the same. Generally, this adjustment can set the angle α4 at which the axis 3401 is set as well. Optionally, this angle can be the same as the angles α2 and α3 as discussed above.

With the outer engagement surface properly set and engaged with the corner 3119, and the alignment projection generally in position between the corners, the handle 3064 can be released to exert a clamping force on the second shrinkable board 3102 as described above. Another fastener 110' is installed in the second opposing guide 3580 and advanced generally along the longitudinal axis 3401 of the guide into the second opposing side 3108 and/or second corner 3109 of the second board 3102. As described above and with the sixth alternative embodiment, the depth of the screw and/or the height at which it is installed in the corner 3109 or side surface 3108 of the second shrinkable board 3102 can be established by virtue of the engagement of the outer engagement surface 3093 with the first corner 3119 of the first board 3103. Likewise, the respective angles of advancement can also be established in similar manners to that as the sixth alternative embodiment above.

During the advancement of the fastener 110' at an angle through the second shrinkable board, the first side surface 3118 and second side surface 3108 are maintained in contact with one another. Further, immediately after the advancing and installation of the fasteners, these side surfaces remain in contact with one another as with the sixth alternative embodiment above. After the fasteners are installed, the tool can be moved along the second shrinkable board 3102 to install another set of fasteners in a similar fashion. This process can be repeated along the entire length of the board until the board is satisfactorily joined with the substructure 3106.

XII. Eighth Alternative Tool and Method Embodiment

An eighth alternative embodiment of the fastener installation tool and related method is illustrated in FIGS. 57-79 and generally designated 4060. This embodiment, like the embodiments above can be well suited for use with shrinkable boards, or other types of boards as described herein. Moreover, this embodiment is also well suited for the types of fasteners in the embodiments described herein, as well as any other type of fasteners. For example, the tool can be used to advance the side angled fasteners 10, 110, 210, 310 at the respective advancement orientations and using the techniques herein, and/or conventional pointed-tip fasteners. The installation tool of the eighth alternative embodiment also is similar in construction and operation to the embodiments described above with several exceptions.

Figure 57:
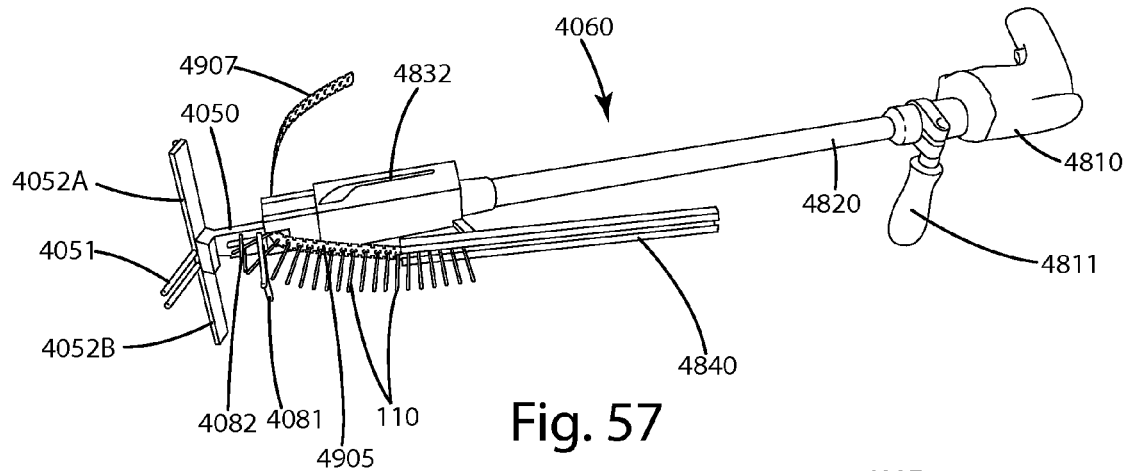
FIG. 57 is a perspective view of an eighth alternative embodiment of the fastener installation tool illustrating an automatic feed system, nose assembly and optional extension for stand-up use of the tool.
Figure 58:
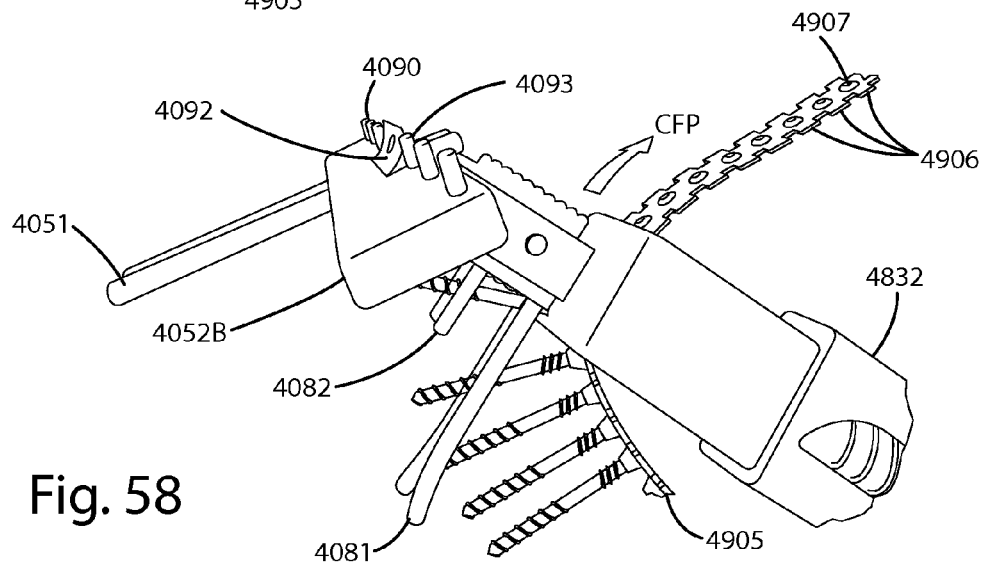
FIG. 58 is a side view of the nose assembly and a lateral foot of the eighth alternative embodiment of the fastener installation tool.
Figure 71:
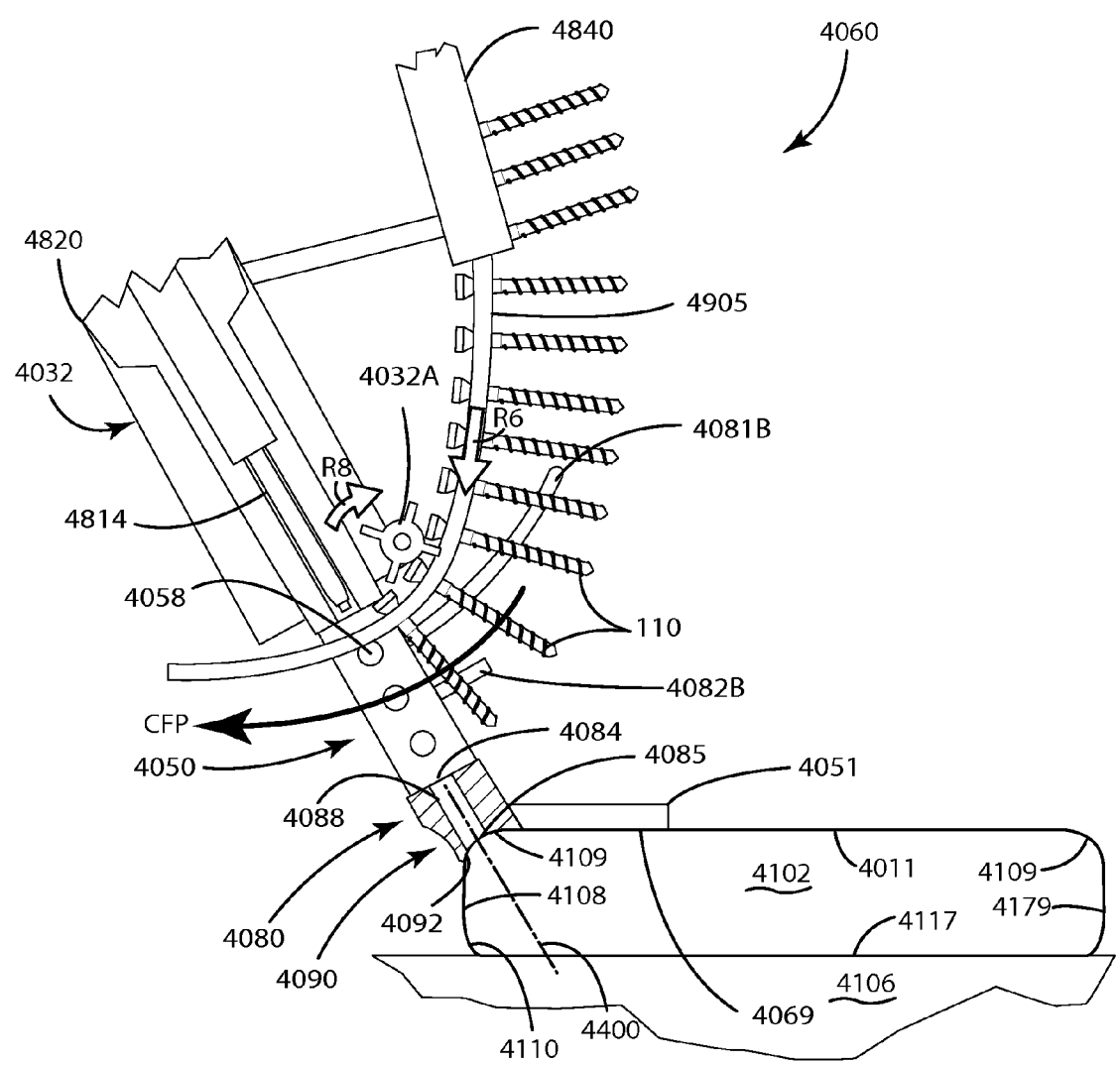
FIG. 71 is a side partial section view of the nose assembly of the eighth alternative embodiment of the fastener installation tool, illustrating the fastener about to enter the nose assembly opening, where the fastener is joined with a flexible strip of material holding other collated fasteners.
Figure 72:
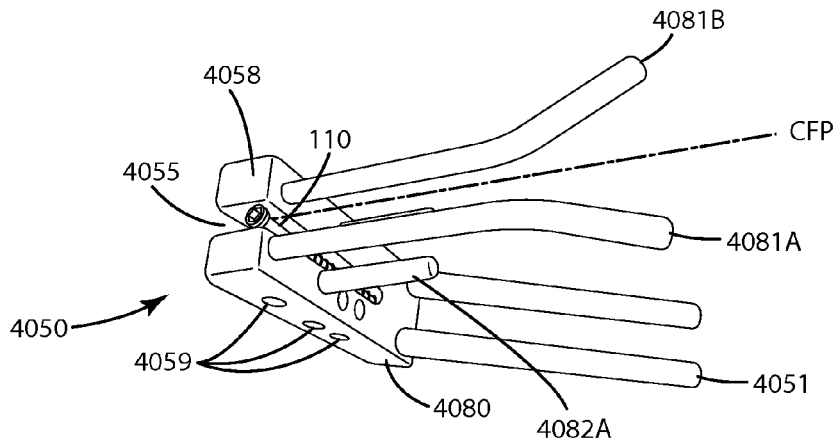
FIG. 72 is an upper perspective view of the nose assembly of the eighth alternative embodiment of the fastener installation tool, illustrating the fastener being aligned with an opening of an angled bore of a guide via magnetic elements.

For example, as shown in FIG. 57, the installation tool 4060 includes a driving tool 4810 joined with an optional extension 4820 which is further joined with a feed mechanism 4832 and a nose assembly 4850. The driving tool 4810 can be any of the driving tools described herein and can include or be associated with a drive element 4814 that extends from the driving tool 4810, optionally through the extension 4820, for engagement with fasteners of a collated strip 4905 in the nose assembly 4050. The drive element 4814, which as shown in FIG. 71, can be in the form of a chuck that engages drive features of the respective fasteners. Those drive features can be of the type described in connection with any of the fastener embodiments herein. The driving tool 4810 can be configured to exert a rotational force and rotate fasteners advanced by the tool 4060.

As shown in FIG. 57, the extension 4820 can be an elongated bar of tubular shape, optionally hollow and of virtually any geometric cross section. Generally, the extension can be of a length sufficient to enable a user of the installation tool 4060 to grasp the driving tool 4810 and stand upright while installing fasteners in a board at a lower level, for example, in a board that is at or near the user's feet or some other distance from the user's hands. The extension 4820 and/or driving tool 4810 can also include a torque handle 4811 which the user can grasp to prevent unwanted torque or rotation of the installation tool 4060 or its components during an advancing operation.

The installation tool 4060 can include a feed mechanism 4832 joined with the extension 4820, optionally at an end opposite the driving tool 4810. Of course, where the extension is not included, the feed mechanism can be joined directly with the driving tool 4810. The feed mechanism, also referred to as a feed, can be any conventional feed mechanism capable of sequentially advancing collated fasteners 4905 from a holder or container 4840 to the nose assembly 4846. One example of a suitable feed mechanism for collated fasteners, and an associated extension tool and driving tool, is a Grabber® Super Drive Model 05, 55 or 75 Series, commercially available from Grabber Construction Products, Inc. of Alpine, Utah. Another example is a Grip-Rite® collated screw gun attachment, which is commercially available from PrimeSource Building Products, Inc. of Irving, Tex. Yet another suitable feed mechanism that can be used in conjunction with the tool herein is the P13KUE auto feed tool, which is available from PAM Fastening Technology, Inc., of Charlotte, N.C.

Optionally, the feed mechanism can include one or more teeth or gears 4032A (FIG. 71) that engage the collated fasteners 4905 and advance them toward the nose assembly 4846. For example, the gear 4032A can engage one or more slots 4906 (FIG. 58) defined by a strip of material 4907 included in the collated fasteners 4905. The feed mechanism 4832 can rotate the gear when a user pushes the driving tool 4810 in a downward motion, or some other motion depending on the feed, thereby engaging the slots and advancing the collated fasteners 4905 toward and/or through the nose assembly 4050.

The feed mechanism 4032 can include a collated fastener holder 4840. Although shown as an elongated channel member that engages the collated fastener strip, the holder 4840 can be in the form of a drum to hold a coil of collated fasteners or virtually any other configuration. Generally, the collated fastener holder 4840 is supported by a bracket extending forward of the feed. Although shown supporting the collated fasteners forward of the feed, the holder 4840 could alternatively support a supply of collated fasteners rearward of the feed 4832 and/or nose assembly 4050, or off to a side, laterally displaced from the feed 4832 and/or nose assembly 4050. Further, in some cases where a large supply of fasteners are not desired, the holder can be absent altogether from the tool, with a short strip of collated fasteners being fed through the nose assembly.

The collated fasteners 4905, as mentioned above and optionally used in the illustrated embodiment, can include a strip of material 4907. The material can be flexible, but sufficiently rigid to engage the head or other portion of fasteners associated with the strip. The material can be constructed from polymers, metals, composites, fabric, tape or any other structure capable of joining multiple fasteners side-by-side adjacent one another in a sequential orientation. One suitable strip of material is a Grip-Rite® flexible strip for collated screws, commercially available from PrimeSource Building Products, Inc. of Irving, Tex.

In the embodiments herein, the strip of material used to hold the collated fasteners is of a flexible nature so that it can generally bend and/or flex both along its longitudinal axis, that is, along its length, and transverse to its axis, that is, across its width, without significant force being applied to provide the bending or flexing. When attached to the strip, the heads of the fasteners are generally uniformly spaced from one another, but at a small distance, for example about 1 mm to about 10 mm, optionally about 2 mm to about 6 mm, due to the small size of the heads optionally described in the embodiments above. Due to the flexible nature of the strip, however, the tips of the fasteners joined with the strip can tend to be non-uniformly spaced. For example, the distances between the tips of adjacent fasteners on the strip 4907 can sometimes be located immediately adjacent and contact one another, while other adjacent fasteners can be significantly spaced, for example, double or triple the space between the heads of the same fasteners. Because of this inconsistent spacing between tips of fasteners, the nose assembly and respective features of the installation tool of the current embodiments are helpful in aligning the fasteners for precise installation into the corner and/or side surface of a board or other work piece as described below.

Turning now to FIGS. 58-61, the nose assembly 4050 will now be described. Generally, the nose assembly 4050 includes an attachment bracket 4053 that attaches the nose assembly 4050 to the feed mechanism 4832, extension 4820 and/or driving tool 4810. The nose assembly 4050 also includes a guide 4080 which is similar in structure and function to any of the guides described herein and includes many of the same features. The guide 4080 can include or be joined with an alignment projection 4090, which can be similar in structure and function to any of the alignment projections described herein. The nose assembly 4050 can include one or more engagement feet 4051 that extend forwardly of the tool. These engagement feet can help establish a predetermined angle between the guide and its respective features, for example, an angled bore 4088, and a side surface and/or corner of a board as described below. The nose assembly also can have joined with it one or more lateral feet 4052A and 4052B which can be used to engage a portion of a board and push it against another board or otherwise stabilize the nose assembly when advancing a fastener into a board with an installation tool.

The above respective components of the nose assembly 4050 will now be described in further detail. Beginning with the bracket 4053, it generally joins the nose assembly 4050 to the feed mechanism 4832 and/or other portion of the installation tool. This bracket, shown in FIGS. 60, 62 and 64, can be of an elongated configuration and can actually be a stock portion of a commercially available installation tool, for example, the Grip-Rite® screw gun attachment as described above. The bracket 4053 can define a slot that allows for adjustment for the length of particular fasteners used in conjunction with the nose assembly 4050. The slot can be demarcated to indicate particular screw lengths and/or drive depths, depending on a particular application. The bracket 4053 can be fastened or otherwise joined with the nose assembly 4050 using fasteners 4053A. The nose assembly itself can include multiple threaded bores into which the fasteners 4053A can be threaded to join the nose assembly to the bracket 4053. Although shown being attached with a bracket, the nose assembly 4050 can be integrally formed with the feed 4832 or other component of the extension or driving tool, depending on the particular application.

The nose assembly 4050 also includes a guide 4080. As mentioned above, this guide can be of any of the guide constructions described herein, and can define a longitudinal angled bore axis 4400 (FIG. 71). This longitudinal angled bore axis 4400 extends along the length of the guide 4080, generally through the angled bore 4088 defined by the guide and a portion of the alignment projection 4090. As with the other embodiments herein, the angled bore 4088 can be configured to accommodate and constrain a rotating fastener, and can extend from a first opening 4084 to a second opening 4085. The first opening 4084 can be configured to receive a fastener, for example, fasteners 10, 110, 210, 310 or any other fastener herein. The second opening 4085 can serve as an exit opening through which the fastener exit the guide and/or alignment projection as it advances and/or work piece. Optionally, the guide 4080 can also be configured to include a material ejection port (not shown) in communication with the angled bore 4088 as described in any of the embodiments above.

The angled bore 4088 can be defined within the guide and/or alignment projection so that it is oriented at a non-orthogonal angle, relative to the upper surface and/or side surface of the respective board when the tool is readied for advancing a fastener into that board. The precise angle at which the angled bore 4088 and longitudinal axis 4400 is set can be the same angles as described in connection with other embodiments herein in connection with the angled bore guide and/or longitudinal axis.

Figure 74:
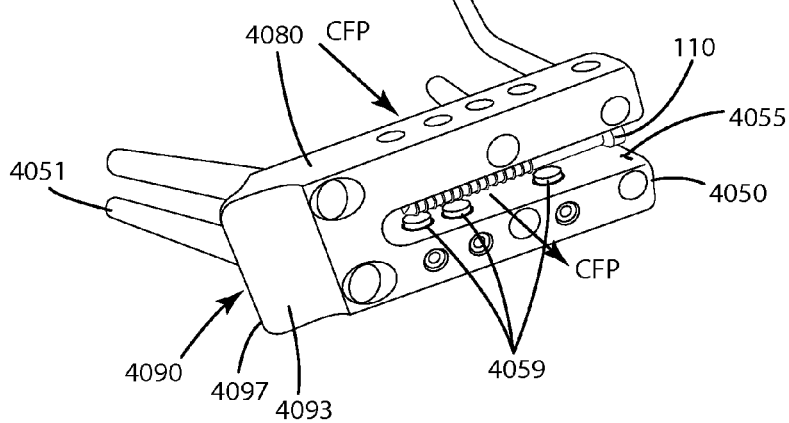
FIG. 74 is a rear view thereof.
Figure 75:
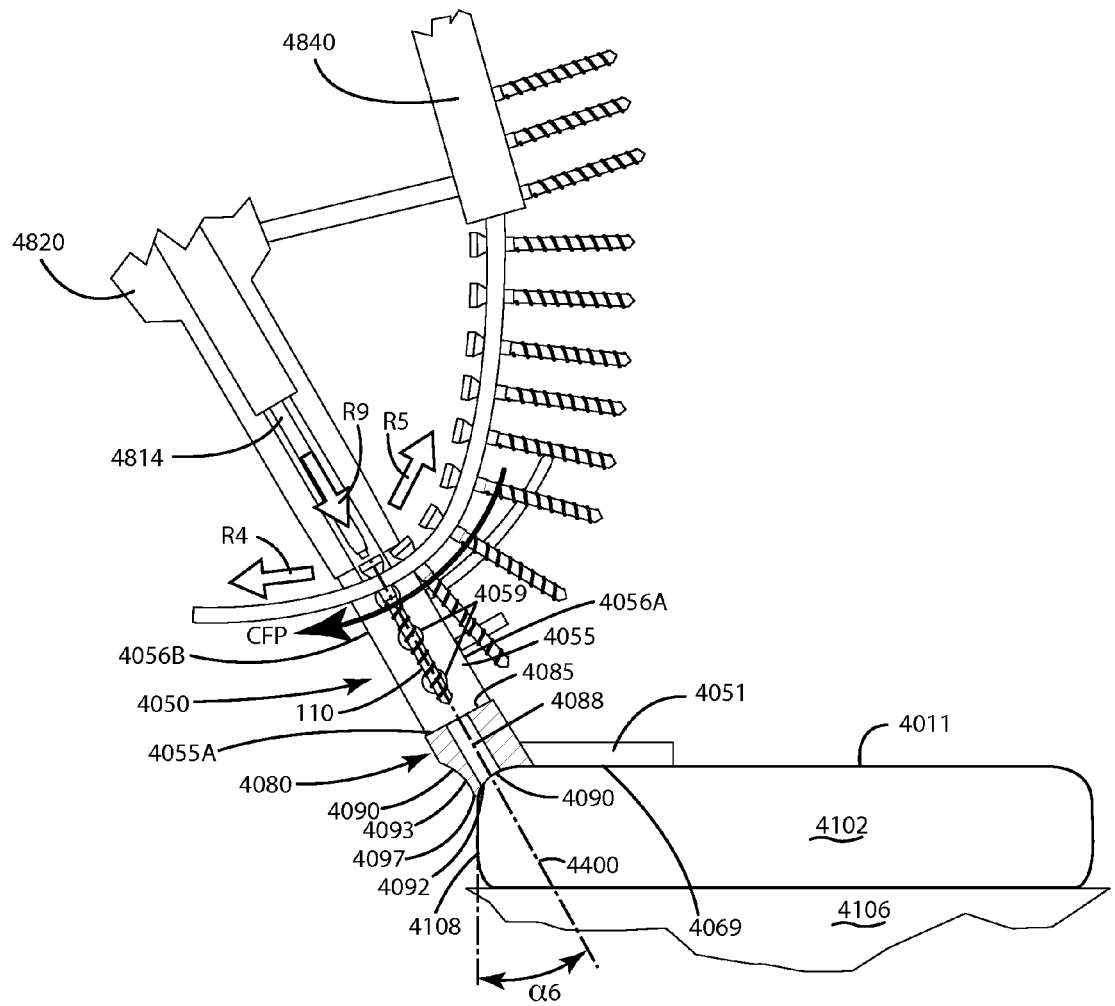
FIG. 75 is a side partial sectional view of the eighth alternative embodiment of the fastener installation tool, with the fastener aligned with the angled bore of the guide for advancement into the angled bore.
Figure 76:
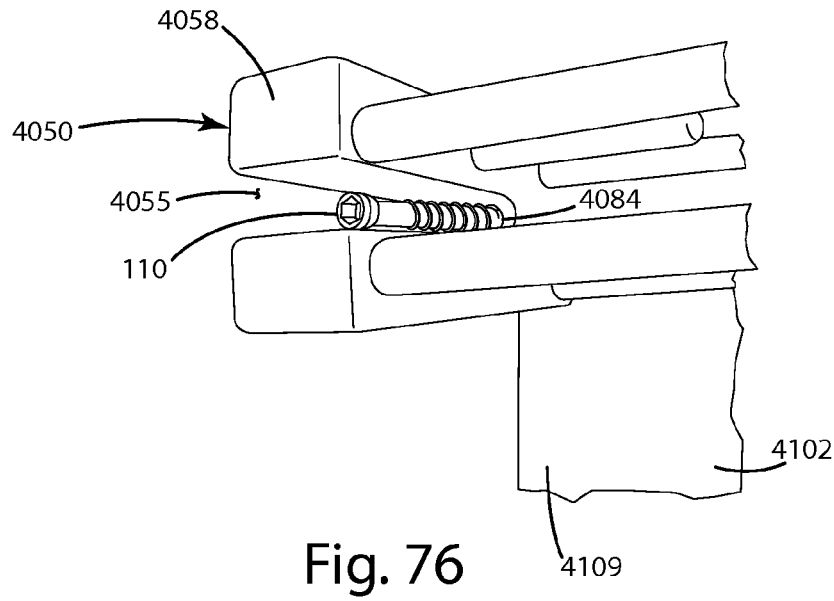
FIG. 76 is a perspective view of the eighth alternative embodiment of the fastener installation tool, with the fastener entering the angled bore of the guide.

The guide 4080 can include or otherwise be joined with an alignment projection 4090 extending downwardly from the guide 4080 and/or nose assembly 4050. The alignment projection 4090, as shown in FIGS. 64, 74 and 75, can generally extend downwardly from the guide and/or nose assembly a preselected distance. For example, the alignment projection 4090 can project about ¹⁄₃₂ inch to about ¾ inch, further optionally about ⅛ inch to about ¼ inch from the bottom 4069 of the nose assembly 4050. The precise distance which it extends downwardly can vary depending on the particular board with which the tool 4060 is used. For example, when the tool 4060 is used in conjunction with boards that generally abut one another, the preselected distance from which the alignment projection 4090 extends from the outer surface 4069 can be selected so that the projection at least partially fits between opposing corners or surfaces of adjacent boards, for example, within the crevice between those corners, generally above the side surfaces of those boards.

Optionally, although not shown, the alignment projection 4090 can optionally extend a distance below the guide 4080 and/or bottom surface 4069, such that the alignment projection 4090 can function as a spacer to establish a gap between boards positioned adjacent one another. The alignment projection in such a construction can generally extend downwardly from the guide and/or bottom surface about ½ inch to 1 inch in such construction.

The alignment projection 4090 can include an inner engagement surface 4092 which is oppositely disposed from an outer engagement surface 4093. These inner and outer engagement surfaces can merge together at a terminal end 4097, and form a wedge or generally triangularly shaped projection extending downwardly from the guide.

Figure 59:
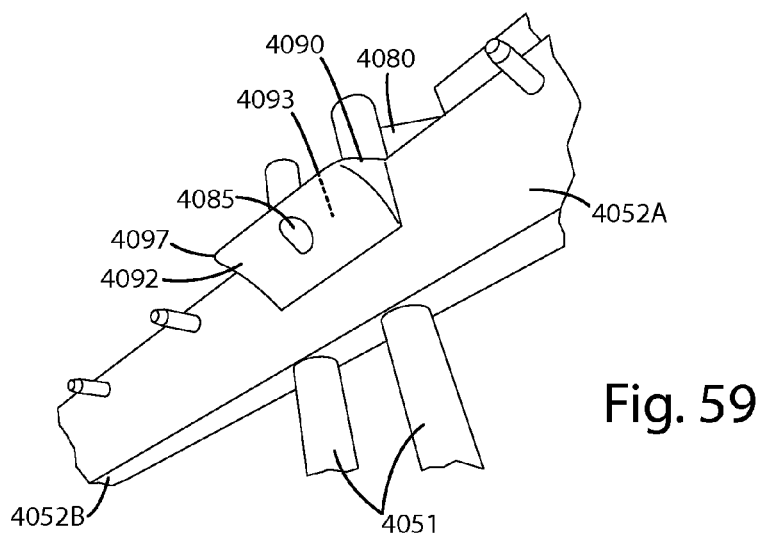
FIG. 59 is a bottom view of the nose assembly and lateral foot of the eighth alternative embodiment of the fastener installation tool.
Figure 60:
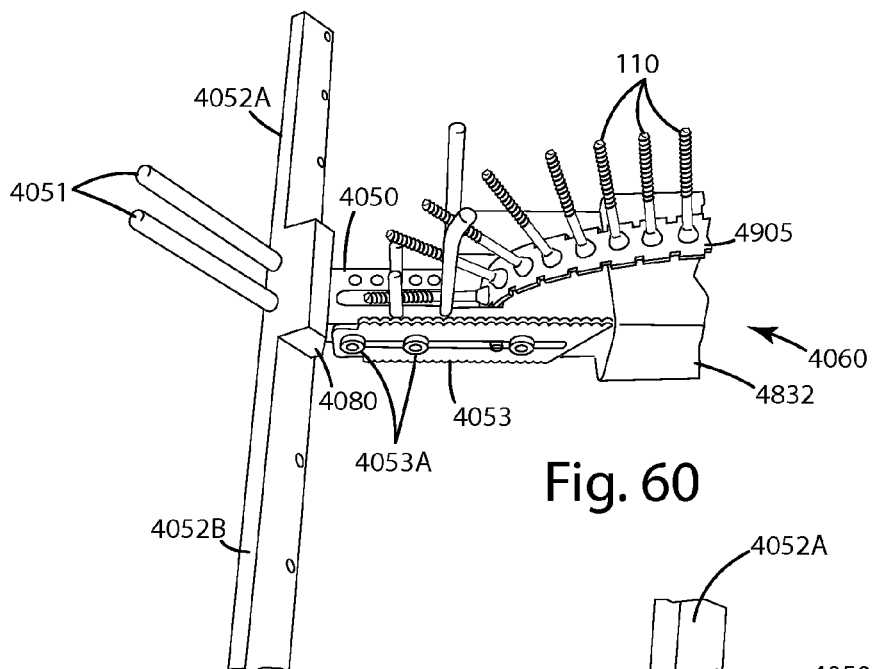
FIG. 60 is another perspective view of the nose assembly and lateral foot of the eighth alternative embodiment of the fastener installation tool.
Figure 61:
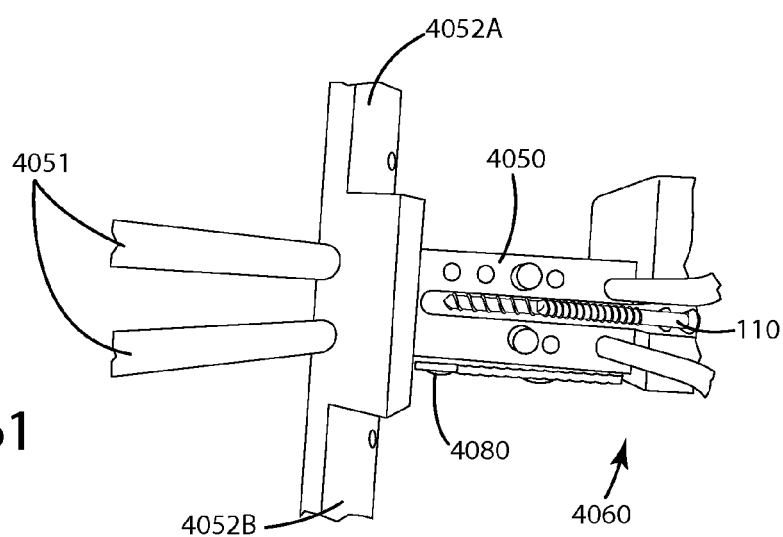
FIG. 61 is a front view of the nose assembly of the eighth alternative embodiment of the fastener installation tool.

The alignment projection 4090 can be of the shape, construction and can operate similarly to any of the alignment projections of the embodiments described herein. For example, the alignment projection can be in the shape of a triangle, having a generally rounded, downwardly projecting terminal end 4097. The alignment projection can be in the form of a wedge shape as shown, with each of the respective outer and inner engagement surfaces being planar, curved convexly, curved concavely, rounded, bulged or otherwise formed. As shown in FIGS. 59 and 64, the inner engagement surface 4092 can be concavely shaped so the inner engagement surface 4092 can engage a rounded corner 4109 of a board 4102. The opposing outer engagement surface 4093 can generally be of a planar configuration as shown, but of course, it also can be concavely configured as well, or of any of the other configurations noted herein.

The inner engagement surface 4092 can transition to a bottom surface 4069 of the installation tool 4060, which can form a bottom surface 4069 of the nose assembly 4050. This bottom surface can also effectively be the bottom surface of the engagement foot 4051. Like the other embodiments herein, the inner engagement surface can transition to the bottom surface along a radius or fillet, without forming a portion of the bottom surface 4069.

Where the inner engagement surface 4092 and outer engagement surface 4093 transition to one another, a terminal end 4097 of the alignment projection 4090 can be formed. The terminal end, as with the other embodiments herein, can be rounded and/or curved, when viewed from a side view as illustrated so that it is not mar, gouge or otherwise damage the boards which the end contacts. Optionally, the terminal end can include a radius between about 0.1 mm to about 50 mm and further optionally about 1 mm to about 20 mm, and even further optionally about 2 mm to about 10 mm or other radii as desired. Further optionally, the terminal end can include multiple compound radii or angled intersecting portions to provide a rounded construction.

As with the other embodiments herein, the precise angle between the inner and outer engagement surface is 4092 and 4093 as well as the angle of the longitudinal axis 4400 relative to one or both of the engagement surfaces can be selected based on the desired location at which the fastener will engage and advance into the corner and/or side surface of the board. The angle between the inner and outer engagement surfaces can vary, optionally from about 10 degrees to about 90 degrees; further optionally about 35 degrees to about 65 degrees; even further optionally about 40 degrees to about 50 degrees or other angles depending on the particular application. These surfaces can be non-parallel with one another if desired. Generally, inner engagement surface 4092 and/or rounded or curved terminal end 4097 can be configured to engage the corner of the board and/or side surface on which the bottom surface 4069 of the nose assembly 4050 and/or engagement foot 4051 rests or is immediately adjacent or near when the tool 4060 is positioned atop of the board for installing the fastener.

As shown in FIGS. 71 and 75, the inner engagement surface 4092 can be configured to directly engage the upper corner 4109 and/or side surface 4108 of the board 4102. Generally, the inner engagement surface 4092 can be concavely contoured so as to engage the corner and/or side surface of the board so as to align the angle bore 4400 with the board side surface at a preselected angle ∀6. This angle ∀6 optionally can be about 30 degrees to about 80 degrees; further optionally about 40 degrees to about 70 degrees; and even further optionally about 45 degrees to about 50 degrees or other angles depending on the precise configuration of the corner 4109 and the side surface 4108. Of course, the inner engagement surface 4092 can be at a particular orientation relative to the bottom surface 4069 to assist in establishing the angle of the bore 4400 relative to the side surface 4108 and/or upper surface 4011 of the board 4102 as well.

Referring to FIGS. 59-64, the nose assembly 4050 can include an optional engagement foot 4051 which extends forwardly from the nose assembly 4050 and the lateral foot portions 4052A and 4052B. This engagement foot 4051 can extend forwardly a preselected distance from the nose assembly. For example, it can extend generally about 2 inches to about 8 inches, 3 inches to about 6 inches and further optionally about 5 inches from the forward portion of the nose assembly 4050.

As shown, the engagement foot 4051 can include two generally parallel bars that extend forwardly from the nose assembly. Although shown as bars, these elements can be combined into a unitary solid, flat structure that extends forwardly from the nose assembly 4050. The engagement foot 4051 can include a bottom or lower surface 4069. This surface 4069 as shown is generally planar. The surface 4069 can function to engage the upper surface 4011 of the board 4102, and provide a stop to forward tilting action of the tool 4060 when being engaged against a board by a user. Generally, the bottom surface 4069 engagement with the board upper surface 4011 also can assist in establishing the angle ∀6 (FIG. 75) between the longitudinal axis 4400 and the side surface 4108 of the board 4102.

Figure 62:
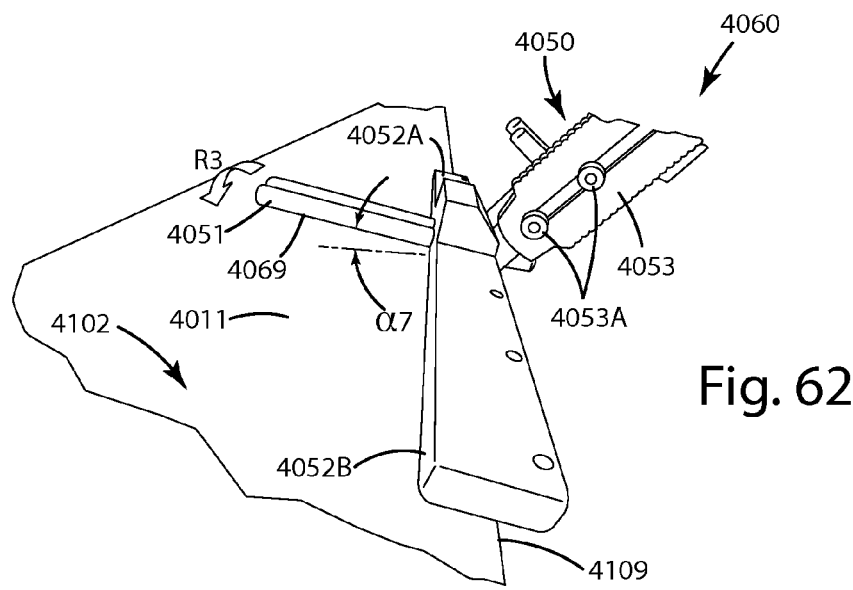
FIG. 62 is a first side view of the eighth alternative embodiment of the fastener installation tool with the nose assembly, having a front engagement foot, preliminarily engaging a corner of a board.

In operation, the engagement foot 4051 can facilitate the proper alignment of the angled bore 4400 and thus advancement of a fastener into the corner and/or side surface of the board. For example, as shown in FIGS. 62-64, when the nose assembly 4050 is initially positioned adjacent the board 4102 and in particular the corner 4109 of the board, the alignment projection 4090 engages the side surface and/or corner of the board. Upon this initial engagement, the laterally extending feet 4052A, 4052B, and more particularly, the downwardly extending projections 4054 also may engage the corner 4109 and/or side surface 4108 of the board. The forwardly extending foot 4051, however, may be tilted upon initial engagement so that the bottom surface 4069 is at an angle ∀7 (FIG. 62) relative to the upper surface 4011 of the board 4102. When disposed at this angle, the longitudinal axis 4400 of the bore is likely offset from the preselected angle ∀6 described above.

To establish the desired angle ∀6, a user forwardly tilts the tool 4060 which in turn causes the forwardly extending foot 4052 to rotate downwardly in direction R3 as shown in FIG. 62. This downward rotation of the foot 4051 continues until the bottom surface 4069 of the foot engages the upper surface 4011 of the board 4102. Upon this engagement, the longitudinal axis and bore are generally established at the desired angle ∀6 as shown in FIG. 75. Generally, the engagement foot assists in consistently and accurately establishing the desired trajectory of the fastener, and more particularly, establishing the desired angle ∀6 of the longitudinal axis 4400 relative to the side surface of the board so that the fastener penetrates the board at the desired location and depth, and through the board a sufficient amount.

The optional lateral foot or feet 4052A, 4052B of the nose assembly 4050 can extend to the left, to the right or to the left and right laterally from the nose assembly 4050 a preselected distance. For example, although shown as extending laterally from opposite sides of the nose assembly 4050, the laterally extending feet 4052A, 4052B can extend from a single side of the nose assembly as desired. The lateral feet, as shown in FIGS. 63 and 64, can align with the upper corner 4109 of the board 4102 when the guide 4080, and more particularly, when the alignment projection 4090 or inner engagement surface 4092 is engaged against the corner 4109 and/or side 4108 of the board 4102. Generally, the lateral feet 4052A, 4052B extend slightly over the upper surface 4011 of the board, but of course, can be reduced in size so that they do not extend over the upper surface 4011.

The lateral feet can include one or more downwardly extending projections 4054 that extend downwardly a preselected distance that is optionally less than or able to the preselected distance which the alignment projection 4090 extends downwardly from the guide 4080 and/or nose assembly 4052. These downwardly extending projections, although shown as separate and independent elements, can be in the form of a single monolithic structure that extends downwardly from the lateral feet 4052A, 4052B. These elements can extend downwardly from the laterally extending foot at a preselected distance away from the alignment projection 4090. Of course, these downwardly extending projections 4054 can form a portion of the alignment projection and can extend laterally directly from that projection.

Optionally, these downwardly extending projections 4054 can, in operation, engage the corner 4109 and/or side surface 4108 of the board. For example, a user can place their foot upon the upper surface of one or both of the feet 4052A, 4052B and push against the lateral foot, generally in the direction F34 shown in FIG. 63. With this force, the downwardly extending projections 4054 engage the corner 4109 and/or side 4108 of the board. The force F34 thus translates to the board 4102. This can be helpful where the board is bowed and it is desired to use the force F34 to push the board 4102 in a desired direction to take the bow out of the board and simultaneously fasten the board down to a substructure so that the board remains in its straightened or other configuration.

The alignment projection 4090, and where included the downwardly extending projections 4054 can extend downwardly a preselected distance a sufficient amount to enable a user to engage and push against an outside corner 4109 and/or side surface 4108 of a board with a desired force either to straighten a bow in the board or push the board against yet another board. The alignment projection 4090 and downwardly extending projections 4054 can also be of the above noted preselected distance for the alignment guide, which is small enough so that the alignment projection and/or projections 4054 can fit within the crevice between adjacent corners of boards that are placed immediately adjacent one another; even where the boards are placed so close together that there is no gap established between the respective side surfaces of the adjacent boards.

Figure 65:
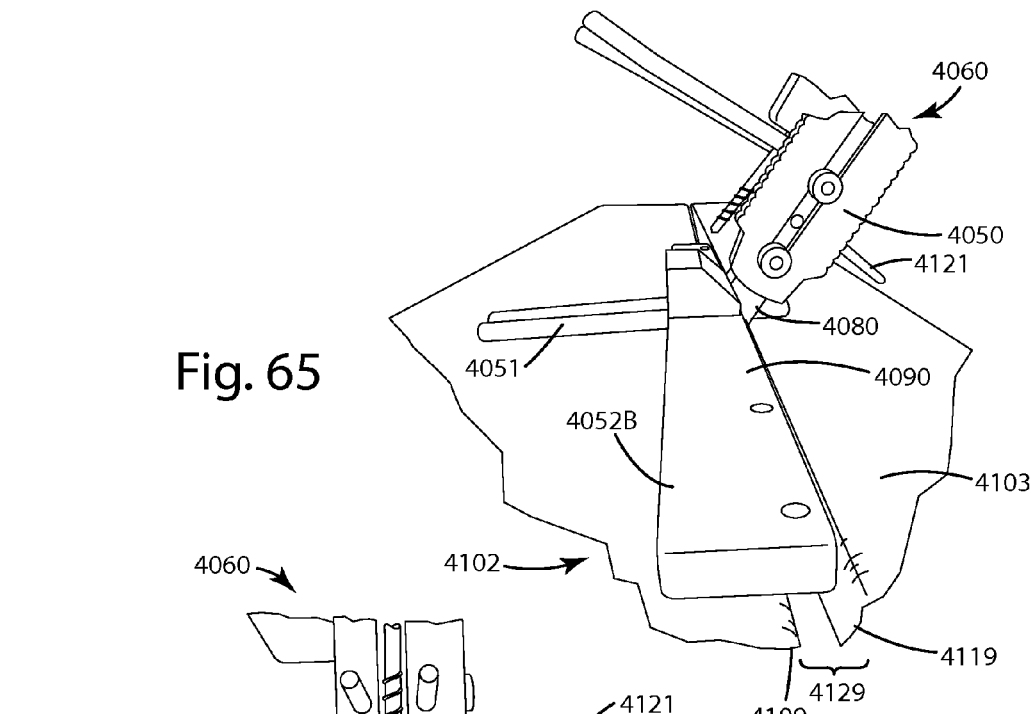
FIG. 65 is another side view of the eighth alternative embodiment of the fastener installation tool with the nose assembly being positioned adjacent first and second boards, generally with the alignment projection wedged between those boards.

Specifically, as shown in FIG. 65, the alignment projection 4090 and downwardly extending projections 4054 associated with the feet 4052A, 4052B can be sufficiently small so that they fit between the respective corners 4109, 4119 of the boards 4102, 4103 respectively. Accordingly, the alignment projection 4090 and the downwardly extending projection 4054 effectively fit within the crevice 4129 defined between the respective corners 4109 and 4119. The alignment projection and downwardly extending projections as shown, however, do not operate to form or establish a gap between the side surfaces of the respective boards 4102, 4103 as described in connection with the embodiments above.

Figure 66:
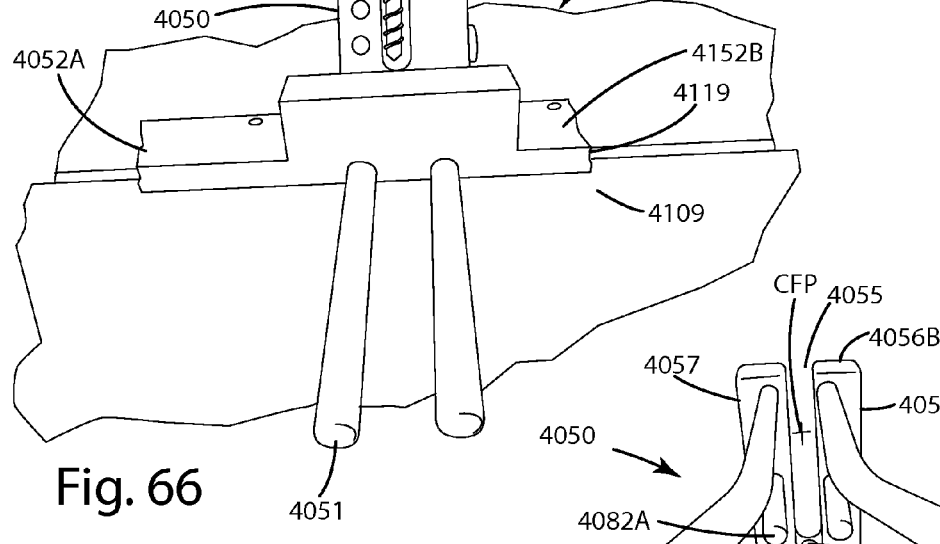
FIG. 66 is a front view of the nose assembly of the eighth alternative embodiment of the fastener installation tool with the nose assembly engaging adjacent first and second boards.

With this construction of the alignment projection and the projections where included, the installation tool 4060 can be used to first push a board 4103 against another board 4102, fasten down an outside, upper corner of 4121 of board 4103 as shown in FIGS. 65, 66. In doing so, the user can ensure that the board 4103 is abutted against the other board 4102 with substantially no gap formed therebetween, and only a crevice 4129 between the adjacent upper corners of the boards. After tacking that corner 4121 and its respective side of the board 4103 down to a substrate, the user can then place the tool 4060 with the alignment projection 4090 and optional downwardly extending projections 4054 in the crevice 4129. The user can then fasten down the opposite side of the board through the corner 4119 to the substrate. This can yield a clean, finished appearance with the fasteners generally hidden from view within the crevices between boards as described in the embodiments above.

The other features of the nose assembly 4050 will now be described with further reference to FIGS. 67-74. In those figures, the nose assembly 4050 has been removed from the bracket 4053, and generally the feed 4032, so that all that is visible is the nose assembly 4050 itself. In addition to the guide 4080 and the alignment projection 4090 described above, the nose assembly 4050 defines a nose assembly opening 4055. This opening 4055 generally extends from the forward surface or supply side surface 4056A to an rearward surface or exit side surface 4056B of the nose assembly. Although referred to as "side surfaces," the supply side surface or exit side surface can be located on the front and rear, or the opposing lateral sides, of the nose assembly as desired in a particular application.

The nose assembly opening 4055 can be of a sufficient size so that the respective fasteners 110 used in conjunction with the installation tool 4060 in general can pass with their full lengths from head to tip through the opening 4055. The opening 4055 can be configured as a slot that extends generally vertically through the nose assembly 4050. The slot can generally be aligned parallel to the collated fastener path CFP, for example as shown in FIGS. 67 and 75.

Optionally, the nose assembly opening 4055 can extend completely through the nose assembly 4050 from the supply side surface 4056A to the exit side surface 4056B along the collated fastener path CFP. This can be helpful in some circumstances. For example, if there is a malfunction with the tool 4060, such as a jam of a fastener from the strip 4907 in the opening 4055 and/or in connection with an advancing or drilling operation, then the collated fasteners 4905 can be pulled in either direction R4 or R5 (FIG. 75) along the collated fastener path CFP. This can in some cases provide two effective ways to un-jam or clear a malfunction within the nose assembly 4050 or otherwise in connection with a tool.

As shown in FIG. 75, it can be seen that the nose assembly opening 4055 can generally be aligned with the longitudinal axis 4400 of the angled bore 4088. The opening 4055 itself can be substantially larger than the angled bore 4088. The material of the nose assembly 4050 can form a floor 4055A of the opening 4055. The floor 4055A can extend from the supply side surface 4056A to the exit side surface 4056B of the opening 4055. The floor 4055A also can form a portion of the guide 4080, in which case, the floor 4055A also defines all or a portion of the opening 4084 to the angled bore 4088.

Figure 67:
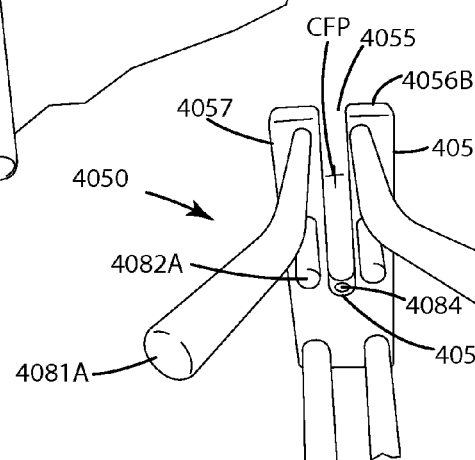
FIG. 67 is a rear view of the nose assembly, of the eighth alternative embodiment of the fastener installation tool, removed from the remainder of the tool.
Figure 68:
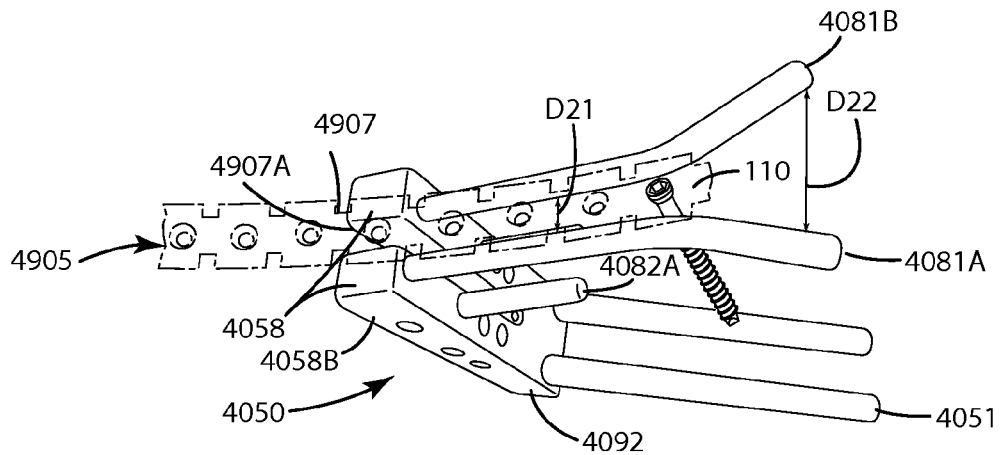
FIG. 68 is a perspective view of the nose assembly of the eighth alternative embodiment of the fastener installation tool illustrating collector guide elements guiding a fastener.
Figure 69:
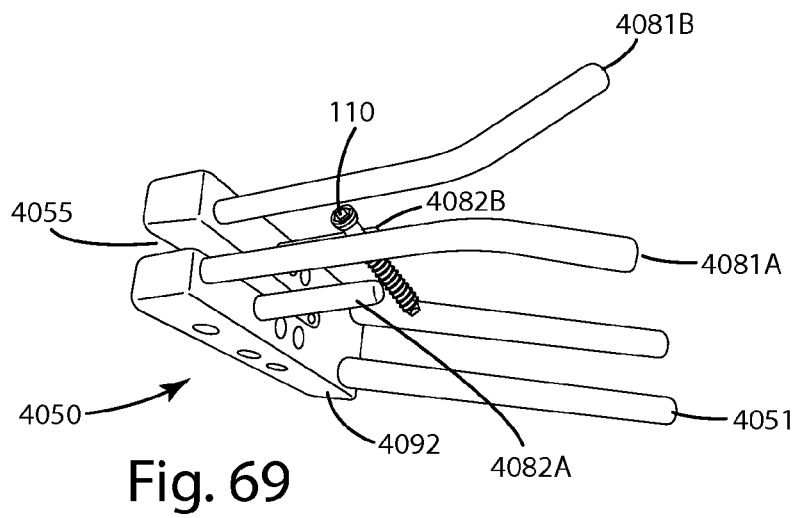
FIG. 69 is a perspective view of the nose assembly of the eighth alternative embodiment of the fastener installation tool, illustrating collector guide elements further guiding the fastener.
Figure 70:
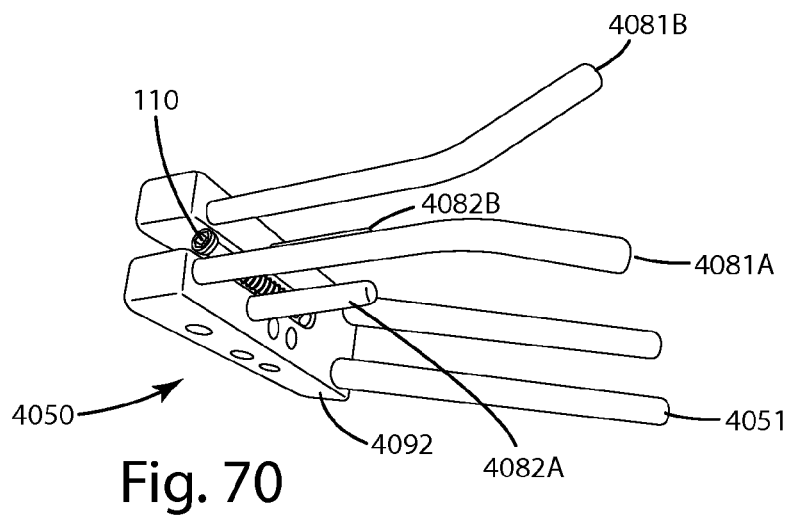
FIG. 70 is a perspective view of the nose assembly of the eighth alternative embodiment of the fastener installation tool, illustrating collector guide elements even further guiding a fastener, where the fastener is about to enter a nose assembly opening.

The nose assembly 4050 can include collector guide elements 4081A, 4081B as shown in FIGS. 67-69. These collector guide elements can generally flank opposing sides of the collated fastener path CFP. Generally the collector guide elements can flare outwardly at their outer most ends distal from the body 4057 of the nose assembly 4050. For example, as shown in FIG. 68, the opposing collector guide elements 4081A, 4081B increase in distance from one another distal from the nose assembly opening. As a more particular example, as shown in FIG. 68, the distance D21 near the opening 4055 is less than the distance D22 near the opening at the free ends of the collector guide elements 4081A, 4081B. With this more opened, tapered configuration toward the free ends of the collector guide elements, these elements can more easily collect, trap and guide any stray or oddly oriented fasteners 110 along the strip of material 4907. In turn, this can more efficiently collect and guide the fasteners 110 toward the opening 4055 for driving through the angled bore into the corner and/or side surface of the board.

The collector guide elements 4081A, 4081B can also be supplemented with secondary collector guide elements 4082A, 4082B. Like the collector guide elements 4081A and 4081B, these lower elements can include rounded ends. These ends can further guide and funnel the tips or lower portions of the fasteners 110 which are distal from the strip of material 4907 into the nose assembly opening 4055. Optionally, although shown as multiple bars, the collector guide elements can be replaced with a slot defined in a larger block or piece of material, for example, like that shown and described in connection with the nose assembly in the ninth alternative embodiment described below.

Returning to FIGS. 68-70, the collector guide elements 4081A, 4081B effectively capture and constrain the fasteners 110, generally guiding them toward the opening 4055 defined by the nose assembly 4050. With reference to FIG. 68, the collector guide elements 4081A, 4081B can be mounted directly to or form an integral part of the nose assembly 4050. The upper surfaces of the collector guide elements 4081A, 4081B can transition to an upper surface of the nose assembly which is adjacent the opening 4055. This upper surface can form a type of upper guide area or rail 4058 along which the collated fasteners 4905, and in particular the collated fastener strip of flexible material 4907, travels. Generally the upper guide area 4058 extends laterally away from the opening 4055, toward the side surfaces of the nose assembly.

Figure 77:
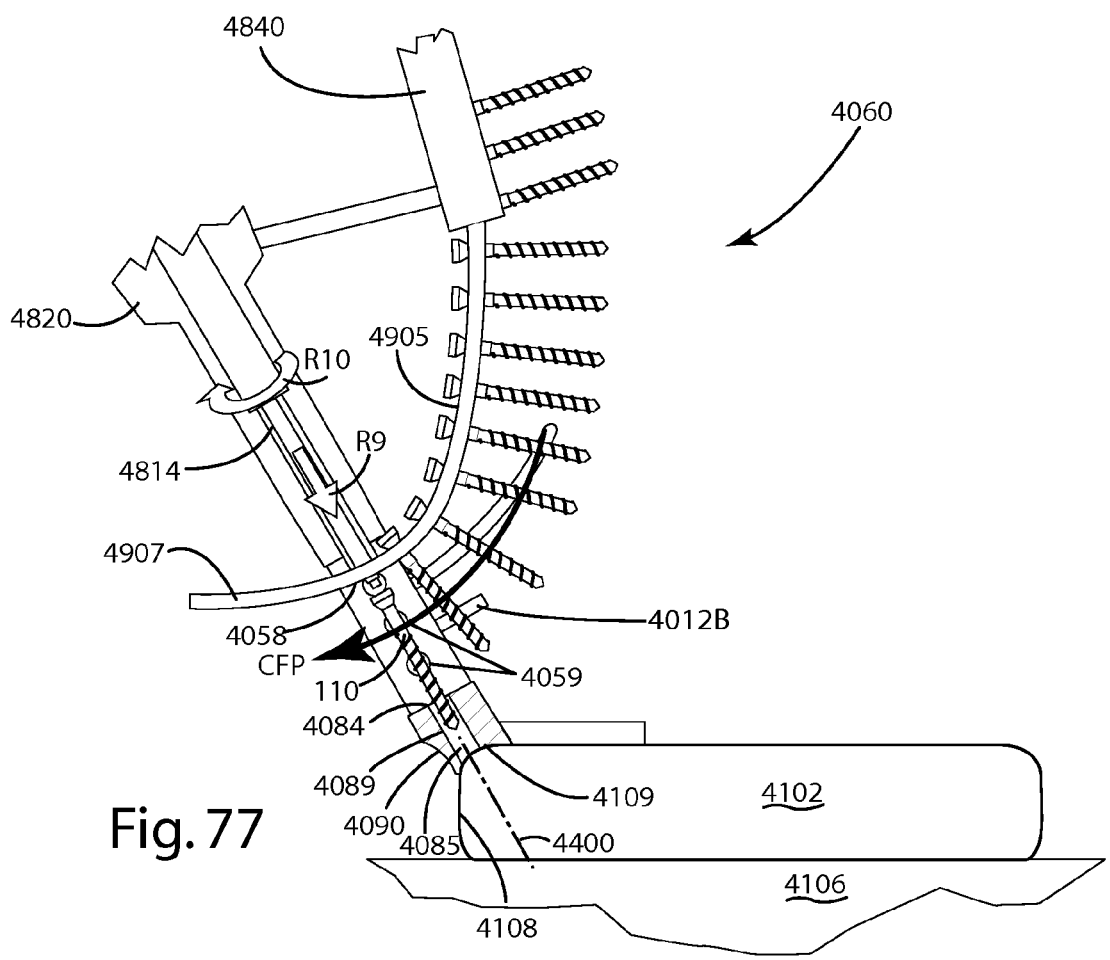
FIG. 77 is a side partial sectional view of the eighth alternative embodiment of the fastener installation tool, with the fastener entering the angled bore of the guide.

The upper guide areas 4058 can generally be of a width sufficient to support the edges 4907A, 4907B (FIG. 68) of the strip 4907 as a drive element 4814 engages a fastener 110 (FIG. 77). The upper guide areas 4055 can effectively support those edges so that the strip of material 4907 is not drawn into the opening 4055 of the nose assembly an amount that would cause a jam of the collated fasteners in the nose assembly. Accordingly, that strip of material 4907 is supported sufficiently to allow the fastener 110 to be punched or otherwise removed from the strip of material 4907 by the drive element 4814. The upper guide area 4058 also can provide sufficient support to allow the drive element 4814 to penetrate or punch through the hole in the strip previously occupied by the fastener 110 during an advancing operation, and optionally, to continue rotating within that hole.

Figure 73:
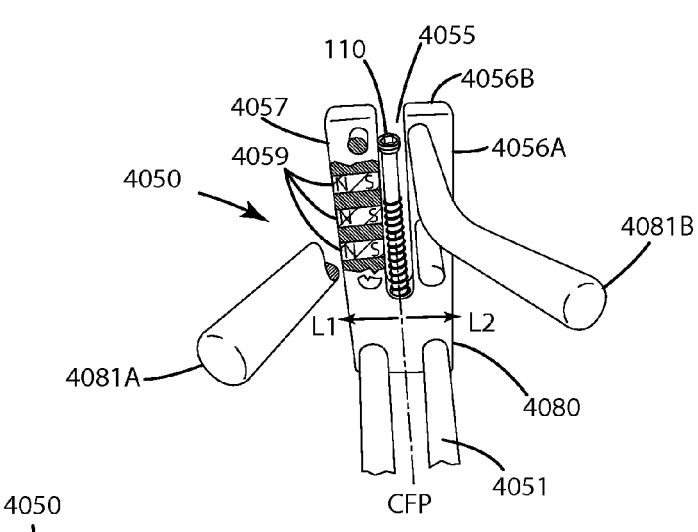
FIG. 73 is a front view thereof.

Turning now to FIGS. 72-75, the nose assembly 4050 can include one or more magnetic elements 4059, positioned generally in or adjacent the nose assembly opening 4055. The magnetic element can be located adjacent the collated fastener path CFP as shown in FIGS. 73, 74, and 75. The magnetic element can include one or more individual magnets as illustrated in FIGS. 73 and 75. Alternatively, the magnetic element 4059 can include a single magnetic magnet, such as a bar magnet, placed longitudinally adjacent the collated fastener path CFP. The magnetic element 4059 is generally placed laterally, in directions L1 and/or L2, of the collated fastener path CFP as shown in FIG. 73.

The magnetic element 4059 can be in the form of one or more cylindrical magnets that are held in holes defined by the body 4057 of the nose assembly 4050. Optionally, the magnetic element 4059 can be in the form of a bar that is defined in a simple recess defined by the body. Further optionally, the magnetic element 4059 can be in the form of a magnet, cemented, glued or otherwise fastened to the inside of the opening 4055 adjacent the collated fastener path CFP.

The magnetic element 4059 can be virtually any type of magnet. One type of magnet suitable for the nose assembly is a Neodymium magnet. Other magnets capable of attracting items including iron or metal can be used depending on the particular application.

As shown in FIGS. 74 and 75, the magnetic element 4059 is disposed substantially parallel to the longitudinal axis 4400 of the angled bore 4088. The magnetic element is placed generally above the angled bore 4088 and substantially aligned in parallel with that bore 4088. In turn, the magnetic element 4059 can exert a magnetic force or otherwise magnetically engage the fastener 110, which also is optionally constructed from a magnetic metal, such as an iron containing steel or other metal. The magnetic element 4059, when so disposed adjacent the collated fastener path CFP, functions to effectively capture the fastener 110 as shown in FIGS. 73 and 75 and aim it toward the opening 4084 of the angled bore 4088. Generally, the magnetic element 4059 swings the tip of the fastener away from the other fasteners in the collated fasteners 4907, and generally away from the magazine or supply container 4840 of the feed 4032, but generally toward the opening 4084 of the angled bore 4088. Accordingly, when the fastener 110 is advanced by the drive element 4814, its tip will point toward, and smoothly and consistently enter, the opening 4084 and thus the angled bore 4088. It further can travel along the longitudinal axis 4400 into the board.

The magnetic element 4059 is well suited for applications where the fasteners 110 are collated and joined with the flexible strip of material 4907, which may bend or flex in a manner such that the fasteners tend to point in a variety of different directions and can be oddly spaced. For example, in some applications, without the magnetic element adjacent the collated fastener path CFP to engage the respective fastener desired to be advanced into the board, that fastener 110 may be positioned nonparallel to the longitudinal axis 4400 and generally offset from the opening 4084 of the angled bore 4088. Accordingly, in such a misaligned fastener orientation, if the drive element 4814 engages the fastener and begins to advance it generally toward the guide 4080, then possible that the fastener will jam against the floor 4055A of the opening 4055 and possibly exit the opening 4055 either out the forward or rearward surfaces. This would potentially damage the tool and/or the board, or at least possibly jam the tool 4060.

In some cases, however, the magnetic element 4059 can be absent from the nose assembly and tool. For example, where the collated fastener strip of material 4907 has substantially consistent flexibility and structural integrity such that the fasteners 110 are consistently aligned with the opening 4084, the alignment can be achieved by moving the collated fasteners along the collated fastener path CFP and stopping the strip at a location sufficient to align the fastener 110 with the opening 4084. Optionally, the alignment can be performed by enlarging the opening 4084, for example by including a large funnel shaped taper at the opening 4095 sufficient to capture the tip of the fastener 110 to be advanced, so that tip is drawn into the angled bore 4088.

Operation of the eighth alternative embodiment of the fastener installation tool 4060 will now be described with reference to FIGS. 71-79. To begin, the tool 4060 is loaded with collated fasteners 4905. This can be accomplished by loading the collated fasteners 4905 in the supply holder 4840. Where the collated fasteners 4905 include a flexible strip of material 4907, that strip can simply be inserted into a channel or other holding mechanism in the supply holder 4840. The collated fastener strip 4907 is at least partially placed in the opening 4055 with a portion of the strip supported by the upper guide area 4058 of the nose assembly 4050. Where included, the collated fasteners and in particular the collated fastener strip 4907 can be registered with the advancing tooth and/or gear 4032A that moves that collated fasteners in direction R6 generally toward the nose assembly 4050. In general, the feed tooth, pusher or gear 4032A moves or rotates in direction R8 which in turn moves the collated fasteners 4905 in direction R6 toward the nose assembly 4050.

After the installation tool 4060 is loaded with collated fasteners 4905, a user can orient the nose assembly so that the alignment projection 4090 is placed immediately adjacent a corner 4109 of a board 4102. The board itself 4102 can be resting on a substrate 4106 with the desired intent being to fasten the board securely to the substrate 4106. Where the installation tool 4060 includes an extension 4820 and a drive tool 4810, the user can engage the alignment projection 4090 and in particular the inner engagement surface 4092 against the corner 4109 and/or side surface 4108 of the board 4102 while standing. The user can orient the nose assembly 4050 and tool so that the forward engagement foot 4051 appropriately tilts or moves so that its bottom or lower surface 4069 engages the upper surface of the board 4011. As noted above, this can assist in aligning the longitudinal axis 4400 with a desired trajectory of the fastener, to satisfactorily advance the fastener into the board at a desired angle and at a desired depth up the side surface 4108 and/or corner 4109 of the board as described in the embodiments above. As shown in FIG. 75, with the alignment projection in place, the longitudinal axis 4400 of the longitudinal bore 4088 is aligned at preselected angle $\forall 6$ relative to the side surface 4108. As mentioned above, that angle is one which is desired for advancing the fastener into the board at a desired angle and/or depth to securely fasten the board to the substrate 4106.

Optionally, where the nose assembly includes lateral feet 4052A, 4052B, the user can engage their own foot against these components to further engage the projection 4054 against the side surface and/or corner to push the board into or against the adjacent board, ensuring a tight fit between those boards, and where desired, eliminating the gap between those adjacent boards.

With the alignment projection 4090 satisfactorily placed, and the inner engagement surface 4092 adjacent the corner 4109 and/or side surface 4108, and thus the second opening 4085 or exit of the angled bore 4088 adjacent the corner and/or side surface, the user can actuate the tool 4060 so that the feed mechanism 4032 further actuates the advancing element 4032A to move the collated fasteners in direction R6 along the collated fastener path, generally further into the nose assembly 4050 and more particularly through the nose assembly opening 4055.

As shown in FIG. 75, a fastener 110 enters the nose assembly opening 4055. Upon entering the nose assembly opening 4055, the fastener is brought near the opening 4084. Due to the nature of the flexible strip of the collated fasteners, however, the tip of the fastener may be offset and misaligned from the opening 4084, and therefore not aligned with the angled bore 4088. To assist in this alignment and ensure that the tip of the fastener 110 is precisely aligned with the opening 4084 of the angled bore 4088, the magnetic element 4059 exerts a magnetic force on the fastener 110. Accordingly, the magnetic element 4059 and its force, aligned generally with the longitudinal axis 4400 of the bore 4088, moves or swings the tip of the fastener so that it is readied for advancement precisely into the opening 4084 and subsequently the angled bore 4088, along the axis 4400 into the corner or side surface of the board.

The drive element 4814 is moved in direction R9 and engages the head of the fastener 110. The drive element 4814 may simultaneously, or at a later time during the advancing step, begin rotating. Due to its connection to drive features of the fastener 110, the fastener 110 also begins to rotate. The drive element 4814 continues to move in direction R9, moving the fastener 110 toward the opening 4084 and thus the angled bore 4088.

Figure 78:
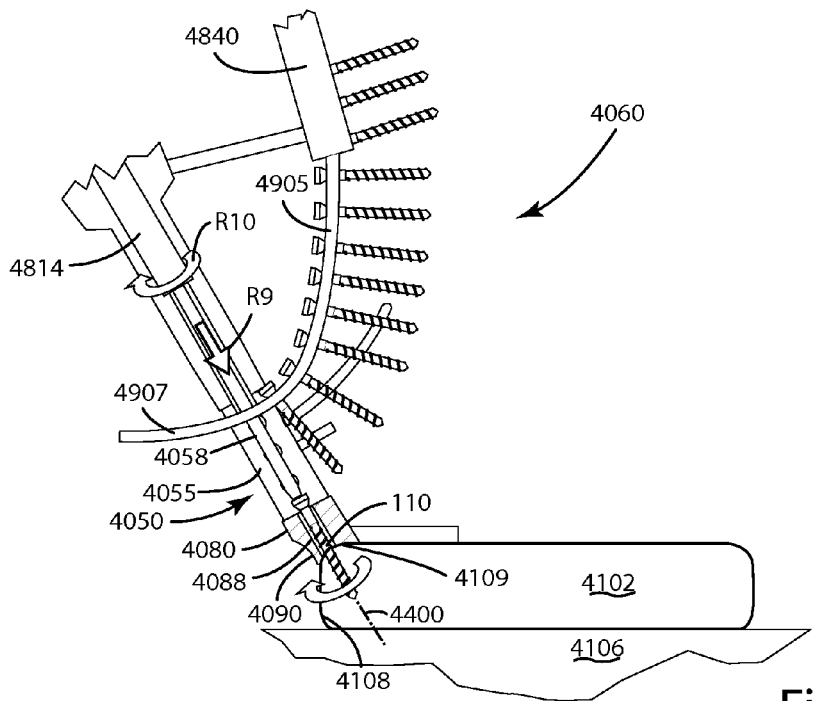
FIG. 78 is a side partial sectional view of the eighth alternative embodiment of the fastener installation tool with a drive element of the tool penetrating the flexible strip and advancing the fastener into the corner of the board.
Figure 79:
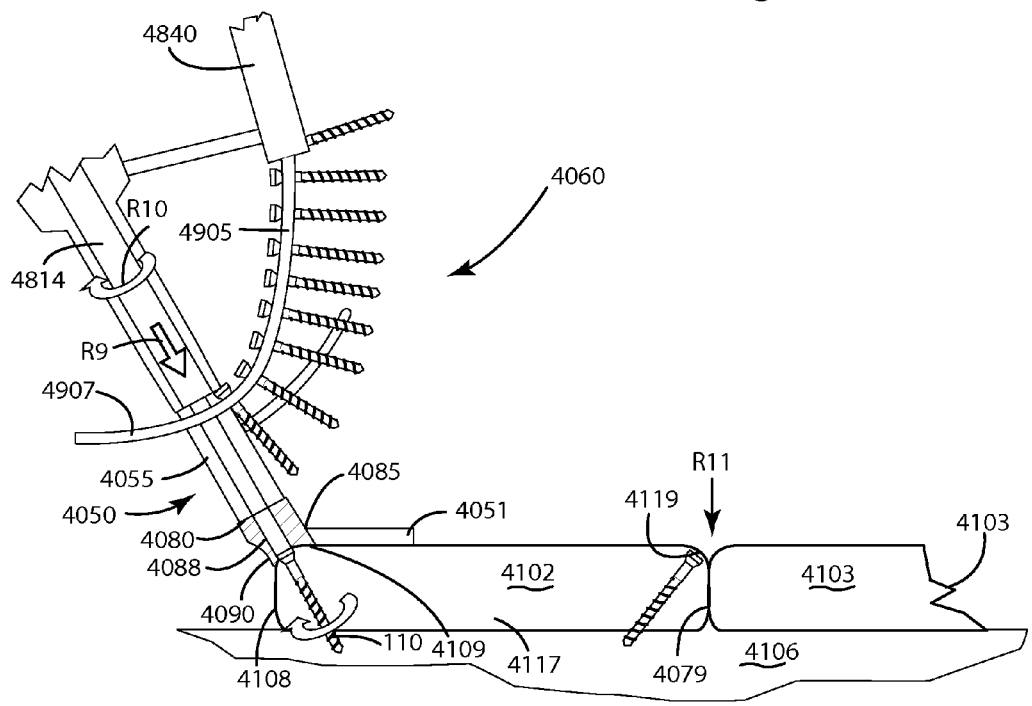
FIG. 79 is a side partial sectional view of the nose assembly of the eighth alternative embodiment of the fastener installation tool further advancing the fastener through the corner of the board and into an underlying substrate.

As shown in FIGS. 77-79, the fastener 110 is advanced sufficiently by the drive element 4814 moving in direction R9, and also rotating in direction R10, such that the drive element 4814 punches through or penetrates the flexible strip 4807. The drive element 4814 also pushes the fastener through the flexible strip 4907 so that the fastener is no longer held with the other collated fasteners within the strip. The fastener 110 may still be acted upon by the magnetic element 4059 to assist in keeping it aligned with the longitudinal axis 4400 of the bore.

As it is rotated, the fastener 110 continues to advance into the opening 4084 of the angled bore 4088, generally moving toward the second opening or exit 4085 defined by the alignment projection 4090. In this manner, the fastener moves along longitudinal axis 4400 toward the corner 4109 and/or side surface 4108 of the board 4102 generally at the predetermined angle $\forall 6$ relative to the side surface 4108.

As shown in FIG. 78, the installation tool 4060, and in particular the drive element 4814, continues to rotate in direction R10 and move in direction R9. The fastener 110 also continues to rotate, being guided by the angled bore 4088 into the corner 4109 and/or side surface 4108. The drive element 4814 continues to penetrate and move through the hole previously occupied by the fastener 110 in the strip of material 4907. The strip 4907 can be prevented from deforming substantially or moving due to the movement of the drive element 4814 by virtue of the strip 4907 engaging and/or resting upon the upper guide area 4058 of the nose 4050 as described above.

The drive element 4814 further advances the fastener 110 into the board 4102 as shown in FIG. 79. The drive element 4814 continues to rotate in direction R10 and move in direction R9. In so doing, it continues to move through the opening 4055 of the nose assembly 4050. The drive element 4814 also passes through the floor 4055A of the nose opening 4055 into the opening 4084. The drive element 4814 enters and rotates within the angled bore 4088. The drive element can also optionally exit the second opening 4085 defined by the alignment projection 4090 and at least partially enter the board 4102, for example, the corner 4109 and/or side surface 4108 as it rotates the screw 110.

After its advancement by the tool 4060, the fastener 110 generally extends through the corner 4109 and/or side surface 4108 and through the bottom surface 4117 of the board 4102. The fastener also enters the substrate 4106 to fasten the board or otherwise tack it or secure it down to the substrate 4106.

With the fastener advancing completed, the installation tool can be operated so that the drive element 4814 retracts from the board 4102, from the angled bore 4088 and the opening 4055 of the nose assembly 4050. The drive element can generally assume the same position as illustrated in FIG. 71. The alignment projection 4090 and foot 4051 and the tool in general 4060 can be removed from the corner of the board at the location where the fastener was advanced. The user can then move down the corner of the board, laterally along the length of the board and engage the tool 4060 with the corner of the board to advance another fastener at another location. The feed mechanism 4032 can assist in advancing yet another succeeding fastener for advancement in a manner described above.

The user can continue to use the board to fasten or tack down the board adjacent the side surface 4108 and/or corner 4109 to the substrate 4106. When one side of the board adjacent the side surface 4108 is sufficiently tacked down or secured to substrate 4106, the user can reorient the tool 4060 and place the alignment projection 4090, and any downwardly extending projections 4054 in the location R11 (FIG. 79) and advance another fastener or multiple fasteners as shown in broken lines to fasten the board 4102 down along the opposing side 4079 or corner 4119 of the board 4102. Of course, if the board 4102 is installed adjacent another board 4103 such that the boards are immediately adjacent one another with no gap formed therebetween as shown in FIG. 79, then the tool 4060, and particularly the alignment projection 4090, is well suited to fit, and optionally wedge, between the adjacent corners of the boards 4102, 4103 to advance fasteners through the corner 4119 and/or side surface 4079 of the board 4102 even with the other board 4103 being adjacent or very close to that board 4102.

XIII. Ninth Alternative Tool and Method Embodiment

A ninth alternative embodiment of the fastener installation tool and related method is illustrated in FIGS. 80-84 and generally designated 5060. This embodiment, like the embodiments above can be well suited for use with shrinkable boards, or other types of boards as described herein. Moreover, this embodiment is also well suited for the types of fasteners in the embodiments described herein, as well as any other type of fasteners. For example, the tool can be used to advance the side angled fasteners 10, 110, 210, 310 at the respective advancement orientations and using the techniques herein, and/or conventional pointed-tip fasteners. The installation tool of the eleventh alternative embodiment also is similar in construction and operation to the embodiments described above with several exceptions.

Figure 80:
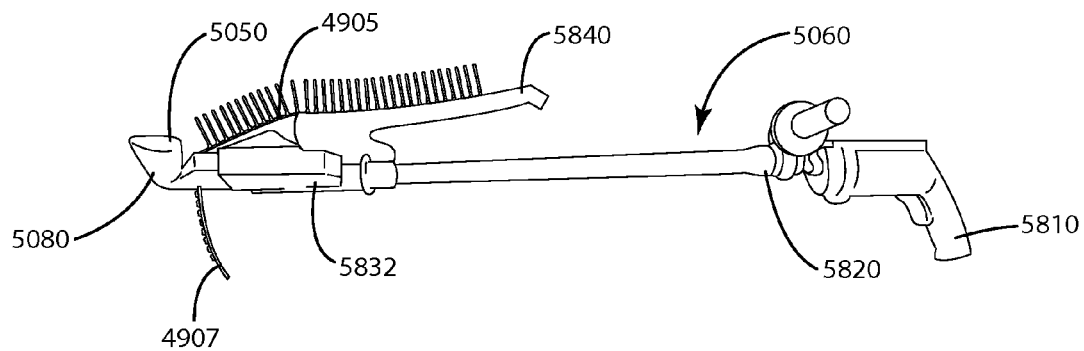
FIG. 80 is a perspective view of the ninth alternative embodiment of the fastener installation tool including a nose assembly, a feed mechanism, an extension and a driving tool.
Figure 81:
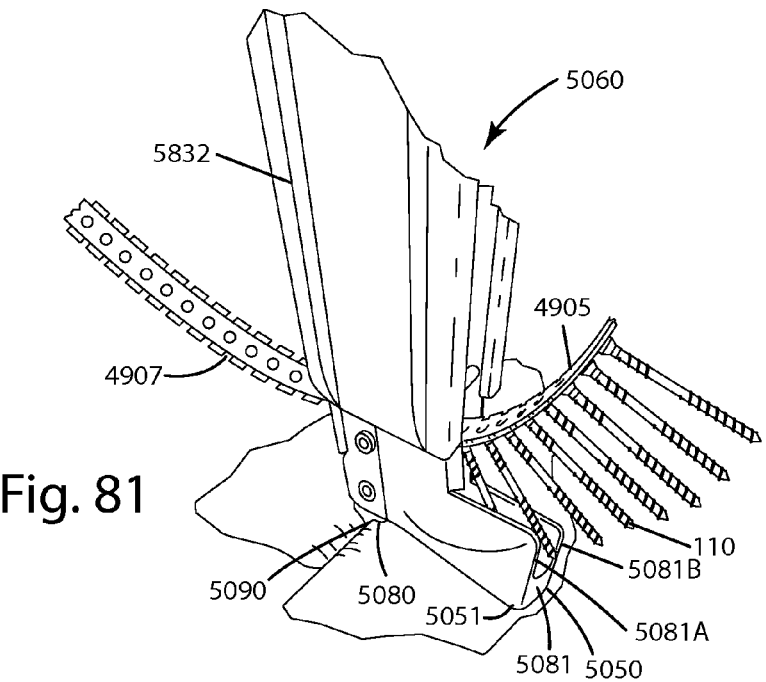
FIG. 81 is a perspective view of the nose assembly of the ninth alternative embodiment of the fastener installation tool advancing the collated fasteners for driving into a corner of a board.
Figure 82:
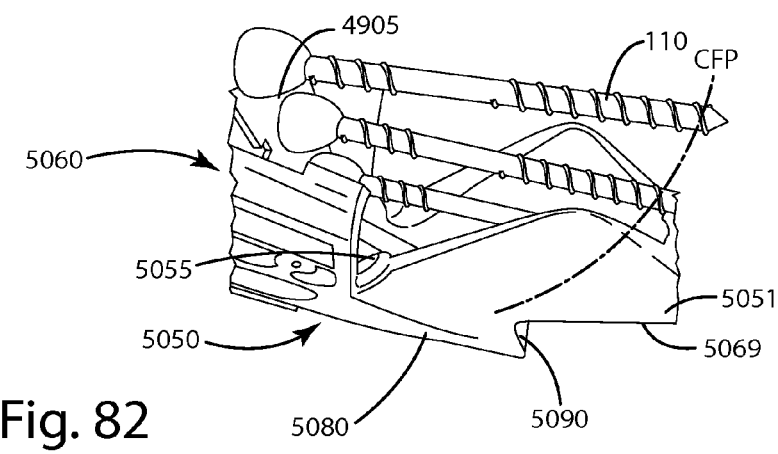
FIG. 82 is close-up perspective view of collated fasteners entering the nose assembly of the ninth alternative embodiment of the fastener installation tool.

For example, turning to FIGS. 80-81, the ninth alternative embodiment of the fastener installation tool 5060 generally includes a driving tool 5810, an extension 5820, a feed mechanism 5832 and a nose assembly 5050. The feed mechanism 5832 can include a collated fastener supply holder 5840. All of these components can be similar in structure and function to that in the eighth alternative embodiment described above. The nose assembly 5050 of this embodiment can be constructed to include a guide 5080 and an alignment projection 5090. These components can be substantially identical to those of the eighth alternative embodiment described above. Indeed, the components can have the same structure and function as those described above, and will therefore will not be described again here in detail.

The nose assembly 5050, however, can be of a more monolithic integral construction, with the guide 5080, alignment projection 5090 and collector guide element 5081 formed as an integral, monolithic piece. For example, as shown in FIGS. 81-84, the nose assembly 5050 defines a nose assembly opening 5055. This nose assembly opening 5055 is similar to that described in the embodiment above, and is in communication with an angled bore extending generally from the floor 5055A of the opening 5055. Like with the embodiment above, the floor 5055A of the opening 5055 define the opening 5084 to the angled bore of the guide and alignment projection. The guide 5080 and alignment projection 5090 can be integrally formed with the forward extending engagement foot 5051.

In addition, the nose assembly 50 can further include collector guide element 5081 which is integrally formed generally extends upwardly from the foot 5051. This collector guide element 5081 can include opposing collector guide element sides 5081A and 5081B that generally flank the opposing sides of the collated fastener path CFP. The collated fastener path CFP can generally be aligned with and run through the longitudinal axis 5400 of the angled bore as with the other embodiments herein.

The collector guide element 5081 can generally be configured such that the opposing collector guide element sides 5081A, 5081B toward the end distal from the nose assembly opening 5055 open or otherwise include outwardly opening tapered sides 5081C. These outwardly opening sides 5081C can generally form a continuous wall that functions to funnel the fasteners 110 toward the nose assembly opening 5055 and generally align the fasteners with the longitudinal axis 5400.

Figure 83:
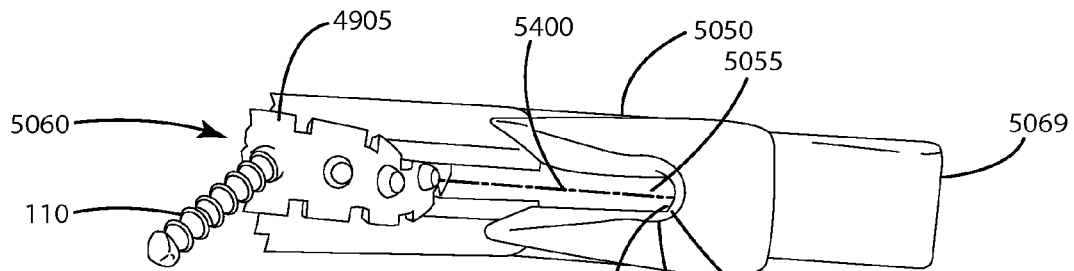
FIG. 83 is a front view of the nose assembly of the ninth alternative embodiment of the fastener installation tool with the fasteners entering a collector guide element of the nose assembly.
Figure 84:
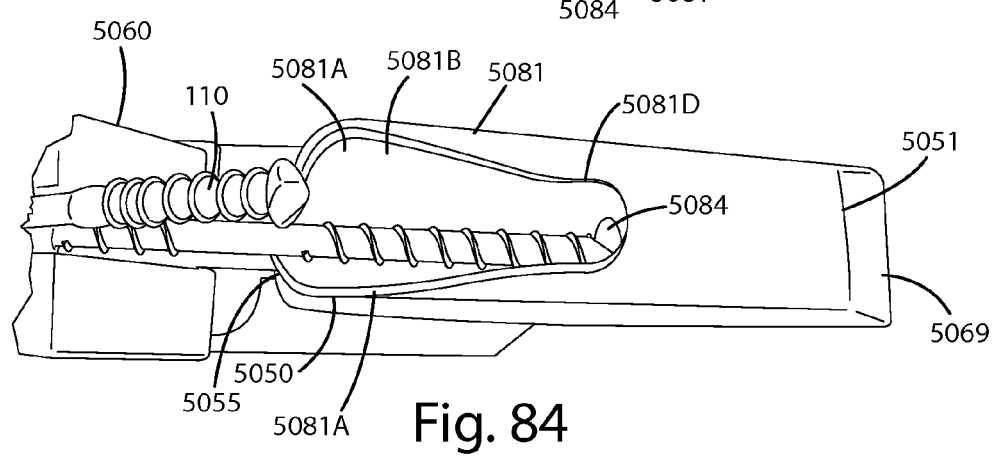
FIG. 84 is a close-up front view of the nose assembly of the ninth alternative embodiment of the fastener installation tool with the fasteners of the collated fasteners entering the collector guide element.

As illustrated in FIGS. 83-84, the collector guide 5081 element can be in the form of an elongated slot 5081D that merges or transitions to the opening 5055 of the nose assembly. Indeed, both the opening 5055 and the slot 5081D can be part of a continuous slot extending through a monolithic block that forms the nose assembly 5050.

Although not shown, the nose assembly 5050 of the ninth alternative embodiment can include one or more magnetic elements. These magnetic elements can be positioned generally in alignment with the longitudinal axis 5400 of the angled bore and can to align the fasteners 110 with the opening 5084 of the nose assembly 5050. The operation of the installation tool 5060 of this ninth alternative embodiment is similar to that described above in connection with the eighth alternative embodiment, and accordingly, will not be described again here.

XIV. Tenth Alternative Tool and Method Embodiment

A tenth alternative embodiment of the fastener installation tool and related method is illustrated in FIGS. 85-89 and generally designated 6060. This embodiment, like the embodiments above can be well suited for use with shrinkable boards, or other types of boards as described herein. Moreover, this embodiment is also well suited for the types of fasteners in the embodiments described herein, as well as any other type of fasteners. For example, the tool can be used to advance the side angled fasteners 10, 110, 210, 310 at the respective advancement orientations and using the techniques herein, and/or conventional pointed-tip fasteners. The installation tool of the tenth alternative embodiment also is similar in construction and operation to the embodiments described above with several exceptions.

Figure 85:
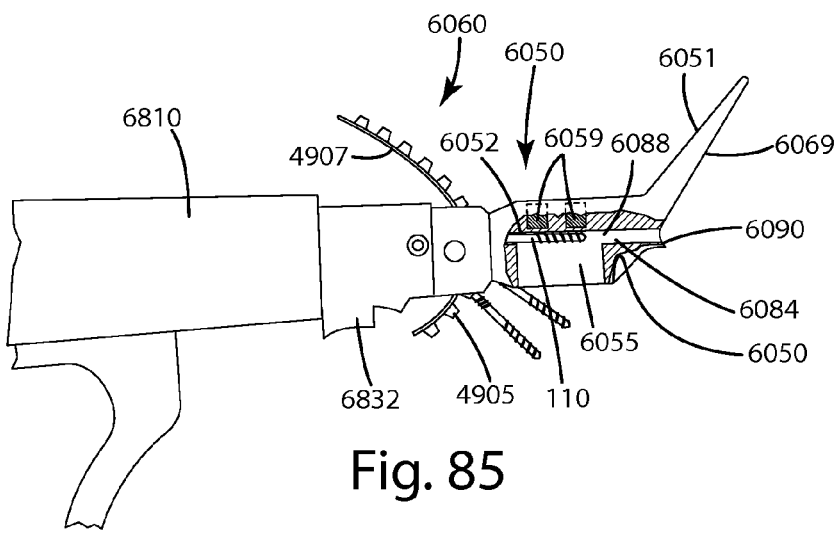
FIG. 85 is a side view of a tenth alternative embodiment of the fastener installation tool including a nose assembly, a driving element and a collated fastener feed mechanism.
Figure 86:
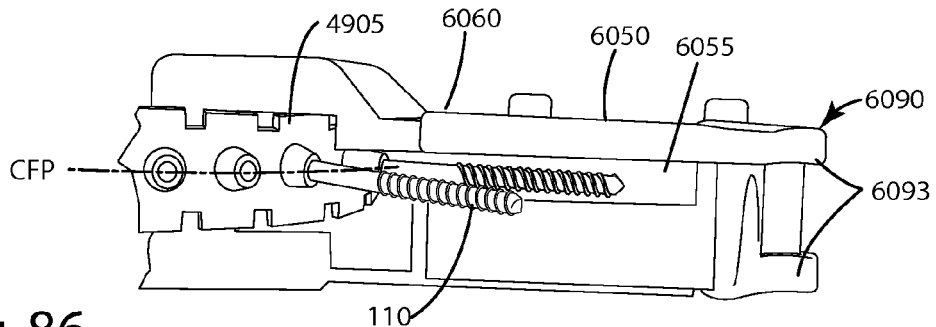
FIG. 86 is a front perspective view of the nose assembly of the tenth alternative embodiment of the fastener installation tool with collated fasteners entering a collector guide element of the nose assembly.
Figure 87:
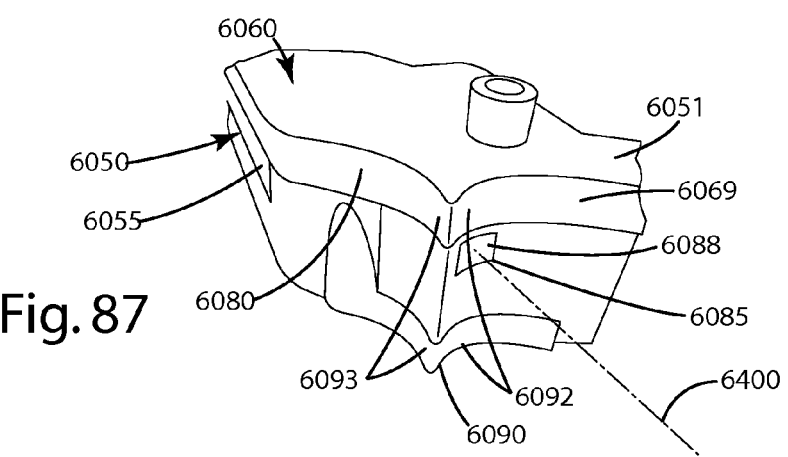
FIG. 87 is a bottom perspective view of the nose assembly of the tenth alternative embodiment of the fastener installation tool further illustrating an alignment projection and an opening in the lower portion of the alignment projection.

As shown in FIG. 85, the tenth alternative embodiment of the fastener installation tool 6060 generally includes a driving tool 6810, but not extension, and a feed mechanism 6832 which feeds the collated fasteners 4905 to the nose assembly 6050. These components can be similar in structure and operation to those of the eighth and ninth alternative embodiments described above, or any other embodiments as desired. The nose assembly 6050 of this construction, however, is slightly different in a few aspects. For example, the nose assembly 6050 can include an integrally formed guide 6080, alignment projection 6090 and engagement foot 6051. The guide is similar in construction and function to that of the embodiments above and has an angled bore 6088 that includes a first opening (not shown) in communication with the nose assembly opening 6055. The guide also can be joined with or include the alignment projection 6090, which can include an inner engagement surface 6092 and outer engagement surface 6093. The inner engagement surface 6092 can define the exit or second opening 6085 of the angled bore 6088. These features again are similar to those in the embodiments described above and will not be described again here in detail.

Figure 88:
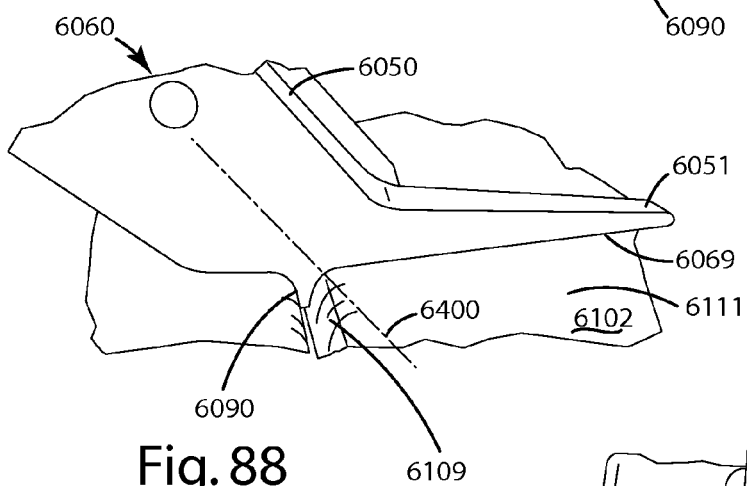
FIG. 88 is a side perspective view of the nose assembly of the tenth alternative embodiment of the fastener installation tool with the alignment projection engaged in the crevice between adjacent corners of boards.
Figure 89:
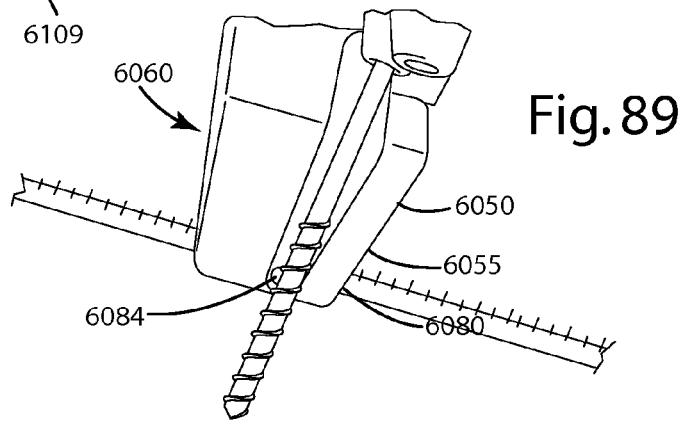
FIG. 89 is a rear perspective view of the nose assembly of the tenth alternative embodiment of the fastener installation tool with the nose assembly engaged in the crevice between adjacent corners of boards.

The foot 6051 can include a bottom surface 6069 configured to engage an upper surface of a board which is to be fastened with a tool 6060. Like the other embodiments above, the engagement foot 6051 can assist in aligning the longitudinal axis 6400 of the angled bore 6088 with a side surface or corner of a board. For example, as shown in FIG. 88, the engagement foot 6051 can engage the upper surface 6111 of the board 6102 with the lower surface 6069 of the foot 6051. The alignment projection 6090 can also engage the corner 6109 of the board. With these portions of the nose assembly 6050 engaging the board 6102, the longitudinal axis 6400 of the angled bore can be aligned to provide a desired trajectory of the fastener, for example, at an angle relative to the side surface of the board like the predetermined angles in the eighth and ninth alternative embodiments, or other embodiments, above.

Returning to FIGS. 86, 87, and 89, the nose assembly 6050 can define the nose assembly opening 6055. This nose assembly opening can differ from the other embodiments in that it is a "dead end" opening. For example, as shown in FIG. 85, the opening 6085 can be configured so that the collated fastener path CFP is aligned with it. Moreover, it can be generally aligned with the longitudinal axis of the angled bore 6088. The opening 6055, however, can be bordered by a stop or a back wall 6052. This back or stop wall can generally be aligned with the angled bore 6088. The fasteners 110 advanced into the opening thus cannot pass beyond the back wall 6052.

Optionally, the back wall 6052 can include a magnetic element 6059 to generally align the fastener 110 with the angled bore 6088 and more generally the opening 6084 to the angled bore as with the other embodiments above. In this embodiment, however, the magnetic elements 6059 are positioned along and/or within the collated fastener path CFP, and can generally obstruct a portion of the collator fastener path CFP. The nose assembly 6055 can be outfitted with or define a strip aperture by which the strip of material 4907 can advance through the remainder of the nose assembly 6050. The operation and function of the installation tool 6060 of this embodiment is similar to that of the eighth and ninth embodiments above and will not be described again in detail here.

XV. Eleventh Alternative Tool and Method Embodiment

An eleventh alternative embodiment of the fastener installation tool and related method is illustrated in FIGS. 90-95 and generally designated 7060. This embodiment, like the embodiments above can be well suited for use with shrinkable boards, or other types of boards as described herein. Moreover, this embodiment is also well suited for the types of fasteners in the embodiments described herein, as well as any other type of fasteners. For example, the tool can be used to advance the side angled fasteners 10, 110, 210, 310 at the respective advancement orientations and using the techniques herein, and/or conventional pointed-tip fasteners. The installation tool of the eleventh alternative embodiment also is similar in construction and operation to the embodiments described above with several exceptions.

For example, the eleventh alternative embodiment of the fastener installation tool can be a simplified tool for use in advancing individual fasteners, one at a time, into the side surface and/or corner of a board as described in conjunction with the embodiments of the other fasteners and tools noted herein. As shown in FIGS. 90-91, the tool generally includes an elongated shaft 7062. This elongated shaft can define a shaft bore 7063. The shaft bore can generally be configured to receive a drive element that is rotated by a drive tool as described in further detail below.

The shaft bore 7063 can be generally an extension of the angled bore 7088. This angle bore 7088 can be similar in structure and function to the angled bore of the embodiments described in the tools above. Generally, the elongated shaft bore 7063 and angled bore 7088 can form a continuous bore through the elongated shaft and the guide 7080, as well as the alignment projection 7090. The continuous bore can be of a sufficient internal continuity so that a fastener inserted in one end of the bore can be advanced through the bore and exit the opposite end of the bore.

The elongated shaft 7062 of the tool 7060 can be joined with the guide 7080. This guide can generally have a guide body 7081. The guide body 7081 can include and/or be joined with an alignment projection 7090. For example, the guide body and alignment projection can be an integral monolithic part, or they can be joined to one another with fasteners or as welded parts.

The guide body 7081, and more generally the guide 7080 can include a forward bottom surface 7069 and optionally a rearward bottom surface 7068 as shown in FIGS. 90 and 91. Each of the bottom surfaces as shown are generally planar, however, if desired, these surfaces can be contoured or can include ridges or other surface features to enhance contact and placement of the guide and tool against an upper surface of a board. Generally, however, the planar configuration of the bottom surfaces 7068 and 7069 are sufficient to engage an upper surface of a board into which a fastener is advanced as further described below.

Although shown as a semi-circular surface which extends generally from the alignment projection forward and rearward, the bottom surfaces 7069 and 7068 respectively, can be of any geometric configuration. For example, these surfaces can be oval, square, rectangular, triangular, polygonal or of other shapes. The precise geometric configuration can be selected depending on the particular application.

Returning to FIG. 91, the tool 7060 includes an alignment projection 7090 that extends downwardly from the guide 7080 a preselected distance. This preselected distance can be about $\frac{1}{32}$ inch to about $\frac{1}{2}$ inch, further optionally about $\frac{1}{8}$ inch to about $\frac{1}{4}$ inch from the bottom 7069 of the tool 7060. The precise distance that the alignment projection extends can vary depending on the particular boards with which the tool 7060 is used. For example, where the tool is used to secure a corner or side of a board that is immediately adjacent another board, the preselected distance can be selected so that the projection can at least partially fit between the opposing corners 7109, 7119 of the adjacent boards 7102, 7103 (FIGS. 92-93), without extending between or promoting the formation of a gap between the boards if the same is desired. Optionally, the alignment projection can fit within the space or crevice between the corners 7109, 7119, above the side surfaces of the boards which side surfaces are located vertically below the corners of those boards.

Of course, where a gap between adjacent boards 7102, 7103 is desired, the alignment projection 7090 can extend downwardly a preselected distance that actually forms a gap between the respective boards (not shown), and in particular, the side surfaces of those boards which face one another when the boards are laid side by side. In such a case, the alignment projection can also act as a spacer, and can be dimensioned to have a thickness to establish a predetermined gap of any desired distance between the respective boards. The spacers and their functions are explained in the embodiments above, which can likewise be implemented in connection with the alignment projection if desired.

Returning to the embodiment illustrated in FIG. 91, the alignment projection 7090 can be in the shape of a triangle, generally in a wedge shape when viewed from the side. For this reason, the alignment projection can also be referred to as a wedge. The alignment projection 2090 can include a terminal end 7097 at which the inner and outer engagement surfaces 7092, 7093 can merge with one another. Generally, the terminal end can be rounded or angled, and can include the radius similar to the terminal end of the alignment projection in any of the embodiments above. For example, the terminal end can be rounded and/or curved when viewed from a side view as illustrated so that it does not mar or gouge boards which it contacts. Optionally, the terminal end can include multiple compound radii or angled intersecting portions to provide the rounded effect.

The features of the alignment projection, in particular the inner engagement surface, the outer engagement surface and the terminal end can have the structure and function of those same components in any of the embodiments above. Further, with regard to the angle between the inner and outer engagement surfaces, as well as the angle of the longitudinal axis 7400 relative to the engagement surfaces, can be preselected based on the desired location at which a fastener will engage and advance into the corner and/or side surface of the board. For example, the angle between the inner and outer engagement surfaces 7092, 7093 taken from the terminal end, can vary from about 10° to about 90°, optionally about 35° to about 65°, further optionally about 40° to about 50°, or in other ranges depending on the particular application. Generally, these surfaces can be non-parallel with one another if desired.

As illustrated in FIG. 91, the inner engagement surface 7092 can be at an angle $\alpha 7$ relative to the bottom surface 7069. This angle $\alpha 7$ can be about 70° to about 140°, optionally about 80° to about 110°, further optionally about 90° to about 100°. Further, as with the inner engagement surfaces of the other embodiments herein, that inner engagement surface can be configured to directly engage the upper corner 7109 and/or side surface below the corner of the board. For example, the inner engagement surface can be rounded, concave or planar to easily engage and rest against the corner.

As illustrated in FIG. 91, the inner engagement surface 7092 defines the exit opening 7085 through which the fastener exits the angled bore 7088 and optionally enters a corner or side surface of a board. Although referred to as an exit opening, due to the configuration of the tool, the opening 7085 can also function as an entrance opening to the angled bore 7088. For example, a fastener can be loaded into the angled bore 7088 by inserting it head first into the opening 7085 and moving it up into the angled bore and the elongated shaft bore 7063. As further described below, the drive element 7814 can engage the head and push and advance and rotate the fastener back out through the opening 7085, at which point that opening functions as an exit opening.

Turning now to the outer engagement surface 2093 of the alignment projection, that surface can be at an angle $\alpha 8$ relative to the bottom surface 7063, as shown in FIG. 90. This angle $\alpha 8$ can be about 30° to about 80°, optionally about 40° to about 60°, and further optionally about 45° to about 55°.

The precise angle can be selected depending on the angle at which the longitudinal axis 7400 and thus the trajectory of the fastener is desired to be oriented relative to the side surface of the board into which the fastener is driven.

As shown in FIG. 90, the tool 7060 can include a magnetic element 7083 that exerts a magnetic force on a fastener placed in the angled bore 7088 and/or shaft bore 7063. The magnetic element can be joined with the shaft 7064, guide 7080, alignment projection 7090, or other element of the tool. Alternatively, the magnetic element can be associated with a bit of a driving tool 7820 use to drive the fastener. Generally, the magnet functions to hold and retain a fastener in the angled bore 7088 and/or shaft bore 7063, readied for a new advancing operation.

With reference to FIGS. 92-95, the operation of the tool 7060 in conjunction with advancing a fastener will now be described. To begin, a user places a fastener head first into the exit opening 7085, pushing the fastener sufficiently into to the angled bore 7088 so that the fastener is loaded in that bore, and optionally the shaft bore, with its tip or chisel edge facing toward the opening 7085. Where the elongated shaft, guide or tool optionally includes a magnetic element 7083, that element exerts a magnetic force on the fastener to retain the fastener in the bore.

With the fastener loaded in the angled bore 7088 and/or shaft bore 7063, the tool 7060 is placed adjacent a board 7102 to be fastened with a fastener. In particular, the bottom surface 7069 is placed adjacent the upper surface 7111 of the board 7102. The bottom surface 7069 can engage the upper surface 7111 of the board 7102 to establish a predetermined angle at which the longitudinal axis 7400 is placed, which in turn can establish the desired trajectory of the fastener as described in the embodiments above. Further, the alignment projection 7090 is placed so that the inner engagement surface 7092 engages or is at least placed adjacent the corner 7109 and/or side surface of the board 7102.

Optionally, as shown in FIGS. 93-95, another board 7103 can be placed immediately adjacent the board 7102 into which the fastener is to be advanced with the tool 7060. In this arrangement, the outer engagement surface 7093 can also engage the other corner 7119 of the other board 7103. Where included, the rearward bottom surface 7068 can also engage the upper surface 7111A of the other board 7103. Generally, this can provide further stabilization to the tool and assist in holding the elongated shaft 7062, preventing the tool from rotating.

To advance the fastener into the corner 7109 and/or side surface of the board 7102, the drive element 7814 is placed in the shaft bore 7162 of the installation tool 7010. As with the other embodiments herein, the drive element can have a drive feature corresponding to and engaging a feature of the head of the fastener. The drive element 7814 can be rotated with the driving tool 7820, which in turn rotates the fastener. The user applies a force F36 to the driving tool 7820 while rotating the drive element 7814. This in turn advances the fastener 110 through the angled bore out the exit opening 7085 of the alignment projection 7090. The fastener then continues into the corner 7109 and/or side surface of the board until it is fully advanced in the board.

During the advancing of the fastener, the longitudinal axis 7400 of the bore 7088 is aligned so that the fastener 110 advances along a trajectory that is generally at an angle $\alpha 9$ relative to the side surface 7108 of the board 7102. This angle $\alpha 9$ can be about 30° to about 80°, optionally about 40° to about 70°, and further optionally about 45° to 55° or other angles depending upon the precise configuration of the corner 7109 and the side surface 7108. Generally, in the configuration shown in FIG. 92A, the outer engagement surface 2093 is outwardly disposed relative to the side surface 7108, and can engage and/or be placed adjacent the corner 7119 of an adjacent board 7103 as described in connection with the other embodiments herein to provide a sort of wedging effect. Of course, where there is no other board 7103 placed adjacent the board 7102, the outer engagement surface 7093 would not engage any other boards during the advancing operation.

As the fastener advances, the drive element 7814 advances further into the shaft bore 7063. During this advancement, and to facilitate this advancement of the fastener, the force F36 can be applied to the driving tool 7820.

Generally, as the driving tool 7820 rotates the drive element 7814 to advance the fastener, there can be slight torque exerted on the installation tool 7060. This torque can be resisted or countered by the interaction of the alignment projection 7090 with the corner 7109 and/or the bottom surface 7069 with the upper surface of the board 7111. A user also can grasp the elongated shaft or other portion of the installation tool 7060 to counter this torque. The torque can be countered to prevent the tool 7060 from disengaging the board, which disengagement could prevent the fastener from being advanced at a predetermined angle relative to the side surface of the board. Optionally, the elongated shaft and/or some other portion of the tool 7060 can be outfitted with a small handle or grip to more easily and ergonomically grasp it to further counter torque.

Advancement of the fastener 110 into the board 7102 can be terminated by the interaction of a stop 7116 with an end 7064 of the elongated shaft 7062. When the stop 7116 bottoms out against the elongated shaft 7062, this can provide tactile feedback to the user that the fastener is fully installed, that it is time to remove the tool 7060 from the board, disengaging the alignment projection from the corner and moving on to reload another fastener in the tool. The use of the tool and advancing operation can be repeated multiple times to fasten down the board to the substrate.

XVI. Twelfth Alternative Tool and Method Embodiment

Figure 96:
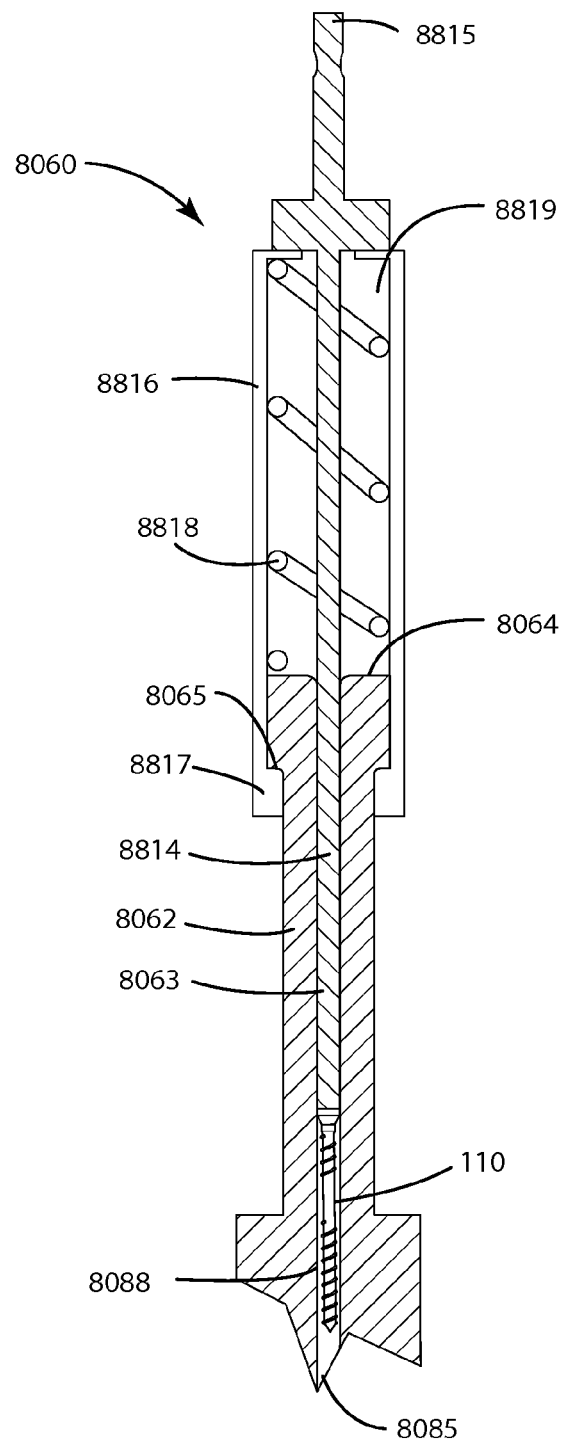
FIG. 96 is a sectional view of a twelfth alternative embodiment of the fastener installation tool with the tool in an uncompressed state, holding a fastener readied for advancement.
Figure 97:
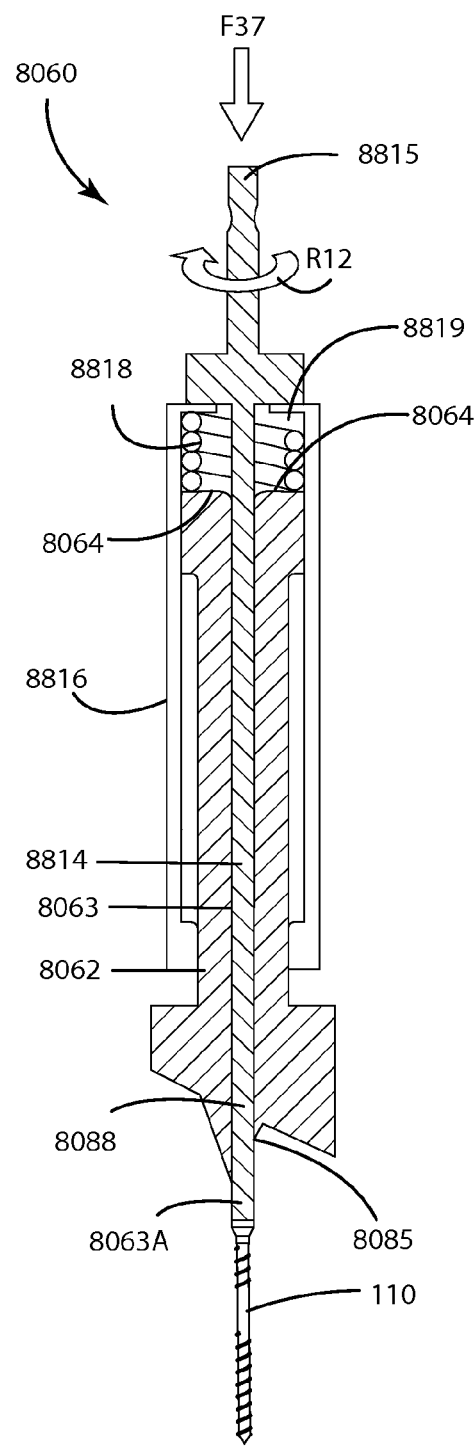
FIG. 97 is a sectional view of the twelfth alternative embodiment of the fastener installation tool with the tool in a compressed state and the fastener fully advanced.

A twelfth alternative embodiment of the fastener installation tool and related method is illustrated in FIGS. 96-97 and generally designated 8060. This embodiment, like the embodiments above, can be well suited for use with shrinkable boards, or other types of boards as described herein. Moreover, this embodiment is also well suited for the types of fasteners in the embodiments described herein, as well as any other type of fasteners. For example, the tool can be used to advance the side angled fasteners 10, 110, 210, 310 at the respective advancement orientations and using the techniques herein, and/or conventional pointed-tip fasteners. The installation tool of the twelfth alternative embodiment also is similar in construction and operation to the embodiments described above with several exceptions.

For example, the twelfth alternative embodiment of the installation tool 8060 incorporates the elongated shaft 8062, guide 8080, alignment projection 8090 and other features of the eleventh alternative embodiment of the installation tool 7060 described above. In addition, however, the tool can include a drive element 8814 which is reciprocally joined with the elongated shaft, guide and alignment projection so that the tool automatically resets to a ready for fastener loading mode after a fastener advancing operation is completed.

As shown in FIG. 96, the tool includes a sleeve 8816 joined with the drive element 8814 and moveably coupled to the elongated shaft 8062. A bias member 8818 is interposed between the end 8064 of the elongated shaft 8062 and an interior surface 8819 of the sleeve 8816. Generally, the bias member 8818 urges the sleeve 8816 and elongated shaft 8062 away from one another, which in turn can retract the drive element 8814 a sufficient distance up into the elongated bore 8063 of the elongated shaft 8062 so that a fastener 110 can be positioned in the angled bore 8088 and/or elongated bore 8063. Optionally, this can reset the tool, readying it to be loaded with another fastener.

To restrict movement of the sleeve 8816 and shaft 8062 or guide 8080 relative to one another, the elongated shaft 8062 can include a shoulder 8065 which can extend generally annularly from the shaft. This shoulder 8065 can engage a portion of the sleeve 8816, for example a projection or ring 8817 that is located on the interior of the sleeve 8816. As shown in FIG. 96, the bias member 8818 urges the sleeve 8816 and the end 8815 of the drive element 8814 away from the end 8064 of the elongated shaft 8062. The projection 8817 of the sleeve abuts against the shoulder 8065 and thereby prevents the sleeve 8818 from being entirely disengaged from the shaft 8062. Of course, a variety of other constructions, such as pins in slots, set screws, and cam configurations alternatively be used to prevent separation of the sleeve from the shaft as desired, while still implementing a biasing member to automatically reset the tool for a fastener reload.

The bias member 8818 generally engages a portion of the sleeve, for example, an interior surface 8819 of the sleeve and an end of 8064 of the shaft 8062. Of course, the bias member could be interposed between different components of the drive element 8814 and the elongated shaft. Further, although shown as a coil spring, the bias member could be in the form of an elastomeric element, a leaf spring, or some other biasing element configured to retract the drive element 8814 into the bore 8063 or generally away from the opening 8085 of the tool 8060.

FIG. 97 illustrates the installation tool 8060 in its compressed state. Generally, in operation, a user exerts a force F37 on the end 8815 of the tool, which in turn moves the driving element 8814 through the elongated bore 3063 and the angled bore 8088, eventually causing the associated fastener 110 to exit from the exit opening 8085 of the tool in into a board (not shown). Generally, the bias member 8818 compresses during the application of the force F37. The sleeve and elongated shaft can be configured so that the sleeve bottoms out against the end 8064 of the elongated shaft 8062 to cease advancement of the drive element in the angled bore or significantly beyond the opening 8085. When the force F37 is removed, the bias element 8018 again urges the surface 8819 of the sleeve away from the end 8064 of the shaft 8062 to re-attain the configuration shown in FIG. 96. At that point, another fastener can be loaded through the opening 8085 and into the angled bore 8088 and/or elongated bore 8063. The process for using the installation tool 8060 can then be repeated to install additional fasteners in the board.

XVII. Thirteenth Alternative Tool and Method Embodiment

A thirteenth alternative embodiment of the fastener installation tool and related method is illustrated in FIGS. 98-106 and generally designated 9060. This embodiment, like the embodiments above can be well suited for use with shrinkable boards, or other types of boards as described herein. Moreover, this embodiment is well suited for the types of fasteners in the embodiments described herein, as well as any other type of fasteners. For example, the tool can be used to advance the side angled fasteners 10, 110, 210, 310 at the respective advancement orientations and using the techniques herein, and/or conventional pointed-tip fasteners. The installation tool of the thirteenth alternative embodiment also is similar in construction and operation to the embodiments described above with several exceptions.

For example, turning to FIGS. 90-102, the thirteenth alternative embodiment of the fastener tool 9060 generally includes a feed mechanism 9832 and a nose assembly 9050. A driving element 9814 can be coupled to a driving tool (not shown). All of these components can be similar in structure and function to that in the alternative embodiments above, for example, at least the eighth through twelfth embodiments above.

The nose assembly 9050 of the thirteenth embodiment can be constructed to include a guide 9080 and an alignment projection 9090. These components can be substantially identical to those of the above embodiments, for example the eighth through twelfth embodiments above. Indeed, the components can have the same structure and function as those described above and will therefore not be described here again in detail. Suffice it to say that the guide 9080 can define an angled bore 9088 that includes a first opening 9084 in communication with the nose assembly opening 9055. The guide 9080 can also be joined with and/or include the alignment projection 9090, which can include the inner engagement surface 9092 and an outer engagement surface 9093, and can define at least a portion of the angled bore. The inner engagement surface can define the exit or second opening 9085 of the angled bore 9088, which extends along a longitudinal axis 9400. These features again are similar to those in the embodiments described above and elsewhere herein.

Figure 98:
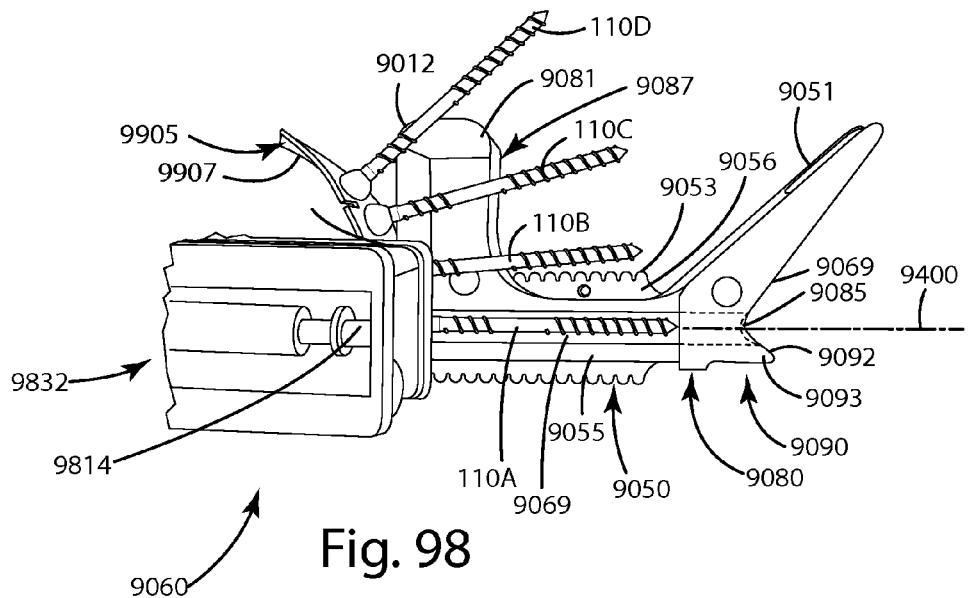
FIG. 98 is a side perspective view of a thirteenth alternative embodiment of the installation tool.

As shown in FIGS. 98-101, the nose assembly 9050 can further define a nose assembly opening 9055 that opens completely to the environment on one side of the nose assembly as shown in FIG. 98. The nose assembly opening 9055 can be in the form of a recess that is disposed adjacent a nose assembly leg 9056 that extends from adjacent the feed 9832 to the guide 9080 and/or foot 9051. With the generally open sided design of the nose assembly opening 9055, an operator can see any issues with the fasteners being advanced through the nose assembly and can access the fasteners or jam if desired. The open configuration of the nose assembly opening also provides an open channel for chip and dust to escape as material is bored or removed from a board and exits the opening 9084 of the angled bore 9088.

The nose assembly leg 9056 can include a supply side surface 9056A and an opposing exit side surface 9056B which generally correspond to the supply side and exit side surfaces of the nose assembly in other embodiments herein. The leg 9056 forms a sidewall of the nose assembly opening 9055. The nose assembly opening is 9055 is bounded on its lower portion by a floor 9055A of the nose assembly.

Figure 99:
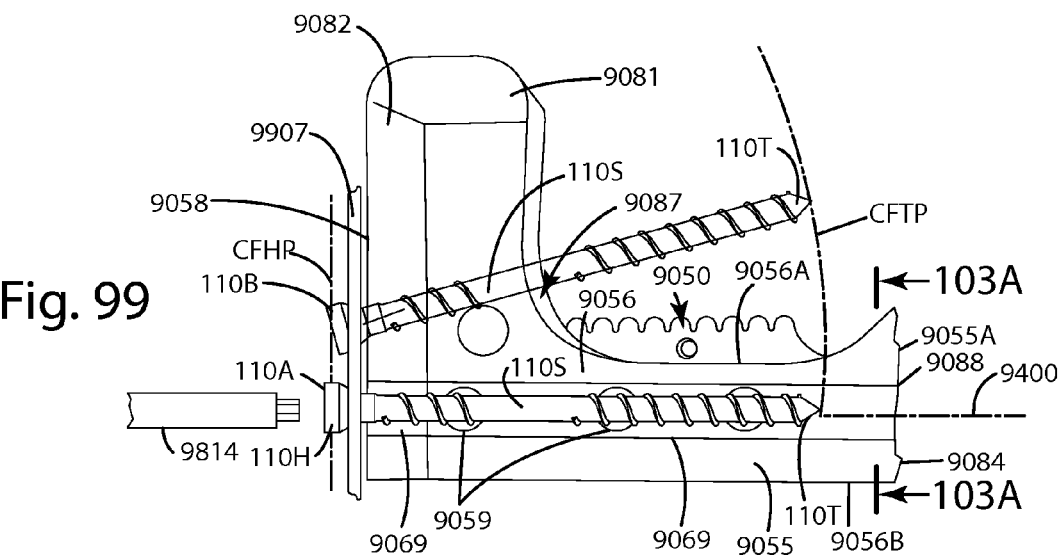
FIG. 99 is a close up view of a guide pocket of a nose assembly of the thirteenth alternative embodiment of the installation tool.

The nose assembly, and more particularly the nose assembly leg 9056 can define a guide pocket 9069. The guide pocket 9069 can be defined on the inner surface of the leg facing the opening 9055. The guide pocket can be aligned with the angled bore 9088 and more particularly the opening 9084 of the angled bore. Moreover, the guide pocket 9069 is aligned with and lies along the angled bore longitudinal axis 9400 so that a fastener rotating within the guide pocket 9069 eventually enters the opening 9084, and travels along the longitudinal axis 9400 as shown in FIGS. 99 and 104.

Figure 104:
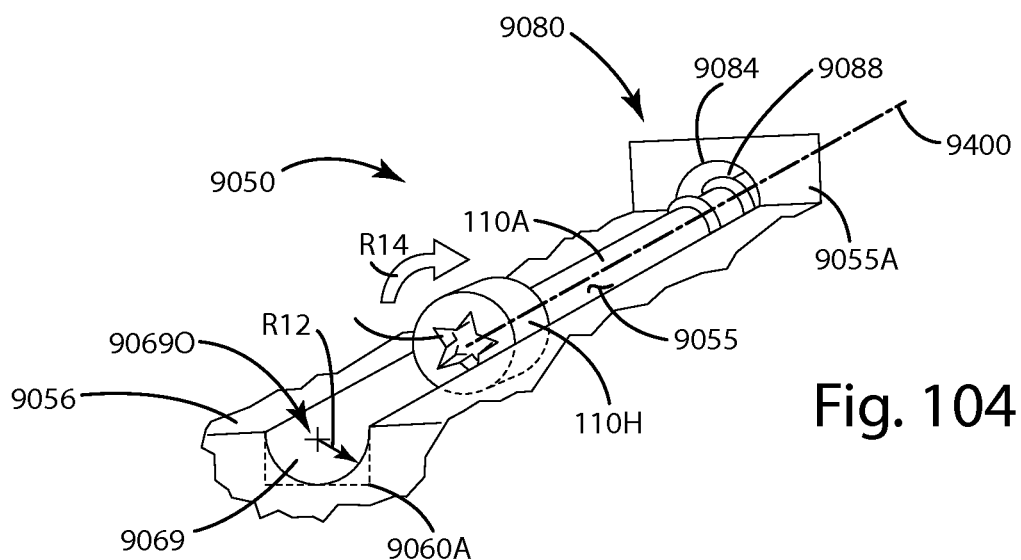
FIG. 104 is a partial sectional view of a head of a fastener being constrained in the guide pocket as the fastener is advanced within the guide pocket and the angled bore of the thirteenth alternative embodiment of the fastener installation tool.

The guide pocket can generally be in the form of a semicircular pocket or recess that opens to the inner surface of the nose assembly leg 9056 as shown in FIG. 104. When in a semicircular form, the pocket can have a radius R12 that is generally greater than the radius R13 of the head of the fasteners which are advanced by the installation tool 9060. As an example, the pocket radius R12 can be about 0.125 inches and the fastener head can have a radius of about 0.1 or 0.08 inches, both being less than the radius R12 of the pocket. In this manner, the head can rotate in direction R14 within the pocket, generally closely fitting within the pocket and being somewhat constrained in it.

Although shown as a semicircular pocket, as shown in broken lines in FIG. 104, the pocket can be of a rectangular shaped groove or slot that extends along the leg 9056 of the nose assembly 9050. Further, if desired, the pocket can be of another shape, such as a polygonal, triangular or elliptical, depending on the particular application.

Generally, the pocket 9069 can be dimensioned so that the fastener 110A, when fitted and rotating in direction R14 within the pocket and/or angled bore 9088, is constrained within that pocket so that the fastener continues to advance parallel to and along the longitudinal axis 9400 of the angled bore 9088. This can be helpful, particularly where the fastener enters the side of a board and begins to dive or deflect substantially off the longitudinal axis in a board, due to the grain of the board, the density of the board, or the angle of entry into the corner or surface of the board. In such a case, the head 110H rotating in direction R14 within the pocket 9069 maintains its position against the sidewalls of the pocket. In turn, the guide pocket 9069 forces the head to advance generally linearly along the pocket so that, despite the forces exerted by the board on the fastener, the fastener remains aligned with and advances along the longitudinal axis 9400 along a desired trajectory.

Figure 100:
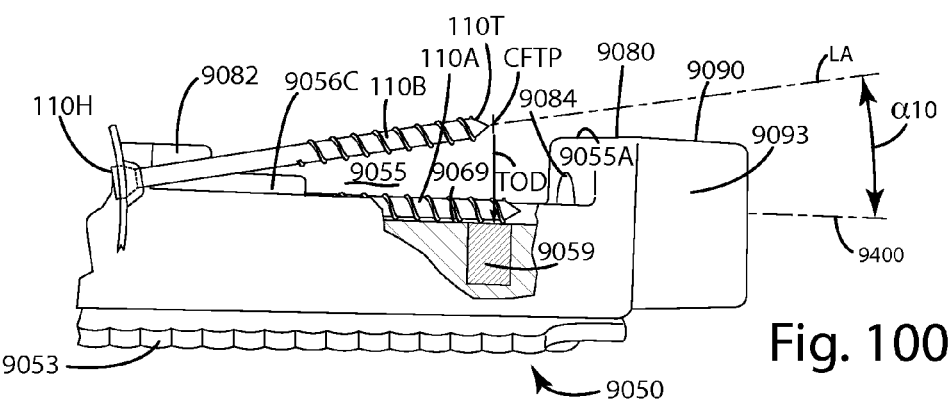
FIG. 100 is a partial sectional view of the nose assembly of the thirteenth alternative embodiment of the fastener installation tool.

As shown in FIGS. 98, 99 and 100, the screw 110A, the nose assembly 9050 can include one or more magnetic elements 9059. These magnetic elements 9059 can be associated with the guide pocket 9050. For example, the magnetic elements can be disposed generally in the lower or side portions of the guide pocket 9069. The magnetic elements can exert a magnetic force on the fastener as described in connection with the magnetic elements of the other embodiments above. Accordingly, as rotates, the fastener 110A is constrained and optionally held within the pocket by the magnetic forces. The magnetic elements can exert a magnetic force on the fastener as it is rotated in the direction R14 throughout the stroke of the tool. The magnetic force can be exerted both on the shaft and the head of the fastener during advancement thereof. Generally, the magnetic elements can cease exerting a magnetic force on the fastener after the head of the fastener enters the opening 9084 of the angled bore 9088, where the screw is entirely circumferentiated by the angled bore 9088. In this position, the head is being substantially guided by the angled bore.

As noted above and shown in FIGS. 98 and 104, the guide pocket is aligned with the longitudinal axis 9400 of the angled bore 9088. The guide pocket 9069 can form a partial continuation of the angled bore 9088, with the opening 9084 being disposed generally between the guide pocket 9069 and the angled bore 9088. In general, the guide pocket can form a channel that partially circumferentiates or surrounds the fastener and its components as that fastener rotates. For example, the channel can surround about 190° to about 60° of the respective components of the fastener 110A.

The angled bore 9088, however, can surround or circumferentiate more of the fastener and its components than the guide pocket. For example, the angled bore as well as its opening can circumferentiate or surround the fastener 110A and its components 360°. Generally, the angled bore can substantially entirely surround the fastener and its components as the fastener is advanced and rotated therethrough.

The guide pocket 9069 can transition to the angled bore 9088 at the opening 9084 as described above. That transition can also form a transition between the leg 9056 to the guide 9080 of the nose assembly 9050. Generally, the guide 9080 or opening 9055 can include a floor 9055A, which defines the opening 9084 to the angled bore 9088. The opening 9084 can also circumferentiate or surround the entire screw, 360° around the screw if desired.

Optionally, the guide pocket 9069 can form a C-shaped channel that transitions to a circular angled bore 9088 defined by the guide 9080 or alignment projection 9090. When in this C-shaped or channeled configuration, the pocket 9069 can generally be of a semicircular, square, rectangular or other polygonal shape. In general, the pocket can form a portion of the corresponding cross sectional shape of the angled bore, which also can be circular, rectangular, square, polygonal or some other shape.

Figure 102:
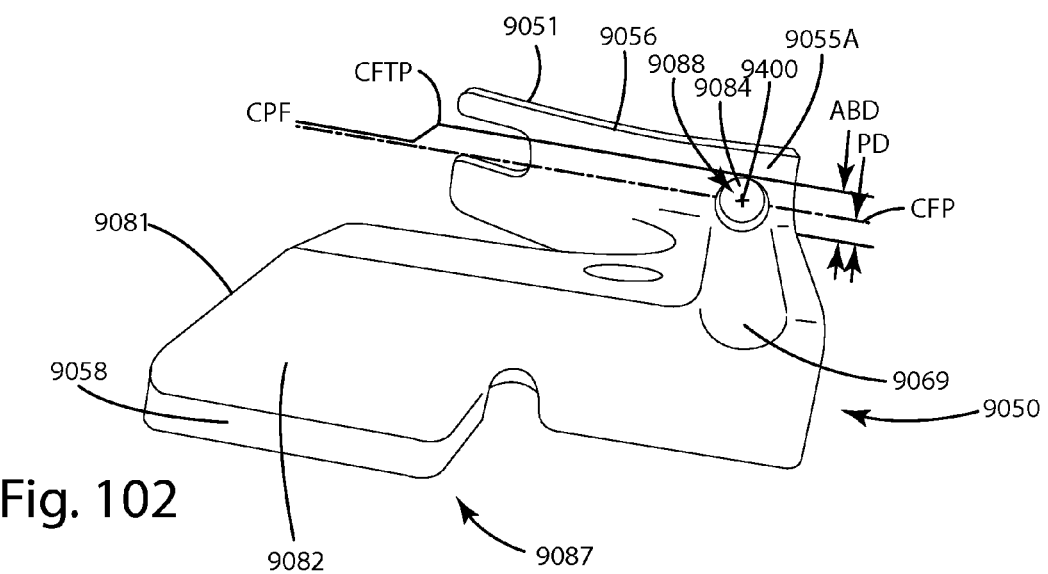
FIG. 102 is an upper perspective view of the nose assembly illustrating the pocket of the thirteenth alternative embodiment of the fastener and installation tool.

Further optionally, as shown in FIG. 102, the depth of the pocket PD can be a fraction or a portion of the angled bore dimension ABD. For example, the pocket depth can be of a depth equal to the radius of the angled bore dimension ABD, which can be a diameter if the angled bore is circular. The pocket can also be "open" on one side, generally opening into the opening 9055, so that a fastener within the opening 9055 can snap laterally into the pocket guide 9069, coming in from the side after having passed around a diverter element and/or a portion of the leg 9056. Further, when disposed in the pocket 9069, the fastener can be located or positioned partially within the nose assembly opening 9055 and partially in the pocket 9069. In this position, the fastener has a portion of its cross section in the pocket and another in the nose assembly opening. As the fastener advances, it also can be position partially in the pocket, partially in the opening of the nose assembly, and partially in the angled bore.

The orientation of the guide pocket 9069 within the nose assembly 9050 and relative to the feed line of the collated fasteners, or collated fastener path CFP, is such that the guide pocket is generally transversely oriented to the feed line or collated fastener path CFP. For example, as shown in FIGS. 103A and 104, the guide pocket 9069 can be in an exemplary "C" or "U" shaped channel configuration having an outer facing opening 9069A. The channel and the opening open in the direction and along the guide pocket opening plane OP, which bisects the opening 9069A of the pocket. The opening is oriented so that it opens laterally, or generally transversely relative to the collated fastener path. For example, an opening plane OP of the guide pocket 9069, is oriented so that that plane OP is transverse to the collated fastener path CFP. As illustrated in FIG. 103A, the opening plane OP can be disposed perpendicular to the feed line or collated fastener path CFP. Of course, in some applications, the opening plane could be oriented so that the opening 9069A opens with the opening plane OP oriented at some other angle, for example, 30 degrees, 45 degrees, or 60 degrees relative to the feed line or collated fastener path CFP. In general, the opening plane OP of the guide pocket 9069 is non-parallel to the feed line or collated fastener path CFP, and can open laterally toward or away from that path CFP at some desired orientation.

With the guide pocket 9069 of the nose assembly 9050, a variety of different length of fasteners can be installed with the tool 9060. For example, due to the physical configuration of the pocket and the optional magnets, fasteners positively register within the pocket regardless of their length. These fasteners are able to be advanced consistently and accurately toward the opening 9084, again, regardless of their length. With such a construction, the nose assembly and the length of the leg need not be adjustable to accommodate different length fasteners. Of course, if desired, it can be adjustable depending on the particular screw application.

Figure 101:
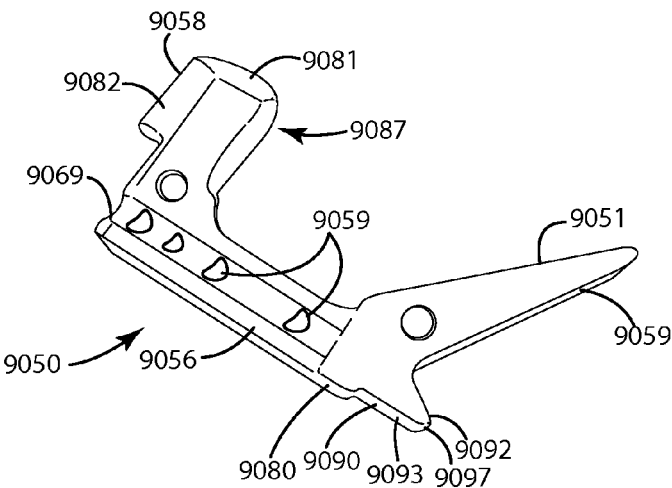
FIG. 101 is a side perspective view of the nose assembly removed from the remainder of the thirteenth alternative embodiment of the installation tool.

As shown in FIGS. 98, 101 and 102, the nose assembly 9050 can include a wing element 9087 including a collector guide element 9081, a diverter element 9082, and a guide area or surface 9058. The collector guide element 9081 can channel the individual fasteners 110A, 1108, 110C, 110D along the collated fastener path CFP, generally capturing the individual fasteners so that they appropriately engage the nose assembly 9050 and travel in a desired direction. The collector guide element 9081 can provide a ramp to guide individual fasteners. For example, If a fastener is excessively tilted, the collector guide element 9081 can guide it toward the drive element 9814. The collector guide element 9081 can be in the form of a chamfered or rounded surface that is positioned immediately adjacent and partially within or obstructing the collated fastener path CFP. This collector guide element can transition to or include a diverter element 9082.

Optionally, although shown as adjoined, chamfered or angled surfaces, the collector guide element 9081 and the diverter element 9082 can be formed by multiple compound angled surfaces or multiple compound curved surfaces. As one example, the diverter element and collector guide element could be combined to form a rounded, hemispherical element extending along and obstructing a portion of the collated fastener path CFP.

As illustrated, the diverter element 9082 is a secondary camphered or rounded surface that is joined with the collector guide element 9081. The diverter element can be positioned directly within and can obstruct at least a portion of the collated fastener path CFP. The diverter element 9082 can be configured so that after an individual fastener is directed toward it via the collector guide element 9081, the diverter element engages that fastener. More particularly, as the fastener advances toward the guide pocket, the diverter element 9082 can engage an upper portion or some other portion of the fastener near the head of the fastener or along the shaft. During such engagement, the diverter element 9082 swings or moves the tip of the fastener outwardly, generally off of the collated fastener path CFP until the fastener is advanced adjacent the pocket 9069, at which point or earlier, the diverter element 9082 disengages or otherwise is no longer in contact with the fastener and the fastener drops or moves into the pocket 9069.

Optionally, due to the flexible nature of the strip 9907 of the collated fasteners 9905, and/or the nature of the connection between the strip and a head of an individual fastener, the swinging, tilting or otherwise moving of the tip of a fastener with the diverter element 9082 is possible. For example, the head and upper portion of the fastener bends or flexes the flexible strip 9907 as the diverter element 9082 engages another portion of the fastener. Sometimes, when it returns to its un-flexed state, the flexible strip 9907 can aid in swinging, tilting or moving the fastener or its tip into the guide pocket, generally in line with the trajectory of the collated fastener path CFP.

To describe the movement of the fastener by the diverter element 9082 in more detail, reference is made to FIG. 100. There, the diverter element 9082 transitions the fasteners, for example 110B, so that the tip 110T is displaced from the collated fastener path CFP by a tip offset distance TOD. When the diverging element 9082 displaces the tip 110T off of the collated fastener path CFP, the tip 110T instead moves along a collated fastener tip path CFTP which is offset from the collated fastener path CFP. Because the collated fastener path CFP also passes through the longitudinal axis 9400, the tip also moves a tip offset distance TOD, offset from the plane of the longitudinal axis 9400 coming out of the page in FIG. 100.

Due to the configuration and location of the guide pocket 9069, a portion of the leg 9056 obstructs the collated fastener path CFP. The diverter element 9082 assists in allowing the fasteners and their tips to ride outward and around that portion of the leg 9056 or the nose assembly that obstructs the collated fastener path CFP until the respective individual fasteners engage or are readied for positioning within the guide pocket 9069.

As shown in FIGS. 98 and 101, the wing element 9087 can include a guide surface or area 9058. The guide surface 9058 can be located adjacent and optionally can transition to the diverter element 9082. The guide surface 9058 can form a riding surface upon which a portion of the strip 9907 can travel as the collated fasteners are advanced through the nose assembly. For example during an advancing operation, the guide surface area can support the strip 9907 adjacent the fasteners 110B, 110C and 110D, thereby preventing those fasteners from flexing and angling or swinging into the opening 9055 as the fastener 110A is advanced. This can prevent jamming of the fasteners within the nose assembly during a driving or advancing operation.

Optionally, as the feed mechanism 9032 and drive element 9814 compress or move during a drive action, the wing element 9087 and the guide surface 9058 can assist in keeping the strip 9907 of the collated fasteners 9905 perpendicular to the drive element 9814. This can prevent jams caused by the fasteners 110B, 110C and 110D by virtue of the flexible strip 9907 flexing and moving these fasteners downward in an undesired area, for example toward the guide pocket as fastener 110A is being advanced. In some cases, where the guide surface 9058 does not engage the strip of the collated fasteners, the strip 9907 might bend toward the deck which could cause some of the succeeding fasteners 110B, 110C to enter the opening 9055 and interfere with the fastener 110A being advanced in the pocket 9069.

FIG. 102 illustrates the relationship between the collated fastener path CFP and the longitudinal axis 9400 of the angled bore 9088, particularly in relationship to the leg 9056 and the pocket 9069. As shown, the leg 9056 obstructs a portion of the collated fastener path CFP. To move the fasteners and in particular the fastener tips around the leg 9056, the collector guide element 9081 and the diverter element 9082 engage upper portions of the fasteners so that the tips follow the collated fastener tip path CFTP. The collated fastener tip path CFTP is displaced outwardly relative to the leg 9056. The tips of the respective fasteners remain displaced laterally from the remainder of the collated fastener path CFP as the tips travel along the collated fastener tip path CFTP, for example, until the respective fastener is queued for registration in the guide pocket 9069.

At that point, the collated fastener tip path CFTP redirects the respective fastener laterally back toward the collated fastener path CFP in the direction of the arrow so that the fastener can enter the guide pocket 9069, and can be substantially aligned with the longitudinal bore axis 9400. This operation can entail the tip and the remainder of the shaft swinging, moving or tilting into the pocket guide 9069, generally so the entire fastener is aligned with the longitudinal bore axis 9069. This can be assisted via the physical structure of the guide pocket 9069 and/or the magnetic force exerted by the magnetic elements 9059.

The operation of the installation tool 9060 of the thirteenth alternative embodiment and its related method of use are similar to the operation and related methods of the other tool embodiments herein, with several exceptions. For example, the installation tool 9060 can be loaded with collated fasteners 9905 and placed adjacent a corner of a board, of any of the types described herein, to advance a fastener into the board. With the collated fasteners loaded, the feed mechanism 9832 feeds the collated fasteners toward the nose assembly, as with the other embodiments, however, the individual fasteners move in a particular manner.

Figure 103:
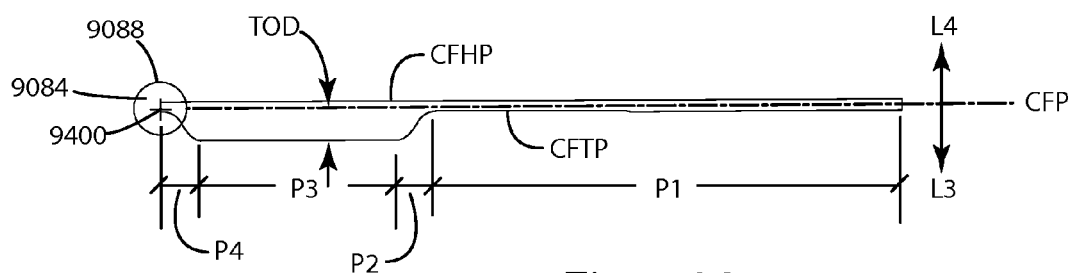
FIG. 103 is an illustration showing a collated fastener path, a collated fastener head path and a collated fastener tip path of collated fasteners advanced by the thirteenth alternative embodiment of the fastener installation tool.
Figure 103A:
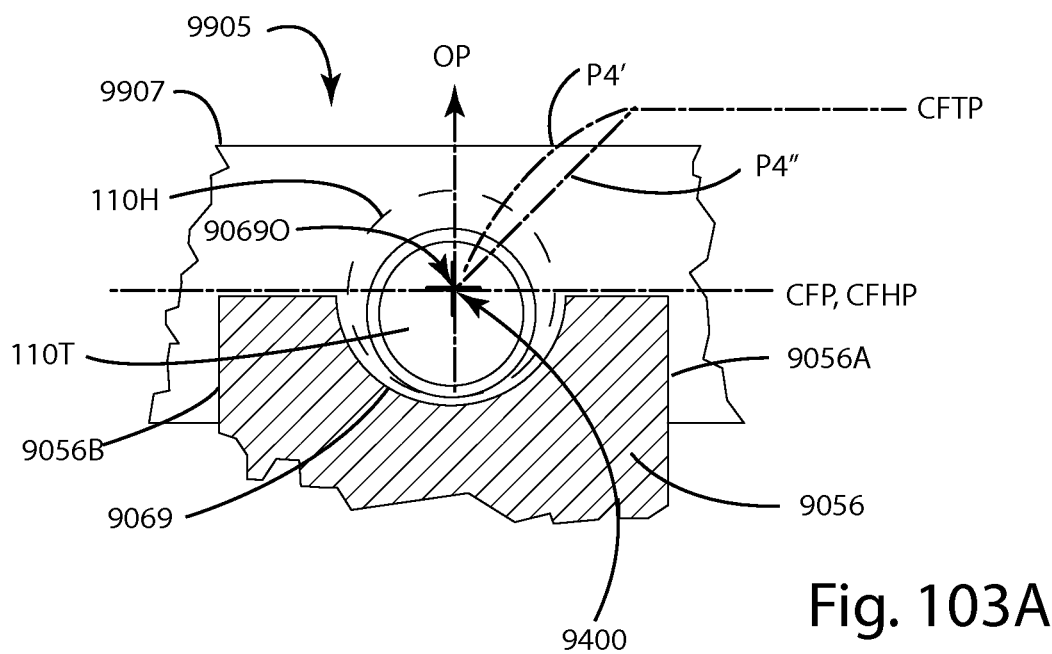
FIG. 103A is a cross section view taken along lines 103A-103A of FIG. 99, showing a collated fastener path, a collated fastener head path and a collated fastener tip path of collated fasteners advanced by the thirteenth alternative embodiment of the fastener installation tool.

For example, as shown in FIGS. 98 and 103, the collated fasteners 9905 include multiple individual fasteners 110A, 110B, 110C, 110D which are fastened to the flexible strip 9907. These fasteners travel along the collated fastener path CFP, which can generally be a straight line or plane from the holder (not shown) extending toward the bore longitudinal axis 9400. Of course, the fasteners and the tips and their locations relative to one another can vary somewhat due to the flexibility of the strip 9905. Generally, however, when unaffected by components of the nose assembly, the fasteners travel with the heads and the tips substantially aligned along the collated fastener path CFP. This is indicated by the collated fastener head path CFHP and the collated fastener tip path CFTP in FIG. 103, being parallel to the collated fastener path CFP (with some optional minor deflections due to the flexibility of the strip). Thus, the collated fastener head path CFHP and the collated fastener tip path CFTP correspond to the collated fastener path CFP, at least during the period or segment P1 as the individual fasteners approach the collector guide element 9081.

When the collector guide element 9081 and/or the diverter element 9058 engage the fasteners during segment P2, the portions of the fasteners adjacent the tip and the tip itself move laterally in the direction L3, transitioning the collated fastener tip path CFTP away from the collated fastener path CFP so that the tips 110T are displaced from the collated fastener path CFP by a tip offset distance TOD. Even with this offset movement and lateral displacement of the tip 110T, the head 110H of the fastener can continue to travel along the collated fastener head path CFHP, generally parallel to and coincident with the collated fastener path CFP, as shown in FIG. 103.

After the transition, the diverter element can maintain the collated fastener tip path CFTP offset from the CFP by the tip offset distance TOD for the segment P3. The tip offset distance TOD can be about 1/32 inches to about 1 inch, optionally about 1/16 inch to about 3/4 of an inch, further optionally about 1/4 inch to about 1/2 inch, depending on the application. Optionally, the tip offset distance TOD can be controlled by the configuration of the diverter element 9082. For example, the diverter element can vary the tip offset distance TOD over the segment P3, so that the collated fastener tip path diverts in an arc from the collated fastener path CFP (when viewed from above), depending on the configuration of the diverter element. The diverter element 9082 also can offset the longitudinal axis LA of the fastener 1108, as shown in FIG. 100, so that the longitudinal axis LA is transverse and/or non-parallel to the angled bore axis 9400. The longitudinal axis LA can be offset from the bore axis 9400 at an angle α10 from the plane coming out of the page through the longitudinal axis 9400. This angle α10 can range from about 1° to about 50°, optionally about 5° to about 40°, and further optionally about 15° to about 25°.

Generally, in this segment P3, the fastener also is tilted or angled away from the leg inner surface 9056C, with the tip 110T being located a first distance away from the inner surface 9056C that is greater than a distance that the shaft 110S of the fastener adjacent the head 110H is away from the inner surface. Indeed, in this segment P3, the upper portion of the shaft 110S' (FIG. 99) of fastener 1108 can engage the diverter element 9082 and be adjacent to it, while the tip 110T' can be separated a distance from the leg inner surface 9056C, and not in engagement with that surface.

With further reference to FIGS. 99, 100 and 103, through segment P3, the collated fastener heads generally travel along the collated fastener head path CFHP parallel to and overlaying the collated fastener path CFP. The tip 110T of the fasteners continue to travel along the collated fastener tip path CFTP, displaced a total offset distance TOD from the collated fastener path CFP for the segment P3 as they advance toward the guide pocket 9069 and angled bore 9088, generally being driven by fed feed mechanism 9832 in a manner similar to the other embodiments herein.

Optionally due to the open recess configuration of the nose assembly opening 9055, the fasteners do not encounter any obstructions as they advance across a portion of the leg 9056 of the nose assembly 9050. This can be due to the diverter element 9082 holding the fastener shaft and tip outward and tilted away from the leg and inner surface 9056C of the leg 9056.

As the fasteners are positioned for individual placement in the guide pocket 9069, the tips 110T of the fasteners travel in the direction shown in segment P4 along the collated fastener tip path CFTP in FIG. 103. In the transition from segment P3 to segment P4, the fasteners pass beyond an end of the diverter element 9082 so that the fastener shaft and tip move generally in lateral direction L4 toward the collated fastener path CFP.

With further reference to FIGS. 103 and 103A, as fasteners are advanced through segment P3, the fasteners are tilted away from the feed line or collated fastener path CFP, with the tips of the individual fasteners travelling along the collated fastener tip path CFTP. The heads 110H, in contrast, generally stay inline and parallel to the collated fastener path CFP along the collated fastener head path CFTP. This is possible because as shown in FIG. 99, the heads are generally above the nose assembly 9050, and the guide surface 9058, while being advanced in the collated fastener strip 9907. As soon as the shaft or portion of the fastener 110A clears the diverter element 9082, the fastener 110 swings, moves or tilts into the guide pocket 9069, by virtue of the material of the strip 9907 resiliently springing it in this direction and/or the magnetic force exerted by the magnetic elements 9059.

As the fastener swings or generally moves into the pocket, several things can occur. For example, the tip 110T and at least a portion of the shaft 110S of the fastener travel transversely to the overall feed line of the collated fasteners 9905, and more particularly, transversely to the collated fastener path CFP. Generally, before such transverse movement, the tip is displaced laterally a distance equal to the tip offset distance TOD. In the transverse movement, the tip can travel along an arcuate path P4' and/or an angled path P4". Of course, this path can be of multiple compound arcs or intersecting angles, or combinations thereof, depending on the transition from the diverter element 9082 to the guide channel 9069. Indeed, in some cases, the tip can travel perpendicularly to the collated fastener path CFP. The tip 100T continues its transverse movement relative to the collated fastener feed line or collated fastener path CFP until it substantially registers in the guide pocket 9069, as shown in FIG. 103A. There, the threads, tip 110T and/or shaft of the fastener are held by the magnetic force exerted by the optional magnetic elements 9059.

During the transverse movement of the tip 110T in segment P4, the head 110H of the fastener, generally moves along its collated fastener head path CFHP, which is aligned with and substantially overlaps the collated faster feed line or collated fastener path CFP. Thus, in this segment P4, the head 100H moves generally along the collated fastener path CFP, while the tip 110T is tilting, swinging or otherwise moving back toward that collated fastener path CFP. Further, the movement of the tip 110 is transverse to the collated fastener path CFP in this segment so that the tip and shaft of the fastener can pass into the guide pocket opening 90690 and register in the guide pocket 9069. Throughout the movement of the fastener in segment P4, and even when the tip 100T and the shaft enter into pocket 9069, the head 110H can remain generally removed from or outside the pocket 9069. For example, as shown in FIG. 99, the head 110H remains above the guide pocket 9069. The head 110H, which can also be included in the strip of material 9907, also can be located above the guide surface 9058, and generally the nose assembly 9050 itself. Of course, as described below, when the drive element 9814 engages and moves the fastener, the head 110H eventually is pushed or moved into and through at least a portion of the guide pocket 9069.

The individual fastener as shown in FIGS. 100 and 104, and in particular the tip 110T and shaft, can be urged into the guide pocket 9069 to ensure positive registration within it by a magnetic force exerted by the magnetic elements 9059 pulling the shaft into the pocket and/or the configuration of the pocket 9069. In some cases the fastener shaft can engage the magnets. Additionally or alternatively, the tips and the shafts can be pulled into the pocket by way of the flexible material resiliently deflecting those elements back into the pocket 9069 after the fastener has passed the diverter element 9082. Where used, the magnetic elements can ensure a positive registration of the fastener within the pocket. Sometimes, an audible click can be heard when the fastener registers within the pocket 9069.

With the fastener 110A, shown in FIGS. 99, 100 and 104, registered in the pocket 9069, that fastener is aligned generally along the longitudinal axis 9400 of the bore and precisely aligned with the opening 9084 of the guide 9080. The drive element 9814 can begin to advance the fastener upon such registration. When the drive element engages the head of the fastener, the fastener rotates in direction R14 as shown in FIG. 104. The fastener moves along the longitudinal axis 9400, rotating as it goes. The head 110H of the fastener 110A is constrained within the pocket 9069 during this advancement, at least for the first portion of the advancement, until the tip of the fastener engages the board into which the fastener is being advanced. The pocket 9069, and optionally the magnets, ensure that the fastener shaft and head stay aligned with the longitudinal axis 9400 of the longitudinal bore, and thus aligned with the desired advancement trajectory of the fastener into the board.

This alignment can be ensured with the nose assembly and guide pocket, regardless of the forces applied to the fastener by the board or other elements during advancement. For example, if the board presents the fastener with an angled surface that typically would cause the fastener to deflect, dive and/or tilt, the guide pocket constrains the rotation of the head of the fastener, and counters this deflection. This, in turn, maintains the screw substantially aligned with the longitudinal axis 9400 so that it does not tilt off of the desired trajectory upon being advanced into the board.

Further, when the head of the fastener enters the opening 9084 and more particularly the angled bore 9088, the head is circumferentiated or surrounded more so than when in the pocket 9069. Accordingly, the fastener is further constrained to keep it along the desired advancement trajectory so it can be driven at an angle into the side surface and/or corner or a respective board as described in any of the embodiments herein. After the fastener is satisfactorily advanced, the tool can be reset and used to advance additional fasteners in a similar manner.

Figure 105:
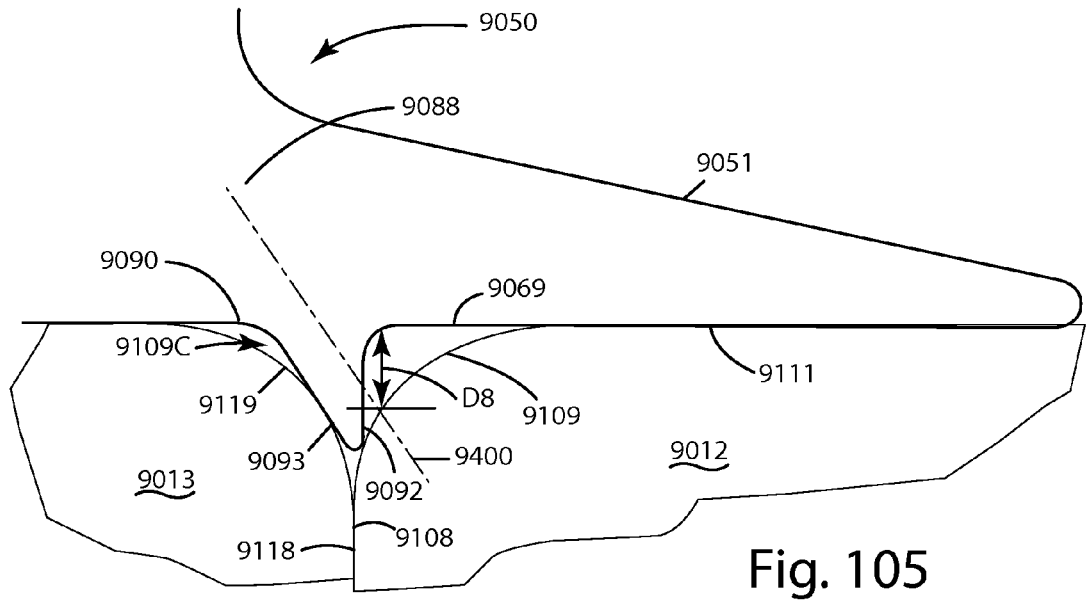
FIG. 105 is side view of an alignment projection of the thirteenth alternative embodiment of the fastener installation tool wedging fully within a crevice between boards paced immediately adjacent one another.

As an additional example, the tool 9060 can be used in connection with boards placed immediately adjacent one another with no or small gaps between the boards. With reference to FIG. 105, the foot 9051 of the nose assembly 9050 can be placed adjacent an upper surface 9111 of board 9102. The inner engagement surface 9092 can be placed immediately adjacent the side surface 9108 and/or corner 9109 of the board. A fastener can subsequently be advanced into this corner along the longitudinal axis 9400 of the bore 9088.

As with some other embodiments herein, where the tool 9060 is used so that the alignment projection or wedge 9090 is wedged between adjacent boards 9102 and 9103 to advance a fastener, the particular radii of the board corners and the engagement of back wall or outer engagement surface 9093 with the adjacent board 9103 can affect the overall depth at which the fastener is driven into the board 9102. For example, as shown in FIG. 105, the radii of the respective corners 9109 and 9119 of boards 9102 and 9103 are sufficiently large so as to form a large crevice 9109C between the corners. The alignment projection or wedge 9090 fits within that crevice. The outer engagement surface of back wall 9093 engages the corner 9119 of the prior laid board 9103. In turn, this engagement of the outer engagement surface with the already laid board 9103 sets the depth D8 at which the fastener can be advanced along the longitudinal axis 9400. The fitment of the entire wedge 9090 within the crevice also enables the bottom surface 9069 of the foot 9051 to rest against the upper surface 9111 of the board 9102.

Figure 106:
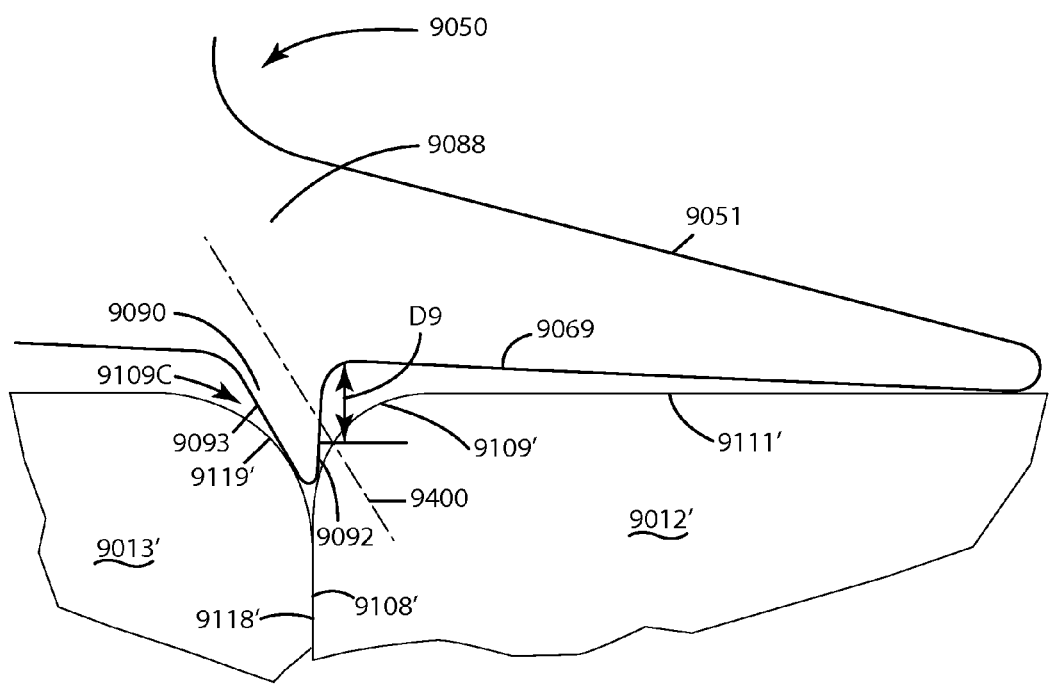
FIG. 106 is another side view of the alignment projection of the thirteenth alternative embodiment of the fastener installation tool wedging partially within a crevice between boards placed immediately adjacent one another.

As another example, FIG. 106 shows a crevice 9109C' between the respective corners 9109' and 9119' is relatively small. There, the alignment projection or wedge 9090 only fits partially into the crevice between the respective corners 9109' and 9119'. The outer engagement surface 9093 engages the opposing corner 9119' of the existing board 9103'. This engagement sets the depth D9 at which the screw is advanced along the longitudinal axis 9400 into the corner 9109'. This depth, D9, is less than the depth D8 shown in FIG. 105. Further, due to the wedge only sitting partially into the crevice as shown in FIG. 106, the bottom surface 9069 is offset at an angle relative to the upper surface 9111' of the board 9102'.

As described in connection with the some other embodiments herein, with different sized crevices between the respective corners of boards, the outer engagement surface 9093 can engage a prior laid board to set the screw as deep as possible without allowing the screw to bite into or mar the corner or radius of the prior laid board. The other operations of the tool are similar to those mentioned in other embodiments herein, and therefore will not be repeated here.

XVIII. Fourteenth Alternative Tool and Method Embodiment

A fourteenth alternative embodiment of the fastener installation tool is illustrated in FIGS. 107-111 and generally designated 10060. The installation tool shown there is similar in construction and operation to the embodiments described above with several exceptions. For example, the tool 10060 is configured to work in conjunction with the integral or selectively attachable driving tool 10010 such as the drills or hand tools described herein. The tool 10060 is also configured so that the user thereof can operate the tool and install fasteners from a standing or otherwise elevated position, as with some of the other embodiments herein.

Sometimes, a challenge with advancing fasteners from a standing position is that the user cannot attain sufficient footing or cannot stabilize their body to precisely position and push the driving tool 10010 to advance a fastener through the nose 10050 and precisely into a substrate or board 10102. This embodiment includes a push handle assembly 10061 to facilitate the application of force by a user to the nose assembly, an alignment projection and/or foot to ensure these elements contact the substrate in a satisfactory manner and advance a screw into the substrate 10102. For example as shown in FIGS. 107-111, the push handle assembly 10061 includes a push bar 10065 and a push handle 10063. The lowermost portion 10065B can be rigidly and fixedly attached to the nose 10050 as shown in FIG. 111. The push bar 10065 can extends upwardly, generally parallel or somewhat aligned with and/or adjacent the extension tube 10020 extending from the driving tool 10010 to the feed mechanism 10032 and/or the nose assembly 10050. Incidentally, all of the components of the nose assembly 10050 feed mechanism, and other components of the installation tool 10060 can be similar if not identical to any of the other embodiments herein.

The push handle assembly 10061 effectively enables a user, for example as shown in FIG. 1007 to depress the push handle portion 10063 and exert a force through the push bar 10065 to the nose assembly 10050. In turn, this enables the user to push with that force the alignment projection 10090 against a side surface 10108 and advance a fastener into the substrate 10102. The transmission of this force through the push handle 10060 can also enable a user to effectively bring the foot 10051 of the nose assembly against an upper surface of the substrate 10102, and generally ensure proper alignment of the alignment projection 10090 with the side surface 10108 when a fastener is to be driven into that side surface.

Generally, the push handle assembly 10061 can enable a user to apply a force through the push handle assembly and push bar 10065 directly to the nose assembly 10050, yet still move the extension tube 10020 and driving tool 10010 toward the nose assembly 10050 under another force. The driving tool and feeding mechanism 10032 can be movably attached to the nose assembly 10050 to advance the fastener, while the push handle assembly 10061 can be rigidly and immovably attached to the nose assembly 10050. Again this optionally can enable a user to exert and transmit one force through the push handle assembly 10061 to the nose assembly 10050 and bring the associated alignment projection 10090 and foot (if included) 10051 into sufficient engagement with a substrate 10102 during the advancement of a fastener into the substrate, and another force through the extension, feed mechanism and/or nose assembly to the fastener to advance the fastener into the substrate. This application of force via the push bar assembly can be helpful where a user is standing on a platform or joists adjacent the substrate or board 10102, but does not have good footing to stand and simultaneously push the nose assembly into contact with the board.

As shown in FIG. 111, the push bar 10065 and in particular its lower end 10065B can be rigidly and fixedly attached to the nose assembly. This can enable a force to be transmitted directly through the push bar 10065 to the nose assembly 10050 and subsequently to the alignment projection 10090, thereby pushing it directly up against a side surface 10108 of a substrate. The bottom 10065B can be attached to the nose assembly and in particular a rearward extension 10053 of the nose assembly 10050. The rearward extension can extend rearward from the pocket 10069 of the nose assembly 10050, and/or generally in an opposite direction from the foot 10051, relative to the alignment projection 10090. Optionally, the extension 10053 extends rearward from the alignment projection 10090 while the foot 10051 extends forward of the alignment projection 10090.

Although shown as separate pieces, the push bar 10065 and the extension 10053 can be integrally formed as a single piece unit. In FIG. 111, the push bar bottom 10065B is attached via a screw 10062 via a fastener 10062 to the extension 10053. In some limited cases, the push bar 10065 can be pivotally attached to the extension 10053 and/or nose assembly 10050 in general. Further optionally, the angle of the push bar 10065 relative to the extension 10020 can be varied to enable a user to customize the angle at which they apply force through the nose assembly 10050 to a substrate 10102.

Figure 108:
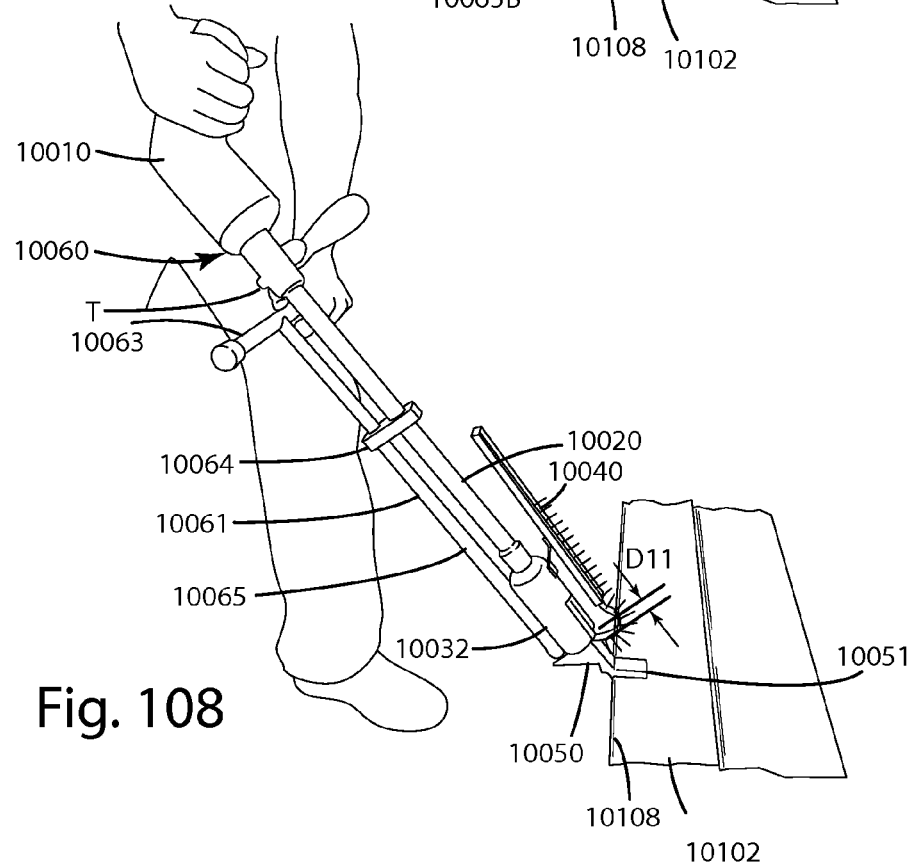
FIG. 108 is another perspective view of the fourteenth alternative embodiment of the fastener installation tool including the push handle further advancing a fastener.

As shown in FIGS. 108 and 110, the push bar 10065 of the push handle assembly can be an elongated tubular member that extends from the nose assembly 10050 upwardly adjacent the extension tube 10020. Although shown as a tube, the push bar 10065 can be a solid construction, such as a rigid bar or some other elongated structure. A push bar handle 10063 can be mounted to the upper end 10065A of the bar 10065. The push bar handle 10063 can be perpendicular to the push bar 10065, if desired, extending laterally from opposing sides of the push bar 10065. In some applications, however the bar may only extend from one lateral side of the push bar 10065. Further, in some applications, the precise angle of the handle 10063 to the push bar 10065 can be varied to ergonomically accommodate a user's pushing technique on the push handle assembly.

Optionally, although not shown, the handle 10063 can be connected at the junction 10063A with the upper end 10065A of the push bar 10065 with a swivel or pivot element that allows a user to swivel a single handle about a longitudinal axis of the push bar 10065, from one lateral side to the other. Further optionally, the handle 10063 may only be a shortened handle that extends in one direction away from the push bar 10065, rather than in both directions as shown in FIG. 110. In such a case, with the swivel at the junction 10063A, or somewhere else along the push bar, a user can readily pivot the handle 10063 from one lateral side to the other, depending on whether the user is left-handed or right-handed, or depending on the particular orientation of the tool relative to a substrate 10102.

The push handle assembly 10061 can be attached to the extension tube 10020 or other components of the driving tool 10060. For example, the push bar 10065 can be attached via a bracket 10064 to the extension tube 10020. This bracket 10064 can securely mount to the push bar 10065 at a fixed location or distance from the extension, the feed mechanism and/or the nose assembly. Optionally, the bracket can attach the push bar to the extension tube in a moving or sliding relationship. For example, as shown in FIG. 110, the diameter or other dimension of a hole 10064A, through which the extension tube 10020 can be placed, can slightly larger than the outermost diameter or other largest dimension of the extension tube 10020. Accordingly, the extension tube 10020 can slide within that hole 10064A during a fastener advancing operation. Of course, in an alternative construction, the bracket 10064 can be rigidly attached to the tube 10020 but can move or slide relative to the push bar 10065. Further, although shown with the bracket 10064 mounted about midway between the nose assembly 10050 and the driving tool 10010, the bracket can be mounted at virtually any location along the extension tube and/or push bar 10065. If desired, the bracket can be incorporated into a portion of the push handle 10063.

Figure 107:
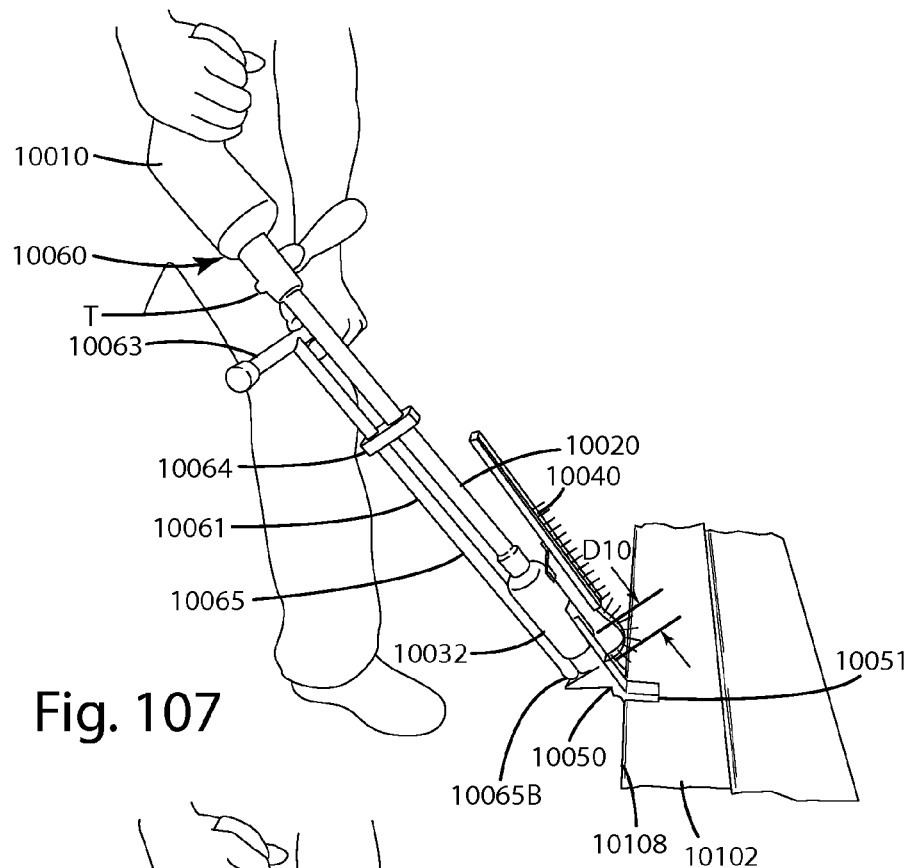
FIG. 107 is a perspective view of a fourteenth alternative embodiment of the fastener installation tool including a push handle at the beginning of a fastener installation.

Operation of the fastener installation tool of the fourteenth alternative embodiment will now be described with reference to FIGS. 107-111. As shown in FIGS. 107 and 111, the feed mechanism 10032 is generally a distance D10 from the nose assembly 10050 at the beginning of an advancement of a fastener. In this configuration, the feed mechanism 10032 has advanced a fastener 10110 sufficiently into the pocket 10069 of the nose assembly 10050, readying the fastener to be advanced into a substrate 10102. The user can grasp the driving tool 10110 with one hand. The user can the handle 10063 of the push handle assembly with their other hand, and can place their knee or thigh T against that handle as well. The user can apply a first force F6 such as those described in other embodiments herein to the driving to advance the fastener within the nose assembly. The user can apply a second force F7 to the handle 10063 with their thigh and/or hand. With the handle generally engaging the user's thigh T, the user can apply additional force by leaning into the handle 10063. This second force F7 force is transmitted through the handle 10063 through the push bar 10065 and directly to the nose assembly 10050. In turn, the alignment projection 10090 can engage the side surface 10108 of the substrate or board 10102 with sufficient force so that when the screw begins to advance into the substrate, it satisfactorily enters and continues in the side surface and/or substrate 10102.

As shown in FIG. 108, the use continues to apply a force by engaging their thigh T against the handle and push bar to continue to apply the force through the nose assembly 10050 against the substrate 10102. In this portion of the operation, the screw is advanced into the substrate and in particular the side surface 10108. In so doing, the feed mechanism 10032 begins to advance toward the nose assembly 10050 thereby reducing the distance D10 to a second distance D11, which is less than the first distance D10. To advance the feed mechanism 10032, the user continues to apply a second and separate force F6, different from the one applied through their thigh T, to the driving tool 10010. This in turn causes the extension tube 10020 to push downwardly the feed mechanism 10032.

As shown in FIG. 108, the extension tube 10020 slides relative to the bracket 10064 and thereby also moves relative to the push handle assembly 10061. During this movement of the other components, however, the push handle assembly 10061 and its components remain rigidly and fixedly attached to the nose assembly 10050, and therefore do not move relative to the nose assembly 10050. Again, this is in contrast to the feed mechanism, extension bar and/or driving tool 10010, which move relative to the nose assembly and generally toward it during advancement of the fastener.

As shown in FIG. 109, the fastener advancing operation continues, with the fastener advancing farther into the substrate 10102. The feed mechanism and other elements move to a distance D12 away from the nose assembly. This distance D12 can be a distance of about 0 inches or slightly more. Generally, the feed mechanism 10032 can bottom out adjacent the nose assembly 10050 in this configuration, which also corresponds to the fastener being fully advanced by the fastener installation tool 10060 into the side surface and/or other surface of the substrate 10102. This distance D12 is less than the distance D11, and less than the distance D10.

Generally, as shown in FIGS. 108 and 109, the user can apply a first force F6 with a first hand directed to the driving tool 10010. This force F6 is transmitted to promote movement of the driving tool 10010 toward the feed mechanism and/or nose assembly 10050, which in turn advances the fastener 10110 into the substrate when the nose assembly is properly positioned. The user also applies a second force F7 through their thigh T and/or other hand directly to the push handle assembly 10061. The second force effectively is transmitted to the nose assembly 10050 to force the nose assembly against a substrate, for example the alignment projection 10090 against a side surface 10108 and the foot 10051 (where included) against the upper surface of the substrate 10102.

Optionally the first force F6 transmitted through the driving tool of the feed mechanism operates to advance the fastener into the substrate, whereas the second force F7 administered through the push handle assembly 10061 transmits a force, separate from the first force, to the nose assembly to ensure engagement of the nose assembly with a substrate. The second force F7 does not operate to advance the fastener through the nose assembly 10050, the alignment projection 10090, or any other associated components of the tool.

XIX. Fifteenth Alternative Tool and Method Embodiment

A fifteenth alternative embodiment of the fastener installation tool and related method is illustrated in FIGS. 112-117 and generally designated 11060. This embodiment, like the embodiments above, can be well suited for use with shrinkable boards or other types of boards as described herein. Moreover, this embodiment is well suited for the types of fasteners in the embodiments described herein, as well as any other type of fasteners. For example, the tool can be used to advance the side angle fasteners 10, 110, 21, 310 at the respective advanced orientations and using the techniques herein, and/or conventional pointed-tip fasteners.

The installation tool of the fifteenth alternative embodiment also is similar in construction and operation to the embodiments described above with several exceptions. For example the fifteenth alternative embodiment of the fastener installation tool can be for use in advancing individual fasteners, one at time, into a side surface and/or corner of a board, for example, a shrinkable board, as described in conjunction with the embodiments of the other fasteners and tools herein.

The fifteenth alternative embodiment of the fastener installation tool 11060 can also include the elongated shaft 11062, guide 11080, alignment projection 11090, shaft bore 11063A, guide bore 11088 and other features of the eleventh and twelfth alternative embodiments of the installation tool 7060 and 8060 described above. In addition, the tool can include a drive element 11014 that is reciprocally mounted within one or both of the shaft bore 11063A and guide bore 11088 of the elongated shaft 11062 and guide 11088, and that moves relative to the shaft, guide and/or alignment projection.

With more particularity, turning to FIGS. 112-116, the tool can include a primary housing or sleeve 11017 mounted to and/or joined with a secondary housing or sleeve 11016. The primary housing 11017 can include ergonomic contours to enhance a user's grip on the tool, preventing it from rotating when it is joined with a driving tool and when a fastener is being advanced by the tool. The primary housing 11016 can include a lower surface 11019 which can be configured to engage the upper surface of the substrate during a fastener advancing operation. This lower surface, also referred to as a substrate engaging surface 11019, can be generally positioned around at least a portion of the guide 11080 and/or the alignment projection 11090. The substrate engaging surface 11019 generally can be flush or slightly recessed above or below the forward and rearward engagement surfaces 11069 and 11068 that are located forward and rearward of the alignment projection as described in connection with other embodiments herein.

The primary housing 11016 can further define a shaft bore 11013. The shaft bore 11013 can house at a portion of the elongated shaft 11062 which itself defines the angled bore 11088 as well as a portion of the guide 11080, which is joined with an/or adjacent the elongated shaft, and which defines the angled bore 11088. The housing 11017 can include a shoulder engagement surface or shoulder 11012 which is configured to engage a shoulder 11063 located adjacent the guide 11080 and the elongated shaft 11062, or some other structure of these components. This engagement can ensure that the shaft 11062 is not unintentionally forcibly pushed upward into the housing 11017 during a fastener advancing operation. If desired, a secondary fastener (not shown) can be placed through the housing engaging a portion of the elongated shaft 11062 or guide to secure it in place within the bore 11013.

Figure 117:
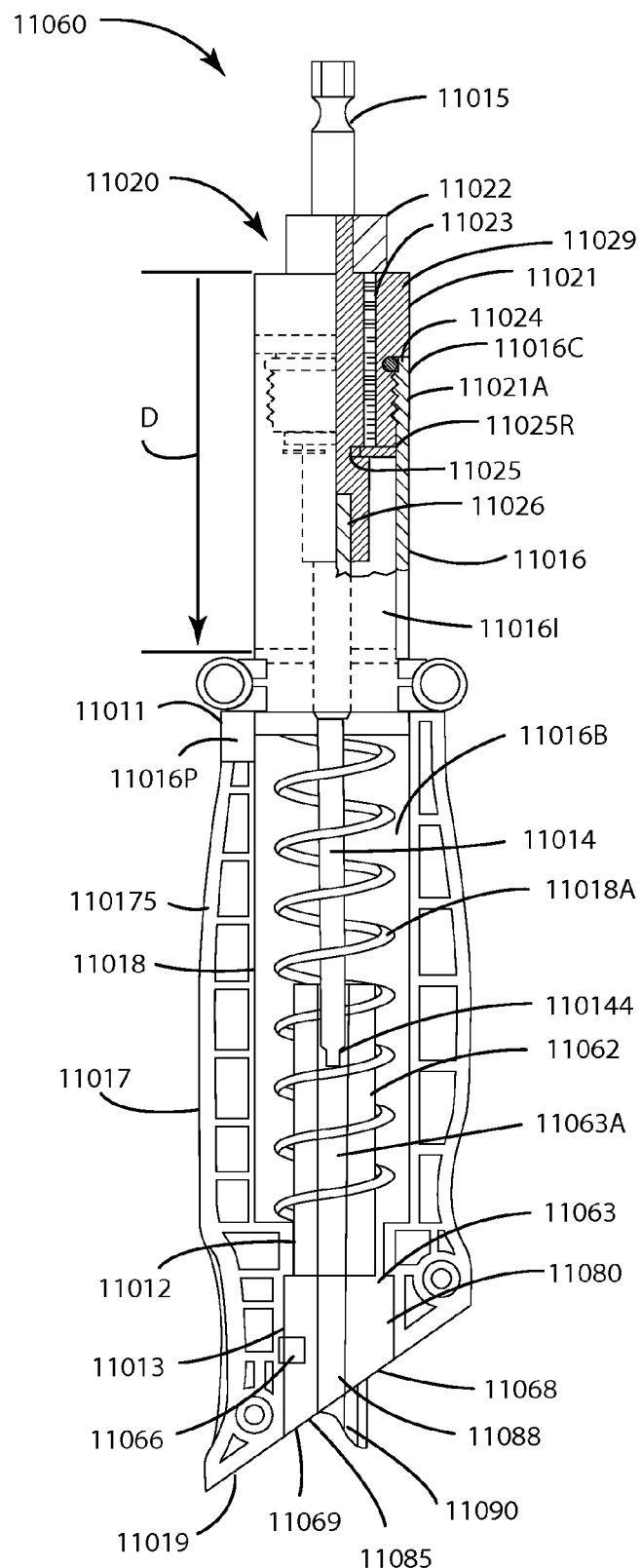

As further shown in FIG. 117, the housing 11017 can define the internal bore 11018 extending generally from the shoulder 11012 upward to an upper or first end 11011 of the housing 11017. This internal bore 11018 can be sized to receive at least a portion of the elongated shaft 11062 and the corresponding shaft bore and/or angled bore. The internal bore 11018 also can be sized to receive and house at least a portion of the drive element 11014, as well as a bias element 11018A.

The bias element 11018A as shown can be a coil spring. It can be interposed between a portion of the housing 11017, for example the shoulder 11012, and the upper end 11011 of the housing. Generally, the bias member 11018A urges the secondary housing 11016 to the generally opened or extended mode as shown in FIG. 117. This extended mode is sufficient to move the drive element 11014, in particular the drive element head 11014H, within the angled bore 11088 and/or shaft bore 11063A so that a fastener can be positioned in the same, substantially entirely within one or both of those bores without protruding beyond the second opening 11085.

Generally, the bias member can reset the tool, readying it to be loaded with a fastener. The bias member 11018A can engage a portion of the secondary sleeve, for example the sleeve pin 11016P and the shoulder 11012 of the housing 11017. The bias member can urge the secondary housing or sleeve 11016 to the extended mode as shown in the figures, which can also ready it for the loading of a fastener in the angled bore and/or shaft bore. The bias member can operate to slow down the advancement of the fastener as the drive element 11014 is advanced and rotated within the shaft bore 11063A and/or the angled bore 11088. Further, although shown as the coil spring, the bias member can be in the form of an elastomeric element, a leaf spring, or some other biasing element configured to extend or move the drive element 11014 relative to the angled bore 11088 or generally away from the second opening 11085 of the tool 11060.

As shown in FIG. 117, the elongated shaft member 11062 defines a shaft bore 11063A that is generally aligned with and forms an extension of the angled bore 11088 defined by the guide 11080. The guide and elongated shaft can be an integral, monolithic part as shown, or they can be separately constructed components, depending on the particular application. Generally the shaft bore is configured to receive the drive element 11014. Because the shaft bore and angled bore can be contiguous, the angled bore can also receive the drive element during an advancing operation. Indeed, the drive element and drive head or drive feature can both be rotated and reciprocally extended and/or retracted therethrough.

Optionally, the elongated shaft 11062 and/or guide 11080 can be outfitted with a magnet or the magnetic element 11066 which can be configured in close proximity to the shaft bore 11063A and/or angled bore 11088. This magnetic element can exert a magnetic force on a fastener disposed within the angled bore 11088 to hold it in place, readied for advancement.

The secondary housing 11016 can define a first end 11016B and a second end 11016C. This first end 11016B can be partially received within the primary housing 11017 and in particular inside the bore 11018 defined by the primary housing 11017. The second end 11016C can be configured to attach generally to a tool bit 11015, and optionally a nut assembly 11020 as described below. As with the other embodiments herein, the tool bit can be configured to be inserted in or otherwise joined with a drive chuck of a driving tool.

The secondary housing 11016 and primary housing 11017 can be coupled to one another so they are generally non-separable, and so that they are constrained to a predefined movement relative to one another. For example, the secondary housing 11016 can also include a pin 11016P. This pin can be integral with the housing, or it can be a fastener attached to the housing. The pin 11016P can be registered in a housing slot 11017S defined by the primary housing. This pin 11016P, by virtue of its registration within the slot 11017S generally maintains the connection between the primary housing 11017 and the secondary housing 11016. Of course, the pin 11016P and slot 11017S configuration can be replaces with some other construction to ensure that the two components remain connected to one another, even when the bias member 11018A biases the tool to the extended mode as shown in FIG. 117.

The interaction of the slot 11017S and the pin 11016P also can limit the range of motion of the housings relative to one another, as well as the advancement of the drive element and drive head in the respective bores, and thus the depth of advancement of a fastener advanced with the tool. For example, the slot 11017S of the housing 11017 can include a stop end 11017S'. This stop end can engage the pin 11016P when the secondary housing 11016 is moved into the primary housing 11017. This stop end can stop the motion or advancement of the secondary housing into the primary housing, and thus stop any further advancement of the drive element 11014 and its head into the angled bore 11088, and thus any further advancement of the fastener associated with the drive head 11014H of the tool.

The advancement of the drive element 11014 and movement of the secondary housing 11016 can also be retarded or stopped by engagement of the lower or second end 11016B of the secondary housing 11016 with the shoulder 11012 of the housing 11017. Indeed, in some cases the slot and pin configuration can be absent altogether and the engagement of the secondary housing with the shoulder within the primary housing 11017 can be the primary structure that stops the advancement and movement of the secondary housing relative to the primary housing and/or the drive element 11014 relative to the inside of the shaft bore 11063A and/or angled bore 11088.

The secondary housing 11016 also can define an internal bore 11016I. This internal bore 11016I can be of a sufficient size so that when the secondary housing 11016 is fully inserted in the internal bore 11018 of the primary housing 11017, the elongated shaft 11062 can be located within the internal bore 11016I. Generally, the internal bore 11016I can be dimensioned slightly larger than the elongated shaft to accommodate it.

The tool 11060 of the fifteenth alternative embodiment also can include drive element replacement assembly 1102 as shown in FIG. 117. The drive element replacement assembly 11020 can include a nut assembly 11021 having threads 11021A that threadably engage portions of the secondary housing 11016 to couple the assembly 11020 to the secondary housing 11016. Optionally an O-ring, or other connecting or fastening element 11024 can be disposed between the nut assembly 11021 and the secondary housing 11016 so the two remain generally attached and do not unthread due to vibration or rotation.

As illustrated, the nut assembly 11021 can include an outer hexagonal shaped surface for a tool to engage and rotate the assembly off of the secondary housing 11016. Optionally, the shape of the outer surface of the assembly can be knurled so that a user can manually unscrew or remove the assembly 11020 from the secondary housing 11016.

With reference to FIG. 117, the tool bit 11015 can be rotationally mounted within the nut assembly 11021. The nut body 11021 defines an internal bore 11029. Within this internal bore 11029 the tool bit 11015 is rotationally mounted and disposed.

The drive element replacement assembly 11020 can also include a system to capture the tool bit 11015 relative to the nut assembly 11021. For example, a ring 11022 can be fixedly attached via a friction fit, a weld, a fastener, adhesion or some other mechanism directly to the bit 11015. Below the nut assembly body 11021, the bit 11015 can define a groove or slot 11025. An e-clip or other type of clip 11025R can be disposed within that slot to further secure the bit 11015 to the assembly 11021. Other devices can be used to secure the bit 11015 to the body 11021 as desired.

Optionally, a bearing 11023 can be disposed between the bit 11015 and the nut assembly 11021 to facilitate rotation of the bit 11015 within the bore of the assembly 11021. Of course if desired, the bearing can be eliminated. The bit 11015 can also define a socket 11026 which receives at least a portion of the drive element 11014.

With the tool 11060 including the drive element replacement assembly 11020 shown in FIG. 117, a user can easily replace a worn out drive element 11014, for example, where the head 11014H of the drive element is worn or stripped. To do so, a user can unthread the nut assembly 11021 from the secondary housing 11016. The user can then remove the drive element 11014 from the socket 11026 of the tool bit 11015 and replace it with a new, fresh drive element. The user can then reassemble the tool by threading the nut assembly 11021 back into the secondary housing 11016.

Operation of the tool 11060 is similar to that of the twelfth and thirteenth embodiments described above. Suffice it to say that a fastener is placed in the angled bore 11088 and/or shaft bore 11063A. A driving tool is attached to the tool bit 11015. The alignment projection 11090 is positioned adjacent a bore with the second opening 11085 facing the side surface and/or corner of a board, and with the forward surface 11069 facing an upper surface of the board. The driving tool is operated to rotate the bit 11015, which in turn rotates the drive element 11014. The head 11014H engages the fastener.

The user applies a force and can hold the housing 11017 to prevent it from rotating. The drive element 11014 is pushed downward within the shaft bore and the angled bore. The fastener advances out of the second opening 11085 and into a board (not shown). The bias member 11018A compresses and the secondary body 11016 moves down a distance D until the pin 11016P bottoms out in the bottom of the slot 11017S'. Due to the bottoming out, the user is provided with tactile feedback, which informs them that the fastener is fully advanced, so the tool can be moved to a new fastener advancement position.

When the user begins to disengage the tool, and the previously applied force is removed, the bias member 11018A urges the secondary housing 11016 from a retracted to the extended mode shown in FIG. 117. The driving head 11014H moves upward within the shaft bore 11063A and/or angled bore 11088, away from the opening 11085, so that another fastener can be placed in the bore for another installation procedure.

XX. Sixteenth Alternative Tool and Method Embodiment

A sixteenth alternative embodiment of the fastener installation tool and related method is illustrated in FIGS. 118-121 and generally designated 12060. This embodiment, like the embodiments above can be well suited for use with shrinkable boards, or other types of boards as described herein. Moreover, this embodiment is well suited for the types of fasteners in the embodiments described herein, as well as any other type of fasteners. For example, the tool can be used to advance the side angled fasteners 10, 110, 210, 310 at the respective advancement orientations and using the techniques herein, and/or conventional pointed-tip fasteners. The installation tool of the sixteenth alternative embodiment also is similar in construction and operation to the embodiments described herein with several exceptions.

For example, turning to FIGS. 118-121, the sixteenth alternative embodiment of the fastener tool 12060 generally includes a nose assembly 12050 which is joined with a feed mechanism 12032 like the other feed mechanism of other embodiments herein. A driving element can be coupled to a driving tool (not shown). All of these components can be similar in structure and function to that in the alternative embodiments herein, for example, at least the eighth through thirteenth embodiments above.

The nose assembly 12050 can be constructed to include a guide 12080 and an alignment projection 12090. These components can be substantially identical to those of the other embodiments herein, for example, the eighth through thirteenth embodiments above. Indeed, the components can have the same structure and function as those described herein and will therefore not be described here again in detail. Suffice it to say that the guide 12080 can define an angled bore 12088 that includes a first opening 12084 in communication with the nose assembly opening 12055. The guide 12080 can also be joined with and/or include the alignment projection 12090, which can include the inner engagement surface 12092 and an outer engagement surface 12093, and can define at least a portion of the angled bore. The inner engagement surface can define the exit or second opening 12085 of the angled bore 12088, which extends along a longitudinal axis 12400. These features again are similar to those in the embodiments described above and below.

Figure 118:
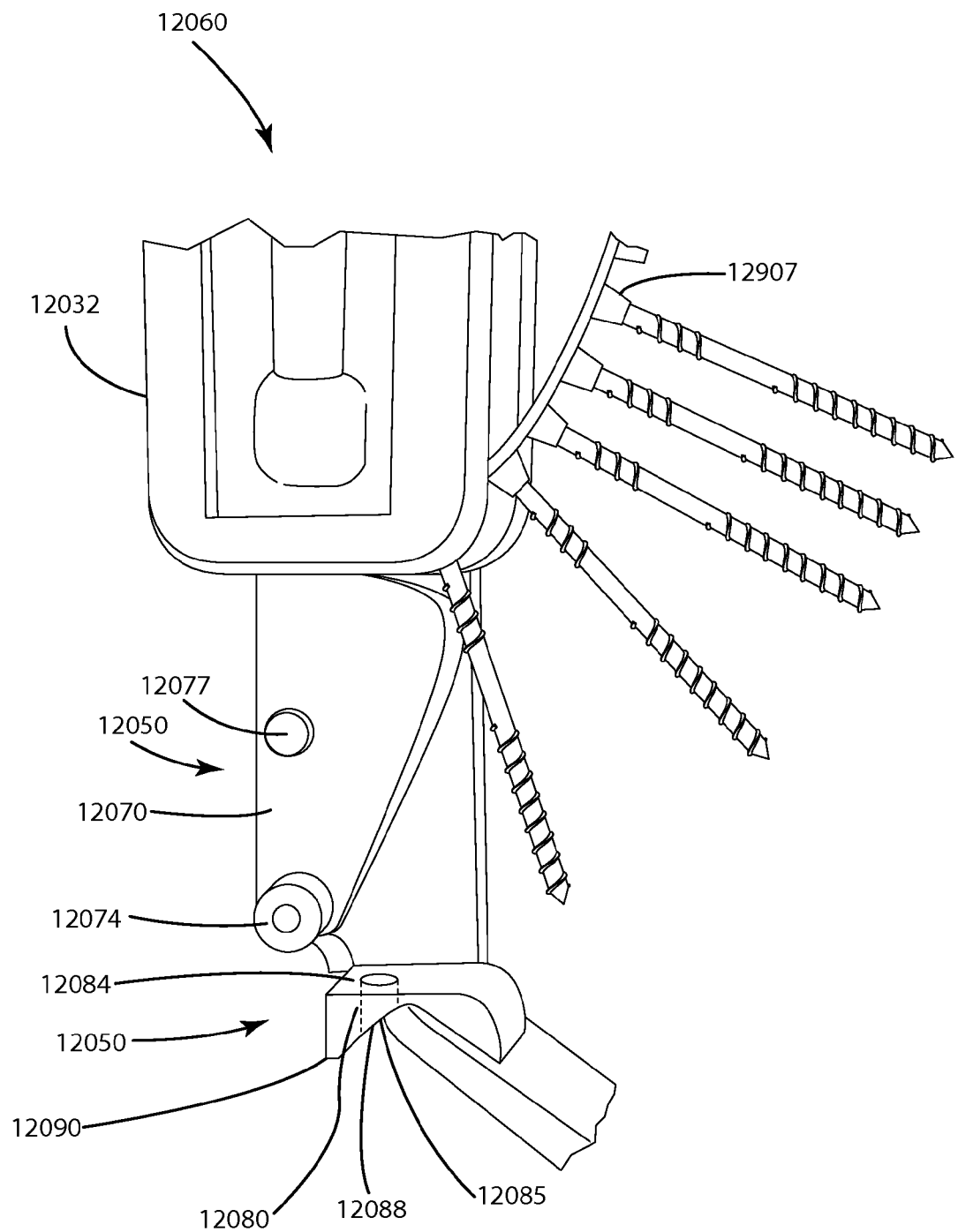
Figure 119:
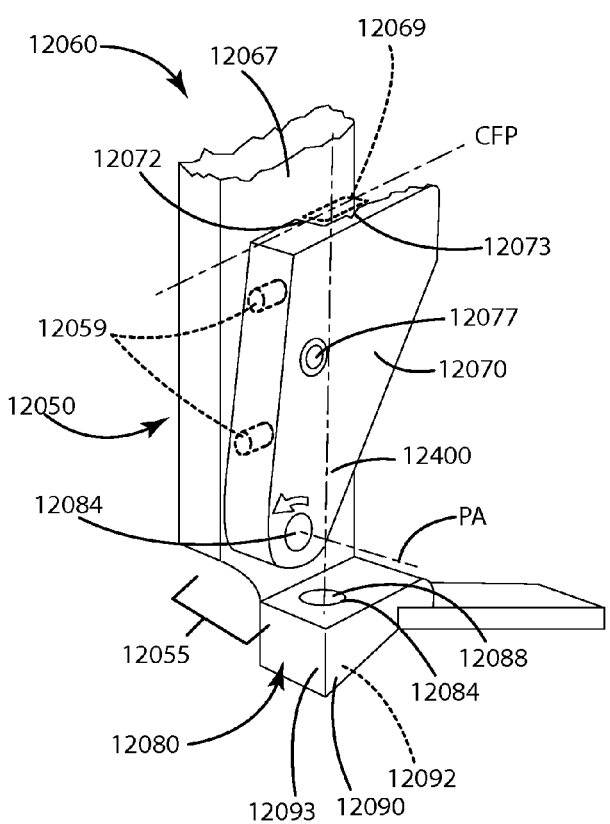

As shown in FIGS. 118 and 119, nose assembly opening 12055 can open to the environment on one side of the nose assembly. The nose assembly opening 12055 can be aligned with a collated fastener path CFP along which collated fasteners travel. The nose assembly can include a pocket element 12070 disposed within the opening 12055 that operates to form at least a portion of a guide pocket 12069. The guide pocket 12069 can be aligned with the angled bore 12088 or more generally the axis of rotation 12400 of the fastener. The guide pocket 12069 can capture and/or guide a portion of a fastener, for example, the head of a screw, and can assist in aligning the fastener with an opening 12084 of the angled bore 12088 so that the fastener consistently feeds into the angled bore 12088. Moreover, the guide pocket 12069 and its interaction with a fastener can prevent the fastener, as it is advanced into a board, from diving, deflecting, or otherwise becoming misaligned with the bore 12088 or tool, which could cause a jam or misfeed in the angled bore or nose assembly.

Figure 120:
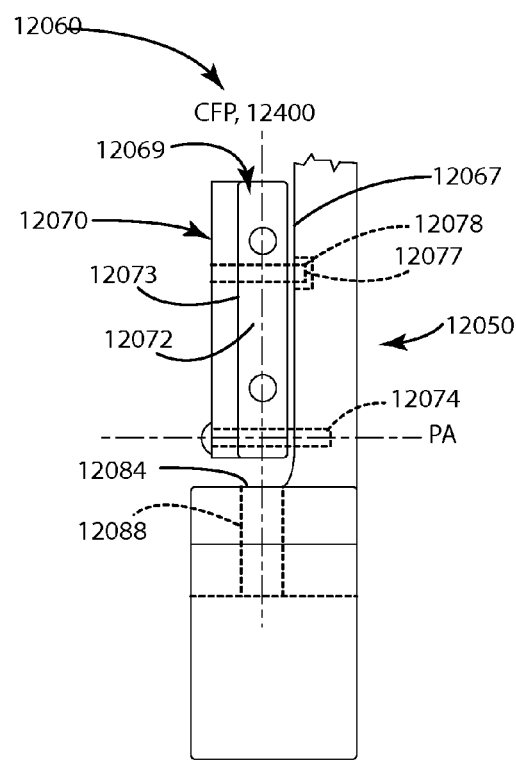

As shown in FIGS. 119 and 120, the guide pocket generally is located within the nose assembly opening 12055, and defined by the pocket element 12070, located in the opening, and adjacent the exterior surface 12067 of the nose assembly. Generally, the exterior surface 12067 of the nose assembly is flat or planar, but optionally can be curved and/or include some surface contours if desired. The pocket element 12070 is joined with the nose assembly, optionally the exterior surface. This joining can be via a fastener 12074, which can be in the form of a pin, a threaded element, or some other construction.

The pocket element 12070 at least partially defines the guide pocket 12069 with the exterior surface 12067. The pocket element includes a side wall 12073 and a back or stop wall 12072. The side wall 12073 and back wall 12072 can be transverse to one another, for example perpendicular to one another, or at some other angle relative to one another. If desired, the back wall 12072 and side wall 12073 can be contiguous, and can form a rounded surface where they connect or elsewhere. Further, although shown as one part of a monolithic, single piece pocket element, these walls can be parts of separate components, independent of one another.

The pocket element 12070 can be configured and oriented to obstruct or be placed within the collated fastener path CFP. As illustrated in FIGS. 118-120, the pocket element side wall 12073 can be generally parallel to the collated fastener path CFP, and the back wall 12072 can be generally transverse to collated fastener path CFP. The back wall 12072 can optionally be placed directly in the collated fastener path CFP so the fasteners associated with the collated strip 12907 cannot pass through the guide pocket without engaging the back wall 12072 or at least resting or briefly contacting it during a driving operation of the fastener. Upon such contact, the fasteners are generally impaired from further linear movement along the collated fastener path CFP, but are not prevented from rotation.

Figure 121:
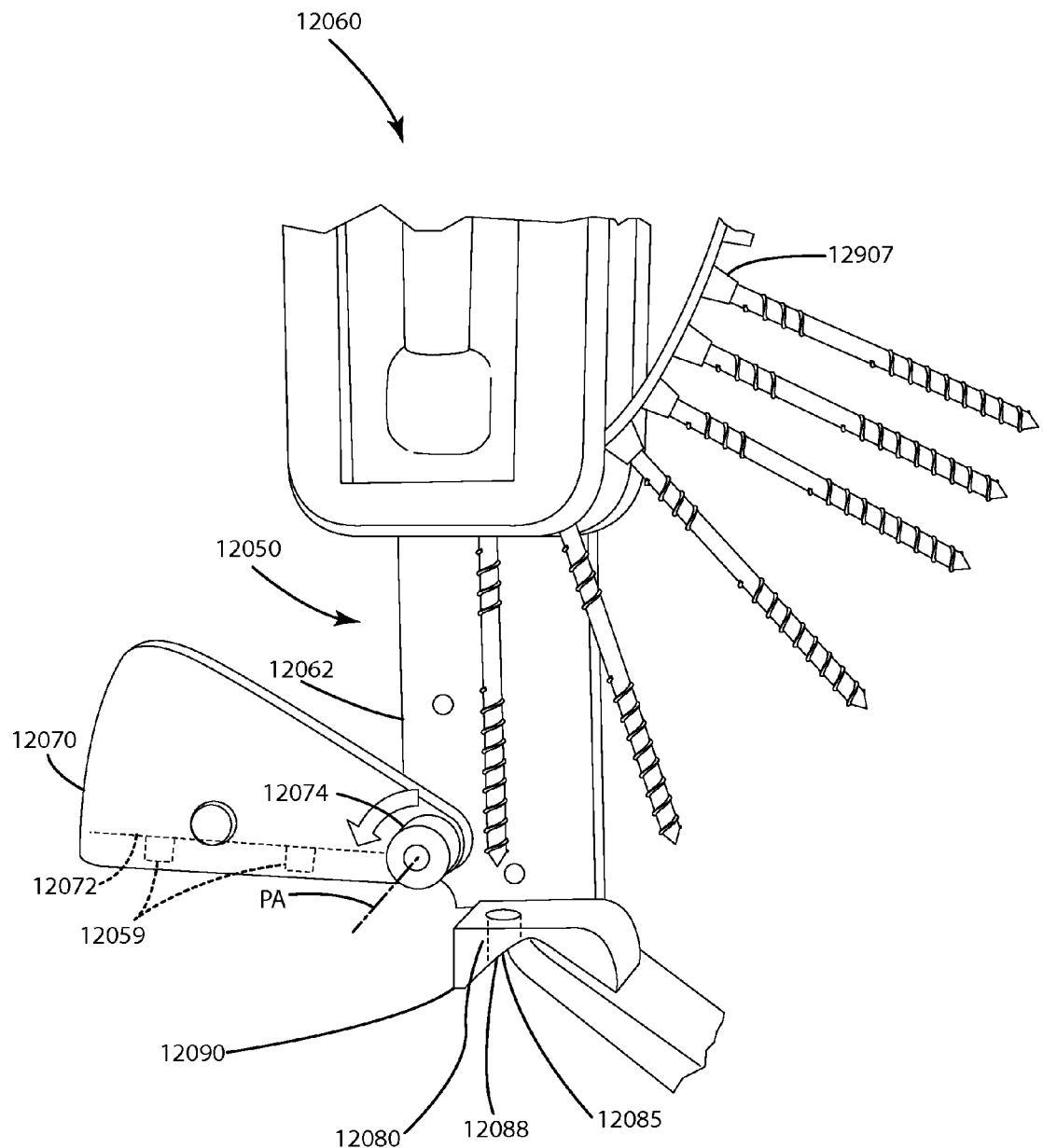
Figure 122:
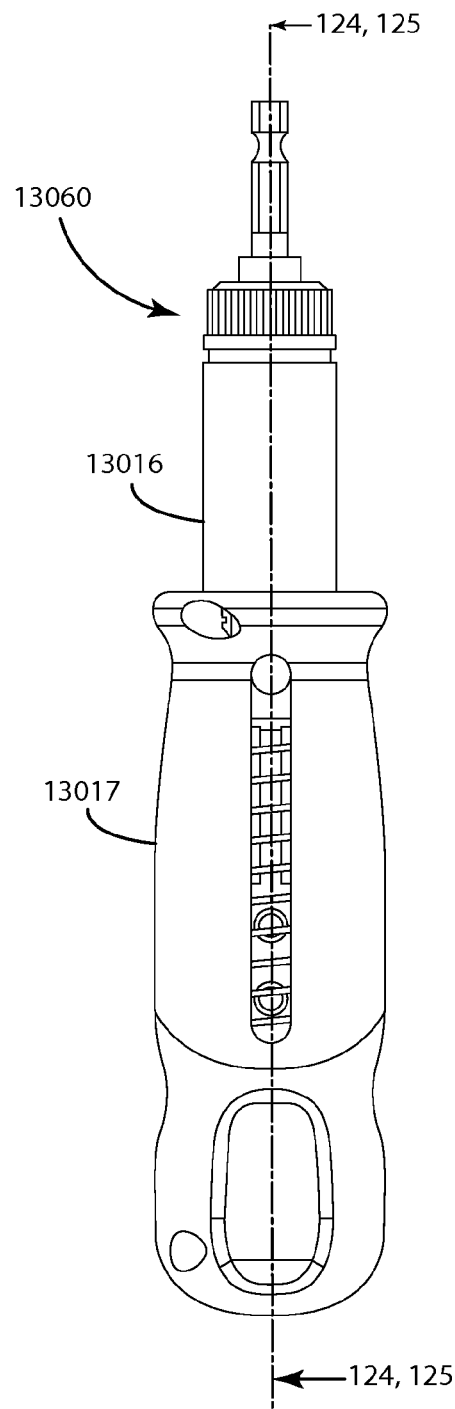
Figure 123:
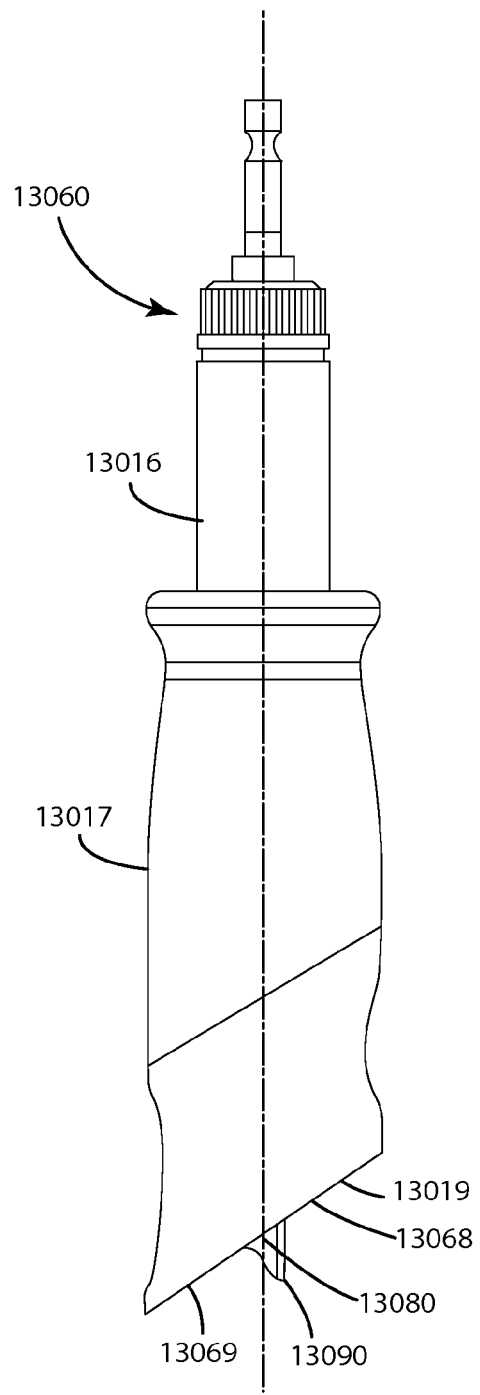

The pocket element 12070 can be moveable relative to the nose assembly 12050 and/or the exterior surface 12067 of the nose assembly. For example, the pocket element 12070 can be rotatably or pivotally attached to the nose assembly so it can move out of way of the collated fastener path CFP. In particular, the back wall 12072 can be moved out of the collated fastener path CFP as shown in FIG. 121. In such a construction, the pocket element 12070 can be pivotally attached to nose assembly 12050, with the lower part of the pocket element 12070 attached via the fastener 12074. The pocket element 12070 can selectively pivot about pivot axis PA. The pocket element 12070 can be rotated in a plane parallel to the exterior surface 12067 of the nose assembly. The pocket element 12070, and the back wall 12072, can be swung out of the collated fastener path CFP, optionally downward and forward of the opening 12055 as shown in FIG. 121.

If desired, however, the pocket element can be moveable relative to the nose assembly 12050 in other configurations. For example, the pocket element 12070 can pivot or rotate about an axis (not shown) that is parallel, rather than transverse to the collated fastener path CFP, and that is generally parallel to the axis of rotation 12400 of the fastener. In such a configuration, the pocket element can swing outward, away from the exterior surface 12067, with the back wall 12072 moving outward and away from the collated fastener path CFP, optionally travelling along an arc as it does so. As another example, the pocket element 12070 can pivot or rotate about an axis that is parallel, rather than transverse to the collated fastener path CFP, and generally perpendicular to the axis of rotation 12400 of the fastener. In such a configuration, the pocket element 12070 can swing outward, away from the exterior surface, with the back wall 12072 moving outward and away from the collated fastener path CFP, generally travelling along an arc, but where the pocket element pivots downwardly, away from the exterior surface of the nose assembly 12050.

Generally, the pocket element 12070 is operable in a pocket mode and a service mode. In the pocket mode, shown in FIGS. 118-120, the pocket element 12070 completes the guide pocket 12069. In the pocket mode, the exterior surface 12067 of the nose assembly 12050, and the back wall and the side wall of the pocket element collectively form the guide pocket 12069 within which the fastener initially rotates as it is engaged by a driving tool, for example, the head of the fastener is engaged by a bit of the driving tool. In the pocket mode, the fastener can be rotationally constrained around optionally at least 50%, further optionally at least 65%, even further optionally at least 75% of the circumference of the fastener, so the fastener is adequately constrained to rotate within a small area or volume, without wobbling or moving significantly out of the same. Further optionally, the screw is surrounded by three "sides" of the guide pocket, that is, the back wall, the exterior surface and the side wall. This can ensure that the fastener is advanced directly and consistently into the guide 12080, for example, the bore 12088 and its opening 12084.

If a screw jams or does not feed properly into the guide 12080 or the opening 12084, or if the collated fastener strip becomes lodged or jams in the tool, the pocket element 12070 can be converted to the service mode, which is shown in FIG. 121. In the service mode, the pocket element 12070 is rotated about the axis PA. The back wall 12072 is thus moved out of the collated fastener path CFP, and the side wall 12073 is moved generally away from the collated fastener path CFP so that access can be gained to the collated fastener path CFP, as well as any fasteners or the collated strip 12907. With the pocket element 12070 moved to the service mode position, the collated strip 12907 can be advanced forward or backward to clear the jam, or otherwise access a fastener in the nose assembly 12050 to clear a jam or otherwise service the nose assembly. After this, the pocket element 12070 can be swung back to the pocket mode shown in FIGS. 118-120.

With reference to FIGS. 119-120, the pocket element 12070 can include a locking element 12077 to secure the pocket element 12070 in the pocket mode and/or the service mode. The locking element 12077 can be a screw that engages a corresponding element, such as a recess 12078 or threaded hole in the exterior surface 12067 of the nose assembly 12050 to secure the pocket element 12070 in the pocket mode. Generally, the locking element prevents the pocket element from rotating about the pivot axis PA. Where the pocket element 12070 moves in other directions, the screw can prevent that movement as well. Optionally, the screw and corresponding structure can be replaced with a detent, a set screw, a cam, a spring loaded pin, or other locking device to lock the pocket element 12070 in the pocket mode. A user can engage the locking element, for example, the structure to disengage it and enable the user to move or rotate the pocket element, optionally converting the pocket element from the pocket mode to the service mode and vice versa.

As shown in FIGS. 119-121, the nose assembly 12050, the pocket element 12070 can include one or more magnetic elements 12059 located adjacent a collated fastener path CFP. The magnetic elements 12059 shown can be of the type described in other embodiments herein. The magnetic elements 12059 can exert a magnetic force on an individual fastener from the collated fasteners, so as to align that individual fastener with an opening 12084 of the guide. This can enable the fastener to enter the opening and subsequently the angled bore of the guide for advancement into the board. Where the fasteners are generally small and/or the bore is small, this can provide reliable alignment for consistent advancement of the fasteners, and can minimize unintentional jamming of the fasteners in the nose assembly 12050.

When associated with the pocket element, the magnetic elements 12059 can be positioned in the back wall 12072. In this manner, the magnetic elements 12072 generally can be positioned in and can obstruct the collated fastener path CFP. This can enable the magnetic elements 12059 to hold the individual fastener centered between the exterior surface 12067 and the side wall 12073, or generally centered over the opening 12084 to the bore 12088. In this manner, the fastener can be consistently aligned with and enter the bore. Optionally, the magnetic elements can be perfectly centered in the collated fastener path CFP, and generally equidistant from the exterior surface and the side wall. This configuration can assist in alignment of the individual fasteners with the bore 12088 and its axis 12400.

Although a variety of magnet configurations and number of magnets can be used, optionally, the magnetic elements 12059 can include first and second magnets. The magnetic elements 12059 can be located in the back wall 12072, generally one above the other in relation to the angled bore 12088 and opening 12084, adjacent the guide pocket 12069. The first magnet can exert a magnetic force on an upper portion of the individual fastener, and the second magnet can exert another magnetic force on a lower portion of the individual fastener. Collectively, these two forces can align the individual fastener with the opening 12084 and/or the axis 12400. Of course, more or fewer magnets can be used to align the fastener.

With the magnetic elements positioned in the back wall 12072, the magnetic elements also can move when the pocket element 12070 transitions between the pocket mode and service mode. For example, the magnetic elements 12059 can be pivoted generally parallel to and/or within with the collated fastener path CFP, but downward out of the way of the individual fasteners as shown in FIG. 121. In this manner, when the pocket element 12070 is in the service mode, the magnetic elements 12059 are removed a distance away from the collated fastener path CFP so that they do not attract or move the fasteners with the associated magnetic forces. Of course, the magnetic elements can be positioned and included in any of the other components, for example the side wall and/or the exterior surface depending on the application.

While the magnetic elements work well with fasteners including iron, there are some fasteners that do not include iron or are not affected by magnetic forces. Stainless steel screws are an example. With the guide pocket 12069 of the tool 12060, however, this is not too problematic because that pocket again substantially surrounds optionally at least 50%, further optionally at least 65%, even further optionally at least 75% of the circumference of the fastener, so the fastener is adequately constrained to rotate in a small area or volume. The fastener also can be surrounded by three "sides" of the pocket, which also aids in the rotational constraining of the fastener.

Further, the alignment projection and foot of the tool set the nose assembly, and thus the guide pocket, at a non-vertical angle, for example, any of the angles described in connection with the other embodiments herein. As a result, when the fastener is non-ferrous, it still lays in the guide pocket under the force of gravity, which can also assist in enabling the guide pocket to rotationally constrain the fastener.

XXI. Seventeenth Alternative Tool and Method Embodiment

A seventeenth alternative embodiment of the fastener installation tool and related method is illustrated in FIGS. 122-125 and generally designated 13060. This embodiment, like the embodiments above, can be well suited for use with shrinkable boards or other types of boards as described herein. Moreover, this embodiment is well suited for the types of fasteners in the embodiments described herein, as well as any other type of fasteners. For example, the tool can be used to advance the side angle fasteners 10, 110, 21, 310 at the respective advanced orientations and using the techniques herein, and/or conventional pointed-tip fasteners.

The installation tool of the seventeenth alternative embodiment also is similar in construction and operation to the embodiments described herein with several exceptions. For example the seventeenth alternative embodiment of the fastener installation tool can be for use in advancing individual fasteners, one at time, into a side surface and/or corner of a board, for example, a shrinkable board, as described in conjunction with the embodiments of the other fasteners and tools herein.

The seventeenth alternative embodiment of the fastener installation tool 13060 can include the elongated shaft 13062, guide 13080, alignment projection 13090, shaft bore 13063A, guide bore 13088 and other features of the eleventh, twelfth and fifteenth embodiments of the installation tools 7060, 8060 and 11060 described herein. The tool can include a drive element 13014 that is reciprocally mounted within one or both of the shaft bore 13063A and bore 13088 of the elongated shaft and guide, and that moves relative to the shaft, guide and/or alignment projection.

Turning to FIGS. 122-125, the tool 13060 can include a primary housing or sleeve 13017 mounted to and/or joined with a secondary housing or sleeve 13016. The primary housing 13017 can include ergonomic contours to enhance a user's grip on the tool, preventing it from rotating when it is joined with a driving tool and when a fastener is being advanced by the tool. The primary housing 13017 can include a lower surface 13019 which can be configured to engage the upper surface of the substrate during a fastener advancing operation. This lower surface, also referred to as a substrate engaging surface 13019, can be generally positioned around at least a portion of the guide 13080 and/or the alignment projection 13090. The substrate engaging surface 13019 generally can be flush or slightly recessed above or below the forward and rearward engagement surfaces 13069 and 13068 that are located forward and rearward of the alignment projection as described in connection with other embodiments herein.

Figure 124:
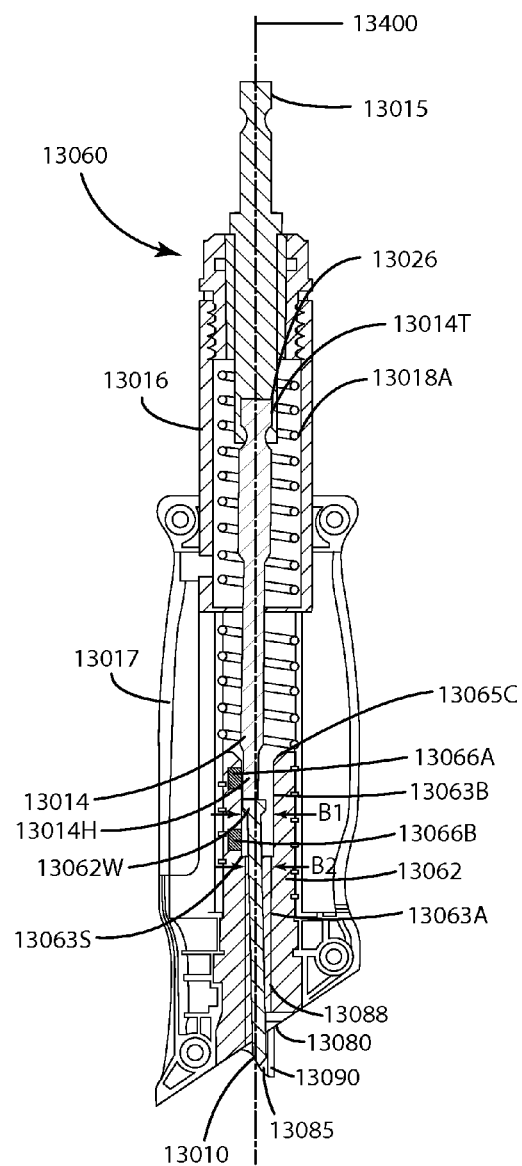

Like the fifteenth embodiment, the primary housing 13017 can further house an elongated shaft 13062 which defines the shaft bore 13063A as well as a portion of the guide 13080 which defines the angled bore 13088. The primary housing 13017 can also house a bias element 13018A to urge the secondary housing 13016 to the generally opened or extended mode as shown in FIG. 124. This extended mode is sufficient to move the drive element 13014, in particular the drive element head 13014H, within the angled bore 13088 and/or shaft bore 13063A so that a fastener can be positioned in the same, substantially entirely within one or both of those bores, with or without protruding beyond the second opening 13085. Generally, the bias member can operate the same as the bias member in the fifteenth embodiment, and can include the same structure.

As shown in FIG. 124, the elongated shaft member 13062 defines a shaft bore 13063A that is generally aligned with and forms an extension of the angled bore 13088 defined by the guide 13080. The guide and elongated shaft can be an integral, monolithic part as shown, or they can be separately constructed components, depending on the particular application. Generally the shaft bore is configured to receive the drive element 13014. Because the shaft bore and angled bore can be contiguous, the angled bore can also receive the drive element during an advancing operation. Indeed, the drive element and drive head or drive feature can both be rotated and reciprocally extended and/or retracted there through.

Figure 125:
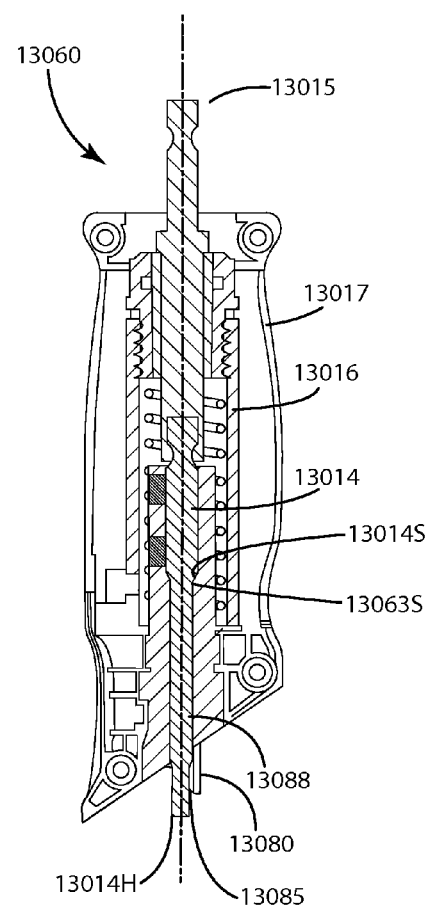

The elongated shaft member 13062 can be modified from the shaft member of the fifteenth embodiment. In particular, the shaft bore 13063A can be of a greater dimension than the angled bore 13080. For example, the shaft bore portion 13062B optionally can have a diameter B1, which is greater than the diameter B2 of the angled bore 13088 by at least 1%, 5% or 10%. This can enable the fastener head to engage the wall 13062W of the bore portion 13062B so that the drive element head 13014 can enter and engage a drive feature on the fastener head more easily. In addition, the different dimensions of the bore portions 13063A and 13063B create a shoulder 13063S in the bore. Where the tool 13060 has fully driven a fastener, for example, as shown in FIG. 125, this shoulder can operate to stop advancement of the drive element 13014 by way of the shoulder 13014S of the drive element engaging the shoulder 13063S in the bore. This can effectively capture the drive element so that it does not eject from the tool. The engagement also can set the depth to which the fastener is driven in an underlying substrate.

Optionally, the shoulder 13063S can operate to help in capturing the head of a fastener, preventing it from easily falling out of the bore. In some cases, where a magnet is included in the bore, the shoulder also can operate to provide an audible "click" when the fastener is sufficiently installed in the bore.

Further optionally, the opening 13063C to the shaft bore can be modified to include a chamfered or rounded surface so that the drive element head 13014H can more easily enter the shaft bore when the tool is disassembled and reassembled or otherwise serviced.

The elongated shaft 13062 and/or guide 13080 can be outfitted with one or more magnetic elements that can be configured in close proximity to the shaft bore 13063A and/or angled bore 13088. As an example, the shaft bore portion 13063B can include first and second magnets 13066A and 13066B. These elements can be aligned with one another, optionally one above the other, along a common plane. The first magnet 13066A can exert a first magnetic force on the head 13014H of the drive element, and the second magnet 13066B can exert a second magnetic force on the head of a fastener 13010 placed in the tool. The first magnet can align the head 13014H of the drive element and the head of the fastener along the common plane. In turn, this can ensure that the drive element head consistently and cleanly enters the drive feature of the fastener head, even when the drive element and its head are rotating relative bore, and entering the initially non-rotating fastener head. Further, where different fasteners having different sized heads are used in the same tool, regardless of the size of those heads, the magnets can repeatedly and consistently align the head of the drive element with the drive feature of the fastener.

As shown in FIG. 124, the upper portion 13014T of the drive element 13014 can be moveably mounted within the socket 13026. For example, the while the socket can retain the upper portion 13014T, it does so somewhat loosely, so that the drive element can pivot slightly about the upper portion 13014T, in some cases misaligning with the axis 13400 so that the drive element is no longer parallel with that axis. In such cases, the head 13014H can be offset from the axis while in the bore 13063B. This enables the head 13014H of the drive element to engage the wall 13062W of the bore, and generally align with the drive feature of the head of the fastener 13010. However, when the head 13014H of the drive element enters the angled bore 13088, the drive element is realigned and generally concentrically rotated about the axis 13400.

Operation of the tool 13060 is similar to that of the twelfth, thirteenth and fifteenth embodiments described above. Suffice it to say that a driving tool is attached to the tool bit 13015. A fastener 13010 is placed in the angled bore 13088 and/or shaft bore 13063A. The magnet 13066B magnetically attracts the head of the fastener to the wall 13062W, optionally in a plane. The alignment projection 13090 is positioned adjacent a bore with the second opening 13085 facing the side surface and/or corner of a board, and with the forward surface 13069 facing an upper surface of the board. The driving tool is operated to rotate the bit 13015, which in turn rotates the drive element 13014. The head 13014H is attracted to the wall 13062W. The head 13014H engages the fastener head and in particular its drive element, optionally in the common plane, and starts to rotate the fastener. The magnets assist in the alignment of the head 13014H and the head of the fastener 13010 in the common plane.

The user applies a force and can hold the primary housing 13017 to prevent it from rotating. The drive element 13014 is pushed downward within the shaft bore and the angled bore. The fastener advances out of the second opening 13085 and into a board (not shown). The bias member 13018A compresses and the secondary body 13016 moves down a distance until the shoulders 13014S and 13063S engage one another, providing tactile feedback to inform a user that the fastener is fully advanced, so the tool can be moved to a new fastener advancement position.

When the user begins to disengage the tool, and the previously applied force is removed, the bias member 13018A urges the secondary housing 13016 from a retracted to the extended mode shown in FIG. 124. The driving head 13014H moves upward within the shaft bore 13063A, 13063B and/or angled bore 13088, away from the opening 13085, so that another fastener can be placed in the bore for another installation procedure. The magnet 13066A holds the head of the drive element adjacent the wall 13063W.

XXII. Eighteenth Alternative Tool and Method Embodiment

An eighteenth alternative embodiment of the fastener installation tool and related method is illustrated in FIGS. 126-135 and generally designated 14060. This embodiment, like the embodiments above, can be well suited for use with shrinkable boards, or other types of boards as described herein. Moreover, this embodiment is well suited for types of fasteners in the embodiments described herein as well as any other type of fasteners. For example, the tool can be used to advance the side angled fasteners 10, 110, 210, 310 at the respective advancement orientations and using the techniques herein and/or conventional pointed tip fasteners. The installation tool of the eighteenth alternative embodiment also is similar in construction and operation to the embodiments described herein with several exceptions.

For example, turning to FIGS. 126-135, the eighteenth alternative embodiment of the fastener tool 14060 generally includes a feed mechanism 14032 and a nose assembly 14050. A guide 14080 and an alignment projection 14090 are included in the nose assembly. A foot 14051 extends forwardly from the nose assembly. The eighteenth alternative embodiment also includes a driving tool 14010. All these components can be similar in structure and function to that in the alternative embodiments herein, for example, at least the tools of the eighth, ninth, tenth and thirteenth alternative embodiments. Accordingly, all of the aspects, features, structure and function of those embodiments can apply similarly to this embodiment and therefore will not be described again in detail.

Figure 126:
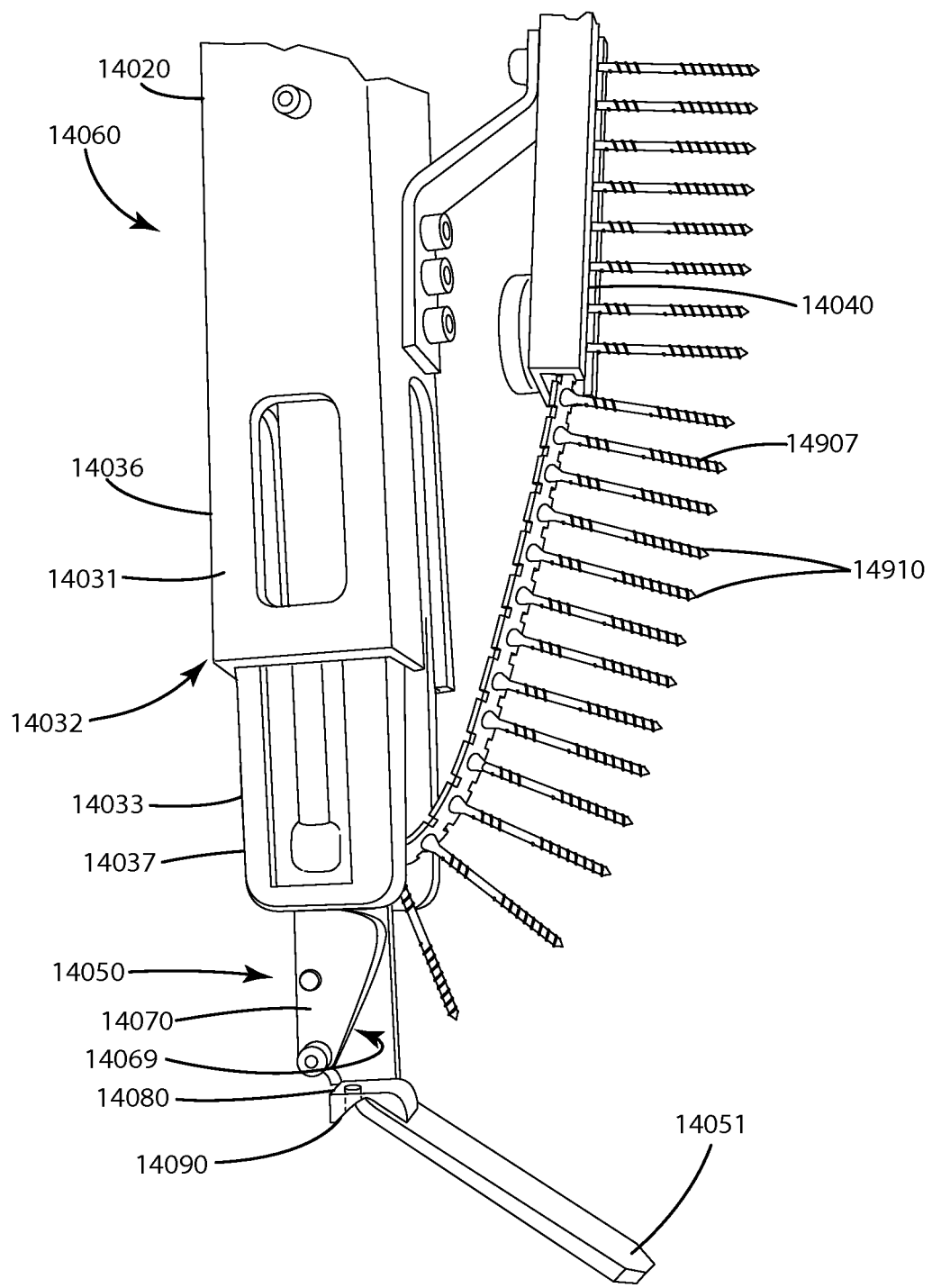

As shown in FIG. 126, the nose assembly 14050 can also include a pocket element 14070 to define a guide pocket 14069, similar to the pocket element described in connection with the sixteenth embodiment above. Indeed, the components can have the same structure and function, and therefore will not be described again here in detail.

Further, the operation of the nose assembly, the guide 14080, the projection 14090, as well as the foot 14051 can similar to that of the thirteenth alternative embodiment, particularly the engagement of the tool with the board shown in FIG. 71-79. Accordingly, all of the aspects, features, structure and function of those embodiments can apply similarly to this embodiment and therefore will not be described again in detail.

The feed mechanism, also referred to as a feed, can be any conventional feed mechanism capable of sequentially advancing collated fasteners 14907 from a holder or container 14040 to the nose assembly 14050. Examples of suitable feed mechanisms for collated fasteners are the Grabber® Super Drive Model 05, 55 or 75 Series, the Grip-Rite® collated screw gun attachment, or the P13KUE autofeed tool, all of which are referred to in connection with the eighth alternative embodiment above. These feed mechanisms are generally capable of advancing a collated strip 14907 having multiple individual fasteners 14910 associated therewith to the nose assembly upon compression of or general reduction of the dimension of the feed mechanism 14032. Typically, the feed mechanism includes a compression spring 14031 which compresses when a force is transmitted through the feeding mechanism via some other structure associated with the tool 14060. The feed mechanism can include a rebound spring or other element 14033 that can assist in resetting the feed mechanism. The feed mechanism also includes multiple structures, such as gears, levers and linkage, which advance the collated fasteners 14907 toward the nose assembly when the primary housing 14036 and secondary housing 14037 are moved relative to one another and/or inside one another. The collated fasteners 14907 and related strip of material used to hold the collated fasteners can be of the type generally described in connection with the thirteenth alternative embodiment above or any other embodiments described herein.

Figure 127:
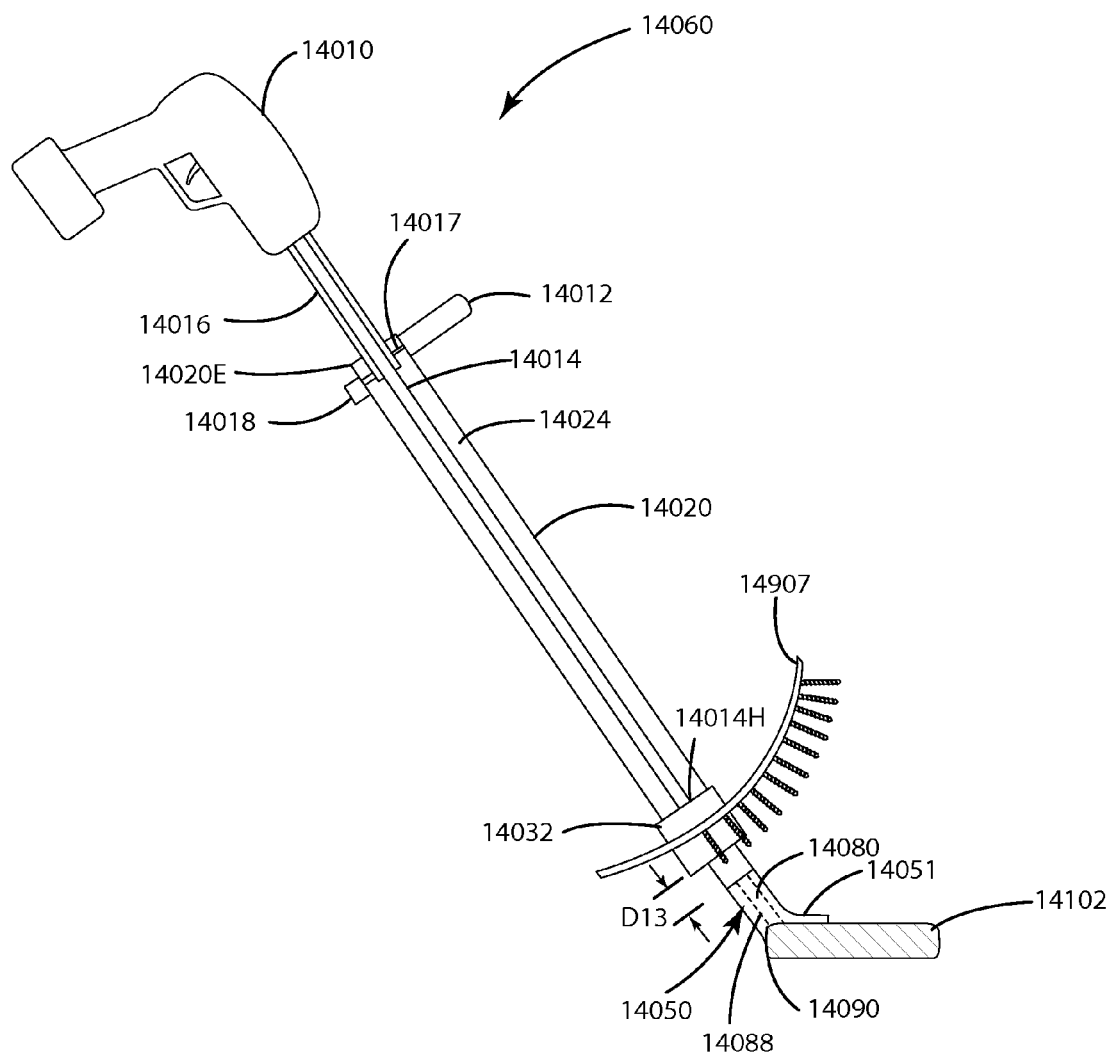
Figure 128:
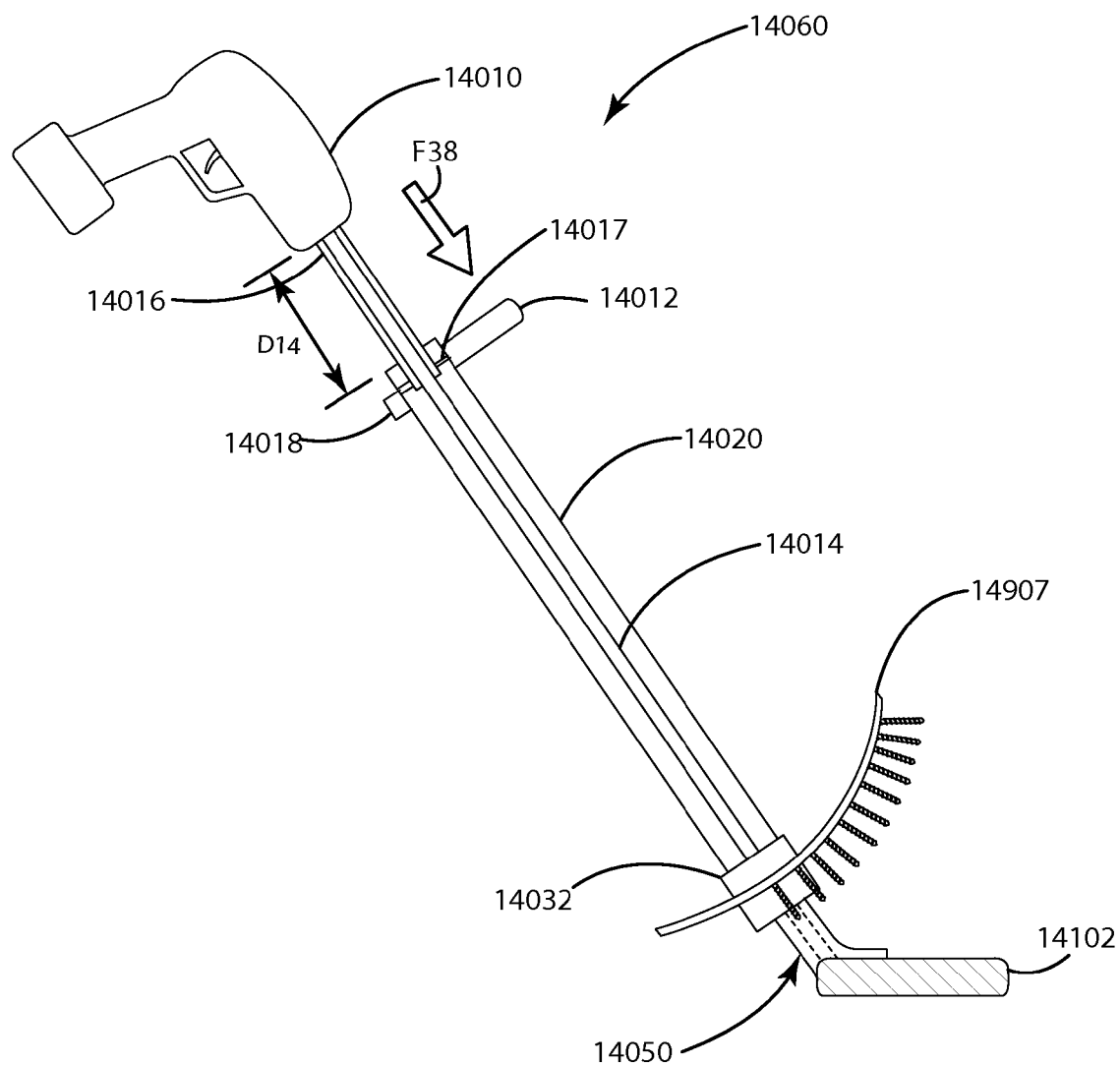

With reference to FIGS. 127 and 132, the tool 14060 includes a feed extension 14020 that extends upwardly away from the feed mechanism 14032. The feed extension 14020 can be an elongated bar of tubular shape, optionally hollow, and virtually of any geometric cross section. The feed extension can be of a length sufficient to enable the user of the installation tool 14060 to grasp the driving tool 14010 and stand up right while installing fasteners in a board at a lower level, for example, in a board that is at or near a user's feet or some other distance from a user's hands. Generally, the driving tool 14010 can be a cordless or electricity powered drill or other device capable of rotating fasteners.

The feed extension 14020 is generally fixedly secured relative to the primary housing 14036. Thus, the feed extension 14020 and the primary housing 14036 are movable toward and relative to the nose assembly 14050, and more generally, to the components thereof and/or a board or substrate 14102 on which the tool 14060 is used to install a fastener. The feed extension 14020 can include a handle 14012 attached to it. The handle 14012 can generally be ergonomically configured so that a user can grasp the handle and apply a downward force F38 (FIG. 128) which can be transferred to the feed mechanism or generally to the tool as described further below. The handle 14012 can be joined directly to the feed extension 14020 or offset with a bracket 14012B that can be moved to accommodate the user's preferences or stature.

A drive extension 14016 can be reciprocally and/or telescopingly mounted to the feed extension 14020. For example, the drive extension 14016 can be of a smaller cross sectional dimension than the feed extension 14020 and can fit within the internal bore of the feed extension 14020. The drive extension 14016 can be immovably, fixedly and/or nonrotatably secured to the driving tool 14010. Generally, the drive extension 14016 houses and encloses a drive element 14014 within the drive extension 14016 to shield a user from contact with it. The drive element 14014 can also extend through the feed extension 14020 downward to the nose assembly, where it can engage advance fasteners as with any of the similar to the drive elements of any of the other embodiments described herein.

Returning to FIGS. 127 and 132, the movement of the drive extension 14016 relative to the feed extension 14020 can be regulated by a pin or other element 14017 that slides within the confines of a slot 14019. Generally the ends of the slot 14019 can engage the pin 14017 to limit the movement of the drive extension 14016 relative to the feed extension 14020. The pin and slot can limit the reciprocating movement of the drive element 14014 within the feed extension 14020. The pin and slot further can prevent the feed extension 14016 from being withdrawn from the feed extension 14020 unintentionally.

The feed extension 14020 and drive extension 14016 can be outfitted with a locking element 14018. This locking element can be a simple threaded element that threads through the feed extension 14020 and engages the drive extension 14016. By tightening the locking element 14018, the drive extension 14016 can be secured in a fixed position and spatial orientation relative to the feed extension 14020. The locking element can enable the tool to operate in first and second modes as described in further detail below. Further optionally, the locking element can be a variety of structures or mechanism that can secure the drive extension 14016 immovably to the feed extension 14020. For example, the threaded element can be replaced with a cam, a collet, a clamp or any other construction.

As mentioned above, the locking element 14018 shown in FIG. 127 can configure the installation tool 14060 in a first mode or a second mode. Of course, the locking element 14018 can be absent from the tool all together, in which case, the installation tool remains in one of the two modes.

In the second mode, the locking element 14018 locks the drive extension 14016 in fixed relation to the feed extension 14020. More generally, the drive tool 14010 is fixed in a stationary location or position relative to the feed mechanism 14032. In this mode, the drive element 14014 is non-reciprocally mounted in the feed extension 14020, however, the drive element can rotate within the extension 14020. Optionally, the drive head 14014H of the drive element 14014 is at a fixed distance from the handle 14012 and/or the end 14020E of the extension 14020 or some other structure associated therewith. In this locked configuration of the second mode, the drive tool and drive element move with the primary housing 14036 of the feed mechanism 14032, and generally move with the feed mechanism 14032 when advancing a fastener toward the board 14102 or through the nose assembly 14050.

This second mode of operation is similar to the modes of operation of the eighth, ninth, tenth and thirteenth embodiments described above. Generally, when the driving operation fastener is completed, the feed mechanism, the feed extension 14020, drive extension 14016, drive element 14014 and driving tool 14010 retract or extend or move away from the nose assembly 14050 and the board 14102.

In the second mode, when a user exerts a force F40 as shown in FIG. 131 on the handle 14012, both the drive element 14014 and the feed mechanism 14032 move toward the nose assembly 14050 and more generally toward the board 14102, optionally simultaneously. In some cases, particularly with regard to boards constructed from plastic, synthetics or hardwoods, this motion can cause the fastener to inconsistently engage the board, float within the nose assembly and/or inadvertently deflect off the corner and/or side surface into which the fastener is advanced. This can lead to inconsistent advancing of the fasteners and can damage the board or lead to an unsatisfactory fastener installation. Further, many times the user cannot apply a controlled and/or consistent amount of force, or otherwise cannot incrementally apply a desired amount of force F40 because part of the force is used to move or press the feed mechanism 14032 and/or the spring associated therewith. This, again, can lead to inconsistent or unsatisfactory advancement of the fastener into these types of boards. Of course, where the substrate is a soft wood, such as treated lumber, the tool shown in the modes of FIGS. 130 and 131 can work satisfactorily due to the softness of the wood and the fastener being less prone to deflect from the surface of the soft wood.

The locking element, as mentioned above, also configures the installation tool in a first mode. In the first mode, the installation tool is operable in a two step procedure. In the first step, the drive tool remains stationary relative to the feed mechanism but moves toward the nose assembly when a force is transferred through the extension to the feed mechanism. In the first step, the drive element moves toward the nose assembly but does not engage the fastener and the collated fastener strip 14907. In this first step, a force applied to the handle 14012 transfers through the extension 14020 and feed mechanism 14032 to firmly and consistently engage the nose assembly, for example, the guide 14080 and optional foot 14051 against the respective side surfaces, corner and/or upper surface of the board 14102.

In the second step, after the feed mechanism is fully actuated, and optionally the spring associated therewith is compressed, or the feed mechanism is bottomed out, the driving tool and associated drive element are separately and independently moved relative to the feed mechanism. The drive tool moves toward the guide and generally toward the board while the feel mechanism remains stationary relative to the nose assembly. In this step, the drive element engages an individual fastener, breaks it loose from the collated strip, and advances it into the board.

Referring to FIG. 127, the locking element 14018 is configured so the installation tool 14060 is in the first mode. In that first mode, the drive element generally is operable in a primary mode and a secondary mode. In the primary mode, the drive element 14014 remains stationary relative to the feed mechanism 14032, but moves toward the nose assembly 14080 upon transfer of a force F38 to the handle 14012. Generally, the drive element can rotate relative to the nose assembly 14050 or other structure of the tool but still remain "stationary" relative to the feed mechanism. By this use of the word stationary is meant that the drive element does not advance toward or away from the feed mechanism, but may or may not rotate about an axis.

The drive element 14014 also is operable in the secondary mode while the tool is in the first mode. In the secondary mode, the drive element is separately and independently moveable relative to the feed mechanism 14032 so that the drive element 14014 moves toward the nose assembly, the guide, angled bore and/or the board while the feed mechanism 14032 remains stationary and/or in a fixed unmoving position, optionally relative to the nose assembly or the components thereof and/or the board 14102.

More specifically, as shown in FIG. 127, the tool is in the first mode and the drive element 14014 is in the primary mode. The tool 14060 is initially brought against the board 14102. The alignment projection 14090 and foot 14051 engage the side surface, corner and/or upper surface of the board 14102 as described in connection with other embodiments herein. The angled bore 14088 is aligned with the corner and/or side surface for a driving operation and alignment of features of the nose assembly, foot and alignment projection. However, the user may desire to apply additional force. In so doing, with reference to FIG. 128 a force F38 is applied to the handle 14012. That force F38 is transferred through the feed extension 14020 to the feed mechanism 14032. As a result, the feed mechanism 14032 presses generally with the primary housing and the secondary housing moving toward one another, the spring compressing, and the feed mechanism 14032 eventually bottoming out. An individual fastener from the collated fastener strip 14907 can be advanced during this operation to ready that individual fastener for advancement into the nose assembly 14050. Generally, the feed mechanism moves a distance D13 toward the nose assembly 14050 and/or the board 14102 in this primary mode. While the drive extension 14020, the drive element 14014 and the driving tool 14010 also move this distance D13, these elements generally do not move toward the feed mechanism, nor do they move any closer to the collated fastener strip 14907 or any individual fastener thereof. In this manner, the drive element head 14014H does not engage individual fasteners.

With the nose assembly 14050 adequately aligned with the board 14102 and a first force F38 applied, the user can continue to apply that force and begin advancement of the fastener. The drive element is then operated in the secondary mode, in which it is separately and independently moved relative to the feed mechanism 14032. Again, the feed mechanism 14032 has ceased its movement. In the secondary mode, another force F39 can be applied directly to the driving tool 14010 and thus to the drive element 14014. The drive element 14014 and the drive head 14014H move toward the nose assembly 14050, the guide 14080 and generally the board 14102. In this operation, the drive element head 14014H engages an individual fastener from the collated fasteners 14907 and pushes it or removes it from the collated fastener strip. The fastener enters the angled bore 14088. The drive element 14014 can continue to move and advance the fastener into the board 14102, for example, the corner and/or side surface as described in connection with any of the other embodiments above. All while this occurs, the alignment projection 14090 and the foot 14051 remain engaged with the side surface, corner and/or upper surface of the board 14102, respectively. The drive element 14014 can advance until the fastener is sufficiently advanced with the board.

After the fastener is sufficiently installed in the board 14102, the forces F39 and F38 can be removed. Another force F41 can be applied to the drive tool and/or the handle to withdraw the drive extension 14016 from the feed extension 14020. Another force F42 can be applied to the handle 14012 to disengage the nose assembly, and the tool in general, from the board 14102 to ready the tool for the installation of another fastener. In so doing, the drive element 14014H head is removed from the angled bore 14088 and generally the nose assembly 14050. It also moves within the feed extension 14020. The nose assembly 14050 can be removed and disengaged from the board 14102 to ready it for advancement of the next fastener. This process can be repeated multiple times to install multiple fasteners.

FIGS. 132-135 generally illustrate the two-step process of the tool first mode from a different perspective. As shown in FIG. 132, the nose assembly 14050 is initially brought into engagement with the corner and/or side surface of the board 14102. The angled bore can be aligned with the corner and/or side surface. As shown in FIG. 133, a force F38 can be applied to the handle 14012. This force is transmitted through the feed extension 14020 to operate the feed mechanism 14032. The feed mechanism 14032 compresses or reduces in size until it bottoms out and the force F38 is transferred to the nose assembly 14050 to sufficiently engage the tool against the board 14102 with a desired amount of force and/or pressure. At this point however, the drive element has not begun to engage the fastener.

As shown in FIG. 134, another force F39 is applied to the drive tool 14010. This moves the drive element into engagement with the collated strip, optionally removing an individual fastener from the strip and pushing it through the nose assembly 14050 to engage the board. As shown in FIG. 135, the drive tool 14010 continues to operate the drive element and drive or advance the fastener into the board, all while the nose assembly 14050 remains sufficiently engaged with the board.

XXIII. Nineteenth Alternative Tool and Method Embodiment

A nineteenth alternative embodiment of the fastener installation tool and related method is illustrated in FIGS. 137-138 and generally designated 15060. This embodiment, like the embodiments herein, can be well suited for use with any type of work pieces or boards, including shrinkable boards, porch boards or tongue and groove boards as described in connection with the tools and methods the third alternative embodiment, the fourth alternative embodiment, and/or the fifth alternative embodiment described herein. For example, the tool can be used to advance the side angled fasteners 10, 110, 210, 310 at the respective advancement orientations using the techniques herein and/or conventional pointed tip fasteners.

As shown in FIG. 138, the tool and method can be used to install work pieces formed as what is conventionally known as "porch boards" or generally a board that includes a tongue-and-groove construction, where the tongue of one board is adapted to insert and be received by the corresponding groove defined by the side of an adjacent, similar board to enhance continuity between the boards and their connection to one another and/or an underlying substrate.

Referring to FIG. 138, the work piece 15602 is generally identical to the work piece 602 shown in the third alternative embodiment of the installation tool discussion above. Briefly, the work piece includes a side surface 15608 having a tongue 15601 that extends outwardly from the side surface 15608. The tongue has a tongue upper surface 15604 that intersects the board's side surface 15608 at a corner 15603. Again, this construction of the board can be similar to that described with any other porch boards or tongue and groove boards herein.

The tool and method of the nineteenth alternative embodiment also is similar in construction and operation to the embodiments described herein with several exceptions. For example, the nineteenth alternative embodiment of the fastener installation tool can be used to advance individual fasteners, one at a time, into a side surface and/or corner of a board, for example a porch board or a tongue and groove board.

The nineteenth alternative embodiment of a fastener installation tool 15060 can include an elongated shaft 15062, a guide 15080 and one or more alignment projections 15090, a shaft bore 15063A, a guide bore 15088 and any other features of the eleventh, twelfth, fifteenth and seventeenth embodiments of the installation tools 7060, 8060, 11060 and 13060 described herein. The tool can include a rotatable drive element 15014 that is reciprocally and rotatably mounted within one or more of the shaft bore 15063A and the bore 15088 of the elongated shaft and guide. The drive element, virtually identical to the eleventh, twelfth, fifteenth and seventeenth elements, can move relative to the shaft, guide and/or alignment projections 15090 and can rotate.

The installation tool 15060 can also include a primary housing or sleeve 15017 and a secondary housing 15016 which are configured and operate like those features in the above noted embodiments. The primary housing 15017 can include forward facing foot 15051 that extends forward of the guide 15000. The housing 15017 also can include a lower surface 15019 which can be configured to engage the upper surface 15611 of a board during a fastener advancing operation. The lower surface 15019, also referred to as the substrate engaging surface, can generally be positioned around all or at least a portion of the guide 15080 and/or the at least one alignment projection 15090. The substrate engaging surface 15019 generally can be flush or slightly recessed above or below the forward and rearward engagement surfaces 15069 and 15068.

The guide 15080 and elongated shaft 15062 are substantially identical to that in the seventeenth alternative embodiment above and therefore will not be described in further detail here. The at least one alignment projection 15090 however, is somewhat different from that in the seventeenth alternative embodiment. For example, the at least one alignment projection 15090 can include a pair of generally cylindrical projections extending downwardly from the lower surface of the guide 15080. The angled bore 15088, and in particular, the opening 15085 of the angled bore can be aligned between the individual ones of the pair of the alignment projections 15090. In this configuration, the fastener is ejected generally between the individual alignment projections 15090. In this manner, it can traverse into a corner 15603 of the work piece 15602. Optionally, the guide and tool of this embodiment does not include a material ejection port. Instead, the one or more alignment projections are sized and shaped so that material bored from a hole due to the advancement of the fastener simply dumps out, adjacent the hole, rather than being carried up a portion of the guide and/or angled bore.

The alignment projections 15090 are shown as each including an inner engagement surface 15092 and an outer engagement surface 15093. The inner engagement surface 15092 generally engages the side surface 15608 of the board 15602 as shown in FIG. 138 during installation. The outer engagement surface 15093 does not engage a portion of the board itself, for example the tongue 15601 and/or the side surface 15608 or the corner 15603. The alignment projection can be of a depth D22 extending from the bottom surface 15069 of the tool 15060. This depth D22 can be preselected so that it is less than the overall distance from the upper surface 15611 of the board to the upper surface 15604 of the tongue 15601. Generally, this enables the bottom surface 15069 to engage the upper surface 15611 of the board 15602 without tilting at an abnormal angle.

As shown in FIG. 137, the opening 15085 of the angled bore 15088 opens at the bottom surface of the guide 15080. Optionally, the alignment projections 15090 do not include any part of or define the second opening 15085. Accordingly, the alignment projections 15090 do not rotationally constrain a fastener advancing out of the opening 15085 or the guide in general. This construction is suitable for tongue and groove boards because the fastener, as it advances is generally guided and rotationally constrained by and aligned with the corner 15603 of the board, by the side surface 15608 and the upper surface 15604 of the tongue 15601. The alignment projections 15090 do not include other structure to guide the screw into that location because the screw is naturally guided by the work piece or board itself.

The operation and method of use of this installation tool 15060 is substantially identical to any of the eleventh, twelfth, fifteenth and seventeenth embodiments herein, and therefore will not be described again here in detail. One exception is that the engagement of the tool with the work piece more closely resembles the engagement of the tools the associated with the porch boards, in particular the third, fourth and fifth embodiments of tools and methods described above.

The above description is that of current embodiments. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A fastener installation tool comprising:
   a primary housing defining an internal cavity;

a secondary housing mounted at least partially within the internal cavity;

a drive element having a drive feature, the drive element rotatably joined with at least one of the primary housing and the secondary housing so that the drive element rotates relative to the at least one of the primary housing and the secondary housing, the drive element being adapted for operably coupling to a rotating driving tool;

an elongated shaft defining a shaft bore, the shaft bore configured to receive the drive element when the drive element is rotated by a drive tool;

a guide joined with the elongated shaft, the guide defining an angled bore configured to receive a fastener, the guide having an exit opening from which the fastener exits the angled bore, the guide including an alignment projection extending downwardly from the guide a preselected distance, the alignment projection including an inner engagement surface oppositely disposed from an outer engagement surface, the inner and outer engagement surfaces merging together at a terminal end to form a wedge, the inner engagement surface contoured to engage at least one of a board side surface and an upper board corner, which transitions between the board side surface and an uppermost surface of the board, so as to align the angled bore with the corner at a preselected angle, the exit opening being defined by the inner engagement surface, wherein at least one of the elongated shaft and the guide are fixedly and non-rotatably joined with the at least one of the primary housing and the secondary housing;

wherein the guide includes a bottom surface extending forwardly of the inner engagement surface, the guide bottom surface configured to engage the uppermost surface of the board to assist in aligning the angled bore with the at least one of the board side surface and the upper board corner at the preselected angle, wherein the angled bore is aligned with the shaft bore so that the drive element can be extended through the shaft bore and through the angled bore while rotating the fastener.

2. The fastener installation tool of claim 1,
wherein the drive element is configured to rotate relative to the primary housing and to the secondary housing,
wherein the secondary housing is moveable from an extended mode to a retracted mode as the drive element is extended through the shaft bore and through the angled bore while rotating the fastener.

3. The fastener installation tool of claim 1 wherein the bottom surface extends rearwardly of the outer engagement surface.

4. The fastener installation tool of claim 3 wherein the primary housing includes a bottom surface, wherein the bottom surface of the primary housing substantially surrounds the bottom surface of the guide extending forwardly of the inner engagement surface and the bottom surface of the guide extending rearwardly of the outer engagement surface.

5. The fastener installation tool of claim 1 comprising a bias member disposed in an internal bore defined by at least one of the primary housing and the secondary housing, the bias member urging the secondary housing from a retracted mode to an extended mode.

6. A method of installing a fastener comprising:
providing an installation tool including an elongated shaft defining a shaft bore configured to receive a drive element being rotated by a drive tool, a guide joined with the elongated shaft, the guide defining an angled bore configured to receive a fastener, the guide having an exit opening from which the fastener exits the angled bore, the guide including an alignment projection extending downwardly from the guide a preselected distance, the alignment projection including an inner engagement surface oppositely disposed from an outer engagement surface, the inner and outer engagement surfaces merging together at a terminal end to generally form a wedge, the tool including a bottom surface adjacent the alignment projection and extending forwardly of the inner engagement surface, the inner engagement surface contoured to engage at least one of a board side surface and an upper board corner, so as to align the angled bore with at least one of a board side surface and an upper board corner, at a preselected angle, the exit opening being defined by the inner engagement surface;

providing a first board having a first board side surface and an first board upper corner, the first board upper corner transitioning between the first board side surface and a first board uppermost surface, providing a second board having a second board side surface and a second board upper corner, the second board upper corner transitioning between the second board side surface and a second board uppermost surface, placing the first board side surface adjacent the second board side surface so that a crevice is formed between the first board upper corner and the second board upper corner;

placing the tool so that the wedge fits at least partially within the crevice between the first board upper corner and the second board upper corner, with the outer engagement surface contacting the second board upper corner so as to set a depth from the first board uppermost surface at which the fastener is advanced, and with the bottom surface of the tool engaging the first board uppermost surface; and advancing the fastener through the angled bore and through the first board upper corner.

7. The method of claim 6 wherein there is no gap between the first board side surface and the second board side surface, wherein the wedge is positioned between the first board upper corner and the second board upper corner without extending beside the first board side surface and the second board side surface.

8. The method of claim 7 comprising rotating the fastener.

9. The method of claim 8 wherein the installation tool includes a bias member that urges the secondary housing to an extended mode relative to the primary housing, generally outward from the internal bore of the primary housing, wherein during the advancing step, the bias member compresses.

10. The method of claim 7 comprising providing a primary housing defining an internal bore and a secondary housing, wherein during the advancing step, the secondary housing enters the internal bore.

11. A fastener installation tool comprising:
a primary housing, including an exterior surface adapted and contoured for manual gripping by a user's hand,
a secondary housing moveable relative to the primary housing during a fastener installation operation,
a drive element,
an elongated shaft defining a shaft bore, the elongated shaft joined with at least one of the primary housing and the secondary housing, the shaft bore configured to receive the drive element when the drive element is rotated by a drive tool, the shaft bore bounded by a wall; and a guide joined with the elongated shaft, the guide defining an angled bore configured to receive a fastener, the guide having an exit opening from which the fastener exits the angled bore, the guide including an alignment projection extending downwardly from the guide a preselected distance, wherein the guide includes a bottom surface configured to engage an uppermost surface of a board to assist in aligning the angled bore with a board side surface at a preselected angle, wherein the angled bore is aligned with the shaft bore so that the drive element can be extended through the shaft bore and through the angled bore while rotating the fastener.

12. The fastener installation tool of claim 11 wherein a magnetic element is positioned adjacent the shaft bore, the magnetic element exerting a magnetic force on a head of the fastener so that the head of the fastener engages the wall.

13. The fastener installation tool of claim 12 wherein the magnetic element exerts the magnetic force on the drive element to align the head of the fastener and the drive element with one another so the drive element engages the head of the fastener while the drive element is rotating.

14. The fastener installation tool of claim 11 wherein the magnetic element includes first and second magnets generally aligned in a common plane so as to exert the magnetic force on the drive element and the head of the fastener in the common plane so that the drive element engages the head of the fastener in the common plane.

15. The fastener installation tool of claim 11 comprising a magnetic element positioned adjacent the shaft bore, the magnetic element exerting a magnetic force on the drive element so that the drive element engages the wall as it rotates, aligned with a drive feature of the head of the fastener.

16. The fastener installation tool of claim 11, wherein the shaft bore includes a shoulder, wherein the drive element includes a shoulder, wherein the shoulder of the shaft bore and the shoulder of the drive element engage one another to terminate extension of the drive element from the tool.

17. The fastener installation tool of claim 11, comprising a magnetic element that exerts a magnetic force, the magnetic element positioned adjacent at least one of the shaft bore and the angled bore, wherein the shaft bore and the angled bore have different diameters, with a diameter of the shaft bore being larger than a diameter of the angled bore, wherein the angled bore defines an axis, wherein the magnetic force pulls the drive element so it is nonparallel with the axis.

18. The fastener installation tool of claim 11 wherein the alignment projection is generally in the shape of a triangular wedge when viewed from a side view and wherein the terminal end is rounded to impair marring of the board with the alignment projection.

19. The fastener installation tool of claim 11 comprising a bias member disposed between the primary housing and the secondary housing, wherein the bias member biases the drive element away from the opening.

20. The fastener installation tool of claim 11, wherein the alignment projection includes an inner engagement surface oppositely disposed from an outer engagement surface, the inner and outer engagement surfaces merging together at a terminal end to form a wedge, the inner engagement surface contoured to engage at least one of the board side surface and an upper board corner, which transitions between the board side surface and the uppermost surface of the board, so as to align the angled bore with at least one of the corner and the board side surface at a preselected angle, the exit opening being defined only by the inner engagement surface.

* * * * *